(12) United States Patent
Xia et al.

(10) Patent No.: US 11,577,309 B2
(45) Date of Patent: *Feb. 14, 2023

(54) POLYHEDRAL METAL NANOCAGES WITH WELL-DEFINED FACETS AND ULTRATHIN WALLS AND METHODS OF MAKING AND USES THEREOF

(71) Applicant: Georgia Tech Research Corporation, Atlanta, GA (US)

(72) Inventors: Younan Xia, Atlanta, GA (US); Dong Qin, Atlanta, GA (US); Xue Wang, Jiaozhou (CN); Sang-Il Choi, Daegu (KR); Sujin Lee, Atlanta, GA (US); Lei Zhang, Hengshui (CN); Xiaojun Sun, Prospect Heights, IL (US); Junki Kim, Goyang-Si (KR); Ming Zhao, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/079,985

(22) Filed: Oct. 26, 2020

(65) Prior Publication Data
US 2021/0114092 A1 Apr. 22, 2021

Related U.S. Application Data

(63) Continuation of application No. 15/580,377, filed as application No. PCT/US2016/036591 on Jun. 9, 2016, now Pat. No. 10,835,955.
(Continued)

(51) Int. Cl.
*B22F 1/054* (2022.01)
*B22F 1/17* (2022.01)
(Continued)

(52) U.S. Cl.
CPC ............... *B22F 1/054* (2022.01); *B22F 1/17* (2022.01); *B22F 9/16* (2013.01); *B22F 9/24* (2013.01);
(Continued)

(58) Field of Classification Search
None
See application file for complete search history.

(56) References Cited

U.S. PATENT DOCUMENTS 2,763,318 A 9/1956 Bertoia
3,264,034 A 8/1966 Lawson
(Continued)

FOREIGN PATENT DOCUMENTS

WO 2009139748 A1 11/2009
WO 2014088518 A1 6/2014

OTHER PUBLICATIONS

Maelabs, "Gold, Au", https://www.princeton.edu/-maelabs/mae324/glos324/gold.htm, accessed Sep. 18, 2019.
(Continued)

*Primary Examiner* — Xiaobei Wang
(74) *Attorney, Agent, or Firm* — Thomas | Horstemeyer, LLP

(57) ABSTRACT

A variety of polyhedral nanocages are provided having a hollow interior, ultrathin walls, and well-defined facets of metal atoms. The nanocages can include a variety of precious metals such as Pt, Au, Ru, Rh, or Ir. The metal atoms can take a face-centered cubic structure with {111} facets on the surface. The walls can be thin, sometimes less than 1 nm in thickness or only a few atomic layers in thickness. The nanocages can provide for efficient uses of valuable precious metals, among other things, in catalysis. For example, catalysts are provided exhibiting high mass activities in oxygen reduction reactions. Methods of making and methods of using the nanocages and catalysts are also provided.

16 Claims, 72 Drawing Sheets

Related U.S. Application Data

(60) Provisional application No. 62/172,943, filed on Jun. 9, 2015.

(51) Int. Cl.

| | |
|---|---|
| *C22C 5/00* | (2006.01) |
| *C22C 27/00* | (2006.01) |
| *B22F 9/24* | (2006.01) |
| *B22F 9/16* | (2006.01) |
| *B82Y 40/00* | (2011.01) |

(52) U.S. Cl.
CPC .......... *B22F 1/0549* (2022.01); *B22F 1/0553* (2022.01); *B22F 2301/25* (2013.01); *B22F 2304/054* (2013.01); *B22F 2998/10* (2013.01); *B82Y 40/00* (2013.01); *C22C 5/00* (2013.01); *C22C 27/00* (2013.01)

(56) References Cited

U.S. PATENT DOCUMENTS

| | | | |
|---|---|---|---|
| D578,786 S | 10/2008 | Cantarutti | |
| D591,966 S | 5/2009 | Bouroullec et al. | |
| D646,074 S | 10/2011 | Cantarutti | |
| D649,799 S | 12/2011 | Lievoure et al. | |
| D726,431 S | 4/2015 | Ye | |
| D832,608 S | 11/2018 | Liu | |
| D839,017 S | 1/2019 | Lievore et al. | |
| D844,357 S | 4/2019 | Buffon | |
| D860,702 S | 9/2019 | Lievore et al. | |
| 2009/0282948 A1 | 11/2009 | Xia et al. | |
| 2011/0143263 A1 | 6/2011 | Shirvanian | |
| 2011/0236991 A1 | 9/2011 | Lu et al. | |
| 2012/0125156 A1 | 5/2012 | Xia et al. | |
| 2012/0175585 A1 | 7/2012 | Banin et al. | |
| 2013/0178357 A1 | 7/2013 | Adzic et al. | |
| 2014/0024524 A1 | 1/2014 | Roh et al. | |
| 2015/0069015 A1 | 3/2015 | Xia et al. | |
| 2016/0082418 A1 | 3/2016 | Qin et al. | |

OTHER PUBLICATIONS

Maelabs, "Platinum, Pt", https://www.princeton.edu/-maelabs/mae324/glos324/platinum.htm, accessed Sep. 18, 2019.
Sargent-Welch, "Table of Periodic Properties of the Elements", VWR Int'l, 2002. (Year: 2002).
Jingyi et al., "Facile Synthesis of Gold-Silver Nanocages with Controllable Pores on the Surface", J. Am. Chem. Soc., vol. 128, pp. 14776-14777, Oct. 28, 2006. (Year: 2006).
Chen et al., "Gold Nanocages: Engineering Their Structure for Biomedical Applications", Advanced Materials, vol. 17, pp. 2255-2261, 2005 (Year: 2005).
International Search Report for PCT/US2016/036591 dated Sep. 13, 2016.
Vinod et al. Size-dependent changes in the electronic structure of metal clusters as investigated by scanning tunneling spectroscopy. Chemical Physics Letters 289. Jun. 12, 1998, 5 pages.
L. Zhang, et al., Platinum-based nanocages with subnanometer-thick walls and well-defined, controllable facets. Science 349:6246, Jul. 24, 2015, 412-416.
X. Lu et al., Fabrication of cubic nanocages and nanoframes by dealloying Au/Ag alloy nanoboxes with an aqueous etchant based on Fe(NO3)3 or NH4OH. Nano. Lett. vol. 7, No. 6, 1764-1769 (2007).
R. R. Adzic et al., Platinum monolayer fuel cell electrocatalysts. Top. Catal. 46, 249-262 (2007).
K. Sasaki et al., Highly stable Pt monolayer on PdAu nanoparticle electrocatalysts for the oxygen reduction reaction. Natature Communications 3, 1-9 (2012).
S. Xie et al., Atomic layer-by-layer deposition of Pt on Pd nanocubes for catalysts with enhanced activity and durability toward oxygen reduction. Nano. Lett. 14, 3570-3576 (2014).
J. Park et al., Atomic layer-by-layer deposition of Pt on Pd octahedra for enhanced catalysts toward the oxygen reduction reaction. ACS Nano (2015), vol. 9, No. 3, 2635-2647.
X. Wang et al., Palladium-platinum core-shell icosahedra with substantially enhanced activity and durability towards oxygen reduction, Nature Communications, 2015, 6, 1-8.
J. Zhang et al., Platinum monolayer electrocatalysts for O2 reduction: Pt monolayer on Pd(111) and on carbon-supported Pd nanoparticles. J. Phys. Chem. B 108, 10955-10964 (2004).
J. X. Wang, et al., Oxygen Reduction on Well-Defined Core-Shell Nanocatalysts: Particle Size, Facet, and Pt Shell Thickness Effects, J Am Chem Soc, 2009, 131, 17298-17302.
Lu, X. et al., Fabrication of cubic nanocages and nanoframes by dealloying Au/Ag alloy nanoboxes with an aqueous etchant based on Fe(NO3)3 or NH4OH. Nano Lett. 2007, vol. 7, No. 6, 1764-1769.
Wang, X. et al., Pt-based icosahedral nanocages: Using a combination of {111} facets, twin defects, and ultrathin walls to greatly enhance their activity toward oxygen reduction. Nano Lett. 2016, 16, 1467-1471.
Forest Poltrona lounge—Design Robby Cantarutti & Partners—Fast S.P.A. https://www.fastspa.com/it/collezioni/forest/poltrone-lounge/poltrona-lounge retrieved from the internet on Nov. 23, 2019.

Decahedron
● Pt atom ▬{111} ▬{100}
Twin boundaries covered by {211}

Decahedron
• Pt atom  ▬{111}  ▬{100}
Twin boundaries covered by {211}

Icosahedron
● Pt atom ▬{111} ▬{100}
Twin boundaries covered by {211}

28A

1- Atomic deposition on the side faces
2- Atomic deposition on the top and bottom faces
3- Surface diffusion ● Pt atom   ○ Pd atom

28B

POLYHEDRAL METAL NANOCAGES WITH WELL-DEFINED FACETS AND ULTRATHIN WALLS AND METHODS OF MAKING AND USES THEREOF

CROSS-REFERENCE TO RELATED APPLICATIONS

This application is a continuation of U.S. application Ser. No. 15/580,377, which is a 35 U.S.C. § 371 national stage application of PCT Application No. PCT/US2016/036591, filed Jun. 9, 2016, which claims the benefit of U.S. Provisional Application No. 62/172,943, filed Jun. 9, 2015, the contents of which are incorporated by reference in their entireties.

STATEMENT REGARDING FEDERALLY SPONSORED RESEARCH OR DEVELOPMENT

This invention was made with government support under awards CHE-1505441 and CHE-1412006 awarded by the National Science Foundation (NSF). The government has certain rights in the invention.

TECHNICAL FIELD

The present disclosure generally relates to nanoparticles containing metal atoms and methods of making and uses thereof.

BACKGROUND

Precious metal catalysts have become extremely important in many industries, such as refinery, petrochemicals, polymer, specialty chemicals, pharmaceuticals, and environmental. For example, the automotive industry utilizes large amounts of precious metal catalysts for exhaust gas purification. Unfortunately, precious metals are expensive, a factor that has greatly limited their widespread use in many industries. For example, proton exchange membrane fuel cells (PEMFCs) offer an energy source with zero emission of pollutants. Although the PEMFC technology has been around for many decades, it is still challenging to commercialize it on an industrial scale. The challenge can be largely attributed to the low abundance and high cost of Pt, a key component of the catalyst needed for speeding up the sluggish oxygen reduction reaction (ORR) on the cathode (Gasteiger, et al., *Appl. Catal., B* 2005, 56, 9; Shao, *Elecrocatalysis in Fuel Cells*, Springer, London, 2013).

Ruthenium and Ru-based nanocrystals have been proven to be of great significance in catalysis including aromatic hydrogenation, CO oxidation, ammonia synthesis and $CO_2$ methanation, etc (Nakatsuka, et al., *J. Am. Chem. Soc.* 2015, 137, 8138-8149; Westerhaus, et al., *ChemSusChem* 2013, 6, 1001-1005; Liu, et al., *ACS Catal.* 2012, 2, 1165-1178; Su, et al., *J. Am. Chem. Soc.* 2007, 129, 14213-14223; Joo, et al., *Nano Lett.* 2010, 10, 2709-2713; Kim, et al., *J. Phys. Chem. C* 2010, 114, 7128-7131; Sharma, et al., *J. Catal.* 2009, 266, 92-97). The activity and selectivity of Ru-based catalysts strongly depend on their structures and morphologies. Although face-centered cubic (fcc) structured Ru has been reported recently, controlling the shape or surface structures of Ru is still challenging (Ye, et al., *Nano Lett.* 2016, 2812-2817; Kusada, et al., *J. Am. Chem. Soc.* 2013, 135, 5493-5496).

Noble metal nanocrystals with controlled sizes and shapes have received great interest due to their size- and/or shape-dependent properties in catalysis, electronics, plasmonic and so forth (Corma, et al., *Nat. Chem.* 2013, 5, 775-781; Xie, et al., *Nano Energy,* 2016, 21, 247-257; Smith, et al., *Appl. Phys. Lett.* 2000, 77, 1399-1341; Mulvihill, et al., *J. Am. Chem. Soc.* 2010, 132, 268-274; Mahmoud, et al., *J. Am. Chem. Soc.* 2010, 132, 12704-12710). Lots of efforts have been invested to explore the approaches to tailor the sizes, morphologies and exposing facets of metal nanocrystals (Vinod, et al., *Chem. Phys. Lett.* 1998, 289, 329-333; Sreedhala, et al., *Nanoscale* 2014, 6, 7496-7502; Tian, et al., *J. Am. Chem. Soc.* 2010, 132, 7580-7581). Among these approaches, seed-mediated growth is one of the most powerful and versatile ways to achieve the controlled syntheses of nanocrystals (Nikoobakht, et al., *Chem. Mater.* 2003, 15, 1957-1962; Xia, et al., *J. Am. Chem. Soc.* 2012, 134, 1793-1801). Compared to conventional methods based on homogeneous nucleation, seed-mediated growth allows one to disentangle growth from nucleation and focus only on the growth step, which makes it easier to control both the sizes and shapes of different nanocrystals. Recently, seed-mediated growth has been extended to various noble metal nanocrystals including monometallic, bimetallic, and multimetallic nanocrystals (Jana, et al., *Chem. Commun.* 2001, 7, 617-618; Zeng, et al., *J. Am. Chem. Soc.* 2010, 132, 8552-8553; Fan, et al., *J. Am. Chem. Soc.* 2008, 130, 6949-6951; Habas, et al., *Nat. Mater.* 2007, 6, 692-297; Kobayashi, et al., *Chem. Phys. Lett.* 2010, 494, 249-254; Xue, et al., *Angew. Chem. Int. Ed.* 2007, 46, 8436-8439; Jin, et al., *Energy Environ. Sci.* 2012, 5, 6352-6357; Wang, et al., *ACS Nano* 2013, 7, 4586-4594; Park, et al., *ACS Nano* 2015, 9, 2635-2647; Wang, et al., *J. Am. Chem. Soc.* 2015, 137, 15036-15042; Wang, et al., *Nat. Commun.* 2015, 6, 7594; Xie, et al., *Angew. Chem. Int. Ed.* 2012, 51, 10266-10270; Wang, et al., *Nano Lett.* 2011, 11, 919-926; Mazumder, et al., *J. Am. Chem. Soc.* 2010, 132, 7848-7849). Among the different strategies for developing cost-effective, Pt-based ORR catalysts, forming conformal, ultrathin Pt shells on the surfaces of Pd nanocrystals has received considerable attention in recent years (Tsung, et al., *J Am Chem Soc,* 2009, 131, 5816; Zhou, et al., *Nano Letters,* 2013, 13, 2870; Zhang, et al., *Nano Letters,* 2010, 10, 638; Choi, et al., *Nano Lett,* 2013, 13, 3420; Stamenkovic, et al., *Nat Mater,* 2007, 6, 241; Park, et al., *Acs Nano,* 2015, 9, 2635; Xie, et al., *Nano Lett,* 2014, 14, 3570; Zhang, et al., *Angew Chem Int Edit,* 2005, 44, 2132). Since Pd and Pt share many similar characteristics such as crystal structure and lattice constant, one can generate Pd@Pt core-shell nanocrystals via conformal, epitaxial deposition (Zhang, et al., *Chem Soc. Rev,* 2012, 41, 8035). For this system, the specific activity can be enhanced by downshifting the d-band center of Pt through the strain and ligand effects, while the use of Pt as an ultrathin shell can greatly increase its utilization efficiency in terms of Pt mass (Kitchin, et al., *Phys Rev Lett,* 2004, 93; Lim, et al., *Science,* 2009, 324, 1302) J. X. Wang, H. Inada, L. J. Wu, Y. M. Zhu, Y. M. Choi, P. Liu, W. P. Zhou, R. R. Adzic, *J Am Chem Soc,* 2009, 131, 17298). Since the current price of Pd is about half of that of Pt ($594/oz vs. $1,052/oz), the replacement of Pt in the bulk of a catalytic particle by Pd will also reduce the materials cost. The interiors of these core-shell structures, however, are still occupied by another precious metals, which will contribute to a large portion of the materials cost associated with such a catalyst.

It is well established that the surface structure of a nanocrystal plays one of the most important roles in determining its catalytic activity and/or selectivity (Xia, et al., *Angew. Chem. Int. Ed.* 2009, 48, 60-103). The catalyst activity can be enhanced by controlling both the elemental composition and surface structure.

There remains a need for improved metal nanoparticles and methods of making and using thereof that overcome the aforementioned deficiencies.

SUMMARY

Various types of polyhedral nanocages are provided that overcome the aforementioned deficiencies. The nanocages can include a hollow interior, and a plurality of facets encapsulating the hollow interior. That nanocages can have small pores in or among some of the facets. Each of the facets can be made of a plurality of metal atoms. The facets can have well-defined structures and the wall thickness can be very thin, e.g. having a thickness of about 5 nm, about 2 nm, about 1 nm, or less.

In various aspects, the nanocage is an icosahedral nanocage having an average diameter of about 5 nm to 15 nm. In some embodiments, about 70% to 100% of the metal atoms are Pt atoms packed in a face-centered cubic lattice, and each of the facets is a {111} facet having a thickness of about 2 to 5 atomic layers or about 0.5 nm to 1.0 nm.

In various aspects, the nanocage is an octahedral nanocage having an average edge length of about 18 nm to 24 nm. In some embodiments, about 80% to 100% of the metal atoms are Pt atoms packed in a face-centered cubic lattice, and each of the facets is a {111} facet having a thickness of about 0.5 nm to 2.0 nm.

In various aspects, the nanocage is a triangular prism nanocage having two triangular {111} facets having a diameter of about 50 nm to 150 nm. In some embodiments, the nanocage has a height of about 20 nm to 30 nm, and the facets have a thickness of about 1.0 nm to 2.0 nm.

In various aspects, the nanocage is a hexagonal prism nanocage having two hexagonal {111} facets having a diameter of about 50 nm to 150 nm. In some embodiments, the nanocage has a height of about 20 nm to 30 nm, and the facets have a thickness of about 5 to 10 atomic layers or about 1 nm to 2 nm.

In various aspects, the nanocage is a cubic nanocage having an average edge length of about 18 nm to 50 nm. In some embodiments, about 80% to 100% of the metal atoms are Pt atoms packed in a face-centered cubic lattice, and each of the facets is a {100} facet having a thickness of about 2 to 5 atomic layers or about 0.5 nm to 1.5 nm.

In various aspects, the polyhedral nanocage is a cubic nanocage having an average edge length of about 20 nm to 50 nm. In some embodiments, about 80% to 100% of the metal atoms are Pt atoms packed in a face-centered cubic structure, and each of the facets is a {100} facet having a thickness of about 2 to 5 atomic layers or about 1 nm to 2.5 nm. The cubic nanocage can have a pore at each of the 8 corners of the cube, each of the pores having an average edge length of about 3 nm to 10 nm.

In various aspects, the nanocage is a cubic nanocage having an average edge length of about 20 nm to 50 nm. In some embodiments, about 60% to 75% of the metal atoms are Au atoms packed in a face-centered cubic structure, and each of the facets has a thickness of about 1 nm to 2.5 nm. The cubic nanocage can have a pore at each of the 8 corners of the cube, each of the pores having an average edge length of about 3 nm to 10 nm.

In various aspects, the nanocage has an irregular shape, with an average size of about 20 nm to 50 nm. In some embodiments, about 80% to 100% of the metal atoms are Pt atoms packed in a face-centered cubic structure. In some embodiments, the nanocages include a plurality of facets having a thickness of about 1 nm to 2.5 nm.

In various aspects, the nanocage is a cubic nanocage having an average edge length of about 6 nm to 25 nm. In some embodiments, about 85% to 95% of the metal atoms are Ru atoms packed a face-centered cubic lattice, and each of the facets is a {100} facet having a thickness of about 0.7 nm to 2.5 nm.

In various aspects, the nanocage is a cubic nanocage having an average edge length of about 6 nm to 18 nm. In some embodiments, about 85% to 95% of the metal atoms are Ir atoms packed a face-centered cubic lattice, and each of the facets is a {100} facet having a thickness of about 1.0 nm.

In various aspects, the nanocage is an octahedral nanocage having an average edge length of about 6 nm. In some embodiments, about 85% to 95% of the metal atoms are Ir atoms packed a face-centered cubic lattice, and each of the facets is a {111} facet having a thickness of about 1.0 nm.

In various aspects, the nanocage is a cubic nanocage having an average edge length of about 7.5 nm. In some embodiments, about 85% to 95% of the metal atoms are Rh atoms packed a face-centered cubic lattice, and each of the facets is a {100} facet having a thickness of about 1.0 nm.

In various aspects, the nanocage is an octahedral nanocage having an average edge length of about 18 nm to 27 nm. In some embodiments, about 85% to 95% of the metal atoms are Rh atoms packed a face-centered cubic lattice, and each of the facets is a {111} facet having a thickness of about 1.0 nm.

The nanocages can have well-defined thin facets. In various aspects, each of the facets has a thickness of about 0.5 to 1.0 nm. In some embodiments, each of the facets has a thickness of about 1.5 nm or less. Each facet can be a {100} facet, a {110} facet, or a {111} facet. In some embodiments, the nanocages include a plurality of facets. The nanocage can include a plurality of twin boundaries, wherein each facet is joined to an adjacent facet through a twin defect.

The nanocages can have a variety of polyhedral structures. In various aspects, the polyhedral nanocage is a cubic nanocage, a tetrahedral nanocage, an octahedral nanocage, a rhombic dodecahedral nanocage, a decahedral nanocage, an icosahedral nanocage, a triangular prism nanocage, a hexagonal prism nanocage, a cuboctahedral nanocage, a rod-shaped nanocage, or a wire-shaped (or tube-like) nanocage. The nanocage can be made very small, e.g. having the largest dimension of about 6 nm to 30 nm.

The nanocage can be made with a variety of precious metals. In some aspects, the metal atoms include one or more selected from the group consisting of Ru, Rh, Pd, Re, Ir, Pt, Au, and a combination thereof. For example, in some embodiments, about 85% or more of the metal atoms are a single type of metal atom such as Ru, Rh, Pd, Ag, Re, Ir, Pt, or Au.

Various methods of making the nanocages are also provided. In some embodiments, the methods include applying a chemical etchant to a core-shell nanoparticle. The core-shell nanoparticle can include a polyhedral metal seed having a plurality of a different metal atoms disposed on the surface. The chemical etchant can etch the metal seed in the core to produce the polyhedral nanocage having a hollow interior encapsulated by a plurality of facets containing the different metal atoms.

The seed can include a variety of metal atoms and a variety of geometries. In some aspects, the metal seed includes Pd, Ag, and a combination thereof. The metal seed can be a cubic metal seed, a tetrahedral metal seed, an octahedral metal seed, a rhombic dodecahedral metal seed, an decahedral seed, an icosahedral metal seed, a hexagonal prism metal seed, a triangular prism metal seed, a cuboctahedral metal seed, a rod-shaped metal seed, a bar-shaped seed metal, a wire-shaped metal seed, or a metal seed with an irregular shape. The metal seed can be mixed with a second metal atom source to deposit the second metal atoms on the surface of the metal seed. In various aspects, the second metal atoms are Pt and the corresponding metal atom source is $H_2PtCl_6$, $Na_2PtCl_6$, $K_2PtCl_6$, $Na_2PtCl_4$, $K_2PtCl_4$, or $Pt(acac)_2$. In various aspects, the metal atoms are Au and the metal atom source is $HAuCl_4$. In various aspects, the metal atoms are Ru and the metal atom source is $RuCl_3$. In various aspects, the metal atoms are Rh and the metal atom source is $RhCl_3$ or $Rh(OAc)_3$. In various aspects, the metal atoms are Ir and the metal atom source is $Na_3IrCl_6$.

Any etchant capable of etching the metal seed in the core while sparing the metal atoms in the shell may be used. In various aspects, the chemical etchant can be selected from the group of $FeCl_3$, $Fe(NO_3)_3$, $K_3Fe(CN)_6$, $HNO_3$, $H_2O_2$, $O_2$ (or air), $I_2$, HCl, halides, and a combination thereof.

Oxygen reduction catalysts and methods of using oxygen reduction catalysts are provided using the metal nanocages described herein. In various aspects, the oxygen reduction catalyst has a specific activity toward the oxygen reduction reaction of about 1.5 mA cm$^{-2}$ to about 4.0 mA cm$^{-2}$ at 0.9 V with a reference to the reversible hydrogen electrode ($V_{RHE}$).

Other systems, methods, features, and advantages of metal nanocages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

(FIG. 5C, FIG. 5D) Mass and specific activities given as kinetic current densities ($j_k$) normalized against the mass of Pt and the ECSA of the catalyst, respectively. (FIG. 5E, FIG. 5F) Mass and specific ORR activities at 0.9 $V_{RHE}$ for the catalysts.

(FIG. 8A) HAADF-STEM image. (FIG. 8B) Atomic-resolution HAADF-STEM image and a model of the decahedron viewed along its 5-fold axis (inset). (FIG. 8C) Atomic-resolution HAADF-STEM image taken from the corner marked by a box in (FIG. 8B), showing the presence of reentrant groove at a vertex and twin boundary along a ridge. (FIG. 8D) HAADF-STEM image of the concave decahedra and the corresponding EDX mapping of elemental Pd and Pt.

(FIG. 9A) Low- and (FIG. 9B) high-magnification HAADF-STEM images of the decahedra, showing that more Pt was deposited on the vertices and edges of a Pd decahedral seed than the faces. (FIG. 9C) Atomic-resolution HAADF-STEM image of an individual decahedron. (FIG. 9D) HAADF-STEM image of the concave decahedra and the corresponding EDX mapping of elemental Pd and Pt.

(FIG. 10B, FIG. 10C) Schematic illustrations showing how the Pt atoms are deposited onto Pd decahedral and icosahedral seeds, respectively, and the possible routes for the initially deposited Pt atoms to diffuse across the surface.

(FIG. 11C, FIG. 11D) Atomic resolution HAADF-STEM images taken from two different particles in sample (FIG. 11A), showing the preservation of the twin defect at a type-A vertex and along a ridge of the decahedral nanocage.

(FIG. 12A) CVs of the catalysts in a N2-saturated HClO4 solution at room temperature. (FIG. 12B) Positive-going ORR polarization curves of the catalysts in an O2-saturated HClO4 solution. (FIG. 12C) Mass and (FIG. 12D) specific ORR activities at 0.9 VRHE, which are presented as kinetic current density (jk) normalized to the mass of Pt (or Pd+Pt) and ECSA, respectively, of the catalyst.

(FIG. 14C) Bright-field and (FIG. 14D) atomic-resolution HAADF-STEM images taken from a single nanocrystal along a 2-fold symmetry axis. (FIG. 14E) HAADF-STEM image taken from the edge marked by a box in (FIG. 14D), revealing a wall thickness of only six atomic layers and a twin boundary. (FIG. 14F) HAADF-STEM image of an icosahedral nanocage and the corresponding EDX mapping of Pd and Pt.

(FIG. 15B) 20 mg of FeCl$_3$ and 120 µL of HCl; (FIG. 15C) 50 mg of FeCl$_3$ and 300 µL of HCl; and (FIG. 15D) an equal molar amount of KCl instead of KBr.

(FIG. 16C, FIG. 16D) Plots of the mass and specific ORR activities given as kinetic current density (jk) normalized to the ECSA and Pt mass of the catalyst, respectively.

(FIG. 21A) 0.5, (FIG. 21B) 1, (FIG. 21C) 2, and (FIG. 21D) 3 h.

(FIG. 22B) TEM image of the product obtained by etching the Pd@Pt$_{2.7L}$ icosahedra with a modified procedure. Relative to the standard procedure, the amounts of KBr, FeCl$_3$, HCl were reduced to 50 mg, 10 mg and 60 µL respectively, while the etching was conducted at 80° C. for 3 h.

(FIG. 24A) TEM image of many Pd@Pt nanoplates. (FIG. 24B) HAADF-STEM image of the side view of a Pd@Pt nanoplate, showing Pt in the shell (with a brighter contrast) and the Pd in the core. (FIG. 24C) Atomic-resolution HAADF-STEM image taken from the edge marked by a box in (FIG. 24B), revealing the detailed arrangement of Pd and Pt atoms. (FIG. 24D) Atomic-resolution HAADF-STEM image taken from the middle part marked by a box in (FIG. 24B).

(FIG. 25A) TEM image of Pd@Pt nanoplates. (FIG. 25B) HAADF-STEM image of the side view of a Pd@Pt nanoplate, showing Pt in the shell (with a brighter contrast) and the Pd atoms in the core.

FIG. 26A is a TEM image of Pt nanocages. FIG. 26B is a HAADF-STEM image of the side view of a Pt nanocage. FIG. 26C is a bright filed STEM image taken from the middle part marked by a box in (FIG. 26B), showing the wall as thin as 5 atomic layers. FIG. 26D is a HAADF-STEM image of Pt nanocages along [111] direction. FIG. 26E is a HAADF-STEM image taken from the edge marked by a box in (FIG. 26D), showing the side wall of 8 atomic layers. FIG. 26F is a HAADF-STEM image of a nanocage and the corresponding EDX mapping of Pd and Pt.

FIG. 27A is a TEM and FIG. 27B is HAADF-STEM images of Pt nanoframes. FIG. 27C is a bright filed STEM image taken from the edge marked by a box in (FIG. 27B), showing the edge thickness of 8 atomic layers. FIG. 27D is the corresponding EDX mapping of the area marked by a box in (FIG. 27B).

FIG. 28A is a schematic illustration showing the possible routes for the deposition and surface diffusion of Pt atoms on a Pd plate. FIG. 28B is a schematic comparison for the Pt-based nanocage and nanoframe derived from Pd@Pt plate obtained in polyol-based and water-based systems, respectively.

FIG. 29A is a TEM image of a typical sample. FIG. 29B is a HAADF-STEM image of an individual nanocage. FIG. 29C is a high-resolution HAADF-STEM image taken from the region boxed in (FIG. 29B), showing a wall thickness of six atomic layers. FIG. 29D is an EDS elemental mapping of Pt and Pd for two nanocages (scale bar, 10 nm).

FIG. 30A shows Pt atoms deposited on the Pd surface may diffuse ("hop") across the surface or substitute into the surface (DFT-calculated activation barriers are shown), leading to a mixed outer layer composition. FIG. 30B shows a schematic of the major steps involved in the continuous dissolution of Pd atoms from a Pd@Pt$_{4L}$ cube to generate a Pt cubic nanocage.

FIGS. 30C-30F show TEM images of Pd@Pt$_{4L}$ cubes after Pd etching for: (FIG. 30C) 0, (FIG. 30D) 10, (FIG. 30E) 30, and (FIG. 30F) 180 min. The 10 nm scale bar applies to all images.

FIG. 31A is a TEM image of a typical sample. FIG. 31B is a HAADF-STEM image of an individual nanocage. The red circle marks a hole responsible for the dissolution of Pd from the core. FIG. 31C is a high-resolution HAADF-STEM image taken from the region boxed in (FIG. 31B), showing a wall thickness of seven atomic layers. FIG. 31D is an EDS mapping of Pt and Pd (scale bar, 10 nm).

(FIG. 32A) Mass and (FIG. 32B) specific activities of the catalysts at 0.9 $V_{RHE}$. (FIG. 32C) Mass activities (at 0.9 $V_{RHE}$) and (FIG. 32D) specific ECSAs of the catalysts before and after accelerated durability test.

(FIG. 34B) HAADF-STEM image of a Ag©Au$_{6L}$ nanocube. (FIG. 34C, FIG. 34D) TEM and SEM images of the nanoboxes obtained by removing the Ag cores. (FIG. 34E) Atomic-resolution HAABF-STEM image taken from the corner region of a nanobox. (FIG. 34F) EDS elemental mapping of a nanobox.

(FIG. 35B) Extinction spectra calculated using the DDA method for Au nanoboxes with a 40 nm outer edge, 2 nm wall thickness, 10 nm pore size, and Au—Ag alloy composition of 65% Au and 35% Ag. The propagation direction (k-vector) and electric field (E-field) were perpendicular and parallel to the (100)-facet of the cubic box.

(FIG. 36B) UV-vis-NIR spectra of aqueous suspension of Ag@Au6L nanocubes with an edge length of 20 nm, and the Au-based nanoboxes. (FIG. 36C) Extinction spectra calculated for Au nanoboxes with 20 nm in outer edge length and 1.9 nm in wall thickness, 3 nm in pore size, and elemental compositions of 65% Au and 35% Ag.

(FIG. 44B) HAADF-STEM image of an individual Pd@Ru cube. (FIG. 44C) Atomic-resolution HAADF-STEM image taken from the corner region in FIG. 44B. (FIG. 44D) HAADF-STEM image of an individual Pd@Ru cube and EDX maps.

(FIG. 45A) 2 mL h$^{-1}$, (FIG. 45B) 5 mL h$^{-1}$, (FIG. 45C) 10 mL h$^{-1}$, (FIG. 45D) 20 mL h$^{-1}$.

(FIG. 46A) 175° C., (FIG. 46B) 150° C., (FIG. 46C) 125° C., (FIG. 46D) 100° C.

(FIG. 47B) HAADF-STEM image of an individual Ru nanocage. (FIG. 47C) Atomic-resolution HAADF-STEM image taken from the corner region in FIG. 47B. (FIG. 47D) HAADF-STEM image of an individual Ru nanocage and EDX maps.

(FIG. 50A) 6 nm, (FIG. 50B) 10 nm, (FIG. 50C) 18 nm.

(FIG. 52A) 1 mg, (FIG. 52B) 4 mg, (FIG. 52C) 10 mg, (FIG. 52D) 20 mg.

FIG. 53A depicts the arrangement of atoms in a fcc unit cell. FIG. 53B depicts the (1001) plane of the exemplary fcc unit cell from FIG. 53A with the atoms in the (100) plane bolded. FIG. 53C depicts the (110) plane of the exemplary fcc unit cell from FIG. 53A with the atoms in the (110) plane bolded. FIG. 53D depicts the (111) plane of the exemplary fcc unit cell from FIG. 53A with the atoms in the (111) plane bolded.

DETAILED DESCRIPTION

Figure 1:
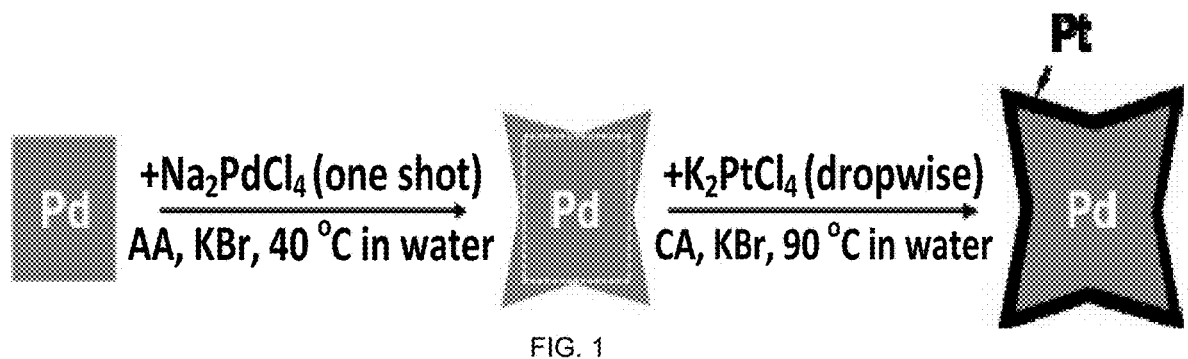
FIG. 1 is a schematic diagram showing the synthesis of Pd@Pt concave nanocubes via (step 1) addition of aqueous $Na_2PdCl_4$ in one shot into an aqueous suspension containing Pd nanocubes, AA, KBr, and PVP held at 40° C. to generate Pd concave nanocubes, followed by (step 2) dropwise injecting $K_2PtCl_4$ solution into an aqueous suspension containing Pd concave nanocubes, CA, KBr and PVP (held at 90° C.) at a rate of 1.0 mL h$^{-1}$.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, materials science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

Throughout this disclosure various nanoscale structures may be described as having a particular polyhedral structure, e.g. tetrahedral, cubic, octahedral, decahedral, rhombic dodecahedral, icosahedral, and the like. It should be understood that such characterization is used as a tool to describe structural differences in particles at the scale of nanometers and, as such, some deviation from a perfectly polyhedral structure consistent with the experimental techniques applied may be expected. The term "facet," as used herein, refers to one of the many essentially planar surfaces forming the external surface of a polyhedral structure.

The type of facet or surface structure of atoms will generally be described herein using the Miller indices for the unit cell of a particular crystal (Bravais) lattice of the atoms, which are defined in a variety of basic technical references. From the crystal lattice, crystal directions and planes may be defined. Directions (vectors) will generally be defined using square brackets and, for a family of symmetry-equivalent directions, using angled brackets. For example, where the [100], [010], and [001] directions are symmetry-equivalent, the family of vectors may be described by <100>. Crystal planes will generally be denoted using parentheses and, for a family of symmetry-equivalent planes, by curly brackets. Accordingly, where the (110), (101), and (011) planes are symmetry equivalent, the family of planes may be collectively denoted by {110}.

Figure 53A:
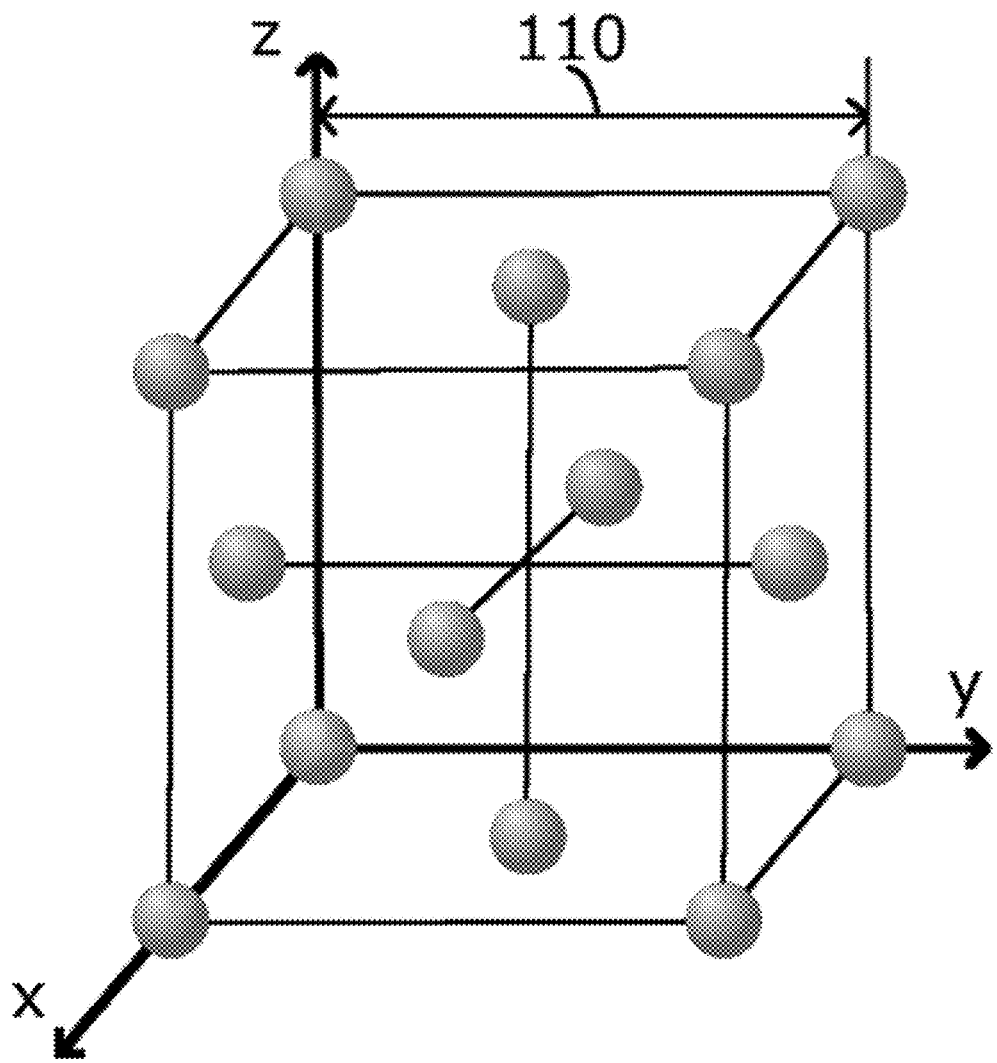
FIGS. 53A-53D depict the unit cell and crystal planes for atoms having a face-centered cubic (fcc) structure.
Figure 53B:
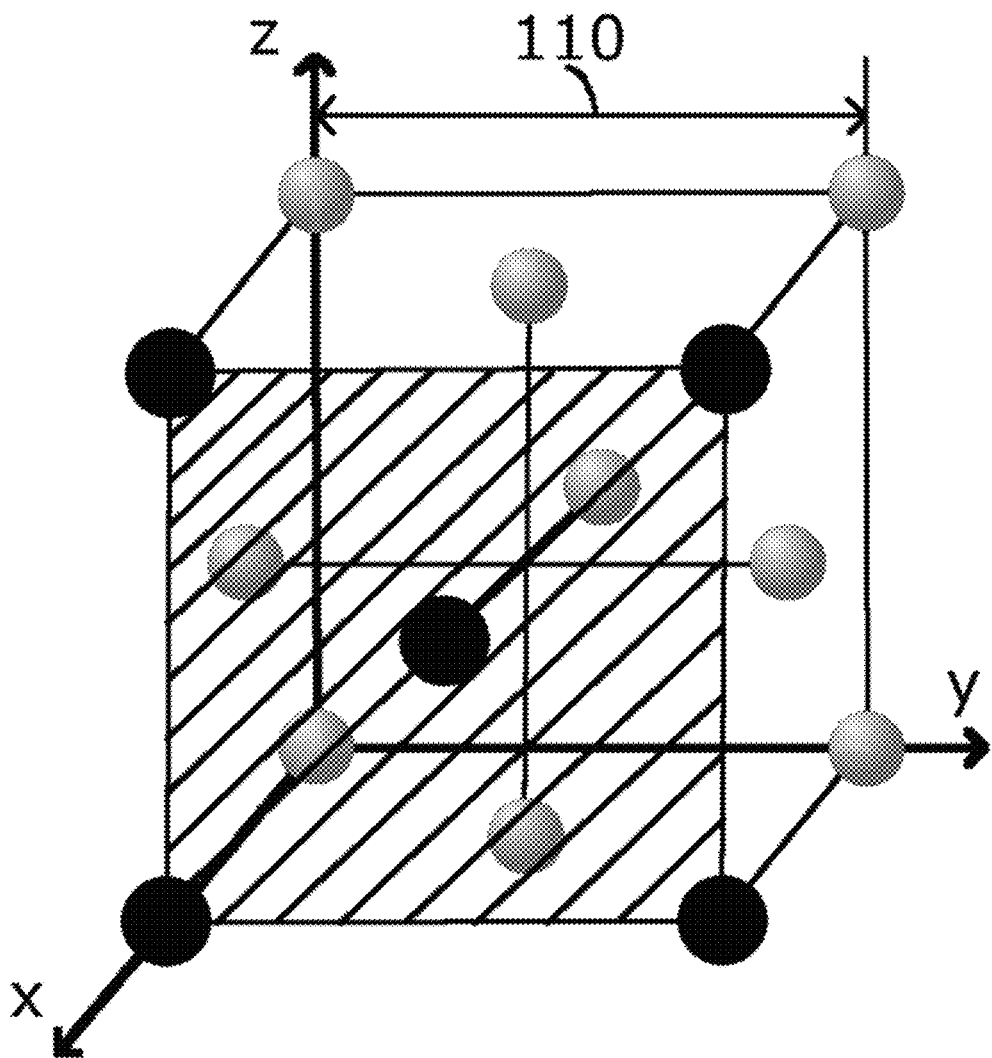
Figure 53C:
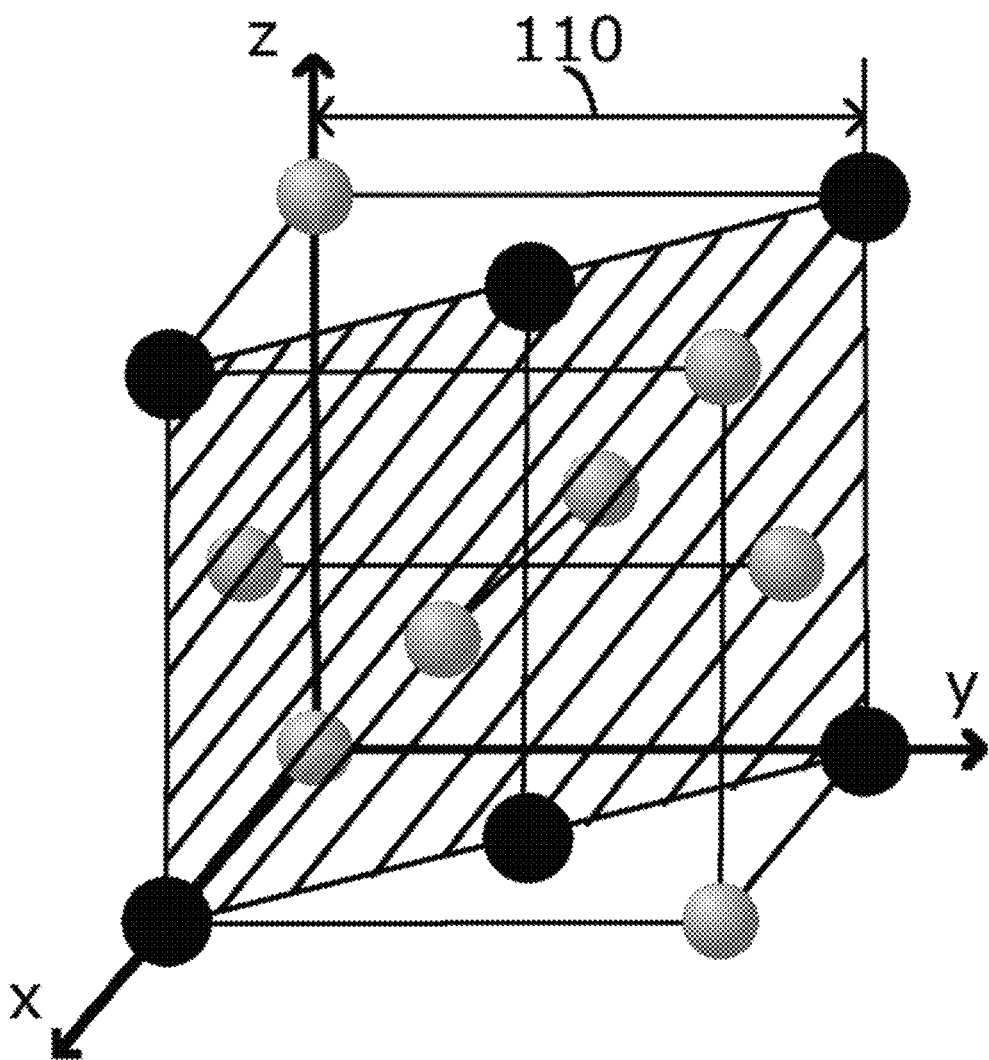
Figure 53D:
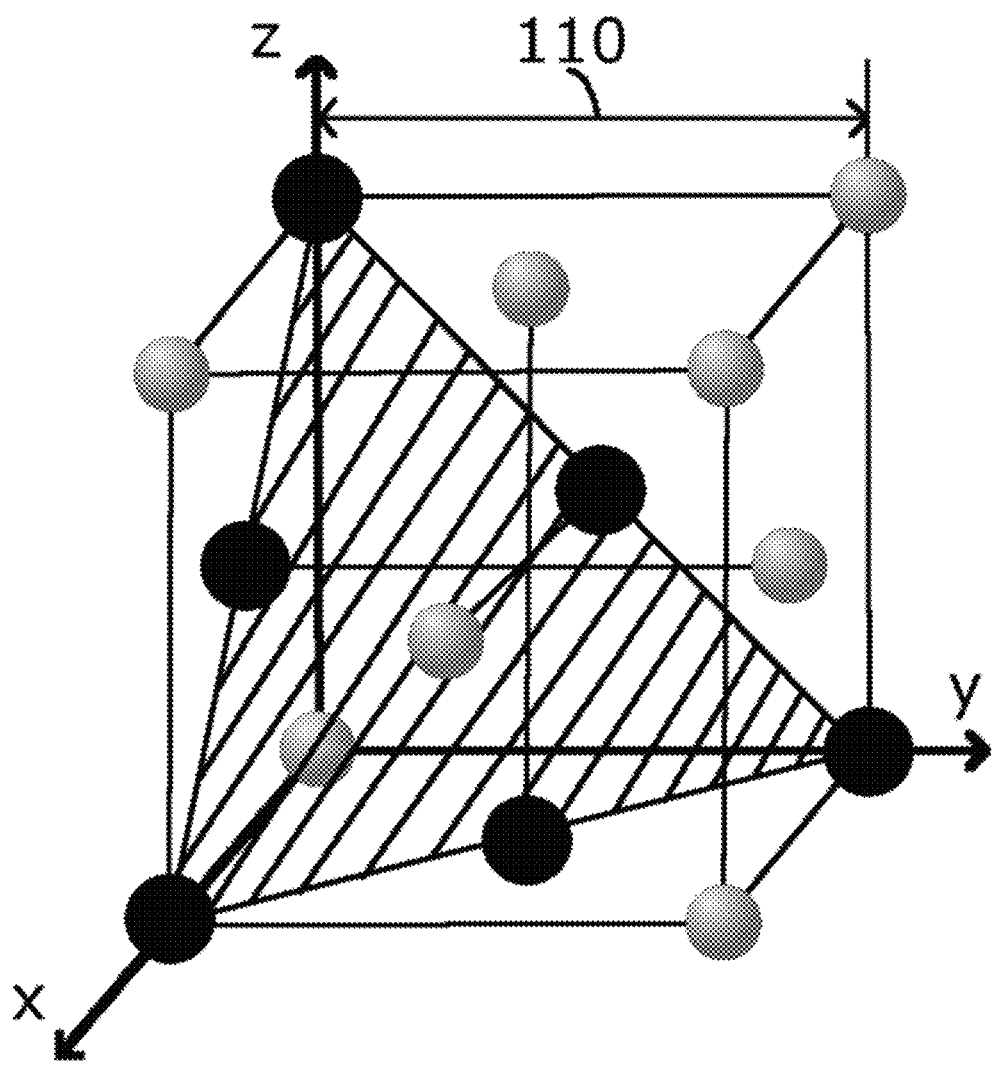

In particular embodiments, the atoms form a face-centered cubic (fcc) structure depicted in FIG. 53A. A dimension 110, known as the lattice constant may define a basic distance over which the unit cell structure repeats itself. FIGS. 53B-53C illustrate three exemplary crystal planes defined for the face-centered cubic structure illustrated in FIG. 53A. For example, FIG. 53B illustrates a (100) plane, FIG. 53C illustrates a (110) plane, and FIG. 53D illustrates a (111) plane.

A surface or facet of a polyhedral structure may be described by identifying the crystal plane or the family of symmetry-equivalent crystal planes that characterize the arrangement of atoms in the surface. Facets may be characterized similar to surfaces. Facets may also be characterized as having a particular thickness, which should be understood to mean the average thickness normal to the facet surface, e.g. the thickness of the wall that makes or forms the facet.

The terms "twinning plane", "twin plane", or "twin boundary", as interchangeably used herein, refer to the region defined by atoms shared between two crystal patterns that share a single surface. Twin planes occur when two crystal structures of the same type intergrow, so that only a slight misorientation exists between them. A twin plane can be a highly symmetrical interface, often with one crystal the mirror image of the other and atoms that are shared by the two crystals at regular intervals.

Polyhedral Nanocages

A variety of polyhedral nanocages are provided. The polyhedral nanocage can include a hollow interior, and a plurality of facets encapsulating the hollow interior. The nanocages can also have small pores in or among some of the facets. In some aspects, the small holes allow small molecules to enter and reside in the interior or on the inner surface of the nanocage, e.g. so both the exterior surface and interior surface of the nanocage can provide a catalytic surface. Each of the facets can be made of a plurality of metal atoms. The facets can be solid or can be porous, e.g. having small pores that allow small molecules to pass between the outside of the nanocage and the hollow interior. The facets of the nanocage can have a well-defined structure and can be very thin, e.g. having a thickness of about 5 nm, about 4 nm, about 3 nm, about 2.5 nm, about 2 nm, about 1.8 nm, about 1.5 nm, about 1.2 nm, about 1.1 nm, about 1 nm, about 0.8 nm, about 0.7 nm, or less.

The polyhedral nanocages can include a variety of metal atoms, overcoming the aforementioned deficiencies with core-shell nanoparticles and catalysts. For example, the facets can include precious metals such as Ru, Rh, Pd, Ag, Re, Ir, Pt, Au, or a combination thereof. In some aspects, the facets include only a single type of metal atom, although in other embodiments two or more different types of metal atoms are included. When more than one metal atom is included, the metal atoms can include two or more precious metals. In some aspects, one or more of the metals can be atoms from the metal core used in the synthesis of the nanocage. In some embodiments, the facets include about 60%, 70%, 80%, 85%, 90%, 95%, or more of a single type of metal atom.

The nanocages can include a variety of polyhedral structures formed from a number of facets. For example, the nanocage can be a cubic nanocage, a tetrahedral nanocage, an octahedral nanocage, a rhombic dodecahedral nanocage, a decahedral nanocage, an icosahedral nanocage, a triangular prism nanocage, a hexagonal prism nanocage, a cuboctahedral nanocage, a rod-shaped nanocage, a bar-shaped nanocage, or a wire-shaped (or tube-like) nanocage. The nanocage can have 4, 5, 6, 7, 8, 9, 10, 11, 12, 13, 14, 15, 16, 17, 18, 19, or 20 facets or more.

The facets can be made to have well-defined structures and very thin. For example, the facets can have a {100} surface structure (a "{100} facet"), can have a {110} surface structure (a "{110} facet"), can have a {111} surface structure (a "{111} facet"), or a combination thereof. The facets can be very thin, e.g. having an average thickness of about 5 nm, about 4 nm, about 3 nm, about 2.5 nm, about 2.0 nm, about 1.5 nm, about 1 nm, or less. In some aspects, the facets are only a few atomic layers thick, e.g. about 1, 2, 3, 4, 5, 6, 7, or 8 atomic layers. The nanocages can include a plurality of twin boundaries, e.g. joining the edges of adjacent facets.

The nanocages can have a variety of sizes. For example, the nanocages can have a largest dimension of about 6 nm to about 100 nm or more. In various aspects, the nanocage has a largest dimension of about 6 nm to 60 nm, about 6 nm to 50 nm, about 10 nm to 50 nm, about 10 nm to 40 nm, about 12 nm to 40 nm, about 12 nm to 30 nm, about 15 nm to 30 nm, about 15 nm to 25 nm, or about 20 nm.

In various aspects, the nanocage can be a Pt nanocage, i.e. the metal atoms are predominately Pt atoms. About 55% to 100%, about 60% to 100%, about 70% to 100%, about 75% to 100%, about 80% to 100%, about 85% to 100%, or about 90% to 100% of the metal atoms can be Pt atoms. In some aspects, about 100% of the atoms are Pt atoms.

In various aspects, the nanocage can be a Au nanocage, i.e. the metal atoms are predominately Au atoms. About 55% to 100%, about 60% to 100%, about 70% to 100%, about 75% to 100%, about 80% to 100%, about 85% to 100%, or about 90% to 100% of the metal atoms can be Au atoms. In some aspects, about 100% of the atoms are Au atoms.

In various aspects, the nanocage can be a Ru nanocage, i.e. the metal atoms are predominately Ru atoms. About 55% to 100%, about 60% to 100%, about 70% to 100%, about 75% to 100%, about 80% to 100%, about 85% to 100%, or about 90% to 100% of the metal atoms can be Ru atoms. In some aspects, about 100% of the atoms are Ru atoms.

In various aspects, the nanocage can be a Rh nanocage, i.e. the metal atoms are predominately Rh atoms. About 55% to 100%, about 60% to 100%, about 70% to 100%, about 75% to 100%, about 80% to 100%, about 85% to 100%, or about 90% to 100% of the metal atoms can be Rh atoms. In some aspects, about 100% of the atoms are Rh atoms.

In various aspects, the nanocage can be a Ir nanocage, i.e. the metal atoms are predominately Ir atoms. About 55% to 100%, about 60% to 100%, about 70% to 100%, about 75% to 100%, about 80% to 100%, about 85% to 100%, or about 90% to 100% of the metal atoms can be Ir atoms. In some aspects, about 100% of the atoms are Ir atoms.

In some aspects, the nanocage is an icosahedral nanocage having an average diameter of about 5 nm to 35 nm, about 5 nm to 30 nm, about 5 nm to 25 nm, about 5 nm to 20 nm, about 5 nm to 15 nm, about 8 nm to 15 nm, about 10 nm to 15 nm, or about 12 nm. About 55% to 100%, about 60% to 100%, about 70% to 100%, about 75% to 100%, about 80% to 100%, about 85% to 100%, or about 90% to 100% of the metal atoms can be Pt atoms packed in a face-centered cubic lattice. Each of the facets can be a {111} facet having a thickness of about 1 to 10 atomic layers, about 2 to 10 atomic layers, about 2 to 8 atomic layers, about 2 to 6 atomic layers, about 2 to 5 atomic layers, about 2 atomic layers, about 3 atomic layers, about 4 atomic layers, or about 5 atomic layers.

In some aspects, the nanocage is an octahedral nanocage having an average edge length of about 6 nm to 40 nm, about 8 nm to 40 nm, about 8 nm to 30 nm, about 8 nm to 24 nm, about 12 nm to 24 nm, about 18 nm to 24 nm, about 20 nm, about 6 nm to 24 nm, about 6 nm to 20 nm, about 6 nm to 18 nm, or about 22 nm. About 55% to 100%, about 60% to 100%, about 70% to 100%, about 75% to 100%, about 80% to 100%, about 85% to 100%, or about 90% to 100% of the metal atoms can be Pt atoms packed in a face-centered cubic structure. Each of the facets is can be a {111} facet having a thickness of about 0.2 nm to 5 nm, about 0.2 nm to 4 nm, about 0.5 nm to 4 nm, about 0.5 nm to 3.5 nm, about 0.5 nm to 3.0 nm, about 0.5 nm to 2.5 nm, about 0.5 nm to 2.0 nm, about 0.5 nm to 1.5 nm, or about 0.5 nm to 1.0 nm.

In various aspects, the nanocage is a hexagonal prism nanocage having two hexagonal {111} facets having a diameter of about 20 nm to 200 nm, about 20 nm to 150 nm, or about 50 nm to 150 nm. The nanocage can have a thickness of about 10 nm to 50 nm, about 10 nm to 40 nm, about 20 nm to 40 nm, about 20 nm to 30 nm, or about 25 nm. Each of the facets can have a thickness of about 2 to 12 atomic layers, about 2 to 10 atomic layers, about 5 to 10 atomic layers, about 4 atomic layers, about 5 atomic layers, about 6 atomic layers, about 7 atomic layers, or about 8 atomic layers.

In various aspects, the nanocage is a cubic nanocage having an average edge length of about 5 nm to 50 nm, about 10 nm to 50 nm, about 5 nm to 40 nm, about 10 nm to 40 nm, about 12 nm to 40 nm, about 18 nm to 40 nm, about 18 nm to 35 nm, about 18 nm to 30 nm, about 18 nm to 25 nm, about 20 nm to 25 nm, about 15 nm to 25 nm, about 10 nm to 25 nm, about 5 nm to 25 nm, or about 22 nm. About 55% to 100%, about 60% to 100%, about 70% to 100%, about 75% to 100%, about 80% to 100%, about 85% to 100%, or about 90% to 100% of the metal atoms can be Pt atoms having a face-centered cubic packing structure. Each of the facets is can be a {100} facet having a thickness of about 1 to 10 atomic layers, about 2 to 10 atomic layers, about 2 to 8 atomic layers, about 2 to 6 atomic layers, about 2 to 5 atomic layers, about 2 atomic layers, about 3 atomic layers, about 4 atomic layers, or about 5 atomic layers.

In various aspects, the nanocage is a decahedral nanocage having an average edge length of about 5 nm to 50 nm, about 10 nm to 50 nm, about 5 nm to 40 nm, about 10 nm to 40 nm, about 12 nm to 40 nm, about 18 nm to 40 nm, about 18 nm to 35 nm, about 18 nm to 30 nm, about 18 nm to 25 nm, about 20 nm to 25 nm, about 15 nm to 25 nm, about 10 nm to 25 nm, about 5 nm to 25 nm, or about 22 nm. About 55% to 100%, about 60% to 100%, about 70% to 100%, about 75% to 100%, about 80% to 100%, about 85% to 100%, or about 90% to 100% of the metal atoms can be Pt atoms having a face-centered cubic packing structure. Each of the facets is can be a {111} facet having a thickness of about 1 to 10 atomic layers, about 2 to 10 atomic layers, about 2 to 8 atomic layers, about 2 to 6 atomic layers, about 2 to 5 atomic layers, about 2 atomic layers, about 3 atomic layers, about 4 atomic layers, or about 5 atomic layers.

In some aspects, the nanocage is an octahedral nanocage having an average edge length of about 8 nm to 40 nm, about 8 nm to 30 nm, about 8 nm to 25 nm, about 10 nm to 25 nm, about 12 nm to 25 nm, about 14 nm to 25 nm, about 16 nm to 25 nm, about 18 nm to 25 nm, about 18 nm to 25 nm, about 20 nm to 25 nm, or about 22 nm. About 55% to 100%, about 60% to 100%, about 70% to 100%, about 75% to 100%, about 80% to 100%, about 85% to 100%, or about 90% to 100% of the metal atoms can be Pt atoms having a face-centered cubic packing structure. Each of the facets is can be a {111} facet having a thickness of about 1 to 10 atomic layers, about 2 to 10 atomic layers, about 2 to 8 atomic layers, about 2 to 6 atomic layers, about 2 to 5 atomic layers, about 2 atomic layers, about 3 atomic layers, about 4 atomic layers, or about 5 atomic layers.

In some aspects, the polyhedral nanocage is a cubic nanocage having an average edge length of about 8 nm to 50 nm, about 10 nm to 50 nm, about 10 nm to 40 nm, about 10 nm to 30 nm, about 10 nm to 20 nm, about 12 nm, about 14 nm, about 16 nm, or about 18 nm. About 50% to 90%, about 60% to 90%, about 60% to 80%, or about 60% to 75% of the metal atoms can be Au atoms having a face-centered cubic packing structure. Each of the facets can have a thickness of about 0.5 nm to 5 nm, about 0.5 nm to 4 nm, about 0.5 nm to 3 nm, about 0.5 nm to 2.5 nm, about 1 nm to 2.5 nm, or about 1 nm to 2 nm. The cubic nanocage ("nanobox") can have pores at the corners, e.g. each of the 8 corners of the cube can have pores. The pores can have a triangular structure with an average edge length of about 3 nm to 10 nm, about 3 nm, about 4 nm, about 5 nm, about 6 nm, about 7 nm, about 8 nm, about 9 nm, or about 10 nm.

In some aspects, the polyhedral nanocage is a cubic nanocage having an average edge length of about 5 nm to 50 nm, about 5 nm to 40 nm, about 5 nm to 30 nm, about 5 nm to 25 nm, about 10 nm to 25 nm, about 12 nm to 25 nm, about 15 nm to 25 nm, about 20 nm to 25 nm, or about 22 nm. About 60% to 100%, about 70% to 100%, about 80% to 100%, about 80% to 95%, or about 85% to 95% of the metal atoms can be Ru atoms having a face-centered cubic packing structure. Each of the facets can be a {111} facet having a thickness of about 0.5 nm to 5 nm, about 0.5 nm to 4 nm, about 0.5 nm to 3 nm, about 0.5 nm to 2.5. nm, about 0.7 nm to 2.5 nm, about 0.7 nm to 2.0 nm, or about 0.7 nm to 1.5 nm. Each of the facets can be a {100} facet having a thickness of about 0.5 nm to 5 nm, about 0.5 nm to 4 nm, about 0.5 nm to 3 nm, about 0.5 nm to 2.5. nm, about 0.7 nm to 2.5 nm, about 0.7 nm to 2.0 nm, or about 0.7 nm to 1.5 nm.

In some aspects, the polyhedral nanocage is a cubic nanocage having an average edge length of about 5 nm to 50 nm, about 5 nm to 40 nm, about 5 nm to 30 nm, about 5 nm to 25 nm, about 10 nm to 25 nm, about 12 nm to 25 nm, about 15 nm to 25 nm, about 20 nm to 25 nm, or about 22 nm. About 60% to 100%, about 70% to 100%, about 80% to 100%, about 80% to 95%, or about 85% to 95% of the metal atoms can be Rh atoms having a face-centered cubic packing structure. Each of the facets can be a {111} facet having a thickness of about 0.5 nm to 5 nm, about 0.5 nm to 4 nm, about 0.5 nm to 3 nm, about 0.5 nm to 2.5. nm, about 0.7 nm to 2.5 nm, about 0.7 nm to 2.0 nm, or about 0.7 nm to 1.5 nm. Each of the facets can be a {100} facet having a thickness of about 0.5 nm to 5 nm, about 0.5 nm to 4 nm, about 0.5 nm to 3 nm, about 0.5 nm to 2.5. nm, about 0.7 nm to 2.5 nm, about 0.7 nm to 2.0 nm, or about 0.7 nm to 1.5 nm.

In some aspects, the nanocage is an octahedral nanocage having an average edge length of about 8 nm to 40 nm, about 8 nm to 30 nm, about 8 nm to 25 nm, about 10 nm to 25 nm, about 12 nm to 25 nm, about 14 nm to 25 nm, about 16 nm to 25 nm, about 18 nm to 27 nm, about 18 nm to 25 nm, about 20 nm to 25 nm, or about 22 nm. About 55% to 100%, about 60% to 100%, about 70% to 100%, about 75% to 100%, about 80% to 100%, about 85% to 100%, about 80% to 95%, about 70% to 95%, about 85% to 95%, or about 90% to 100% of the metal atoms can be Rh atoms having a face-centered cubic packing structure. Each of the facets can be a {111} facet having a thickness of about 1 to 10 atomic layers, about 2 to 10 atomic layers, about 2 to 8 atomic layers, about 2 to 6 atomic layers, about 2 to 5 atomic layers, about 2 atomic layers, about 3 atomic layers, about 4 atomic layers, or about 5 atomic layers. Each of the facets can be a {111} facet having a thickness of about 0.5 nm to 5 nm, about 0.5 nm to 4 nm, about 0.5 nm to 3 nm, about 0.5 nm to 2.5 nm, about 0.5 nm to 2 nm, about 0.5 nm to 1.5 nm, or about 0.7 nm to 1.7 nm.

In some aspects, the polyhedral nanocage is a cubic nanocage having an average edge length of about 5 nm to 50 nm, about 5 nm to 40 nm, about 5 nm to 30 nm, about 5 nm to 25 nm, about 6 nm to 30 nm, about 6 nm to 25 nm, about 6 nm to 20 nm, about 6 nm to 18 nm, about 10 nm to 25 nm, about 10 nm to 18 nm, about 12 nm to 25 nm, about 15 nm to 25 nm, about 20 nm to 25 nm, or about 22 nm. About 60% to 100%, about 70% to 100%, about 80% to 100%, about 80% to 95%, or about 85% to 95% of the metal atoms can be Ir atoms having a face-centered cubic packing structure. Each of the facets can be a {100} facet having a thickness of about 0.5 nm to 5 nm, about 0.5 nm to 4 nm, about 0.5 nm to 3 nm, about 0.5 nm to 2.5. nm, about 0.7 nm to 2.5 nm, about 0.7 nm to 2.0 nm, or about 0.7 nm to 1.5 nm.

In some aspects, the nanocage is an octahedral nanocage having an average edge length of about 5 nm to 50 nm, about 5 nm to 40 nm, about 5 nm to 30 nm, about 5 nm to 25 nm, about 6 nm to 30 nm, about 6 nm to 25 nm, about 6 nm to 20 nm, about 6 nm to 18 nm, about 10 nm to 25 nm, about 10 nm to 18 nm, about 12 nm to 25 nm, about 15 nm to 25 nm, about 20 nm to 25 nm, or about 22 nm. About 55% to 100%, about 60% to 100%, about 70% to 100%, about 75% to 100%, about 80% to 100%, about 85% to 100%, about 80% to 95%, about 70% to 95%, about 85% to 95%, or about 90% to 100% of the metal atoms can be Ir atoms having a face-centered cubic packing structure. Each of the facets can be a {111} facet having a thickness of about 1 to 10 atomic layers, about 2 to 10 atomic layers, about 2 to 8 atomic layers, about 2 to 6 atomic layers, about 2 to 5 atomic layers, about 2 atomic layers, about 3 atomic layers, about 4 atomic layers, or about 5 atomic layers. Each of the facets can be a {111} facet having a thickness of about 0.5 nm to 5 nm, about 0.5 nm to 4 nm, about 0.5 nm to 3 nm, about 0.5 nm to 2.5 nm, about 0.5 nm to 2 nm, about 0.5 nm to 1.5 nm, or about 0.7 nm to 1.7 nm.

Methods of Making Nanocages

Various methods of making nanocages are provided. The methods can include applying a chemical etchant to a core-shell polyhedral nanoparticle. The core-shell polyhedral nanoparticle can have a polyhedral metal seed with a plurality of metal atoms disposed on the surface. The chemical etchant can etch and/or remove the metal seed to produce the polyhedral nanocage having a hollow interior encapsulated by a plurality of the facets.

A variety of metal seeds can be useful for making various nanocages described herein. In some aspects, the metal seed is Pd, Ag, or a combination thereof. The polyhedral metal seed can be a cubic metal seed, a tetrahedral metal seed, an octahedral metal seed, a rhombic dodecahedral metal seed, a decahedral metal seed, an icosahedral metal seed, a triangular prism metal seed, a hexagonal prism metal seed, a cuboctahedral metal seed, a rod-shaped metal seed, a bar-shaped metal seed, or a wire-shaped metal seed.

The metal seed can have a variety of sizes to make the variously sized nanocages described herein. For example, the metal seed can have a largest dimension of about 6 nm to about 100 nm or more. In various aspects, the nanocage has a largest dimension of about 6 nm to 60 nm, about 6 nm to 50 nm, about 10 nm to 50 nm, about 10 nm to 40 nm, about 12 nm to 40 nm, about 12 nm to 30 nm, about 15 nm to 30 nm, about 15 nm to 25 nm, or about 20 nm.

The chemical etchant can include any etchant capable of etching the metal core while leaving the metal atoms forming the facets. In various aspects, suitable etchants include $FeCl_3$, $Fe(NO_3)_3$, $K_3Fe(CN)_6$, $HNO_3$, $H_2O_2$, $O_2$ (or air), $I_2$, HCl, halides, and a combination thereof.

The core-shell polyhedral nanoparticle can be prepared by mixing the polyhedral metal seed with a metal atom source to deposit the metal atoms on the surface of the polyhedral metal seed. For example, the metal atoms can be Pt and the metal atom source can be $Na_2PtCl_6$. In some aspects, the metal atoms are Au and the metal atom source is $HAuCl_4$. In other aspects, the metal atoms are Ru and the metal atom source is $RuCl_3$. The deposition can be performed over a period of time from about 1 hour to 20 hours, 5 hours to 20 hours, 5 hours to 15 hours, or 5 hours to about 10 hours.

Uses of Nanocages

Platinum is an effective catalyst for a variety of applications, such as automotive catalytic converters, nitric acid production, petroleum cracking, as well as oxygen reduction and hydrogen oxidation reactions in fuel-cell technology (Ertl, et al., *Handbook of Heterogeneous Catalysis;* 2nd ed.; Wley-VCH: Weinheim, 2008; Balaj, et al., *Angew. Chem., Int. Ed.* 2004, 43, 6519-6522; Chen, et al., *Chem. Rev.* 2010, 110, 3767-3804; Debe, *Nature* 2012, 486, 43-51). However, the scarcity and the high cost of Pt are main issues that limit its use in commercialization. In past decades, many strategies have been developed to improve the activities of Pt catalysts, such as decreasing their sizes, controlling shape and structure, and adjusting elemental composition (Chen, et al., *Nano Today* 2009, 4, 81-95; Tian, et al., *Science* 2007, 316, 732-735; Yu, et al., *Angew. Chem., Int. Ed.* 2011, 50, 2773-2777; Zhou, et al., *Nano Lett.* 2013, 13, 2870-2874; Zhang, et al., *Nano Lett.* 2010, 10, 638-644; Choi, et al., *Nano Lett.* 2013, 13, 3420-3425; Wu, et al., 2012, 134, 11880-11883; Cui, et al., *Nat. Mat.* 2013, 12, 765-771). Among them, one promising approach is to construct nanocatalysts with hollow structures.

Currently, the commercial Pt/C catalysts used for PEMFCs are made of Pt nanoparticles of 3-5 nm in size, and their mass activity is far below than what is required to gain economic advantages when competing with the technology based on combustion engines (Steele, et al., *Nature* 2001, 414, 345). There are also several other major drawbacks for the commercial Pt/C catalysts, including their poor catalytic durability and difficulty to increase the specific activity by engineering the surface structure (De Bruijn, et al., *Fuel Cells,* 2008, 8, 3).

The loading of Pt in a catalyst can be reduced by increasing the mass activity, which is simply a product of the specific activity and specific surface area. The specific activity can be enhanced by controlling the elemental composition, surface structure, or a combination of them (Wang, et al., *Angew. Chem., Int. Ed.* 2008, 47, 3588-3591; Yu, et al., *Angew. Chem., Int. Ed.* 2011, 50, 2773-2777; Zhou, et al., *Nano Lett.* 2013, 13, 2870-2874; Zhang, et al., *Nano Lett.* 2010, 10, 638-644; Choi, et al., *Nano Lett.* 2013, 13, 3420-3425; Choi, et al., *ACS Nano* 2014, 8, 10363-10371; Wu, et al., *J. Am. Chem. Soc.* 2012, 134, 11880-11883; Cui, et al., *Nat. Mater.* 2013, 12, 765-771; Huang, et al., *Science* 2015, 348, 1230-1234; Chen, et al., *Science* 2014, 343, 1339-1343; Wang, et al., *J. Am. Chem. Soc.* 2011, 133, 13551-13557; Xie, et al., *Nano Lett.* 2014, 14, 3570-3576; Park, et al., *ACS Nano* 2015, 9, 2635-2647). For example, both theoretical and experimental studies have shown that the $Pt_3Ni(111)$ surface could have a specific ORR activity 9.2 and 7.4 times greater than those of the Pt(111) and $Pt_3Ni(100)$ surfaces, respectively (Stamenkovic, et al., *Science* 2007, 315, 493-497). The inclusion of a transition metal more reactive than Pt, however, may compromise the catalytic durability because the more reactive metal tends to be selectively leached out during device operation. For nanocrystals made of pure Pt, it has been shown that the specific activities of various types of facets decrease in the order of high indices >{110}>{111}>{100} (Yu, et al., *Angew Chem. Int. Ed.* 2011, 50, 2773-2777; Stamenkovic, et al., *Science* 2007, 314, 493-497; Kuzume, et al., *Electroanal. Chem.* 2007, 599, 333-342). It has also been reported that the presence of twin defects on the surface could lead to further augment in specific activity (Wang, et al., *Nat. Commun.* 2015, 6, 7594; Sun, et al., *ACS Nano* 2015, 9, 7634-7640). Taken together, it is clear that Pt icosahedra might be a promising surface structure for enhancing the specific activity of Pt-based nanocrystals. However, at the current stage of development, Pt icosahedra could only be made with a size (the distance between two opposite edges) larger than 7.5 nm (Zhou, et al., *Nano Lett.* 2013, 13, 2870-2874; Zhu, et al., *Chem.-Eur. J.* 2012, 18, 12222-12226; Kang, et al., *ACS Nano* 2013, 7, 645-653). For solid particles with such a big size, their small specific surface area tends to compromise the mass activity. One solution to this dilemma is the Pt-based icosahedra described herein with both hollow interior and ultrathin wall thickness.

We have developed a new method for the fabrication of Pt-based nanocages whose majority of atoms are exposed on the surface (both outer and inner surfaces), together with a well-controlled surface structure for the optimization of catalytic activity and selectivity. The nanocages were prepared by coating Pt (or other noble metals, as well as their alloys) of only a few atomic layers thick on Pd nanocrystals with different shapes, followed by selective removal of the Pd templates via wet etching using an etchant such as aqueous $FeCl_3$ solution. We have successfully applied this technique to Pd nanocrystals with a variety of different shapes, including, cubes, cuboctahedra, octahedra, tetrahedra, icosahedra, decahedra, plates, bipyramids, nanorods, and nanowires. Our electrochemical measurements indicate that these Pt-based nanocages exhibited great enhanced activities and improved stability toward oxygen reduction reaction (ORR) relative to the commercial Pt/C catalyst.

In various aspects, oxygen reduction catalysts are provided including one or more of the polyhedral nanocages described herein. The oxygen reduction catalyst can have a high specific activity toward the oxygen reduction reaction, e.g. about 0.5 mA $cm^{-2}$ to about 5.0 mA $cm^{-2}$, about 1.0 mA $cm^{-2}$ to about 5.0 mA $cm^{-2}$, about 1.5 mA $cm^{-2}$ to about 5.0 mA $cm^{-2}$, or about 1.5 mA $cm^{-2}$ to about 4.0 mA $cm^{-2}$ at 0.9 V with a reference to the reversible hydrogen electrode ($V_{RHE}$).

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1: Pd@Pt Concave Nanocubes with Enhanced Catalytic Activity Toward Oxygen Reduction In this example, a facile synthesis of Pd@Pt core-shell nanocubes with concave facets on the surface is reported and their enhanced activities toward the oxygen reduction reaction (ORR) is demonstrated. The success of this synthesis depends on our ability to manipulate both the deposition rate of atoms and the surface diffusion rate of adatoms. In the first step, Pd nanocubes with side faces capped by Br ions are transformed into concave nanocubes via seed-mediated growth. The $PdCl_4^{2-}$ precursor is added in one shot and the growth is conducted at 40° C. to accelerate deposition and decelerate surface diffusion. For the synthesis of Pd@Pt core-shell concave nanocubes, the $PtCl_4^{2-}$ precursor is added dropwise into a suspension of the Pd concave nanocubes and reduced by citric acid at 90° C. As such, we can conformally deposit an ultrathin Pt shell on the surface of each Pd concave nanocube by suppressing the formation of Pd—Pt dendrite structures and self-nucleation of Pt atoms. Despite their much larger size, the Pd@Pt concave nanocubes exhibit greater specific electrochemical surface areas than a commercial Pt/C catalyst, implying more efficient dispersion of Pt atoms on the surface. In addition to greatly improved durability, the catalyst based on Pd@Pt concave nanocubes with 28.8 wt % of Pt shows much enhanced specific (1.38 mA $cm^{-2}$) and mass activity (0.84 Å $mg_{Pt}^{-1}$) toward ORR when compared with a commercial Pt/C (0.36 mA $cm^{-2}$ and 0.20 Å $mg_{Pt}^{-1}$).

Here we demonstrate a simple approach to the synthesis of Pd@Pt concave nanocubes enclosed by high-index facets in an aqueous system, with Pd concave nanocubes serving as the templates (Jin, et al., *Angew Chem Int Ed Engl*, 2011, 50, 7850). By manipulating both the deposition rate of atoms and the surface diffusion rate of adatoms, Pd nanocubes with side faces capped by Br ions were easily transformed into concave nanocubes through seed-mediated growth (Xia, et al., *Proc. Natl. Acad. Sci. U.S.A.* 2013, 110, 6669). Because of the high surface energy of a high-index facet, however, it was extremely difficult to conformally coat Pt as an ultrathin shell on the surface of a Pd concave nanocube. It is noted that the high energy barrier for diffusion of Pt adatoms results in formation of Pt islands instead of the thin layer of Pt. We addressed this problem by introducing the solution of a Pt precursor dropwise to slow down the deposition rate. Most significantly, the Pt coating could be conducted in an aqueous system at a temperature below 100° C., making it attractive for commercialization as an energy-saving process. It is also eco-friendly when compared with other protocols using organic solvents such as ethylene glycol and benzyl alcohol (Lim, et al., *Adv. Funct. Mater.* 2009, 19, 189). As expected, the Pd@Pt concave nanocubes showed a greatly enhanced specific activity of 1.38 mA $cm^{-2}$ relative to a commercial Pt/C catalyst (0.36 mA $cm^{-2}$). Even after 10,000 cycles of accelerated durability test, the Pd@Pt concave nanocubes still showed a mass activity of 0.54 Å $mg_{Pt}^{-1}$, which is about 2.7 times greater than that of the pristine Pt/C catalyst (0.20 A $mg_{Pt}^{-1}$).

Chemicals and Materials

Sodium tetrachloropalladate(II) ($Na_2PdCl_4$, 98%), potassium tetrachloroplatinate(II) ($K_2PtCl_4$, 99.99%), poly(vinyl pyrrolidone) (PVP, MW≈55,000), ascorbic acid (AA, 99%), citric acid (CA, 99.5%), and potassium bromide (KBr, 99%) were all obtained from Sigma-Aldrich. Ethylene glycol (EG, 99%) was ordered from J.T. Baker. All the chemicals were used as received. De-ionized (DI) water with a resistivity of 18.2 MΩ·cm was used for all procedures and syntheses.

Synthesis of Pd Nanocubes

The Pd nanocubes with an average edge length of 10 nm were synthesized using a protocol previously reported by our group (Jin, et al., *Nano Research* 2010, 4, 83). In a typical synthesis, 8 mL of an aqueous solution containing PVP (105 mg), AA (60 mg), and KBr (300 mg) was heated at 80° C. under magnetic stirring for 10 min. Another aqueous solution (3 mL) containing 57 mg of $Na_2PdCl_4$ was then added in one shot using a pipette. After heating at 80° C. for another 3 h under magnetic stirring, the reaction solution was cooled down to room temperature. The Pd nanocubes were collected by centrifugation at 55,000 rpm, washed three times with water to remove excess PVP, and re-dispersed in 11 mL of water.

Synthesis of Pd concave nanocubes.

The Pd concave nanocubes with an average size of 18 nm were synthesized using our previously reported protocol with some minor modifications (Jin, et al., *Angew Chem. Int. Ed. Engl.* 2011, 50, 7850). In a typical synthesis, aqueous suspension of the 10-nm Pd cubes (0.11 mg $mL^{-1}$) was added into 8 mL of an aqueous solution containing PVP (105 mg), AA (240 mg), and KBr (300 mg), and the mixture was incubated at room temperature for 6 h. The mixture was then heated to 40° C. in an oil bath and held at this temperature for 10 min. Finally, 3 mL of an aqueous solution containing 14.5 mg of $Na_2PdCl_4$ was quickly added in one shot using a pipette. After further heating at 40° C. for 1 h under magnetic stirring, the reaction solution was cooled down to room temperature. The product was collected through centrifugation at 13,200 rpm, washed three times with water and re-dispersed in water for further use.

Synthesis of Pd@Pt Concave Nanocubes

For the synthesis of Pd@Pt concave nanocubes with 18.7 wt % Pt, PVP (35.6 mg) and CA (300 mg) were added into 7 mL of an aqueous suspension of Pd concave nanocubes (0.16 mg mL$^{-1}$) and heated at 90° C. for 10 min in an oil bath under magnetic stirring. Then, 3 mL of water containing 6 mg of $K_2PtCl_4$ was introduced dropwise at a rate of 1 mL h$^{-1}$ using a syringe pump. For the concave cubes with 28.8 wt % Pt and 37.0 wt % Pt, 3 mL of aqueous solutions containing 12 mg and 48 mg of $K_2PtCl_4$ were injected, respectively. The reaction solution was kept at 90° C. for another 3 h under magnetic stirring and then cooled down to room temperature. The product was collected by centrifugation at 13,200 rpm, washed three times with water, and finally re-dispersed in water.

Instrumentation

Transmission electron microscopy (TEM) images were obtained with an HT7700 microscope (Hitachi) operated at 120 kV. High-angle annular dark-field scanning TEM (HAADF-STEM) and energy dispersive X-ray (EDX) scanning analyses were performed using an ARM200F microscope (JEOL) with STEM aberration corrector operated at 200 kV. Inductively coupled plasma-mass spectrometry (ICP-MS, NexION 300Q, Perkin-Elmer) was used to measure metal contents in the sample.

Preparation of carbon-supported Pd@Pt concave nanocubes (Pd@Pt/C).

The Pd@Pt concave nanocubes were collected by centrifugation and re-dispersed in 20 mL of ethanol. A specific amount of porous carbon (Ketjenblack EC-300J, AkzoNobel) was added into the suspension to obtain a metal loading of about 20 wt % based on the total mass of Pt and Pd. The mixture was then ultrasonicated for 3 h and the resulting Pd@Pt/C was collected by centrifugation, re-dispersed in 10 mL of acetic acid (99.7%, Sigma-Aldrich), and heated at 60° C. for 2 h to clean the surface of the particles. The Pd@Pt/C catalyst was washed six times with ethanol and dried in an oven for further use.

Electrochemical Characterizations

Electrochemical measurements were performed using a glassy carbon rotating disk electrode (RDE, Pine Research Instrumentation) connected to a potentiostat (CHI 600E, CH Instruments). An ink for electrochemical measurement was prepared by adding 3 mg of the catalyst into a mixture containing 0.5 mL of water, 0.5 mL of 2-propanol (Sigma-Aldrich), and 20 µL of Nafion (5 wt % aqueous solution, Sigma-Aldrich), followed by sonication for 10 min. A working electrode was prepared by loading the ink (10 µL) on the RDE. Another working electrode was prepared from a commercial catalyst (Pt/C, 20 wt % of 3.2 nm nanoparticles on Vulcan XC-72 carbon, Premetek) using the same protocol. A reversible hydrogen electrode (RHE, Gaskastel) and a Pt coil (Pine Research Instrumentation) were used as the reference and counter electrodes, respectively. The electrolyte was an aqueous $HClO_4$ solution (70%, double-distilled, GFS chemicals) with a concentration of 0.1 M. The chemical contaminants on the surface of a catalyst were removed using a non-destructive method at room temperature by keeping the electrode potential at $-0.05$ $V_{RHE}$ for 1 min. The cyclic voltammograms (CVs) were measured in a $N_2$-saturated electrolyte by cycling between 0.08 and 1.1 $V_{RHE}$ at a sweep rate of 0.05 V s$^{-1}$. Electrochemical surface areas (ECSAs) of the catalysts were calculated from the average charges measured from adsorption and desorption peaks of the CV with a reference value of 210 µC cm$^{-2}$ for the adsorption (or desorption) of a underpotentially deposited hydrogen (Hupp) from a Pt surface. The ORR test was carried out in an $O_2$-saturated electrolyte with a scan rate of 0.01 V s$^{-1}$ and a rotation speed of 1,600 rpm. The kinetic current density ($j_k$) was derived from the Koutecky-Levich equation as follows:

$$\frac{1}{j} = \frac{1}{j_k} + \frac{1}{j_d}$$

where j is the measured current density and $j_d$ is the diffusion-limiting current density.

Results and Discussion

Synthesis of Pd and Pd@Pt Concave Nanocubes

FIG. 1 shows a schematic illustration regarding the formation of Pd and then Pd@Pt concave nanocubes from Pd nanocubes. A key to the success of this synthesis is to manipulate the ratio between the deposition rate of the newly formed atoms and the surface diffusion rate of the adatoms, that is, $V_{deposition}/V_{diffusion}$ (Xia, et al., Proc. Natl. Acad. Sci. U.S.A, 2013, 110, 6669). We first prepared Pd nanocubes with an average edge length of 10 nm using a protocol developed by our group (Jin, et al., Nano Research 2010, 4, 83). We then transformed the Pd nanocubes into concave nanocubes with high-index facets on the surface via seed-mediated growth (Jin, et al., Angew Chem. Int. Ed. Engl. 2011, 50, 7850). Because of a shortened edge length of Pd nanocubes relative to what was used in our previous work (10 nm vs. 18 nm), it is necessary to increase the deposition rate and reduce the surface diffusion rate in order to generate a concave structure on the surface. To this end, we increased the amount of ascorbic acid (AA, a reducing agent) by four times to accelerate the deposition rate ($V_{deposition}$) and conducted the synthesis at a lower temperature (40° C. vs. 60° C.) to slow down the diffusion rate ($V_{diffusion}$) of Pd adatoms.

Figures 2A, 2B:
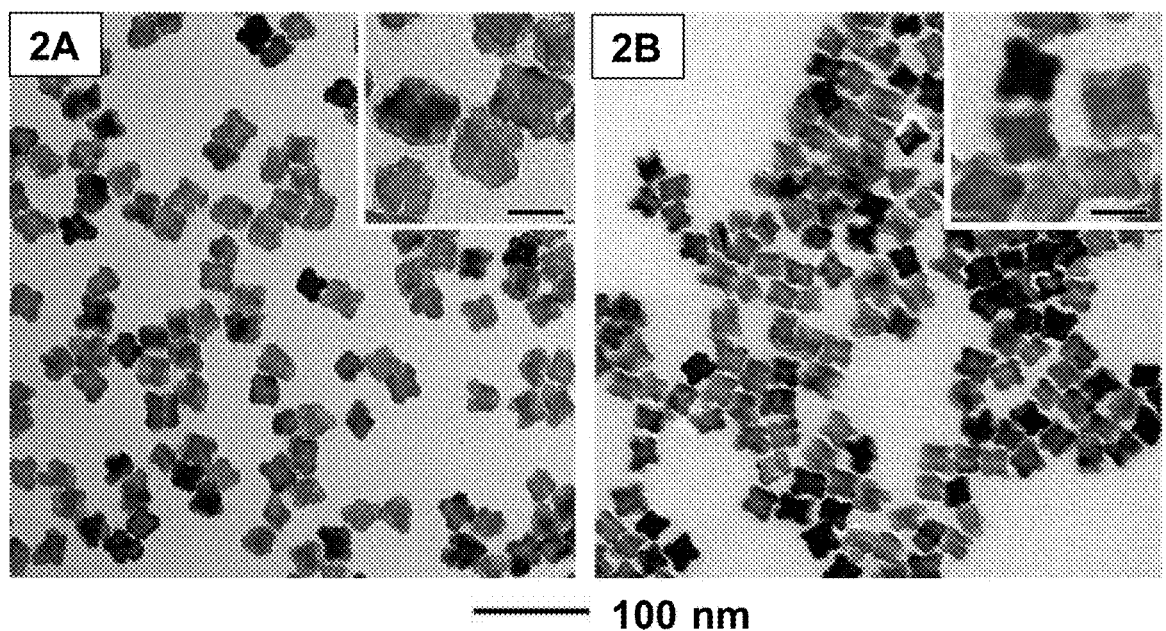
FIGS. 2A-2B show TEM images of Pd@Pt concave nanocubes with 28.8 wt % Pt that were synthesized by adding the Pt precursor (FIG. 2A) in one shot and (FIG. 2B) drop wise.

For the synthesis of Pd@Pt concave nanocubes, an ultrathin shell of Pt has to be conformally deposited on the surface of each Pd concave nanocube. To accomplish this goal, we used a protocol reported in one of our recent publications with some modifications. The original protocol was developed for the conformal coating of Pd octahedra with ultrathin Pt shells using an aqueous system (Park, et al., Acs Nano, 2015, 9, 2635). It involves the addition of Pt precursor in one shot and thus the use of a mild reducing agent such as citric acid (CA) to reduce the Pt precursor at a relatively slow rate, preventing self-nucleation for the resultant Pt atoms (Park, et al., Acs Nano, 2015, 9, 2635). Compared to the octahedral system, however, it is more challenging to generate a conformal, ultrathin shell of Pt on the surface of a concave cube due to the higher energy barrier for surface diffusion caused by high densities of atomic kinks and edges on a concave surface. In general, their higher surface energy leads to aggregation of Pt adatoms and formation of Pt clusters on the Pd surface. When we introduced an aqueous $K_2PtCl_4$ solution into the suspension of Pd seeds in one shot with a pipette, we typically obtained Pt shells with a rough surface instead of smooth and conformal thin layer (FIG. 2A-2B). To address this issue, we injected the Pt precursor dropwise into the growth solution using a syringe pump at a relatively slow rate of 1 mL h$^{-1}$. Due to the use of a slow injection rate, as well as the use of a mild reducing agent (CA) at high temperature (90° C.), we were able to generate an ultrathin, conformal Pt shell on the entire surface of a Pd concave nanocube by avoiding the island growth mode (i.e., the Volmer-Weber mode) for the deposited Pt atoms. To keep the original concave structure covered with a mixture of {100}, {110}, and {210} facets, we also shorten the reaction time from 24 h to 3 h relative to the protocol used for the synthesis of Pd@Pt octahedra.

Figures 3A, 3B, 3C, 3D:
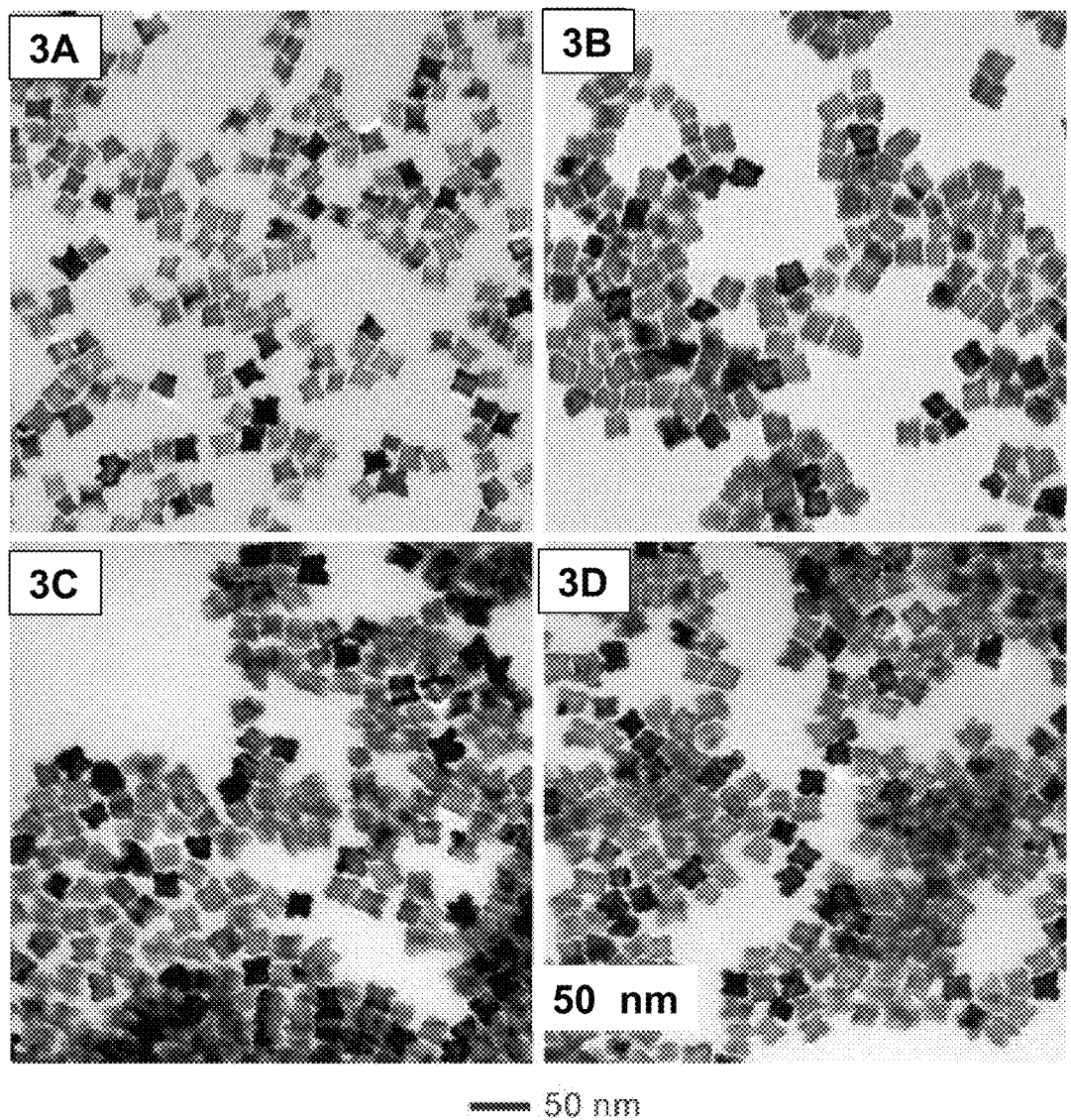
FIGS. 3A-3D show TEM images of (FIG. 3A) Pd concave cubes and (FIGS. 3B-3D) Pd@Pt core-shell concave nanocubes obtained through the deposition of Pt ultrathin shells on the Pd concave nanocubes. The Pt contents in the Pt@Pt concave nanocubes were (FIG. 3B) 18.7, (FIG. 3C) 28.8, and (FIG. 3D) 37.0 wt %. These samples were prepared by increasing the concentration of $K_2PtCl_4$ solution from 2 to 4 and 16 mg mL$^{-1}$, respectively, while keeping the volume fixed at 3 mL.
Figures 4A, 4B, 4C, 4D, 4E, 4F:
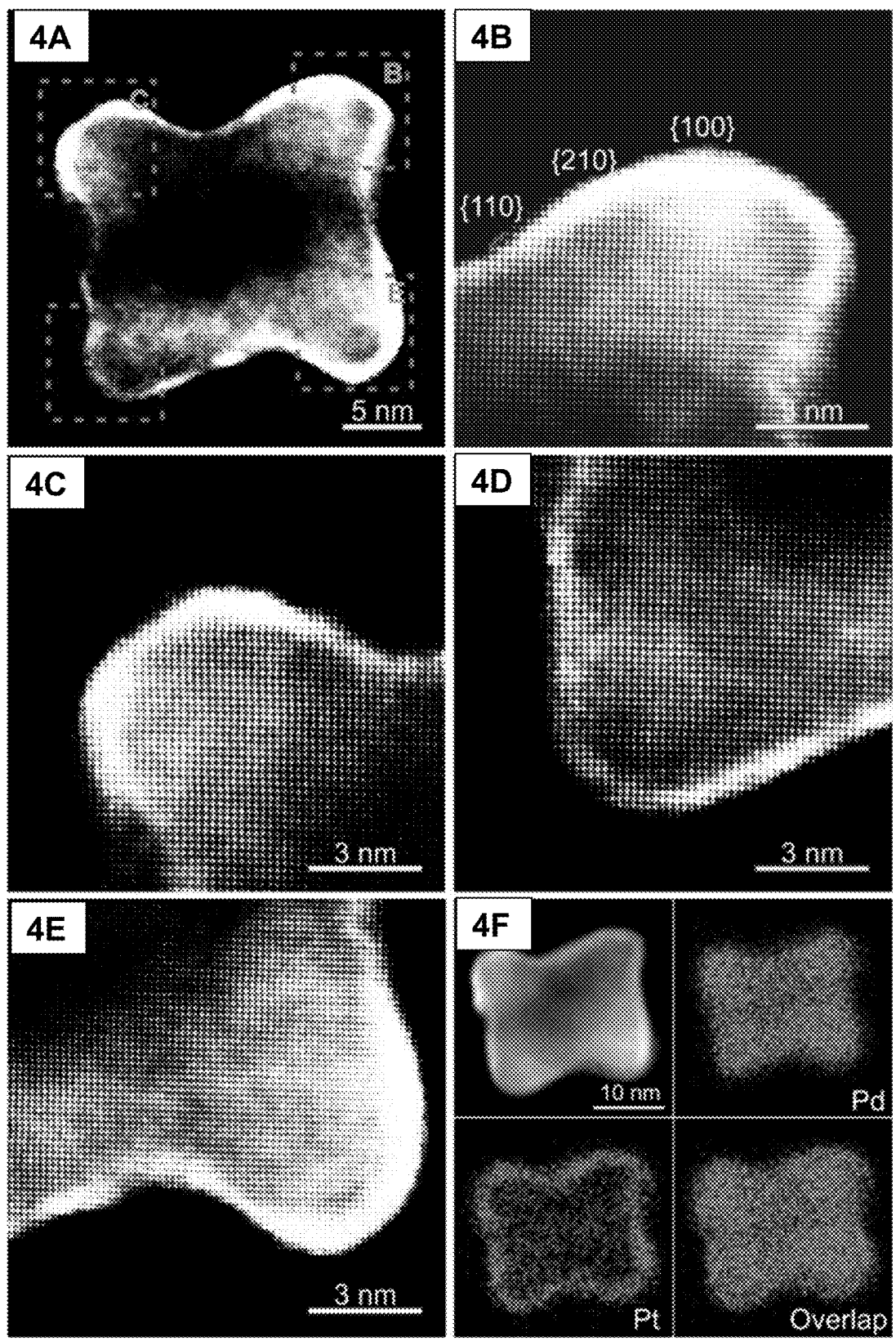
FIGS. 4A-4F show HAADF-STEM images of (FIGS. 4A-4E) a Pd@Pt concave nanocube with 28.8 wt % Pt and (FIG. 4F) its EDX elemental mapping.

FIG. 3A shows a typical transmission electron microscopy (TEM) image of the Pd concave nanocubes that served as seeds for the deposition of Pt shells. We started with 10-nm Pd cubes, whose {100} side faces were passivated by the chemisorbed Br⁻ ions. As a result, the newly formed Pd atoms were preferentially deposited on the corner and edge sites of each Pd cube. FIG. 3B-3D shows TEM images of three samples with different Pt contents (in wt %). The Pt content in the Pd@Pt concave nanocubes could be controlled by varying the amount of $PtCl_4^{2-}$ solution added into the reaction system while the amount of Pd concave nanocubes was fixed. The contents of Pt in the Pd@Pt concave nanocubes were 18.7, 28.8, and 37.0 wt % when we injected 6, 12, and 48 mg of $K_2PtCl_4$ into the reaction solution, respectively, while the solution volume was fixed at 3.0 mL. The Pd@Pt concave nanocubes in all these samples exhibit great uniformity in terms of shape, which was more or less similar to the original Pd concave nanocubes without any issues such as self-nucleation or island growth. These results suggest that we could indeed achieve conformal deposition of a Pt ultrathin shell on the surface of each Pd concave nanocube by adjusting the ratio between the deposition rate for the newly added atoms and the surface diffusion rate of adatoms.

FIG. 4A-4F shows the high-angle annular dark-field scanning TEM (HAADF-STEM) images recorded from one of the Pd@Pt concave nanocubes in the sample with 28.8 wt % Pt. The bright and dark contrasts correspond to Pt and Pd, respectively. The STEM images reveal that the concave structure was well preserved during Pt deposition and the Pt atoms were conformally and epitaxially deposited on the surface of the Pd seed. From the image shown in FIG. 4B, we could observe that the surface of the Pd@Pt concave nanocube was covered by a mix of {210}, {110}, and {100} facets. The HAADF-STEM images in FIG. 4B-4E, were taken from different sides of the concave nanocube. It is clear that the thickness of the Pt shell is about 5 atomic layers at vertex and edge and about 3 atomic layers on other regions. This observation indicates that the growth of Pt on a Pd concave nanocube did not exactly follow the layer-by-layer mode due to the difference in surface free energy along various directions. It is also possible that the ratio of $V_{deposition}/V_{diffusion}$ was still too high to prevent the newly deposited Pt atoms from diffusing away from the corner sites because we had to conduct the synthesis at a relatively high temperature to promote surface diffusion. The energy dispersive X-ray (EDX) mapping shown in FIG. 3F further confirms that an ultrathin, conformal Pt shell was indeed formed on the surface of the Pd concave nanocube, as indicated by the color difference between the core (green, Pd) and the shell (red, Pt).

Electrocatalytic measurements of the Pd@Pt concave nanocubes.

Figure 5A:
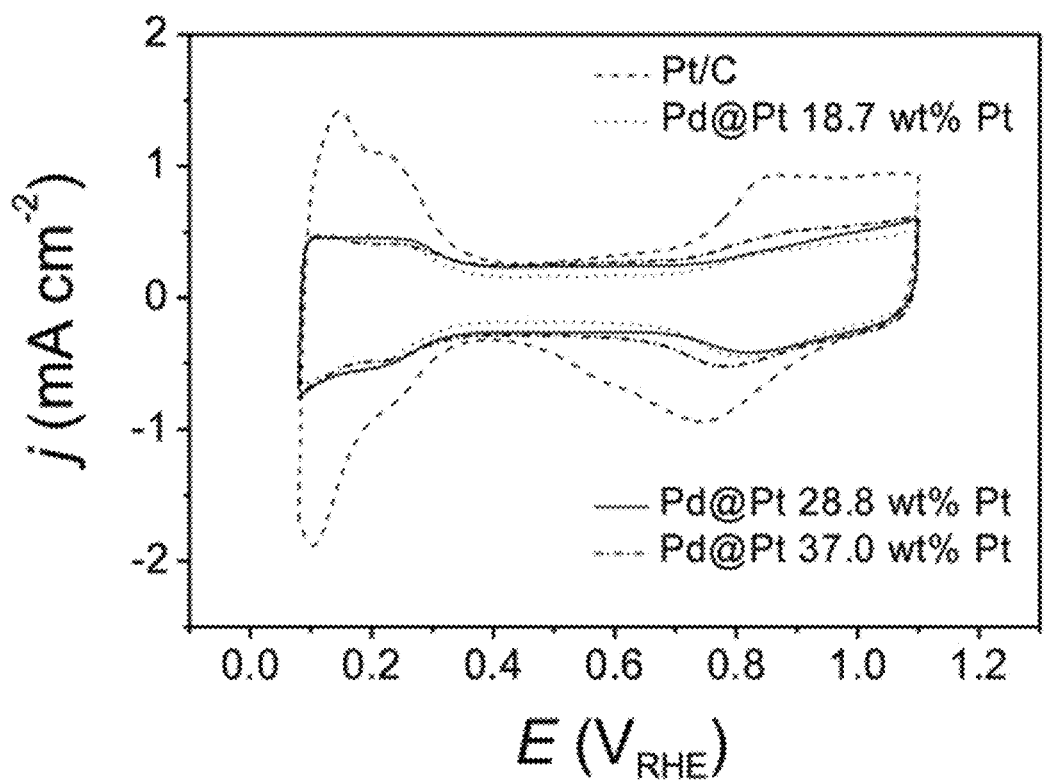
FIGS. 5A-5F show (FIG. 5A) CVs and (FIG. 5B) ORR polarization curves recorded for Pd@Pt concave nanocubes with 18.7 wt % Pt (red), 28.8 wt % Pt (blue), and 37.0 wt % Pt (green), respectively. The current densities (j) were normalized against the geometric area of RDE (0.196 cm$^2$).

We compared the ORR activities of the Pd@Pt concave nanocubes with 18.7, 28.8, and 37.0 wt % of Pt using the rotating disk electrode (RDE) method by benchmarking against a commercial Pt/C catalyst (Premetek). FIG. 5A shows cyclic voltammograms (CVs) recorded from the three different Pd@Pt/C catalysts and the commercial Pt/C. The CV curves were recorded at room temperature in a $N_2$-saturated $HClO_4$ solution in the potential range of 0.08-1.1 V vs. the reversible hydrogen electrode (RHE). The electrochemical surface area (ECSA) of each catalyst was derived from the charges associated with both adsorption and desorption of hydrogen. They were then normalized against the Pt mass to obtain the specific ECSA, and the results are summarized in Table 1. The specific ECSA of Pd@Pt concave nanocubes with 18.7 wt % of Pt was almost twice that of the commercial Pt/C. The specific ECSA gradually dropped from 102 to 61.0 and 53.8 $m^2 \, g_{Pt}^{-1}$ as the Pt content in the Pd@Pt concave nanocubes increased from 18.7 to 28.8 and 37.0 wt %. All the catalysts showed comparable or higher specific ECSAs relative to the commercial Pt/C despite their much larger size (~20 nm in edge length) than the Pt particles in the commercial Pt/C (3.2 nm). These results confirm that we could achieve greater dispersion for the Pt atoms by depositing them as ultrathin shells on Pd concave nanocubes.

TABLE 1

Comparison of the specific electrochemical surface areas (ECSAs), the specific activities (SAs), and the mass activities (MAs) of the catalysts based on Pt/C and Pd@Pt concave nanocubes.

| Catalyst | Specific ECSA ($m^2 \, g_{Pt}^{-1}$) | SA at 0.9 $V_{RHE}$ (mA cm$^{-2}$) | MA at 0.9 $V_{RHE}$ (A $mg_{Pt}^{-1}$) |
|---|---|---|---|
| Pt/C | 55.3 | 0.359 | 0.199 |
| Pd@Pt with 18.7 wt % Pt | 102 | 0.717 | 0.728 |
| Pd@Pt with 28.8 wt % Pt | 61.0 | 1.38 | 0.842 |
| Pd@Pt with 37.0 wt % Pt | 53.8 | 1.21 | 0.653 |

Figure 5B:
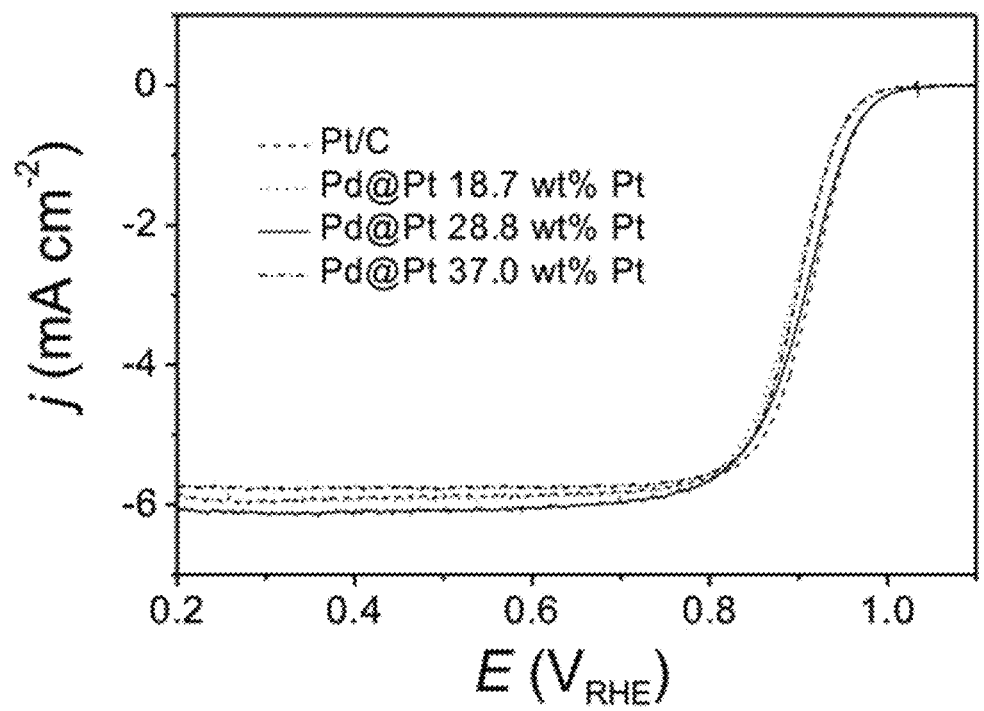
Figure 5C:
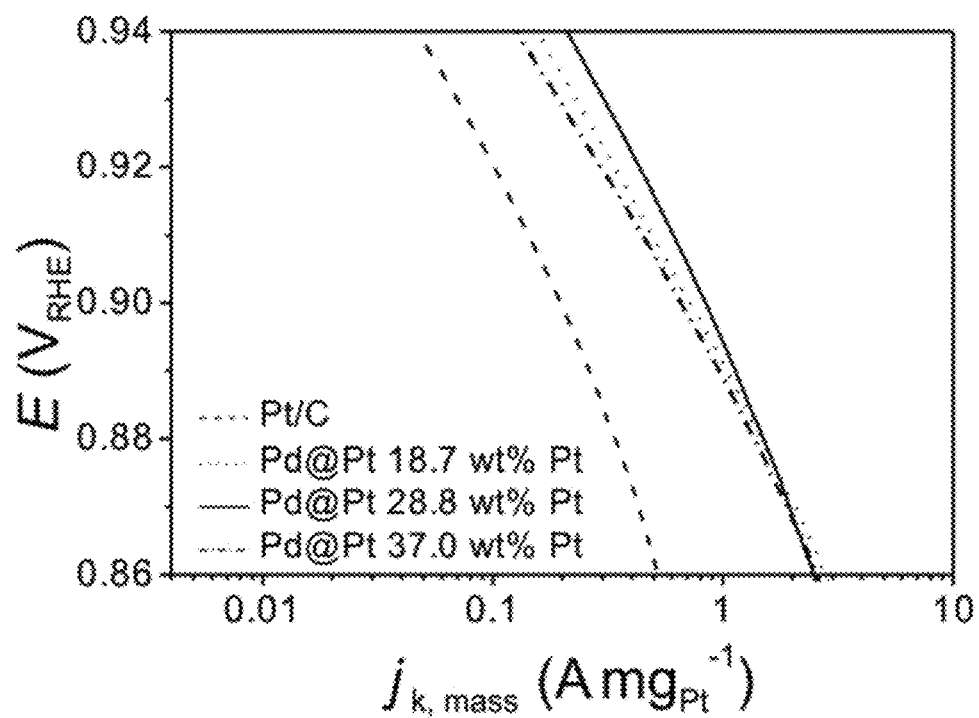
Figure 5D:
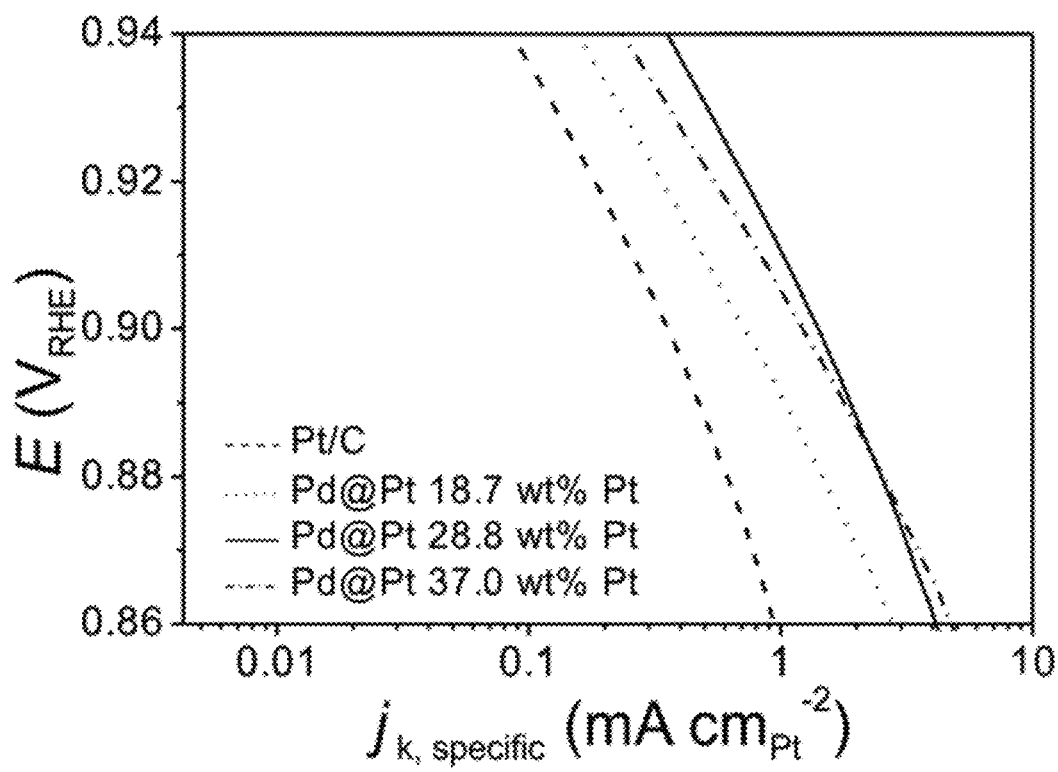
Figure 5E:
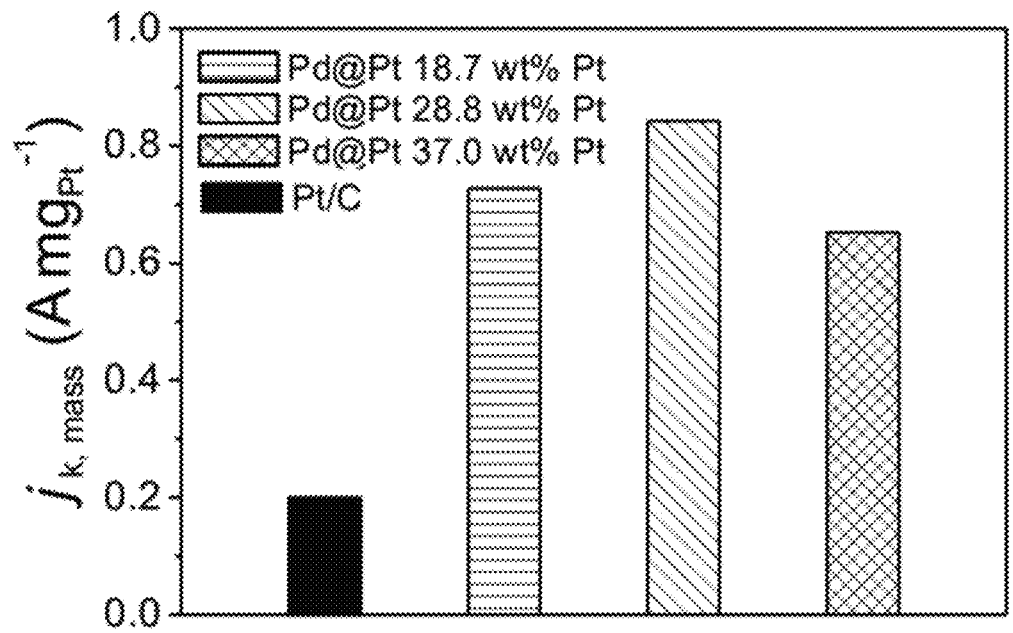
Figure 5F:
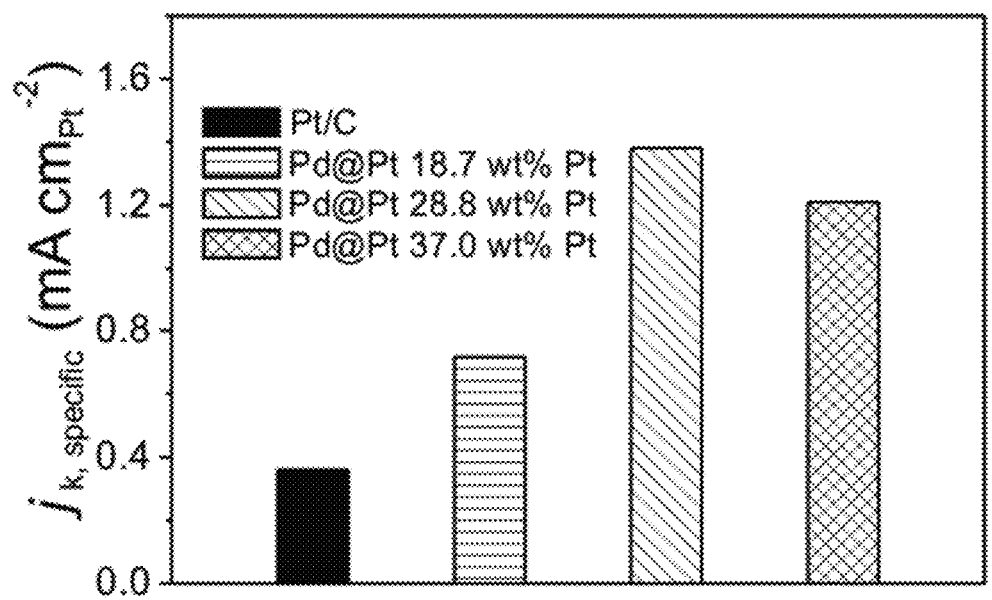

FIG. 5B shows the ORR polarization curves for the Pd@Pt concave nanocubes measured using the RDE method. These data are obtained at room temperature in an $O_2$-saturated aqueous $HClO_4$ solution with a rotation speed of 1,600 rpm for the working electrode. We used Koutecky-Levich equation to get kinetic current densities ($j_k$) from the ORR polarization curves and normalized them against Pt mass to obtain the mass activity ($j_{k, \, mass}$, FIG. 5C), or against ECSA to obtain the specific activity ($j_{k, \, specific}$, FIG. 5D). For quantitative comparison, we selected the mass and specific activities at 0.9 $V_{RHE}$ for all catalysts and plotted them in FIG. 5E-5F. The concave cubes with 28.8 wt % of Pt showed highest activities for ORR. The mass activities of the Pd@Pt concave nanocubes with 18.7, 28.8, and 37.0 wt % of Pt were 0.73, 0.84 and 0.65 A $mg_{Pt}^{-1}$, respectively, which were 3.7, 4.2, and 3.3 times greater than that of the Pt/C. The specific activities of the concave cubes with 18.7, 28.8 and 37.0 wt % of Pt were 0.717, 1.38 and 1.21 mA cm$^{-2}$, showed an enhancement factor of 2.0, 3.8 and 3.4 relative to that of the commercial Pt/C (0.359 mA cm$^{-2}$) Respectively. The significant improvement in both specific ORR activity and specific ECSA makes a great contribution to the enhancement in mass activity for the Pd@Pt concave nanocubes.

The enhancement in specific activity is closely associated with the unique high-index facets of the concave nanocubes. As shown by the HAADF-STEM images in FIG. 4B, the surface of the Pd@Pt concave nanocube contained a large number of low-coordination atomic steps, kinks, and edges. The $O_2$ molecules are preferentially adsorbed to these sites, which correspond to a mix of {210}, {110}, and {100} facets, and serve as active sites for breaking bonds (Yu, et al., *Angew Chem. Int. Edit.* 2011, 50, 2773). In addition, the strain effect caused by the difference in lattice constant between Pd and Pt atom can also lead to improvement in catalytic activity toward ORR. Electronic coupling among Pd and Pt, known as the ligand effect, is another factor that can contribute to the improvement in ORR activity. These two effects downshift the d-band center of Pt which will reduce the Pt—O binding energy. It is a combination of these effects that lead to the observed large increase in specific activity. One must however, note that the mass activities in terms of precious metals (both Pd and Pt) were 0.14, 0.24, and 0.30 A mg$^{-1}$ for Pd@Pt concave with 18.7, 28.8, and 37.0 wt % of Pt, respectively.

Figure 6A:
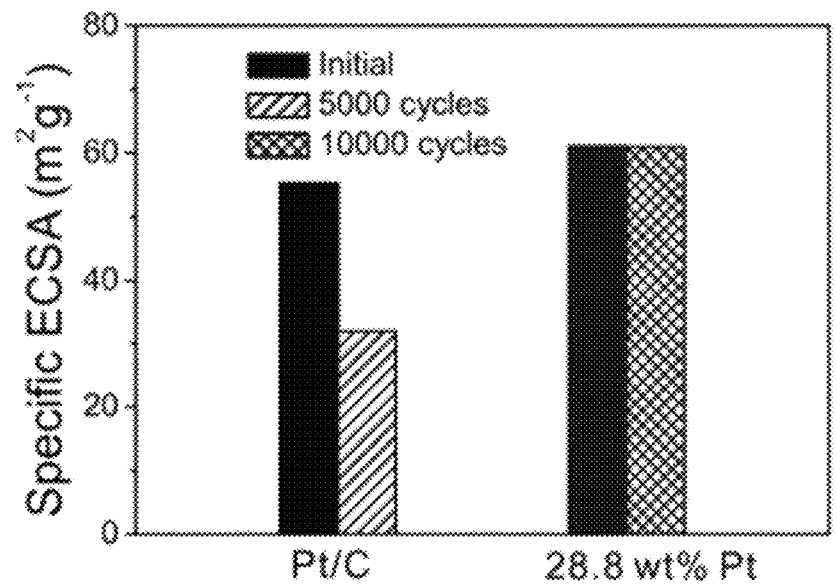
FIGS. 6A-6B show (FIG. 6A) Specific ECSA and (FIG. 6B) mass ORR activity at 0.9 $V_{RHE}$ for the catalysts before and after the accelerated durability tests.
Figure 6B:
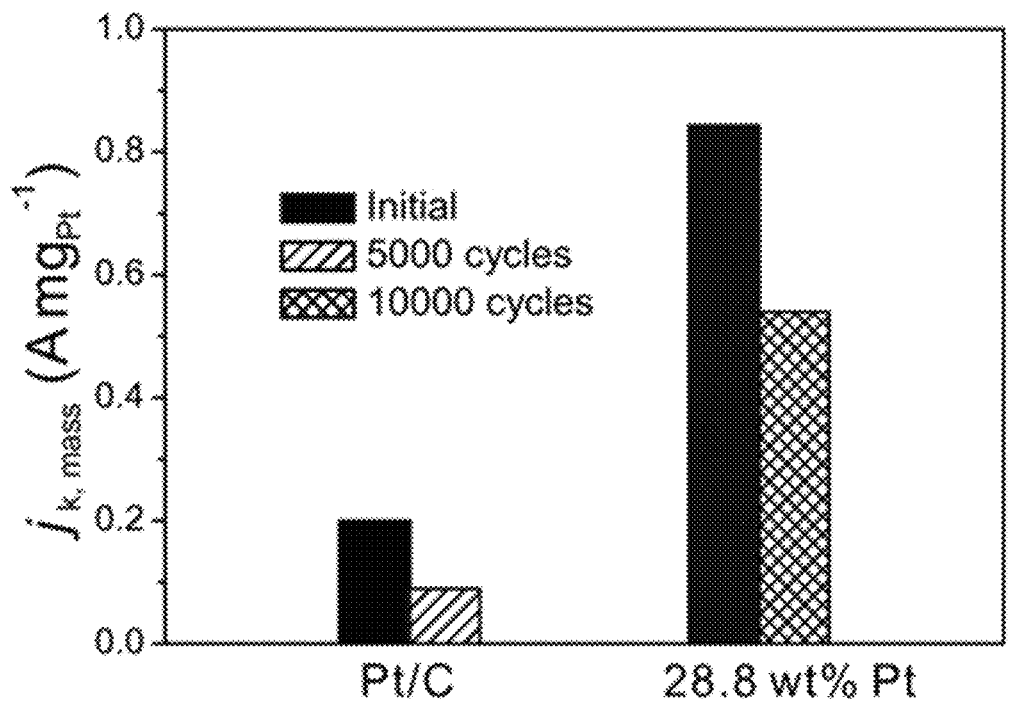

The catalysts based on Pd@Pt concave nanocubes with 18.7 and 28.8 wt % of Pt were also subjected to accelerated durability tests. We applied linear potential sweeps between 0.6 and 1.1 at a rate of 0.1 V s$^{-1}$ in an $O_2$-saturated $HClO_4$ solution at room temperature. Compared to the commercial Pt/C, the retention power of the Pd@Pt concave nanocubes was greatly improved based on the specific ECSAs, mass activities, and specific activities, as shown in FIG. 6A-6B. After 10,000 cycles, the mass activity of the Pd@Pt with 28.8 wt % of Pt at 0.9 $V_{RHE}$ only dropped to 0.54 A $mg_{Pt}^{-1}$, which is enhanced by 2.7-fold relative to that of the pristine Pt/C. Meanwhile, the specific ECSA dropped 0.1-0.2% from the initial value for the catalyst based on Pd@Pt concave nanocubes. However, the mass activity and the specific ECSA of commercial Pt/C dropped drastically by 55% and 42%, respectively even after 5000 cycles.

Figures 7A, 7B:
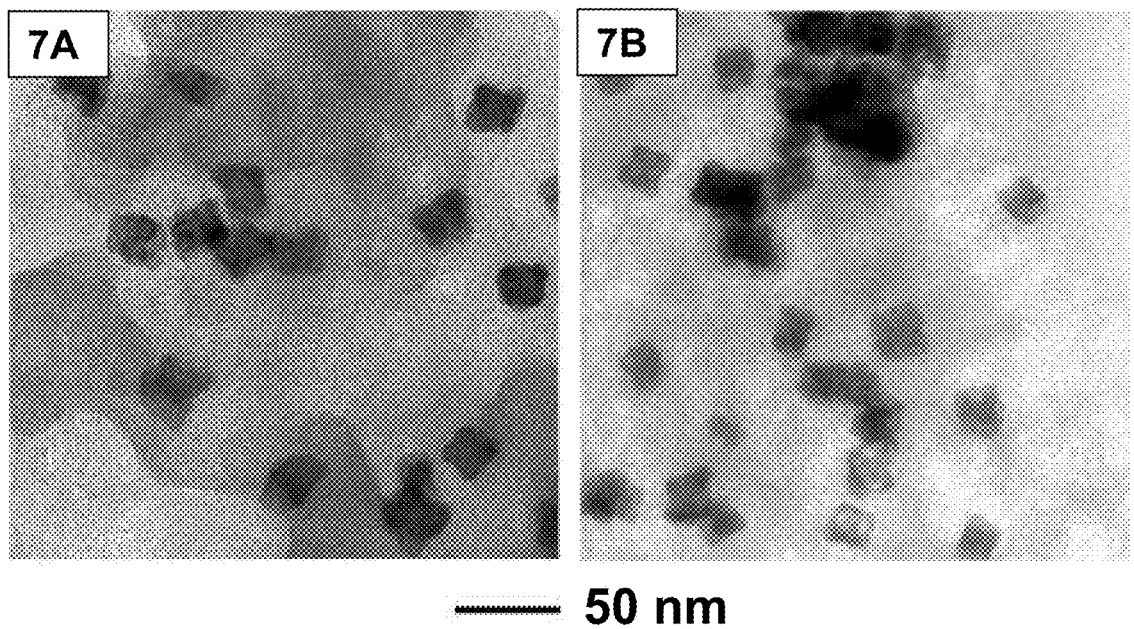
FIGS. 7A-7B show TEM images of the catalyst based on Pd@Pt concave nanocubes with 28.8% of Pt before (FIG. 7A) and after (FIG. 7B) the accelerated durability test.

FIG. 7A-7B shows TEM images of the catalyst based on Pd@Pt concave nanocubes with 28.8% of Pt before and after the accelerated durability tests. The concave nanocubes evolved into a cage-like structure during the tests, indicating that the Pd cores were selectively dissolved. ICP-MS data of initial and after 10,000 cycles of accelerated tests indicate that the ratio between Pd and Pt was changed from 2.5:1 to 1.7:1. Both results suggest that the core-shell structure could prevent Pt from dissolution by sacrificing the Pd core, which is less noble than Pt. The removal of Pd caused some reduction to the specific activity since it lessened the strain and ligand effects. Due to the aggregation of Pd@Pt concave nanocubes on the carbon support after the accelerated durability test, the specific ECSA remained almost the same even though transformation into hollow structure can increase the value of specific ECSA. These results confirm that both the activity and durability of the Pt-based catalysts can be greatly improved by depositing ultrathin layer of Pt on the surface of Pd concave nanocubes.

Conclusions

We have demonstrated a facile approach to the synthesis of Pd@Pt core-shell concave nanocubes via seed-mediated growth using Pd concave nanocubes as the templating seeds. To coat conformal, ultrathin Pt shells on Pd concave nanocubes, the deposition rate for the newly formed Pt atoms have to be decelerated using a slow injection rate for the Pt precursor and a mild reducing agent simultaneously. When benchmarked against the conventional Pt/C catalyst, the catalyst based on Pd@Pt concave nanocubes showed remarkably enhanced ORR activities in terms of both mass and specific activities. The enhancement in the specific activity of Pd@Pt concave nanocube catalysts can be attributed to a combination of the ligand and strain effects, as well as the high-index facets associated with a concave structure. Together with the enhancement in specific activity, the high specific ECSA arising from the use of an ultrathin Pt shell resulted in a significant enhancement in mass activity. In addition, the concave nanocube catalysts with 28.8 wt % Pt showed a great improvement in catalytic durability when compared to the commercial Pt/C. Although transformed into Pt-based nanocages due to the selective removal of the Pd cores via electrochemical etching, the Pd@Pt concave nanocubes still showed a mass activity more than twice that of the pristine Pt/C catalyst after 10000 cycles of accelerated durability test. This work clearly suggests that the Pd@Pt concave nanocubes enclosed by high-index facets could be a promising substitute of the commercial Pt/C catalyst with enhancement in both catalytic activity and durability.

Example 2: Pd@Pt Core-Shell Concave Decahedra: A Class of Catalysts for the Oxygen Reduction Reaction with Enhanced Activity and Durability (JACS)

We report a facile synthesis of multiply twinned Pd@Pt core-shell concave decahedra by controlling the deposition of Pt on pre-formed Pd decahedral seeds. The Pt atoms are initially deposited on the vertices of a decahedral seed, followed by surface diffusion to other regions along the edges/ridges and then across the faces. Different from the coating of a Pd icosahedral seed, the Pt atoms prefer to stay at the vertices and edges/ridges of a decahedral seed even when the deposition is conducted at 200° C., naturally generating a core-shell structure covered by concave facets. The non-uniformity in the Pt coating can be attributed to the presence of twin boundaries at the vertices, as well as the {100} facets and twin defects along the edges/ridges of a decahedron, effectively trapping the Pt adatoms at these high-energy sites. Compared to a commercial Pt/C catalyst, the Pd@Pt concave decahedra show substantial enhancement in both catalytic activity and durability toward the oxygen reduction reaction (ORR). For the concave decahedra with 29.6% Pt by weight, their specific (1.66 $mA/cm^2_{Pt}$) and mass (1.60 $A/mg_{Pt}$) ORR activities are enhanced by 4.4 and 6.6 times relative to those of the Pt/C catalyst (0.36 $mA/cm^2_{Pt}$ and 0.32 $A/mg_{Pt}$, respectively). After 10,000 cycles of accelerated durability test, the concave decahedra still exhibit a mass activity of 0.69 $A/mg_{Pt}$, more than twice that of the pristine Pt/C catalyst.

Here we demonstrate that high-index facets could be integrated with twin defects in a core-shell structure for the fabrication of cost-effective catalysts with substantial enhancement in both specific and mass activities toward ORR. We have also systematically investigated the experimental conditions and thus the mechanistic details responsible for the formation of Pd@Pt core-shell decahedra with concave facets on the surface.

Chemicals and Materials

Ethylene glycol (EG, lot no. L05B13) was purchased from J. T. Baker. Sodium palladium(II) tetrachloride ($Na_2PdCl_4$, 99.998%), sodium platinum(IV) hexachloride hexahydrate ($Na_2PtCl_6 \cdot 6H_2O$, 98%), poly(vinyl pyrrolidone) (PVP, M.W.≈55,000), L-ascorbic acid (AA), potassium bromide (KBr), ferric chloride ($FeCl_3$), sodium sulfate ($Na_2SO_4$), diethylene glycol (DEG, lot no. BCBL9535V), hydrochloric acid (HCl, 37%), acetic acid (99.7%), and perchloric acid (HClO4, 70%, PPT Grade, Veritas) were all obtained from Sigma-Aldrich. All chemicals were used as received. All aqueous solutions were prepared using deionized (DI) water with a resistivity of 18.2 WI cm.

Synthesis of Pd Decahedra

The Pd decahedra of 19 nm in size were synthesized using a recently reported protocol (Huang, et al., *ACS Nano* 2014, 8, 7041-7050). Specifically, 80 mg PVP and 44 mg $Na_2SO_4$ were dissolved in 2.0 mL DEG hosted in a 20 mL vial and heated at 105° C. for 10 min in an oil bath under magnetic stirring. Subsequently, 15.5 mg $Na_2PdCl_4$ was dissolved in 1.0 mL DEG and added into the vial using a pipette. The vial was then capped and maintained at 105° C. for 3 h. The product was collected through centrifugation, washed once with acetone and twice with DI water to remove excess PVP and ionic species, and re-dispersed in 3 mL EG.

Synthesis of Pd@Pt Core-Shell Concave Decahedra

For the concave decahedra with a weight percentage (wt %) of 29.6% Pt, 1.0 mL of the suspension of Pd decahedral seeds (0.54 mg/mL), 54 mg KBr, 66 mg PVP, 100 mg AA, and 9 mL EG were mixed in a 50 mL three-neck flask and held at 110° C. in an oil bath under magnetic stirring for 1 h. The reaction temperature was then ramped to 200° C. in 30 min. The deposition of Pt atomic layers was initiated by injecting 13 mL of a $Na_2PtCl_6$ solution in EG (0.06 mg/mL) into the flask at a rate of 4.0 mL/h. For the concave decahedra with 47.5 wt % Pt, the Pt coating was formed by injecting 27 mL of the $Na_2PtCl_6$ solution in EG at a rate of 1.5 mL/h. After the $Na_2PtCl_6$ solution had been completely injected, the synthesis was continued at 200° C. for another 1 h. The solid product was collected by centrifugation, washed once with acetone and five times with ethanol, and re-dispersed in 1 mL DI water.

Etching of Pd from the Pd@Pt Concave Decahedra with 47.5 wt % Pt

In a typical procedure, 300 mg KBr, 50 mg PVP, 10 mg $FeCl_3$, 0.06 mL HCl, and 5.94 mL DI water were mixed in a glass vial. The mixture was held at 90° C. in an oil bath under magnetic stirring, and then 0.1 mL of an aqueous suspension of the Pd@Pt concave decahedra was introduced. After etching for 2 h or 3 h, the solid product was collected by centrifugation, followed by washing five times with ethanol and DI water.

Instrumentation

Transmission electron microscopy (TEM) images were taken using a Hitachi HT7700 microscope operated at 120 kV by drop casting the nanocrystal dispersions onto carbon-coated Cu grids and drying under ambient conditions. High resolution high-angle annular dark-field scanning transmission electron microscopy (HAADF-STEM) and tomography images were carried out on a Cs-corrected FEI Titan 80/300-kV TEM/STEM microscope at ORNL. All STEM images were acquired using 300 kV and a beam size of –0.7 Å with a convergence angle of 30 mrad and collection angles of 65-220 mrad. The STEM tomography was conducted with an angular increment of 5° and a tilt range of 60° to –55°. Energy-dispersive X-ray (EDX) analyses were performed using a Hitachi HD-2700A Cs-corrected STEM/SEM microscope. The metal contents were measured using an inductively coupled plasma mass spectrometer (ICP-MS, NexION 300Q, PerkinElmer).

Preparation of the Working Electrodes

First, the Pd@Pt concave decahedra were loaded onto a carbon support (Ketjen Black EC-300J) with a metal loading content of 20% based on the total mass of Pd and Pt (determined by ICP-MS). Typically, 0.9 mg of the concave decahedra and 3.6 mg Ketjen black were dispersed in 8 mL ethanol under continuous ultrasonication for 3 h. The carbon-supported concave decahedra were then collected by centrifugation, re-dispersed in 10 mL of acetic acid, and heated at 60° C. for 12 h to clean the surface of the nanocrystals. The catalyst was recovered by centrifugation, followed by washing with ethanol twice. After drying, 1.5 mg of the catalyst was re-dispersed in a mixture of 0.5 mL of DI water, 0.5 mL of isopropanol, and 20 μL of 5% Nafion under ultrasonication for 20 min. 20 μL of the suspension was then placed on a pre-cleaned glassy carbon rotating disk electrode (RDE, Pine Research Instrumentation) with a geometric area of 0.196 $cm^2$ and dried at room temperature and under ambient conditions. The Tanaka Kinkinzoku Kogyo (TKK) Pt/C catalyst (46.1 wt % 2.8-nm Pt nanoparticles supported on Ketjen Black EC-300J) was used as a benchmark for comparison. Typically, 1.1 mg of the TKK catalyst was dispersed in a mixture of 0.5 mL of DI water, 0.5 mL of isopropanol, and 20 μL of 5% Nafion under ultrasonication for 20 min to produce an ink with a Pt concentration of 0.47 mg/mL (measured by ICP-MS). 10 μL of the ink was then placed on a pre-cleaned glassy carbon RDE and dried at room temperature and under ambient conditions.

Electrochemical Measurements

Electrochemical measurements were conducted using a glassy carbon RDE connected to a CHI 600E potentiostat (CH Instruments). Hydroflex hydrogen reference electrode (Gaskatel) and a Pt mesh were used as the reference electrode and counter electrode, respectively. All potentials were converted to values in reference to reversible hydrogen electrode (RHE). The electrolyte was 0.1 M $HClO_4$ prepared by diluting a 70% stock solution with DI water. The CV curve was recorded at room temperature in a $N_2$-saturated 0.1 M $HClO_4$ solution in the potential range of 0.08-1.1 volts with a reference to the reversible hydrogen electrode (RHE), or $V_{RHE}$, at a scanning rate of 50 mV/s. We calculated the specific electrochemical active surface area (ECSA) of each catalyst based on the charges associated with the desorption of hydrogen in the region of 0.08-0.45 $V_{RHE}$ after double-layer correction with a reference value of 210 $\mu C/cm^2$ for the desorption of a monolayer of hydrogen from Pt surfaces. We measured the ORR activities of catalysts at room temperature in the potential range of 0.08-1.1 $V_{RHE}$ in an $O_2$-saturated 0.1 M $HClO_4$ solution through the RDE method at a scanning rate of 10 mV/s (rotating rate of 1,600 rpm). The background current was measured in the potential range of 0.08-1.1 $V_{RHE}$ by running the ORR sweep profile in an $N_2$-saturated 0.1 M $HClO_4$ solution at a scanning rate of 10 mV/s (rotating rate of 1,600 rpm). The ORR data were corrected by ohmic iR drop compensation and background currents. For the accelerated durability test, we performed CVs and ORR polarization curves after sweeping 5,000 and 10,000 cycles in the range of 0.6 and 1.1 $V_{RHE}$ at a rate of 0.1 V/s in an $O_2$-saturated 0.1 M $HClO4$ solution at room temperature.

Results and Discussion

Synthesis and Characterization of Pd@Pt Concave Decahedra.

We first prepared Pd decahedral seeds with an average diameter of 19 nm by following a protocol recently developed in our group (Huang, et al., ACS Nano 2014, 8, 7041-7050). We then synthesized Pd@Pt concave decahedra using the polyol-based route developed for the fabrication of Pd@$Pt_{nL}$ (n=1-6) core-shell, cubes, octahedra, and icosahedra (Xie, et al., Nano Lett 2014, 14, 3570-3576; Park, et al., ACS Nano 2015, 9, 2635-2647; Wang, et al., Nat. Commun. 2015, 6, 7594). Specifically, a solution of $Na_2PtCl_6$ (a precursor to Pt) in EG was slowly pumped into a suspension of the Pd decahedral seeds in EG held at 200° C., in the presence of AA, PVP, and KBr. Different from the previous syntheses involving Pd cubic, octahedral, and icosahedral seeds, facets with a concave structure were formed on the surface of each decahedral seed after the deposition of Pt atoms.

Figure 8A:
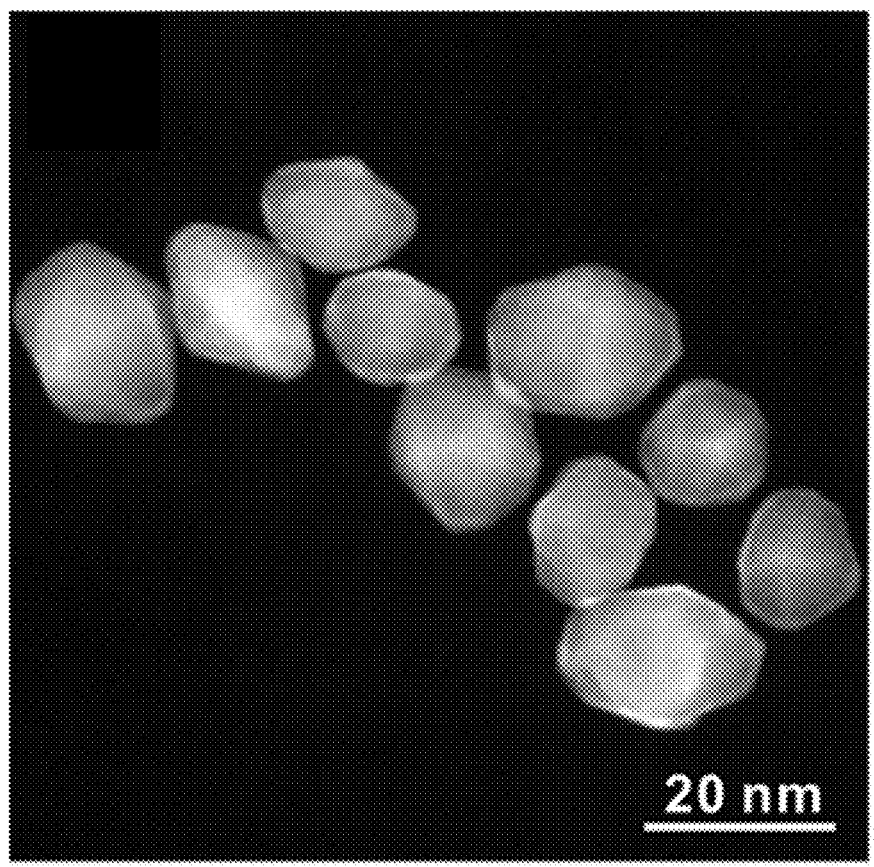
FIGS. 8A-8D show structural and compositional analyses of the Pd@Pt core-shell concave decahedra with 29.6 wt % Pt.
Figure 8B:
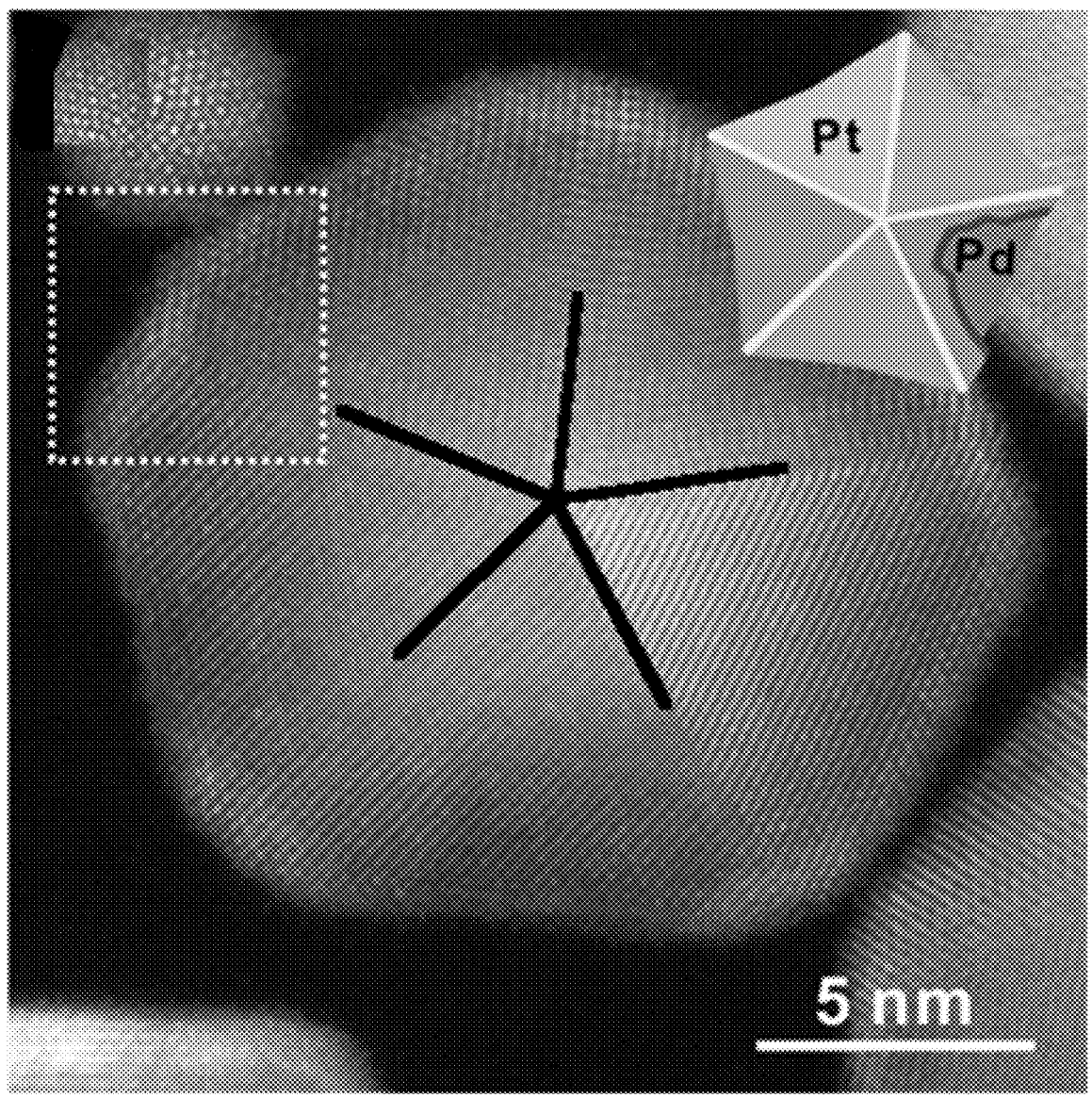
Figure 8C:
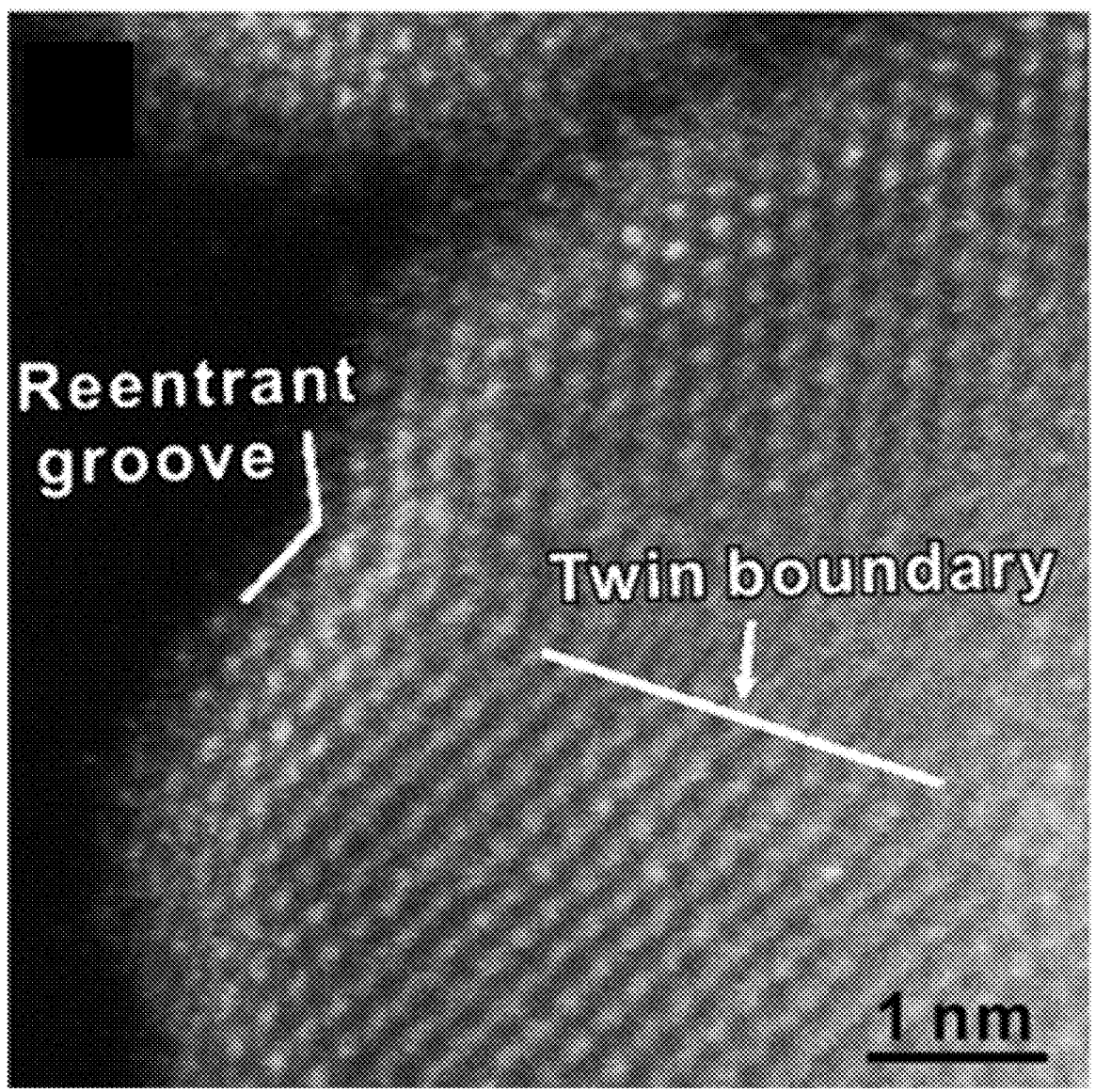
Figure 8D:
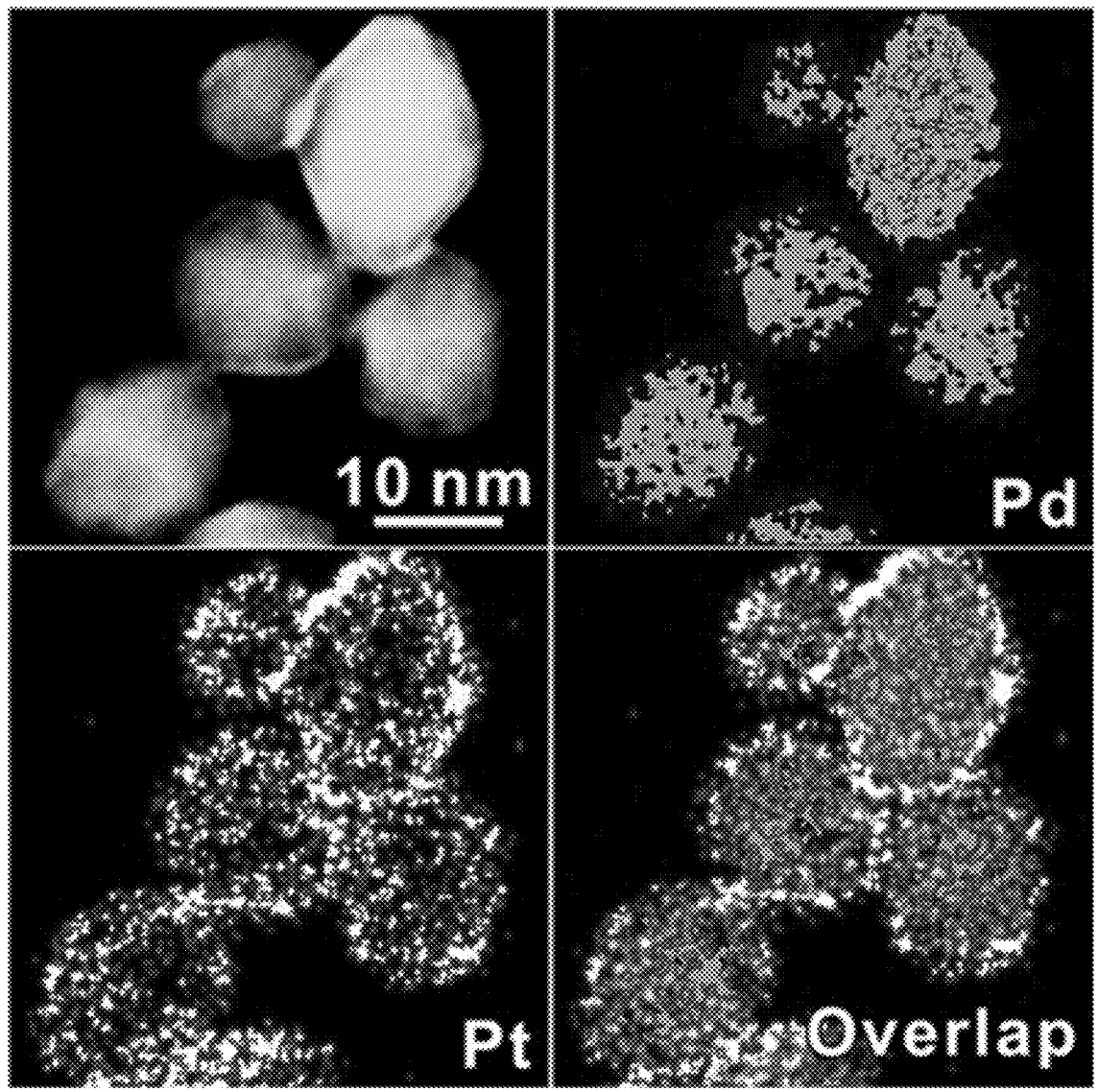

FIGS. 8A-8C show typical HAADF-STEM images of the Pd@Pt concave decahedra prepared by adding 13 mL of the Na$_2$PtCl$_6$ solution. As indicated by the atomic-resolution image in FIG. 8B, more Pt atoms were deposited on the vertices of each Pd decahedral seed than on the faces. Based on the data from ICP-MS (Table 2), the wt % of Pt in this sample was 29.6%, corresponding to an average shell thickness of about two atomic layers, if we assume a conformal and uniform Pt shell on the surface of each Pd decahedral seed. However, the atomic-resolution HAADF-STEM image shown in FIG. 8C indicates that the thickness of the Pt shell at the vertex was about five atomic layers, whereas the thickness on the edge was noticeably thinner. Because the Pt shell adopted a concave structure on each face, the average shell thickness should be thinner than two atomic layers on top of the {111} facets. The twin planes could still be easily resolved in the core-shell decahedron, as marked by the lines in FIGS. 8B-8C, implying that the twin defects on the original Pd decahedral seed were well preserved during Pt deposition. Additionally, we observed reentrant grooves present at some vertices of the core-shell nanocrystals (FIG. 8C), which might have been formed to effectively relax the internal strain of the pentagonal crystal (Zhang, et al., *J. Am. Chem. Soc.* 2008, 130, 15581-15588). We also used EDX mapping to confirm the formation of a core-shell structure for the nanocrystals. As shown in FIG. 8D, Pd and Pt were only detected from the cores and shells, respectively, of the concave decahedra.

TABLE 2

Comparison of the Pt deposition efficiency (%) for the Pd@Pt concave decahedra.

| Samples | Wt % of Pt from ICP-MS | Added Pt (mg) | Deposited Pt (mg) | Deposition efficiency (%) |
|---|---|---|---|---|
| Pd@Pt with 29.6 wt % Pt | 29.6 | 0.361 | 0.302 | 83.7 |
| Pd@Pt with 47.5 wt % Pt | 47.5 | 0.562 | 0.489 | 87.0 |

Figure 9A:
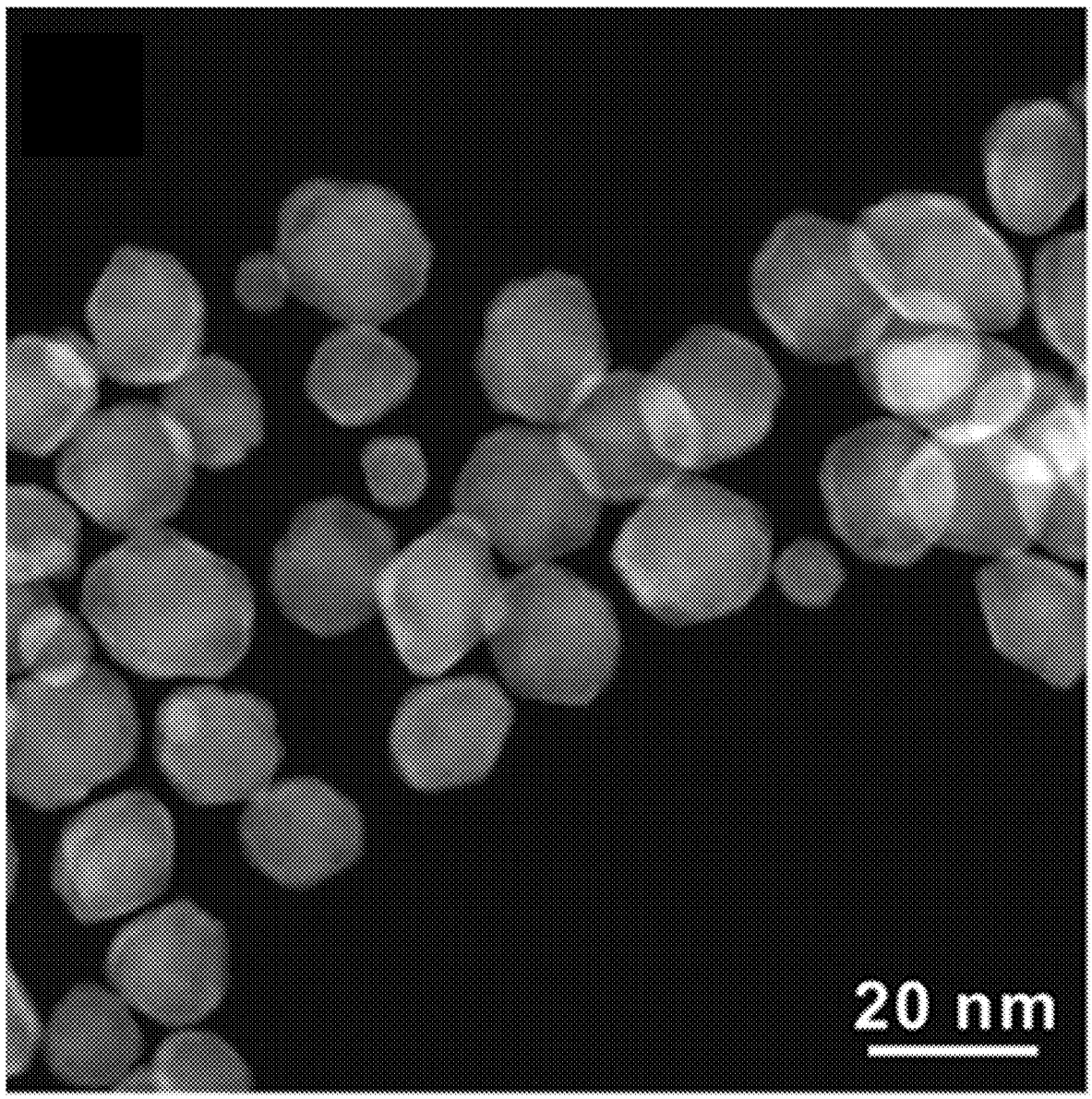
FIGS. 9A-9D show structural and compositional analyses of the Pd@Pt core-shell concave decahedra with 47.5 wt % Pt.
Figure 9B:
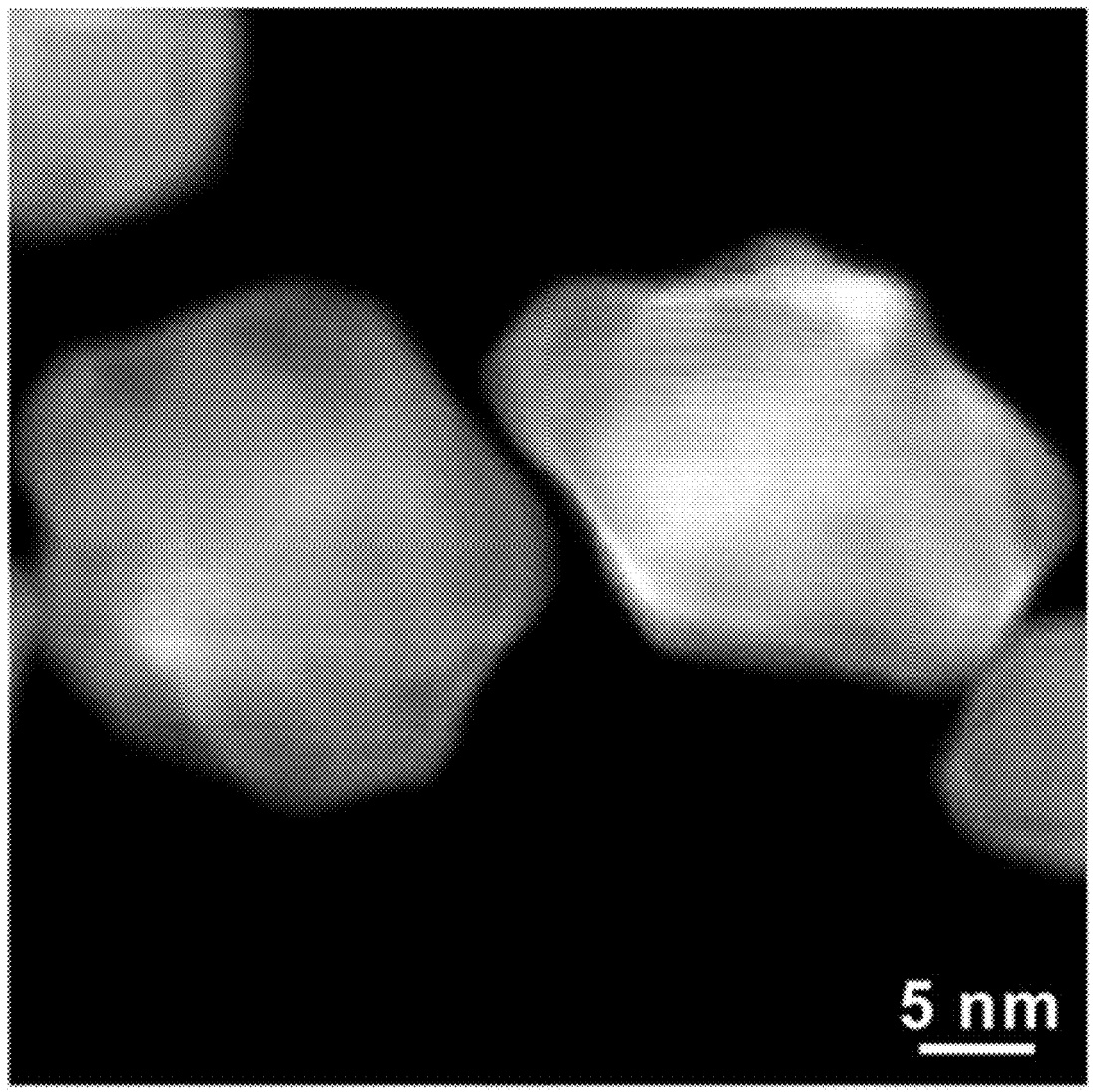
Figure 9C:
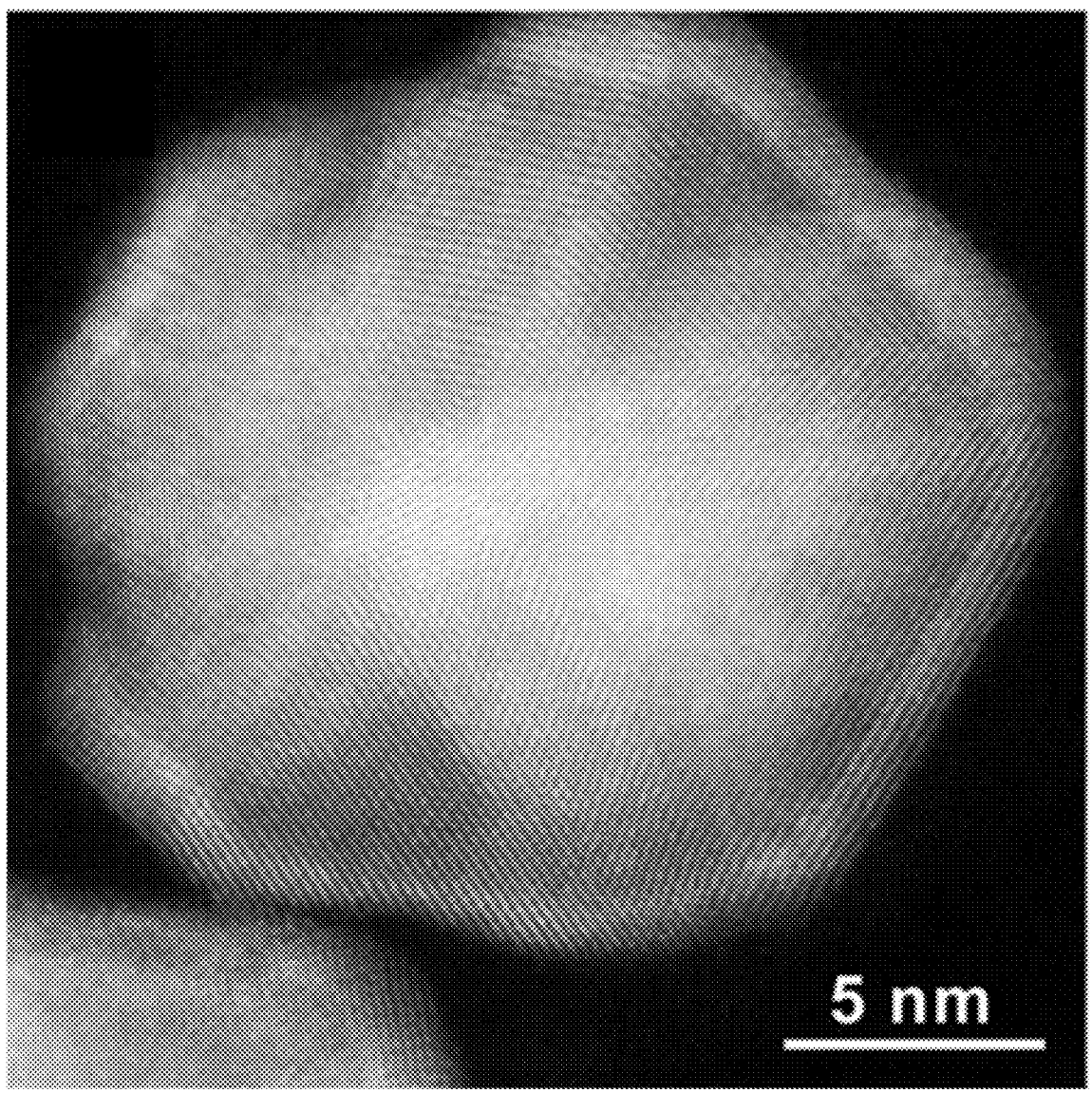
Figure 9D:
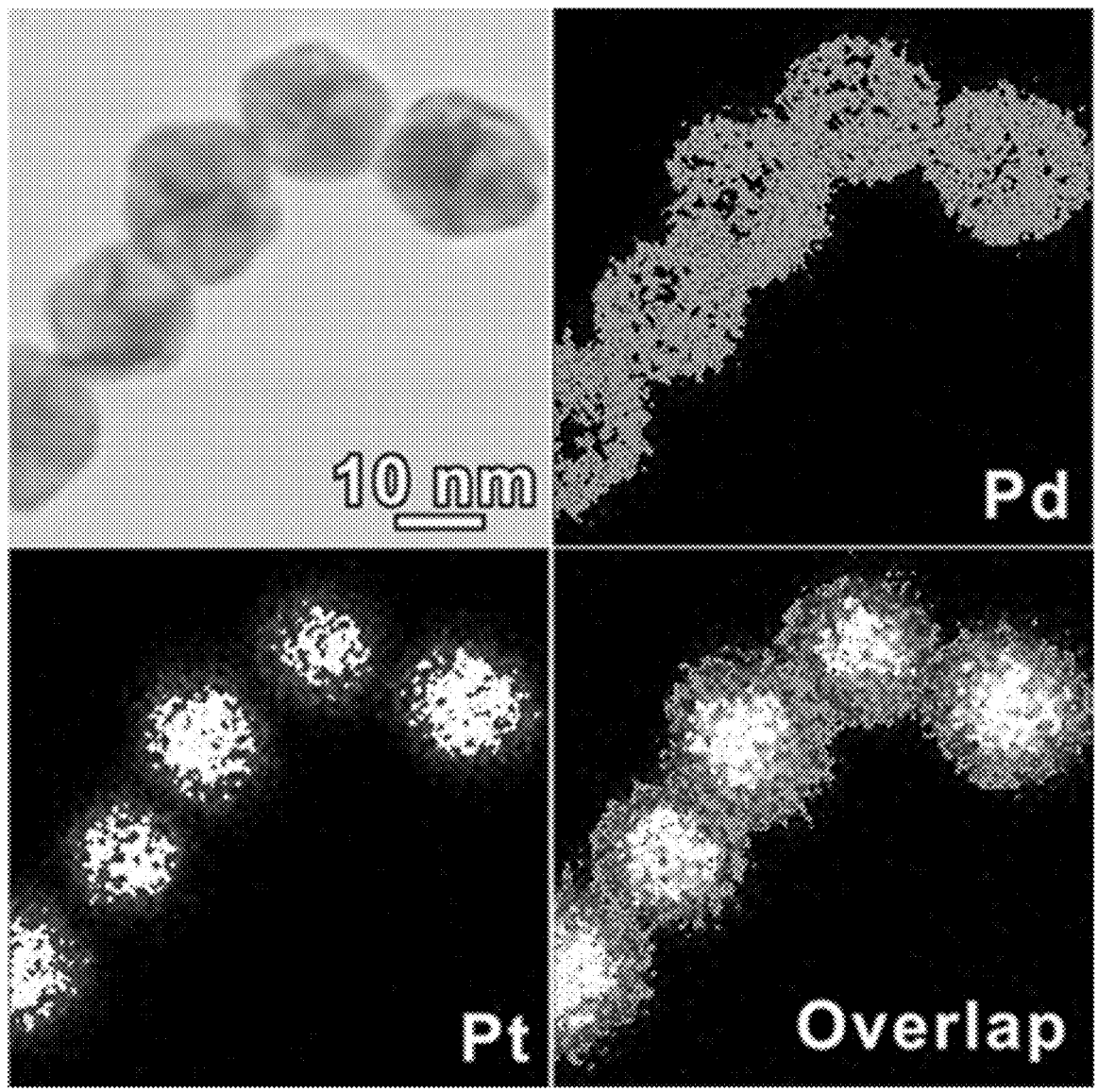

By reducing the injection rate to 1.5 mL/h and increasing the volume of Na$_2$PtCl$_6$ solution to 27 mL, we obtained Pd@Pt concave decahedra with 47.5 wt % Pt, as indicated by ICP-MS analysis. As illustrated by the HAADF-STEM images in FIGS. 9A-9B, the nanocrystals also clearly showed a concave structure on the surface, with more Pt being deposited at the vertices of each decahedral seed relative to the faces. The atomic-resolution HAADF-STEM image indicates that the Pt shell at the vertex was increased to about seven atomic layers in thickness while the Pt shell deposited on the edges along the <100> direction was about five atomic layers (FIG. 9C). From the ICP-MS data, we calculated an average thickness of approximately four atomic layers by assuming a conformal, uniform Pt shell. Given the concave structure, the average thickness of the Pt skins on the {111} facets should therefore be less than four atomic layers. The concave structure could be better resolved using HAADF-STEM tomography. As shown by the image in FIG. 9C, the Pd@Pt decahedra clearly exhibited a concave structure on each facet. Furthermore, EDX mapping of the Pd and Pt elements (FIG. 9D) confirmed the formation of a Pd@Pt core-shell configuration for the nanocrystals.

Mechanistic Investigation of the Formation of Pd@Pt Concave Decahedra.

Figure 10A:
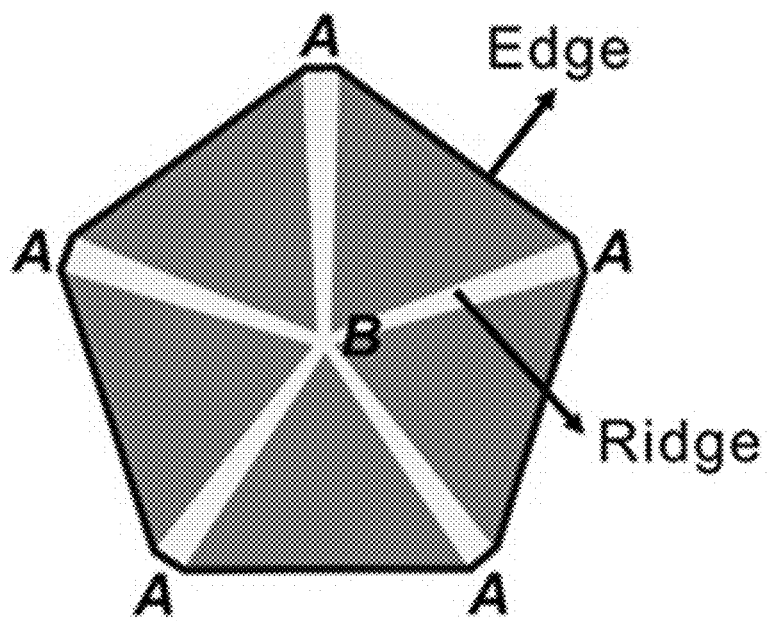
FIGS. 10A-10C show (FIG. 10A) schematic of a decahedron viewed along its 5-fold axis, showing the type-A and type-B vertices, as well as the ridges and edges.
Figure 10B:
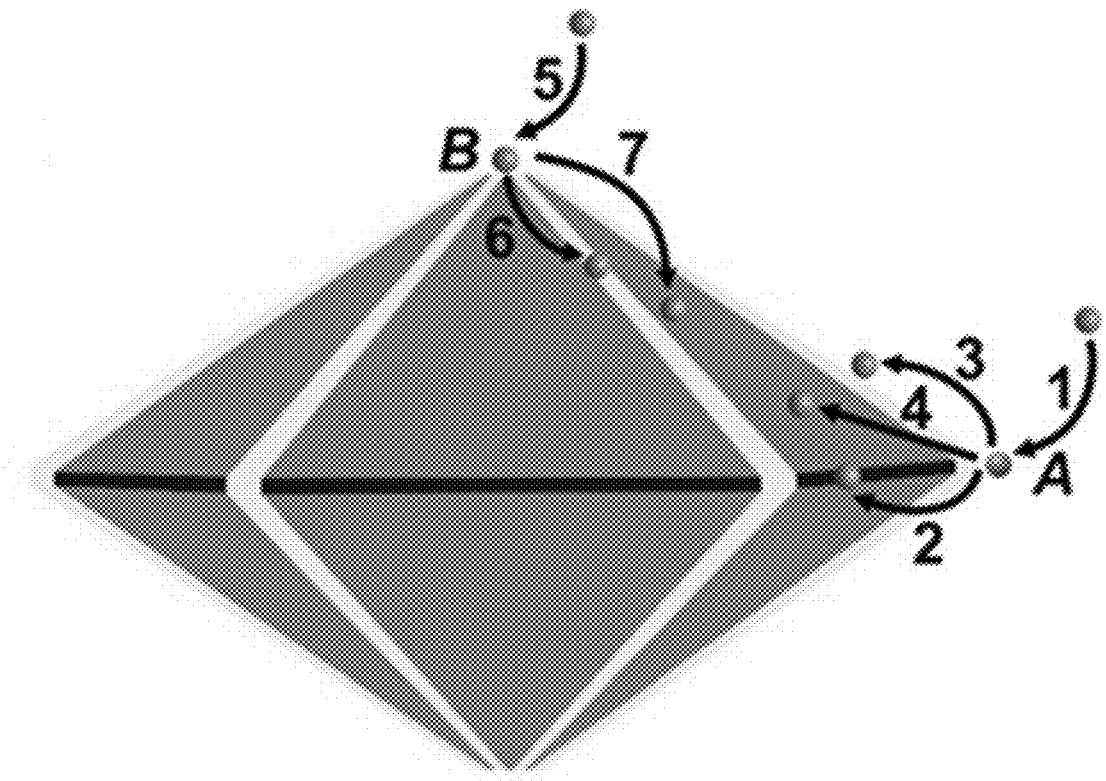
Figure 10C:
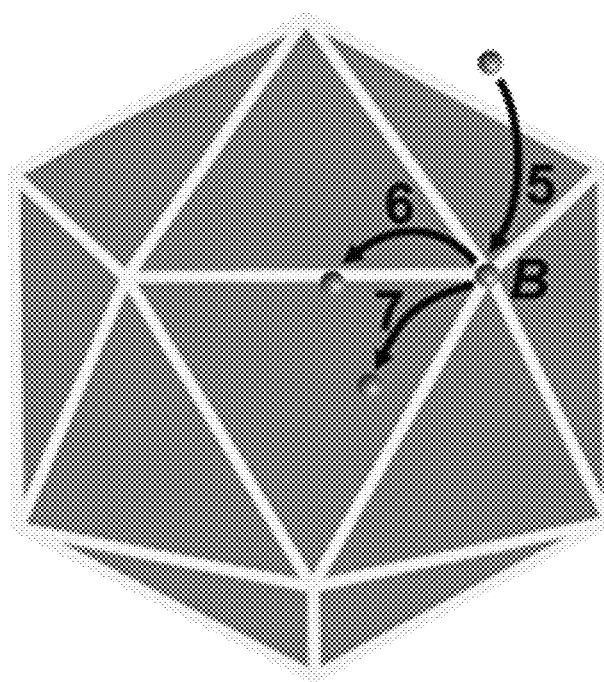

FIGS. 10A-10C show a plausible mechanism responsible for the formation of the concave decahedra. For clarity, we refer to the ten edges along twin boundaries as "ridges" and the five edges covered by {100} facets as "edges" (FIG. 10A). There are also two different types of vertices on a decahedron. Five of the vertices are oriented along the <211> direction and each one of them is intersected by two twin boundaries. These are defined as "type-A" vertices. The remaining two vertices are oriented along the <110> direction and each of them is intersected by five twin boundaries. We refer to these as "type-B" vertices in our discussion. As demonstrated in our previous work, the growth pattern and thus the final shape or morphology of a nanocrystal is determined by the relative rates for the deposition of atoms and the diffusion of adatoms (Xia, et al., *Proc. Natl. Acad. Sci. U.S.A.* 2013, 110, 6669-6673). Due to the involvement of a strong reducing agent based on AA and an elevated temperature, the Pt(IV) precursor should be reduced to Pt(0) atoms immediately upon its introduction into the reaction solution. Therefore, the primary factor that controls the rate of atom deposition in this system should be the same as the injection rate used for the Pt precursor solution.

Although decahedra and icosahedra possess similar twin defects on their surfaces, the Pt atoms showed completely different behaviors when they were deposited onto Pd decahedral and icosahedral seeds under identical experimental conditions. Whereas the Pt atoms formed a conformal, uniform shell over an icosahedral seed, they instead developed into a concave structure on a decahedral seed even at the same reaction temperature of 200° C. (Wang, et al., *Nat. Commun.* 2015, 6, 7594). When comparing the structures of icosahedra and decahedra, it is worth noting that an icosahedron only contains type-B vertices and ridges while a decahedron contains both types of vertices as well as ridges and edges (FIGS. 10B-10C). When Pt atoms are deposited onto the type-B vertices of a Pd icosahedron (FIG. 10B), they can readily diffuse along the ridges (6) and across {111} facets (7) at a relatively high temperature of 200° C., resulting in the formation of a conformal, uniform Pt shell (Wang, et al., *Nat. Commun.* 2015, 6, 7594). In the case of a decahedron, however, while the Pt atoms deposited on the type-B vertices can adopt the same diffusion mode as for an icosahedron, those deposited on the type-A vertices tend to take a different route.

There are three different diffusion pathways for the Pt atoms deposited on the type-A vertex of a Pd decahedral seed: i) along the edges (2), ii) along the ridges (3), and iii) across the {111} faces (4). Because of the relatively high energies associated with the ridges (due to twin defects) and edges (due to the square packing for the {100} facets), the Pt atoms deposited at the type-A vertex tend to diffuse to edges and ridges and then stay at these sites. As a result, when 13 mL of the Pt precursor solution was injected at a rate of 4 mL/h, even at a temperature as high as 200° C., the Pt atoms still were unable to spread over the entire surface of a decahedral seed to generate a uniform shell. When increasing the volume of Pt precursor solution to 27 mL at the same injection rate of 4 mL/h, we obtained both concave decahedra and multipods with a decahedral shape. The multipods were formed because of inadequate diffusion of Pt adatoms from the vertices to edges relative to the rate of deposition, further implying that the Pt atoms were initially deposited on the vertices of a Pd decahedral seed, and subsequently allowed to diffuse to ridges, edges, and faces. By lowering the injection rate to 1.5 mL/h, and thereby decreasing the Pt deposition rate, we obtained concave decahedra with 47.5 wt % Pt (FIGS. 9A-9B).

We also studied the effect of reaction temperature on the morphology of the particles. When the reaction temperature was reduced to 140° C., the product still adopted a concave structure similar to that obtained at 200° C. However, the weight percentage of Pt in the product dropped to 20.4% (according to ICP-MS analysis) owing to the decreased reducing power of AA at a lower temperature. When the reaction temperature was further reduced to 110° C., we found that the edges of most particles in the product became more rounded. The facets corresponding to the twin boundaries (i.e., ridges) on a decahedron can be indexed as {211} facets while the facets corresponding to the edges can be indexed as {100} facets (Choi, et al., *ChemCatChem* 2015, 7, 2077-2084). Calculations have shown that the surface energy of Pd(100) (1661 ergs/cm$^2$) is slightly higher than that of Pd(211) (1617 ergs/cm$^2$), whereas the Pd(111) (1382 ergs/cm$^2$) is much lower than both Pd(100) and Pd(211) in terms of surface energy (Zhang, et al., *Appl. Surf. Sci.* 2004, 229, 34-42). In addition, the rate of diffusion of an adatom across a surface is determined by the diffusion coefficient (D), which can be expressed as: $D=D_0 \exp(-E_{diff}/RT)$. In this equation, $D_0$ is the pre-exponential factor, $E_{diff}$ is the energy barrier to diffusion, R is the ideal gas constant, and T is the absolute temperature (Xia, et al., *Proc. Natl. Acad. Sci. U.S.A.* 2013, 110, 6669-6673). Therefore, at a low temperature of 110° C., Pt atoms deposited at type-B vertices tend to diffuse along the edges, remaining at these sites and forming more rounded edges to minimize both the internal strain and the total surface free energy (Yacaman, et al., *J. Vac. Sci. Technol. B* 2001, 19, 1091-1103). When conducted at 200° C., the temperature is sufficiently high for Pt atoms deposited at type-B vertices to overcome the diffusion energy barriers and access both ridges and edges.

Figures 11A, 11B, 11C, 11D:
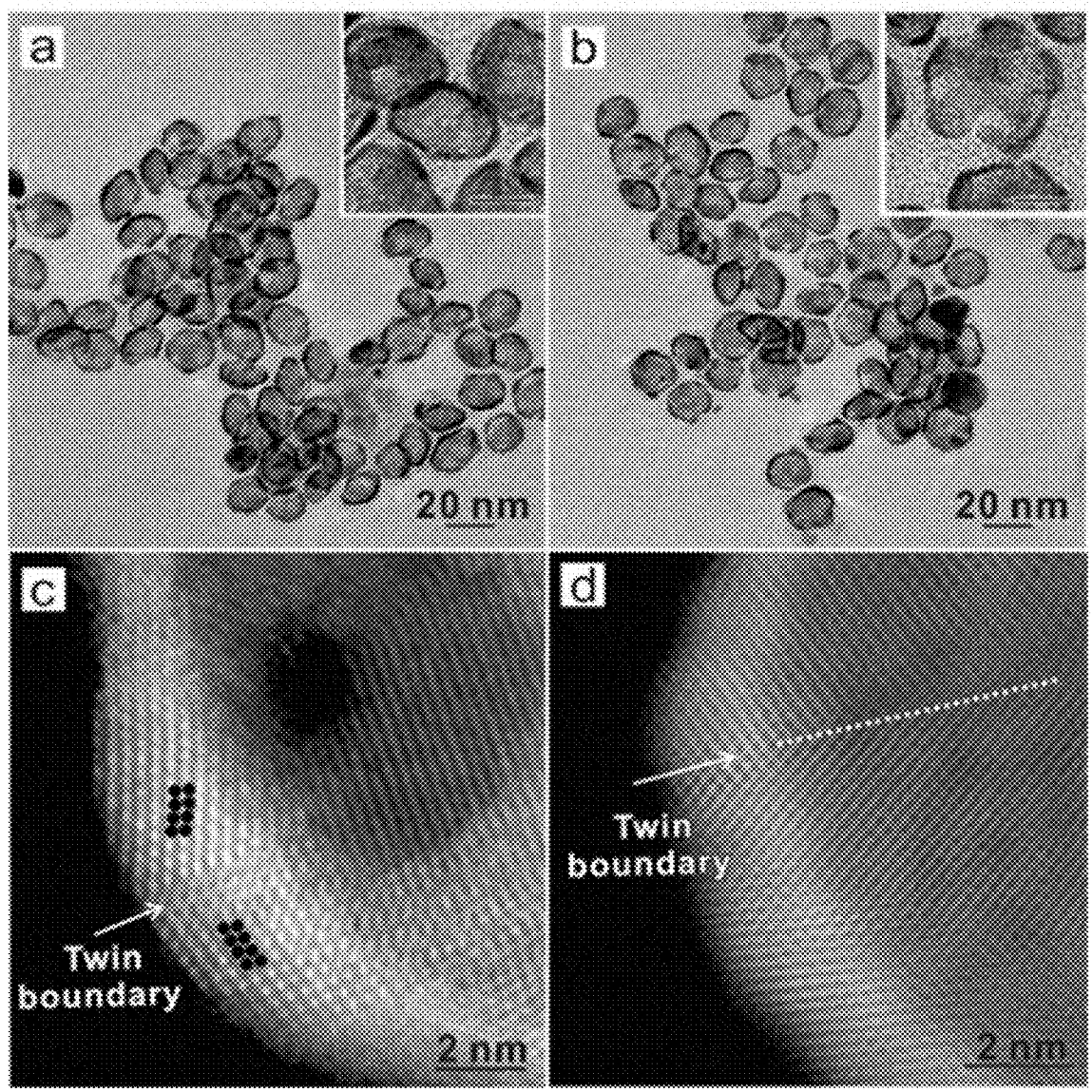
FIGS. 11A-11D show (FIG. 11A, FIG. 11B) TEM image of Pt nanocages obtained by selectively etching away Pd cores from the Pd@Pt concave decahedra with 47.5 wt % Pt for (FIG. 11A) 2 h and (FIG. 11B) 3 h, respectively. The scale bars in the insets are 10 nm.

To further confirm the core-shell structure, we tried to etch away the Pd cores from the Pd@Pt concave decahedra with 47.5 wt % Pt. The etching protocol was similar to what was used in the synthesis of Pt cubic and octahedral nanocages (Zhang, et al., *Science* 2015, 349, 412-416). After etching at 90° C. for 2 h, we were able to selectively remove the Pd cores to obtain Pt-based decahedral nanocages with a Pt content of 85 wt % as shown by ICP-MS analysis (FIGS. 11A-11D), confirming that the original Pd@Pt concave decahedra indeed had a core-shell structure. When the etching time was extended to 3 h (FIG. 11B), the content of Pt in the product maintained a similar value of 84.6 wt % according to ICP-MS analysis. However, some of the {111} facets were also etched away, whereas the majority of Pt atoms on the edges/ridges and vertices of the decahedra were retained. This result also demonstrates that more Pt atoms were deposited on the vertices and edges/ridges of the Pd decahedral seeds than on the faces to generate a concave structure. Interestingly, atomic-resolution HAADF-STEM images (FIGS. 4C-4D) confirmed that the twin defects were preserved after the Pd cores had been etched away.

Electrochemical Measurements.

Figure 12A:
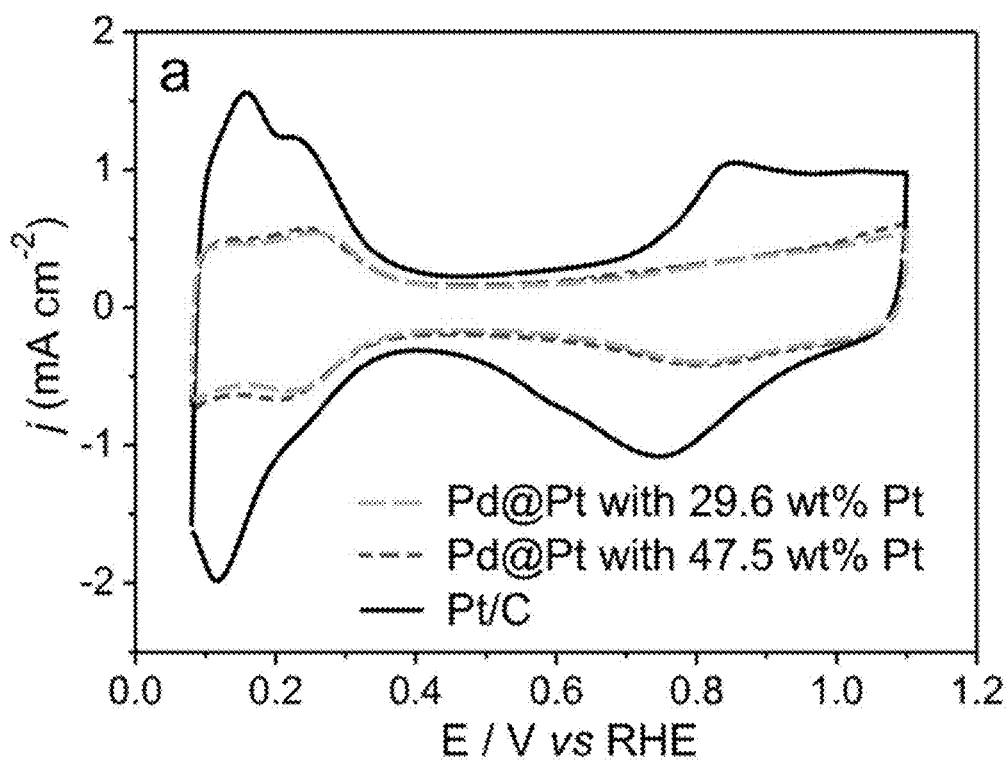
FIGS. 12A-12D show electrochemical properties of the carbon-supported Pd@Pt concave decahedra with 29.6 wt % and 47.5 wt % Pt, respectively, benchmarked against the TKK Pt/C catalyst.

We evaluated the catalytic activities of both the Pd@Pt concave decahedra with 29.6 and 47.5 wt % Pt toward ORR by benchmarking against a commercial Pt/C catalyst from TKK. FIG. 12A shows cyclic voltammograms (CVs) of the three different types of catalysts. The ECSAs of the catalysts were calculated from the charges associated with the desorption of hydrogen between 0.08 and 0.45 $V_{RHE}$. The specific ECSA of a catalyst was obtained by normalizing against the Pt mass. The specific ECSAs of both catalysts based on concave decahedra were found to be comparable to that of the Pt/C (88.9 m$^2$/g), though the concave decahedra were more than seven times larger than the Pt nanoparticles in the commercial Pt/C. In particular, due to a higher dispersion of Pt atoms on the surfaces of concave decahedra with 29.6 wt % Pt, the specific ECSA (95.9 m$^2$/g) of this catalyst was even slightly higher than that of the Pt/C. These results suggest that the dispersion of Pt atoms could be retained when deposited on Pd decahedra as ultrathin shells.

Figure 12B:
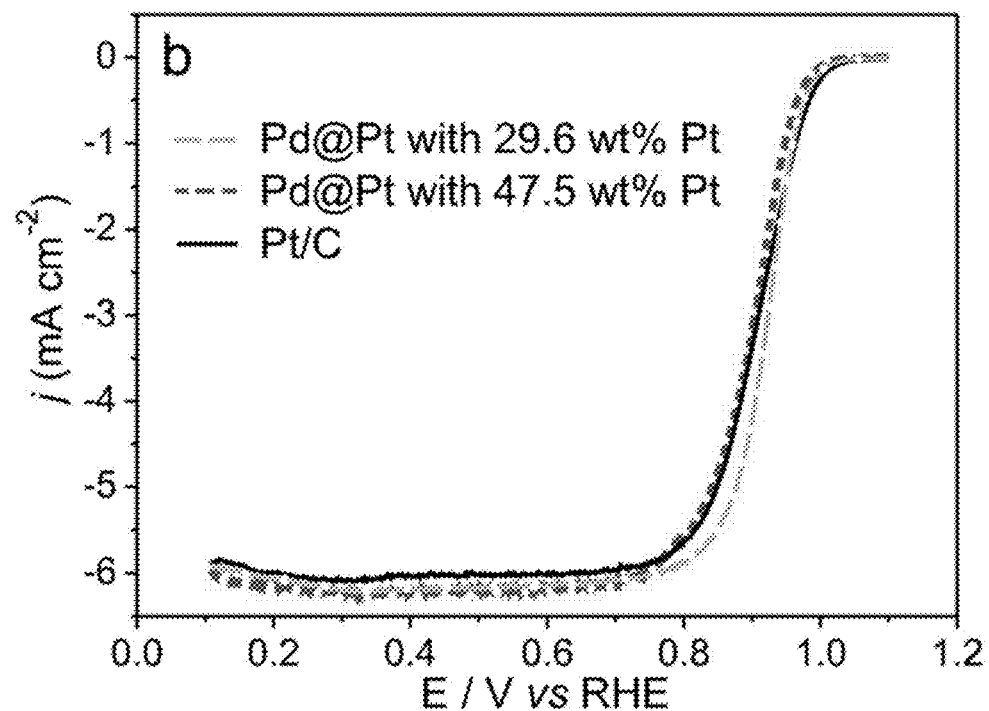
Figure 12C:
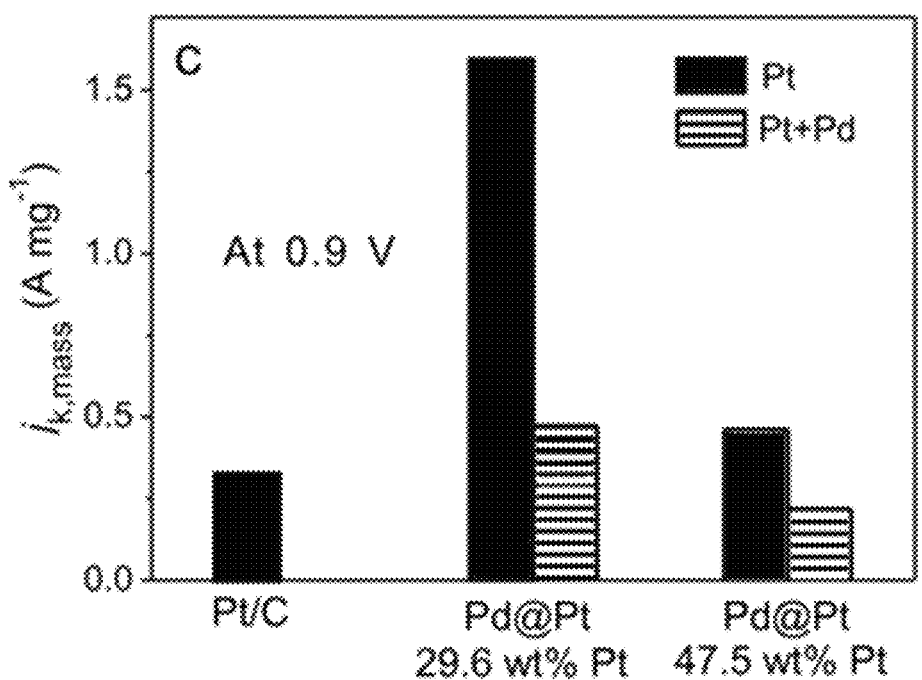
Figure 12D:
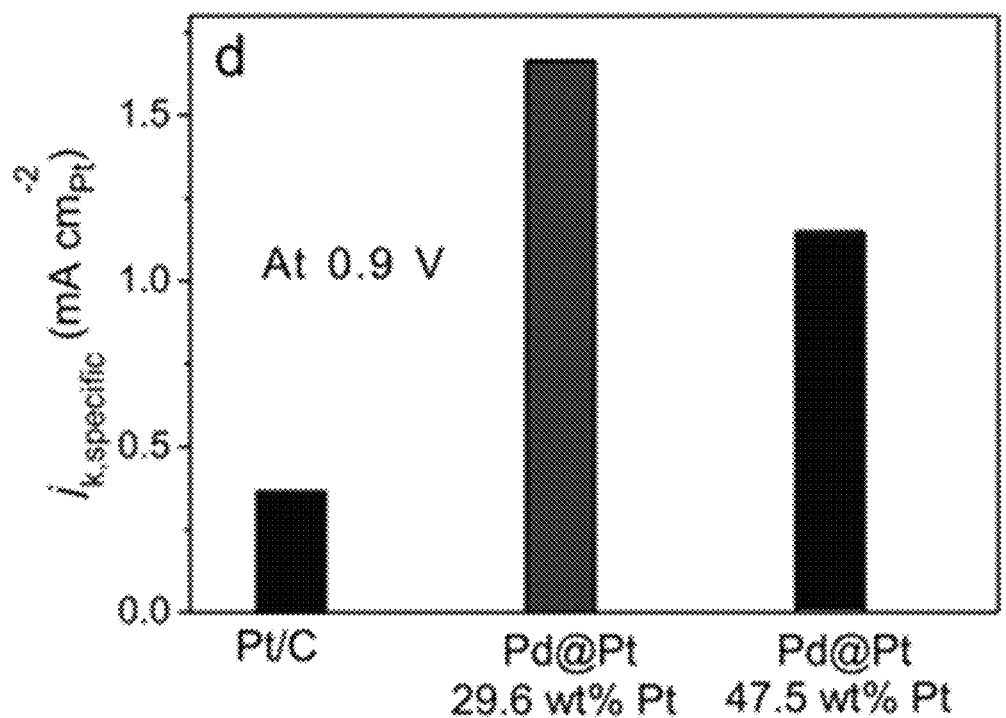

FIG. 12B shows the positive-going ORR polarization curves of the catalysts. The mass and specific activities ($j_{k,mass}$ and $j_{k,specific}$) were calculated using the Koutecky-Levich equation and then normalized against the ECSA and Pt mass of the catalyst. Both the specific and mass activities of the concave decahedra were greatly enhanced in the potential region of 0.86-0.94 $V_{RHE}$; the concave decahedra with 29.6 wt % Pt exhibited the highest activities. At 0.9 $V_{RHE}$, the $j_{k,specific}$ and $j_{k,mass}$ of the concave decahedra with 29.6 wt % Pt were 1.66 mA/cm$^2_{Pt}$ and 1.60 A/mg$_{Pt}$, respectively (FIGS. 12C-12D). In terms of specific activity, the concave decahedra with 29.6 wt % Pt showed an enhancement factor of 4.6 relative to that of the commercial Pt/C (0.36 mA/cm$^2_{Pt}$). The enhancement in specific activity can be partially attributed to the ligand effect and the strain arising from the lattice mismatch between Pd and Pt (Xie, et al., *Nano Lett.* 2014, 14, 3570-3576; Park, et al., *ACS Nano* 2015, 9, 2635-2647; Wang, et al., *Nat. Commun.* 2015, 6, 7594; Kitchin, et al., *Phys. Rev. Lett.* 2004, 93, 156801-156804; Wang, et al., *J. Am. Chem. Soc.* 2009, 131, 17298-17302; Wang, et al., *J. Am. Chem. Soc.* 2013, 135, 5938-5941; Mavrikakis, et al., *Phys. Rev. Lett.* 2006, 81, 2819-2822). In addition, nanocrystals with a concave structure and thus high-index facets should contain more unsaturated steps, edges, kinks, and low-coordination atoms on the surface, which are more favorable for the adsorption of $O_2$ molecule (Yu, et al., *Angew. Chem. Int. Ed.* 2011, 50, 2773-2777). All of these factors may contribute to the markedly enhanced specific activity observed for the Pd@Pt concave decahedra. As a critical indicator for the commercialization viability of a Pt-based catalyst, the $j_{k,mass}$ of the concave decahedra with 29.6 wt % Pt at 0.9 $V_{RHE}$ was 5 times that of the Pt/C (0.32 A/mg$_{Pt}$). In terms of precious metals (both Pd and Pt), the mass activity of the concave decahedra with 29.6 wt % Pt still showed 1.5-fold enhancement compared to that of the commercial Pt/C. Clearly, it is the improvements in both specific ECSA and specific activity that contributed to the drastically enhanced mass activity measured for the concave decahedra with 29.6 wt % Pt.

Figure 13A:
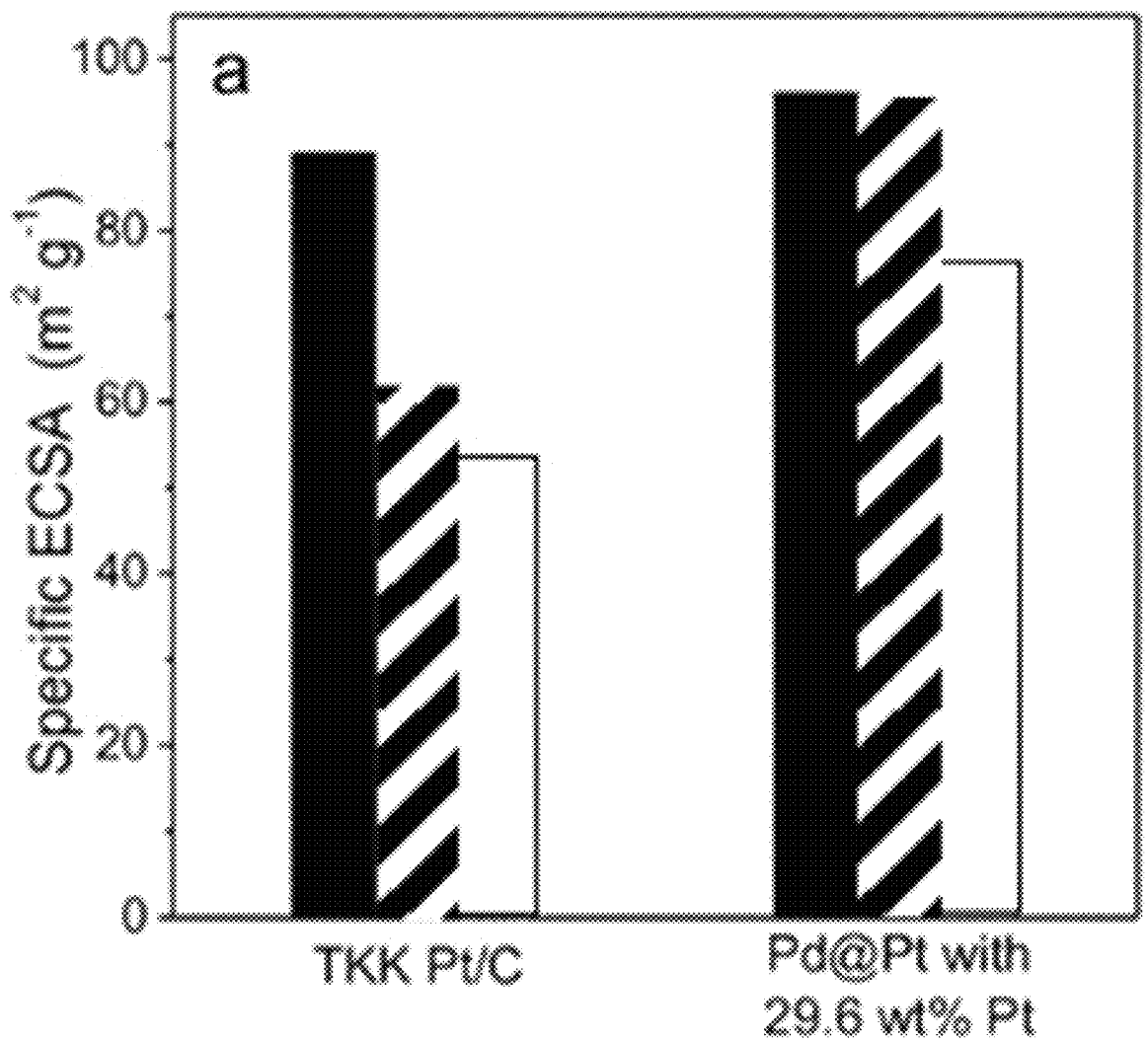
FIGS. 13A-13B show durability tests for the carbon-supported Pd@Pt concave decahedra with 29.6 wt % Pt and the TKK Pt/C catalyst. The comparison is based on (FIG. 13A) the specific ECSA and (FIG. 13B) the mass ORR activity at 0.9 VRHE for the catalysts before and after the accelerated durability test.
Figure 13B:
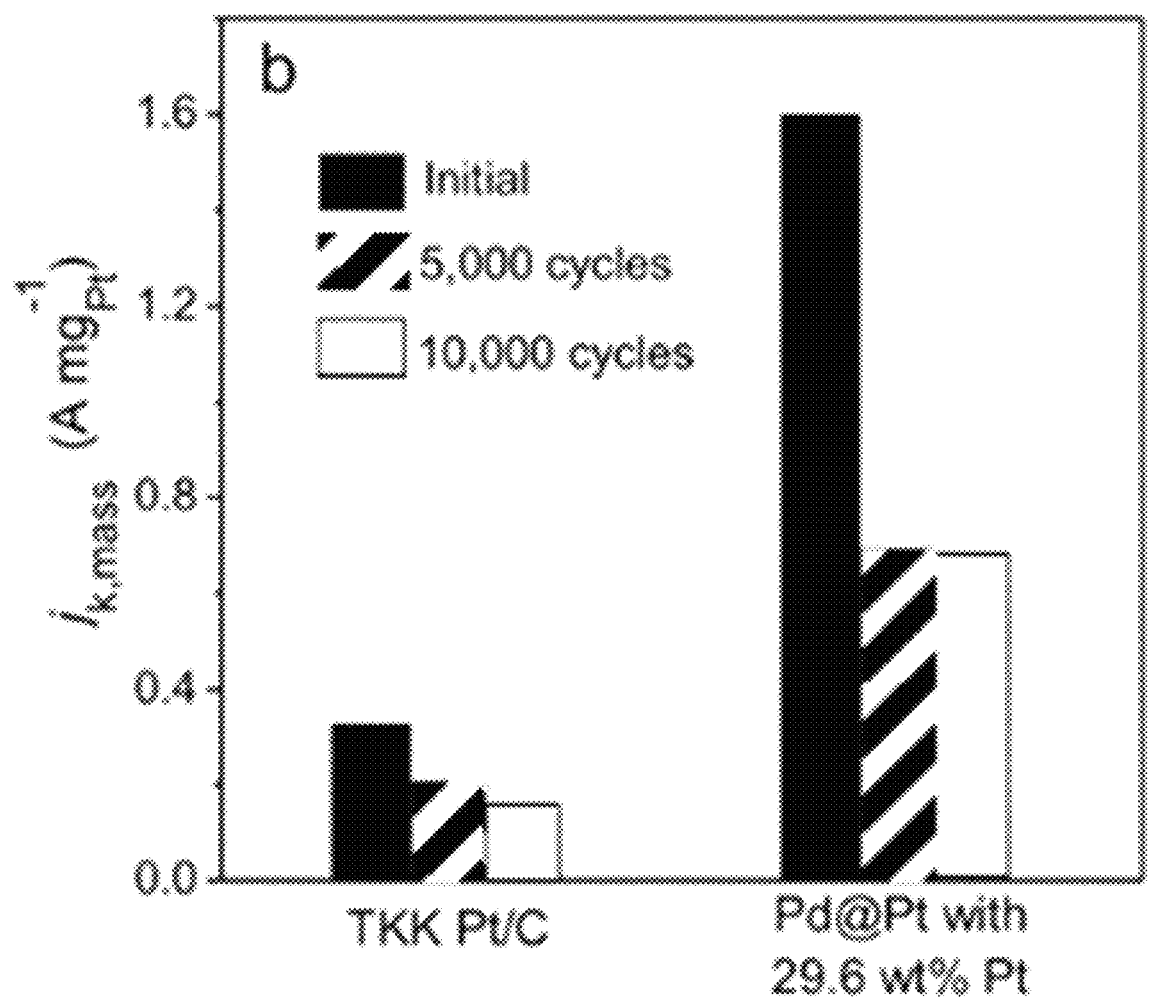

We also evaluated the long-term catalytic stability of the concave decahedra with 29.6 wt % Pt through an accelerated durability test at room temperature (FIGS. 13A-13B). The concave decahedra showed substantial improvement in durability as compared to the TKK Pt/C. After 5,000 cycles, the specific ECSA of the concave decahedra dropped less than 1%, while the specific ECSA of the Pt/C decreased by 31% (FIG. 13A). Even after 10,000 cycles, the specific ECSA of the concave decahedra only dropped by 21%, while the specific ECSA of the Pt/C decreased by 40%. The slower deterioration in specific surface area can be attributed to a much larger size for the concave decahedra relative to the Pt nanoparticles in the Pt/C catalyst (19.4 nm vs. 2.8 nm). After 10,000 cycles, the mass activity of the concave decahedra at 0.9 $V_{RHE}$ decreased to 0.69 A/mg$_{Pt}$, still providing 2.2-fold enhancement when compared to the pristine TKK Pt/C. In contrast, the mass activity of the Pt/C had dropped to 0.15 A/mg$_{Pt}$ (FIG. 13B). The Pd@Pt concave decahedra were transformed into cage-like structures made of Pt during the accelerated durability via the selective removal of Pd cores. The dissolution of Pt was largely prevented due to its higher chemical stability relative to Pd. The loss of Pd diminished the ligand and strain effects, causing the specific activity to decrease. These results demonstrate that both the activity and durability of a Pt-based ORR catalyst can be improved by forming a core-shell structure with an ultrathin shell and a concave surface.

Conclusions

In summary, we have fabricated multiply twinned Pd@Pt concave decahedra by coating the surfaces of pre-synthesized Pd decahedral seeds with Pt atoms. As opposed to the uniform deposition of Pt on Pd icosahedral seeds, the Pt atoms were deposited on Pd decahedra as ultrathin shells with a concave surface even when the reaction was conducted at a temperature as high as 200° C. Due to the presence of twin boundaries, the Pt atoms were preferentially deposited onto the vertices of a Pd decahedral seed, followed by surface diffusion along the edges/ridges and then across to the faces. The {100} and {211} facets on the edges/ridges of a decahedron tend to trap the Pt adatoms at these high-energy sites, resulting in the formation of a Pt shell containing multiple concave facets. The concave decahedra with 29.6 wt % Pt showed greatly enhanced activity and durability toward ORR when compared with a commercial Pt/C catalyst. Specifically, the enhancement in specific activity can be attributed to a combination of ligand effect, strain effect arising from the lattice mismatch between Pd and Pt, and the high-index facets associated with a concave surface. Together with the large specific ECSA arising from an ultrathin Pt shell, the enhancement in specific activity led to a markedly increased mass activity. After 10,000 cycles of accelerated durability test, the Pd@Pt concave decahedra still showed a mass activity twice that of the pristine Pt/C, although they were transformed into Pt-based nanocages due to the selective removal of the Pd cores via electrochemical etching. The multiply-twinned concave decahedra represent a new class of attractive structures for the development of cost-effective and high-performance catalysts toward ORR and other types of reactions.

Example 3: Pt-Based Icosahedral Nanocages: Using a Combination of {111} Facets, Twin Defects, and Ultrathin Walls to Greatly Enhance their Activity Toward Oxygen Reduction Engineering the surface structure of noble-metal nanocrystals offers an effective route to the development of catalysts or electrocatalysts with greatly enhanced activity. Here we report the synthesis of Pt-based icosahedral nanocages whose surface is enclosed by both {111} facets and twin boundaries while the wall thickness can be made as thin as six atomic layers. The nanocages are derived from Pd@Pt$_{4.5L}$ icosahedra by selectively etching away the Pd in the core. During etching, the multiply twinned structure can be fully retained whereas the Pt atoms in the wall reconstruct to eliminate the corrugated structure built in the original Pt shell. The Pt-based icosahedral nanocages show a specific activity of 3.50 mA cm$^{-2}$ toward the oxygen reduction reaction, much greater than those of the Pt-based octahedral nanocages (1.98 mA cm$^{-2}$) and a state-of-the-art commercial Pt/C catalyst (0.35 mA cm$^{-2}$). After 5,000 cycles of accelerated durability tests, the mass activity of the Pt-based icosahedral nanocages drops from 1.28 to 0.76 A mg$^{-1}_{Pt}$, which is still about four times greater than that of the original Pt/C catalyst (0.19 A mg$^{-1}_{Pt}$).

Here we demonstrate the synthesis of Pt-based icosahedral system (Zhang, et al., Science 2015, 349, 412-416). We have successfully synthesized Pt-based icosahedral nanocages enclosed by multiple twin defects and {111} facets. We have also systematically evaluated the conditions for both Pt deposition and Pd etching to ensure that the multiple twin boundaries could be preserved while their walls were thinned down to only six atomic layers or 1.3 nm. As predicted, the Pt-based icosahedral nanocages showed an extremely high specific activity of 3.50 mA cm$^{-2}$, which represents the highest value ever reported for Pt surfaces. Even after 5,000 cycles of accelerated durability tests, the icosahedral nanocages still showed a mass activity of 0.76 A mg$^{-1}_{Pt}$, which is about four times greater than that of the pristine Pt/C (0.19 A mg$^{-1}_{Pt}$).

Chemical and Materials

Ethylene glycol (EG, lot no. L05B13) was purchased from J. T. Baker. Sodium palladium(II) tetrachloride (Na$_2$PdCl$_4$, 99.998%), sodium platinum(IV) hexachloride hexahydrate (Na$_2$PtCl$_6$.6H$_2$O, 98%), poly(vinyl pyrrolidone) (PVP, M.W.≈55,000), L-ascorbic acid (AA), potassium bromide (KBr), ferric chloride (FeCl$_3$), diethylene glycol (DEG, lot no. BCBL4037V), hydrochloric acid (HCl, 37%), acetic acid (99.7%), and perchloric acid (HClO4, 70%, PPT Grade, Veritas) were all obtained from Sigma-Aldrich. All chemicals were used as received. All aqueous solutions were prepared using deionized (DI) water with a resistivity of 18.2 MΩ·cm.

Synthesis of Pd icosahedra.

The Pd icosahedra were synthesized using a previously reported protocol: 80 mg of PVP was dissolved in 2.0 mL of DEG in a 20 mL vial and heated to 130° C. in an oil bath under magnetic stirring for 10 min. Subsequently, 15.5 mg of Na$_2$PdCl$_4$ was dissolved in 1.0 mL of DEG and then injected into the above solution using a pipette. The vial was capped and kept at 130° C. for 3 h. The product was collected by centrifugation, followed by washing once with acetone and twice with DI water to remove excess PVP and ionic species, and then re-dispersed in 3.0 mL of EG.

Synthesis of Pd@Pt$_{4.5L}$ core-shell icosahedra.

In a typical process, 1.0 mL of the Pd icosahedra (0.59 mg mL$^{-1}$, determined using ICP-MS), 54 mg of KBr, 66 mg of PVP, 64 mg of AA, and 7.0 mL of EG were mixed in a 50-mL three-neck flask and heated to 110° C. for 1 h. The reaction temperature was then quickly ramped to 200° C. within 10 min. The deposition of Pt atomic layers was initiated by injecting 28.0 mL volume of the Na$_2$PtCl$_6$ solution in EG (0.06 mg mL$^{-1}$) into the reaction solution at a relatively slow rate of 4.0 mL h$^{-1}$. After the injection of a specific amount of the Pt precursor, the reaction solution was kept at 200° C. for another 1 h. The final product was collected by centrifugation, washed once with acetone and twice with ethanol, and re-dispersed in 1 mL DI water.

Preparation of Pt icosahedral nanocages.

Wet etching was conducted with the Pd@Pt$_{4.5L}$ icosahedra using an acidic aqueous solution to generate Pt icosahedral nanocages. In the standard procedure, 300 mg of KBr, 50 mg of PVP, 40 mg of FeCl$_3$, 0.24 mL of HCl and 5.76 mL of DI water were mixed in a vial. Then, the mixture was heated to 100° C. in an oil bath under magnetic stirring. Subsequently, 0.1 mL of an aqueous dispersion of the as-prepared Pd@Pt$_{4.5L}$ nanocrystals was injected with a pipette. After 2 h, the products were collected by centrifugation, washed twice with ethanol and three times with water, and finally dispersed in DI water.

Structural and compositional analyses.

TEM images were taken using a Hitachi HT7700 microscope operated at 120 kV by drop casting the nanoparticle dispersions on carbon-coated Cu grids and drying under ambient conditions. High-angle annular dark-field and high-resolution TEM (HRTEM) imaging was performed on an a JEOL JEM 2200FS STEM/TEM microscope equipped with a CEOS probe corrector (Heidelberg, Germany) to provide a nominal image resolution of 0.07 nm. EDX analyses were performed in STEM mode using an aberration-corrected JEOL 2200FS electron microscope equipped with a Bruker-AXS SDD detector. The metal contents were measured using ICP-MS (NexION 300Q, Perkin Elmer).

Preparation of the working electrode.

Firstly, the sample was loaded on a carbon support (Ketjen Black) with a metal loading content of 10% based on the mass of Pt (determined by ICP-MS). The carbon-supported Pt icosahedral nanocages were then dispersed in 10 mL of acetic acid and heated at 60° C. for 12 h to clean the surface of the catalytic particles. The catalyst was recovered by centrifugation, followed by washing with ethanol twice. After drying, 1.5 mg of the catalyst was re-dispersed in a mixture of 0.5 mL of DI water, 0.5 mL of isopropanol, and 20 µL of 5% Nafion under ultrasonication for 20 min to produce an ink with a Pt concentration of 0.11 mg mL$^{-1}$ (measured by ICP-MS). 20 µL of the suspension was then placed on a pre-cleaned glassy carbon rotating disk electrode (RDE, Pine Research Instrumentation) with a geometric area of 0.196 cm$^2$ and dried at room temperature and under ambient conditions. The commercial Pt/C catalyst (20 wt % 3.2 nm Pt nanoparticles supported on Vulcan XC72 carbon, Premetek Co.) was used as a benchmark for comparison. Typically, 3 mg of the Pt/C catalyst was dispersed in a mixture of 1.5 mL of DI water, 1.5 mL of isopropanol, and 60 µL of 5% Nafion under ultrasonication for 20 min to produce an ink with a Pt concentration of 0.24 mg mL$^{-1}$ (measured by ICP-MS). 20 µL of the ink was then placed on a pre-cleaned glassy carbon RDE and dried at room temperature and under ambient conditions.

Electrochemical measurements.

Electrochemical measurements were conducted using a glassy carbon RDE connected to a CHI 600E potentiostat (CH Instruments). Hydroflex hydrogen reference electrode (Gaskatel) and a Pt mesh were used as the reference electrode and counter electrode, respectively. All potentials were converted to values in reference to reversible hydrogen electrode (RHE). The electrolyte was 0.1 M HClO$_4$ prepared by diluting a 70% stock solution with DI water. The CV curve was recorded at room temperature in a N$_2$-saturated 0.1 M HClO$_4$ solution in the potential range of 0.08-1.1 V$_{RHE}$ at a scanning rate of 50 mV s$^{-1}$. We calculated the specific ECSA of each catalyst based on the charges associated with the desorption of hydrogen in the region of 0.08-0.45 V$_{RHE}$ after double-layer correction with a reference value of 210 µC cm$^{-2}$ (for commercial Pt/C) or 240 µC cm$^{-2}$ (for icosahedral nanocages) for the desorption of a monolayer of hydrogen from Pt surfaces. We measured the ORR activities of catalysts at room temperature in the potential range of 0.08-1.1 V$_{RHE}$ in an 02-saturated 0.1 M HClO$_4$ solution through the RDE method at a scanning rate of 10 mV s$^{-1}$ (rotating rate of 1,600 rpm). The background current is measured in the potential range of 0.08-1.1 V$_{RHE}$ by running the ORR sweep profile in an N$_2$-saturated 0.1 M HClO$_4$ solution at a scanning rate of 10 mV s$^{-1}$ (rotating rate of 1,600 rpm). The ORR data were corrected by ohmic iR drop compensation and background currents. For the accelerated durability test, we performed CVs and ORR polarization curves after sweeping 5,000 cycles in the range of 0.6 and 1.1 V$_{RHE}$ at a rate of 0.1 V s$^{-1}$ in an O$_2$-saturated 0.1 M HClO$_4$ solution at room temperature.

Materials and Methods

Figure 19:
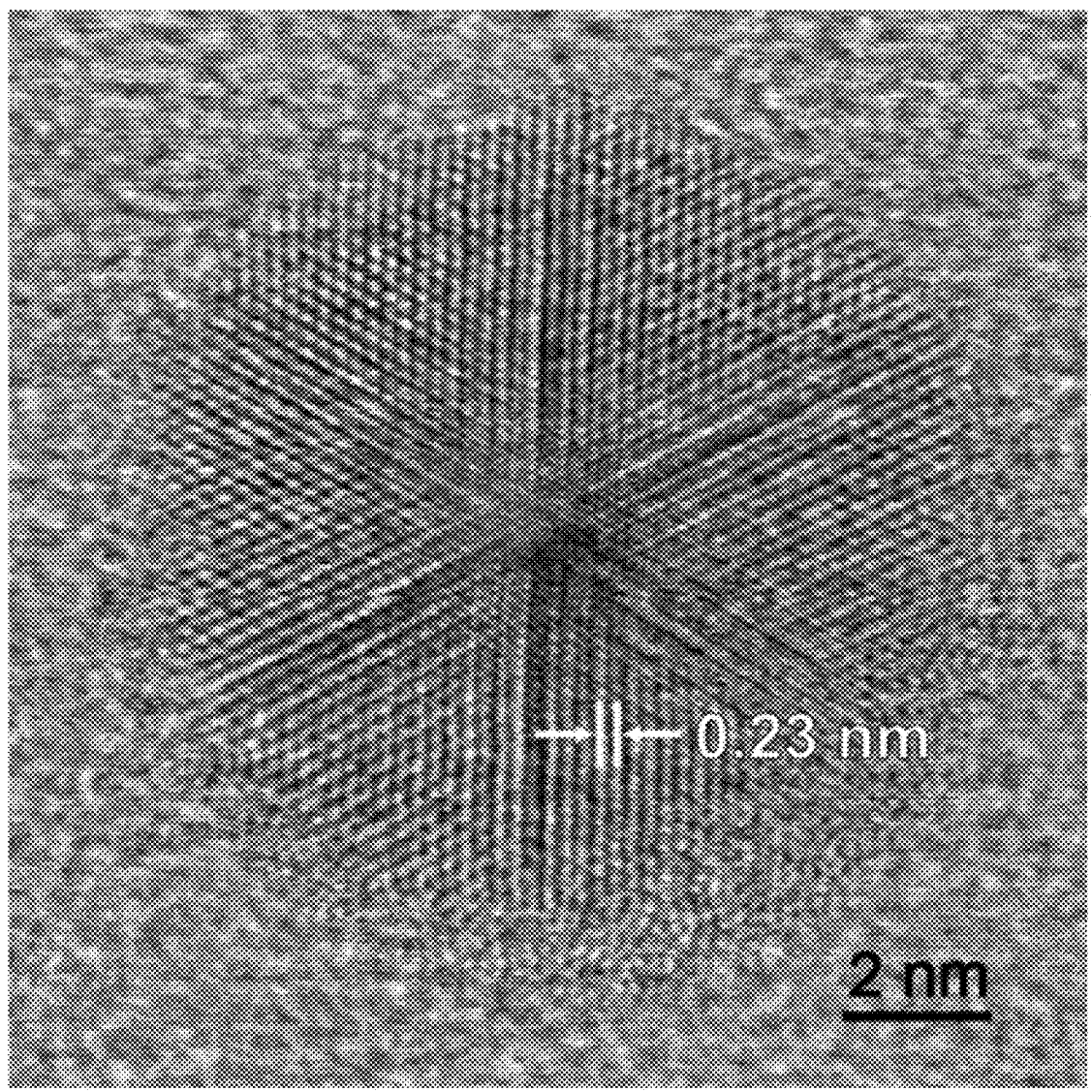
FIG. 19 shows a high-resolution TEM image taken from a typical Pd icosahedron.

The first step involves the preparation of Pd icosahedra and then Pd@Pt$_{nL}$ core-shell icosahedra using protocols we recently developed (Wang, et al., *Nat. Commun.* 2015, 6, 7594; Lv, et al., *ChemSusChem* 2013, 6, 1923-1930). As shown in FIGS. 18A-18D, the average diameters (d) of the Pd and Pd@Pt$_{nL}$ icosahedra were 12.2±2.0 and 13.8±2.5 nm, respectively. As shown by the atomic-resolution TEM image in FIG. 19, the Pd icosahedron had a multiply twinned structure with the surface covered by {111} facets. Based on the inductively coupled plasma mass spectrometry (ICP-MS) analysis, the average number of Pt atomic layers was determined to be about 4.5 (Table 3). Since the number of Pt atomic layers derived from the ICP-MS data represents the average value of a very large number of nanocrystals, we denote the sample shown in FIG. 18C as Pd@Pt$_{4.5L}$ icosahedra. As revealed by the high-angle annular dark-field scanning transmission electron microscopy (HAADF-STEM) images in our previous report, the packing of Pt atoms in the shell of a Pd@Pt$_{4.5L}$ icosahedron did not exactly follow the underlying Pd atoms in the core (Wang, et al., *Nat. Commun.* 2015, 6, 7594). Owing to the lateral confinement imposed by the twin boundaries, a corrugated structure with a compressive strain was formed in the Pt shell through relaxation normal to the surface (Wang, et al., *Nat. Commun.* 2015, 6, 7594). When subjected to a wet etchant consisting of FeCl$_3$ and KBr, the Pd cores could be selectively etched away, leaving behind Pt-based nanocages enclosed by multiple twin boundaries and {111} facets.

TABLE 3

The average number (n) of Pt atomic layers calculated from the ICP-MS data of Pd and Pt contents in a sample of Pd@Pt$_{nL}$ core-shell icosahedra; the wt % of Pt obtained from the ICP-MS data; and the wt % of Pt derived from the size of Pd icosahedra and the integral number (n$_i$) of Pt atomic layers.

| Sample | n | wt % of Pt from ICP-MS | wt % of Pt from size and n$_i$ |
|---|---|---|---|
| Pd@Pt$_{4.5 L}$ | 4.5 | 48.2 | 44.8 (n$_i$ = 4) |
|  |  |  | 51.1 (n$_i$ = 5) |

Figure 14A:
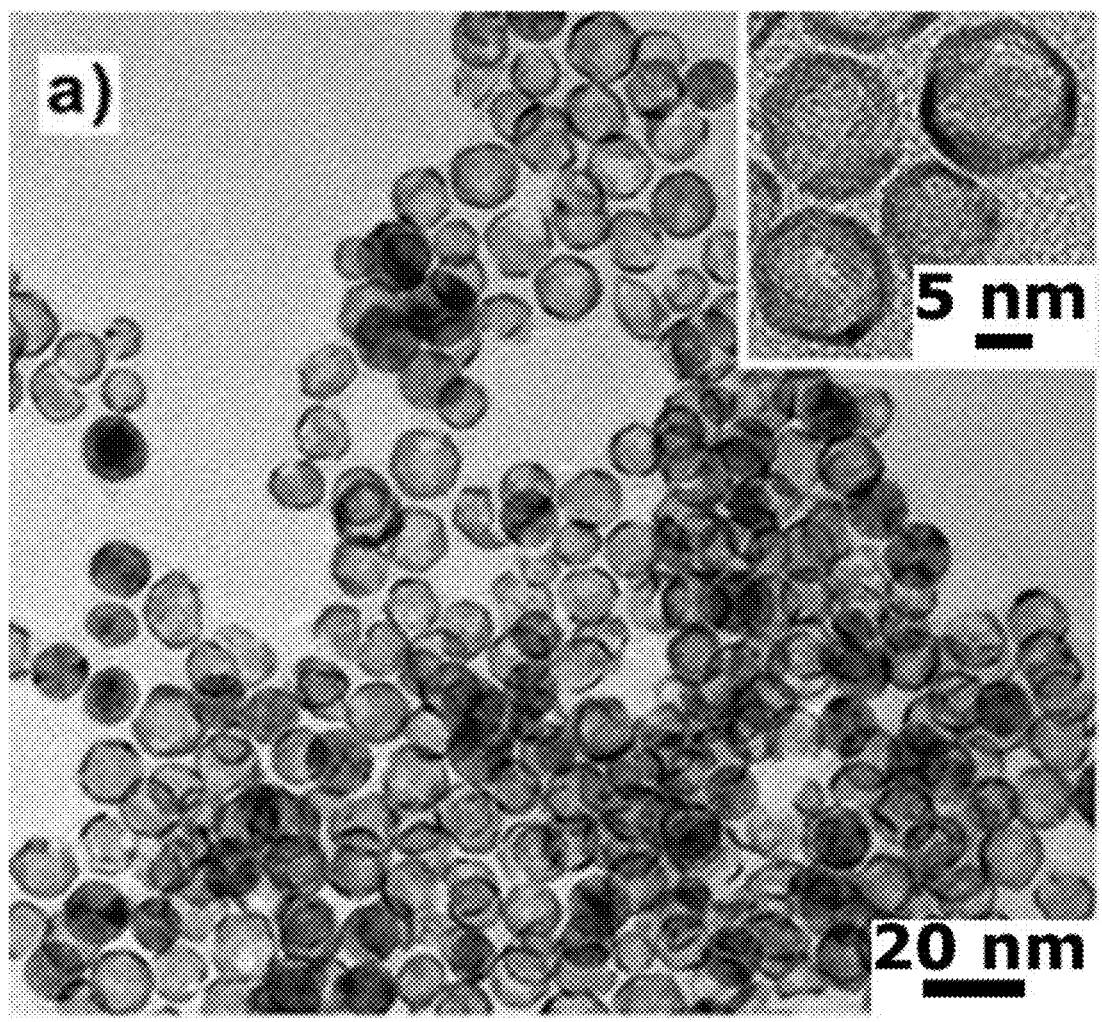
FIGS. 14A-14F show (FIG. 14A) TEM and (FIG. 14B) low-magnification HAADF-STEM image of the Pt icosahedral nanocages.
Figure 14B:
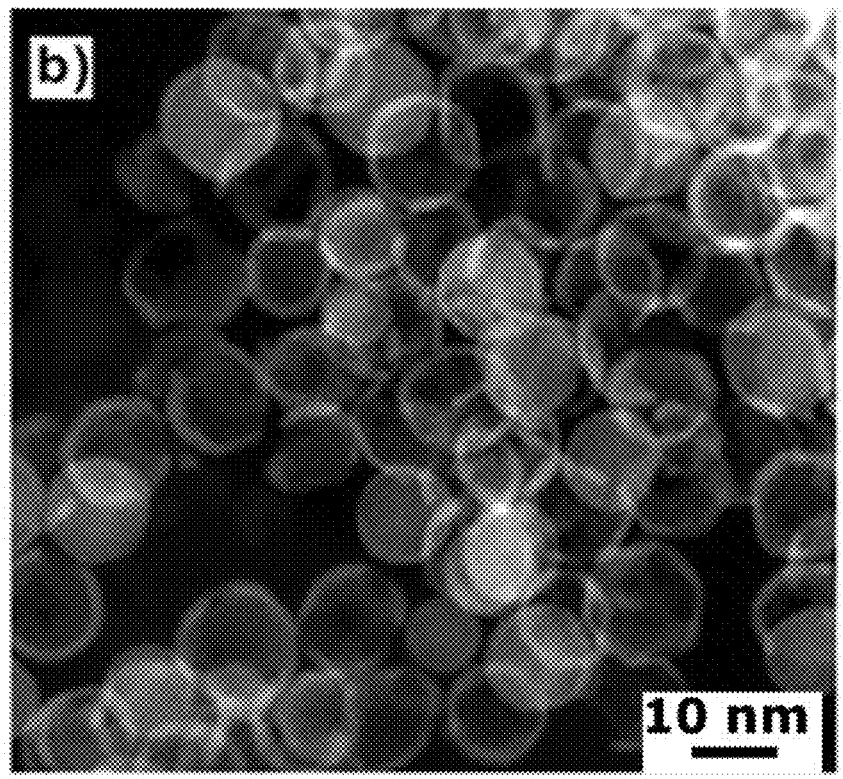
Figure 14C:
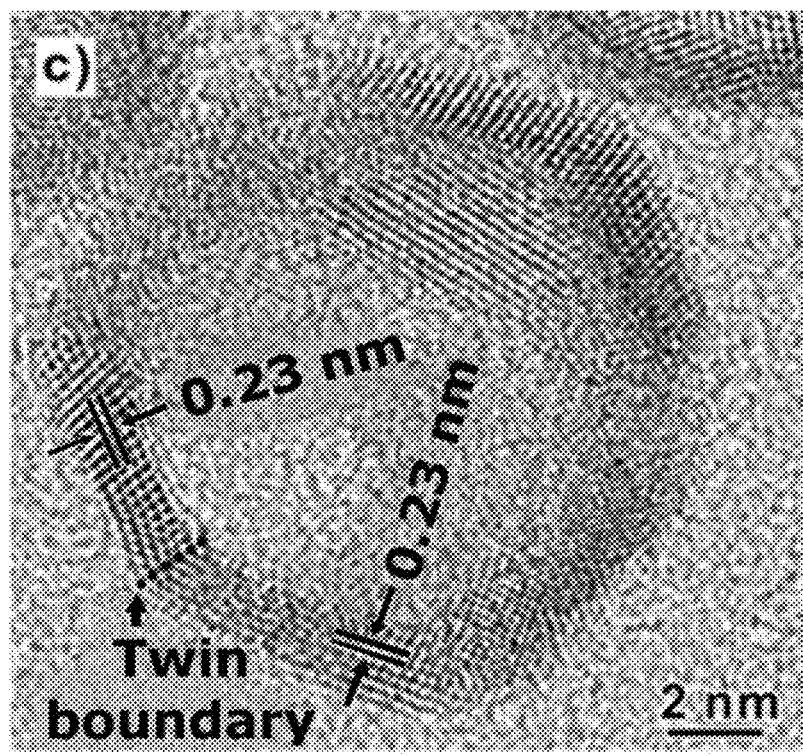
Figure 14D:
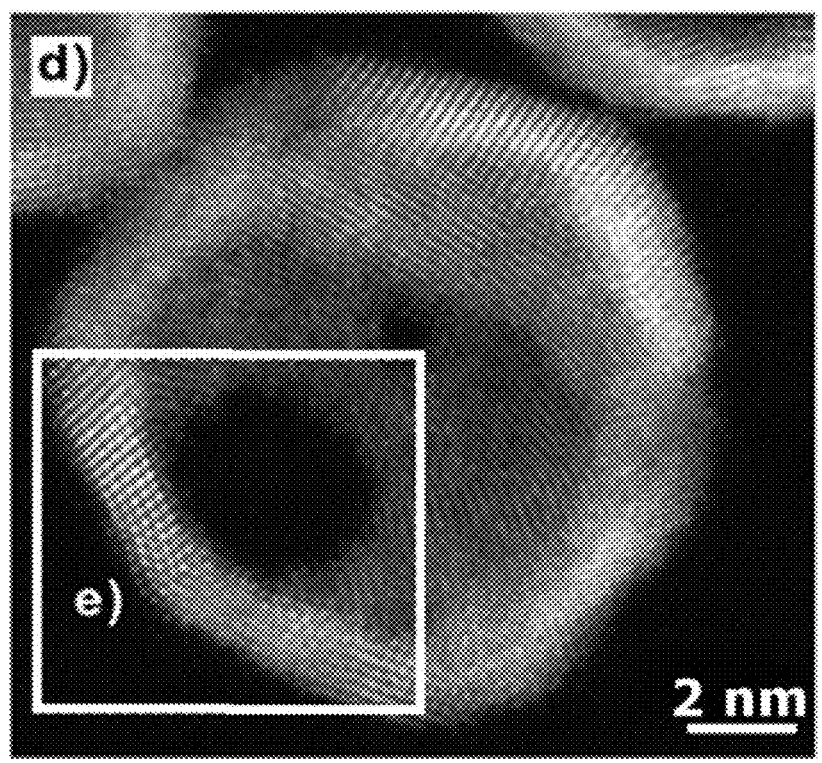

FIG. 14A-14B show typical TEM and HAADF-STEM images of the Pt nanocages, demonstrating that the icosahedral shape could be largely preserved during the etching of Pd cores. The nanocages had an average wall thickness of 1.3 nm, and most of their surfaces were decorated with small holes. FIG. 14C-14D show bright-field and atomic-resolution HAADF-STEM images taken from an individual nanocage along one of its 2-fold symmetry axes. The lattice spacing of 0.23 nm can be assigned to the {111} planes of face-centered cubic (fcc) Pt, suggesting that the icosahedral nanocage was still enclosed by {111} facets after the Pd cores had been etched away. The well-resolved twin boundaries indicate that the Pt nanocage still contained a multiply twinned structure similar to the original Pd or Pd@Pt$_{nL}$ icosahedra. From the atomic-resolution HAADF-STEM image (FIG. 14E), it is clear that the wall thickness of the nanocage was only about six atomic layers, slightly thicker than the Pt shell (4.5 atomic layers) conformally deposited on the surface of Pd core. This increase in shell thickness can be attributed to the inter-diffusion and alloying between Pt and Pd atoms, as well as the formation of holes in the walls (Zhang, et al., *Science* 2015, 349, 412-416). In addition, the migration of atoms from faces to edges might also make the walls appear thicker under TEM imaging. After the removal of Pd core, the corrugated structure in the Pt shell disappeared, leaving behind an icosahedral nanocage with the same packing density for every atomic layer of the wall. Energy-dispersive X-ray spectroscopy (EDX) mapping (FIG. 14F) demonstrated that the nanocage was made of a Pt—Pd alloy. From the ICP-MS data, the weight percentage (wt %) of Pt in the icosahedral nanocages was 80%, as compared to 48% of Pt for the original Pd@Pt$_{4.5L}$ icosahedra.

Figure 14E:
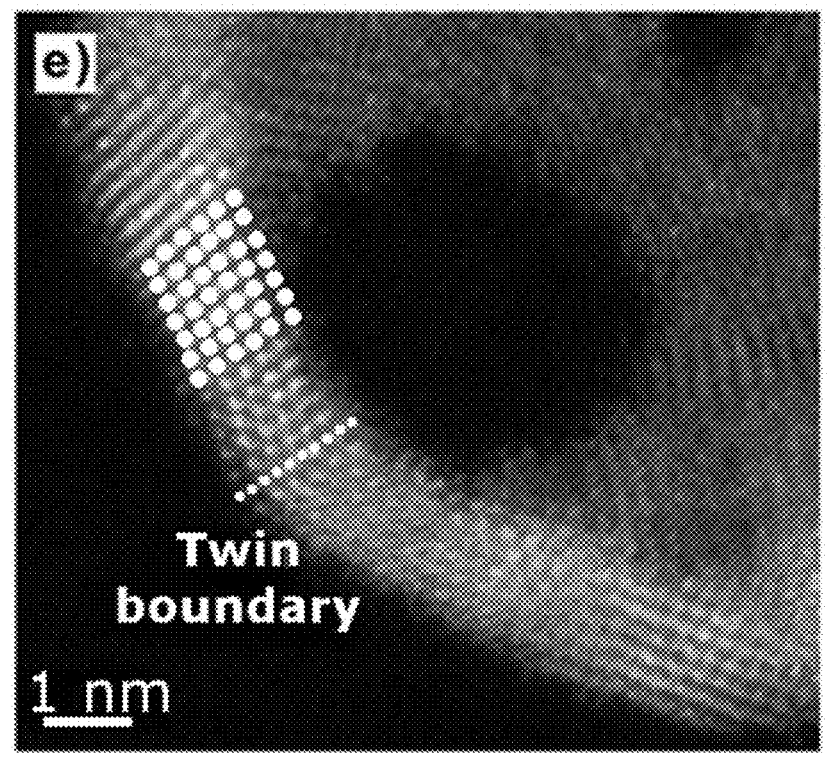
Figure 14F:
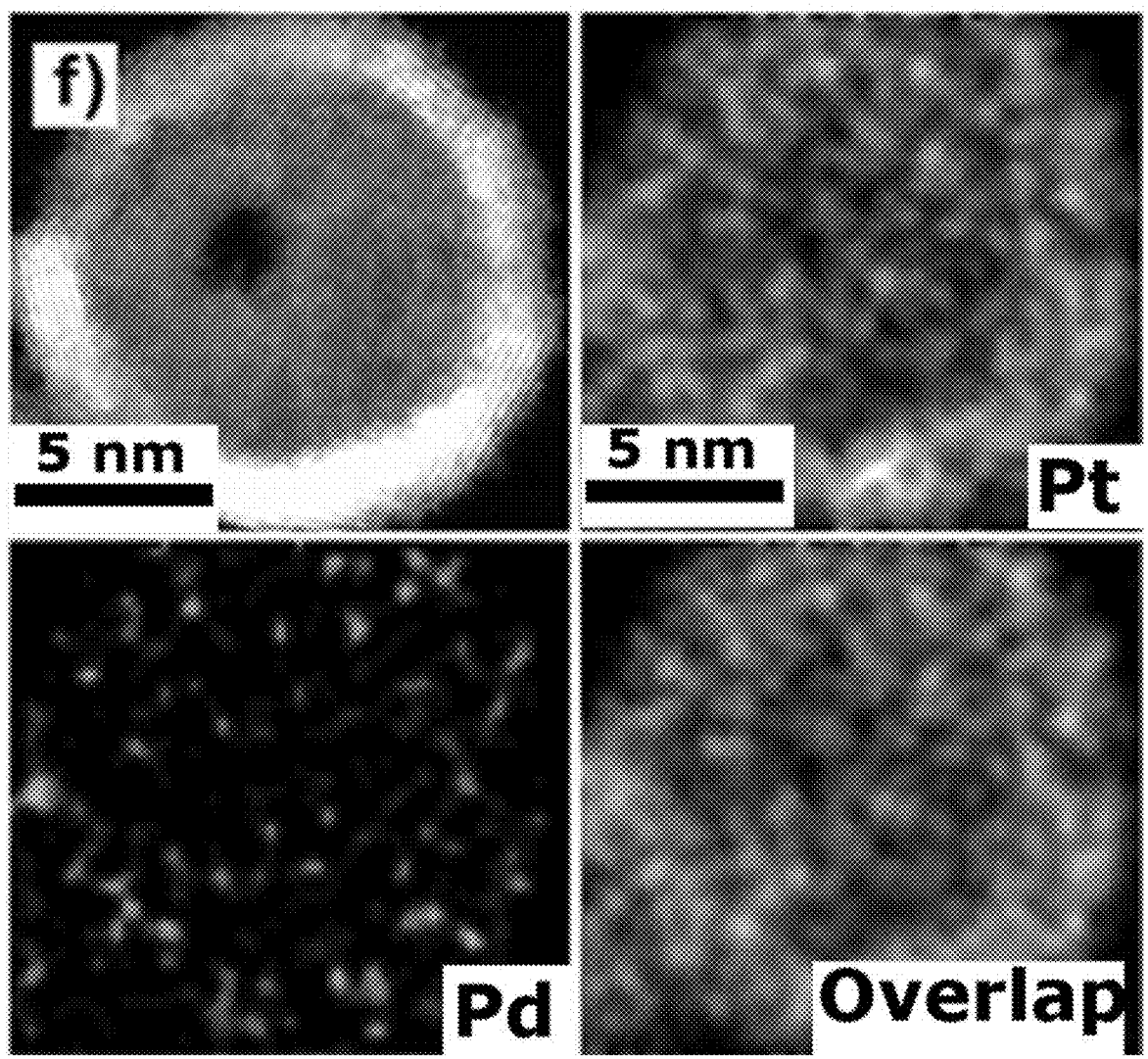
Figure 20:
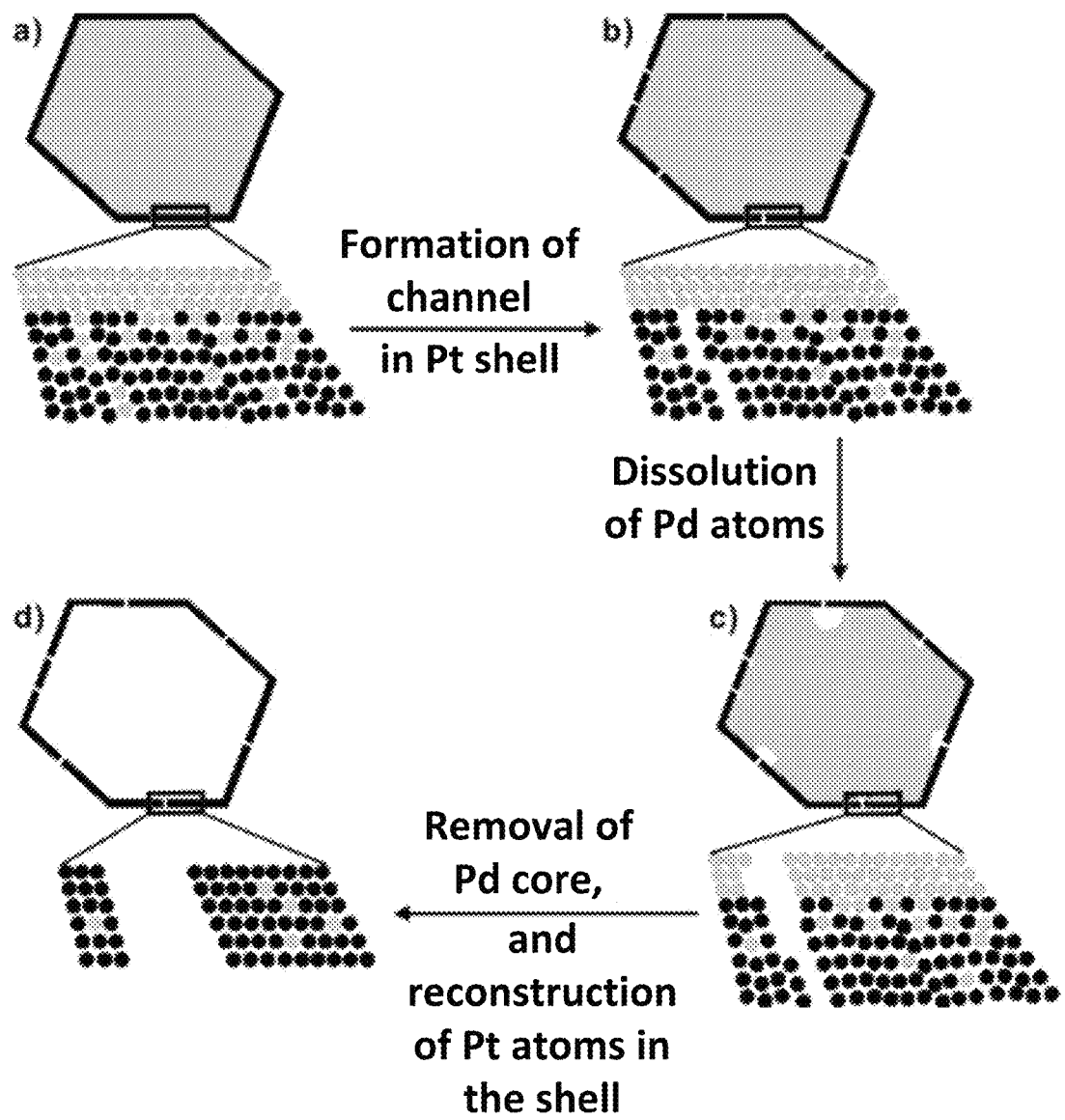
FIG. 20 shows a schematic illustration of the major steps involved in the dissolution of Pd atoms from a Pd@Pt$_{4.5L}$ icosahedron to generate a Pt-based icosahedral nanocage: (step a) before etching, (step b) with the formation of atomic-wide channels in the Pt shell in the early stage of an etching process, (step c) during the dissolution of Pd core, and (step d) after the completion of etching to generate a Pt-based icosahedral nanocage. The icosahedral particles are shown along one of the 2-fold symmetry axes. The drawing also illustrates the possible reconstruction of Pt atoms during the etching process.
Figures 21A, 21B, 21C, 21D:
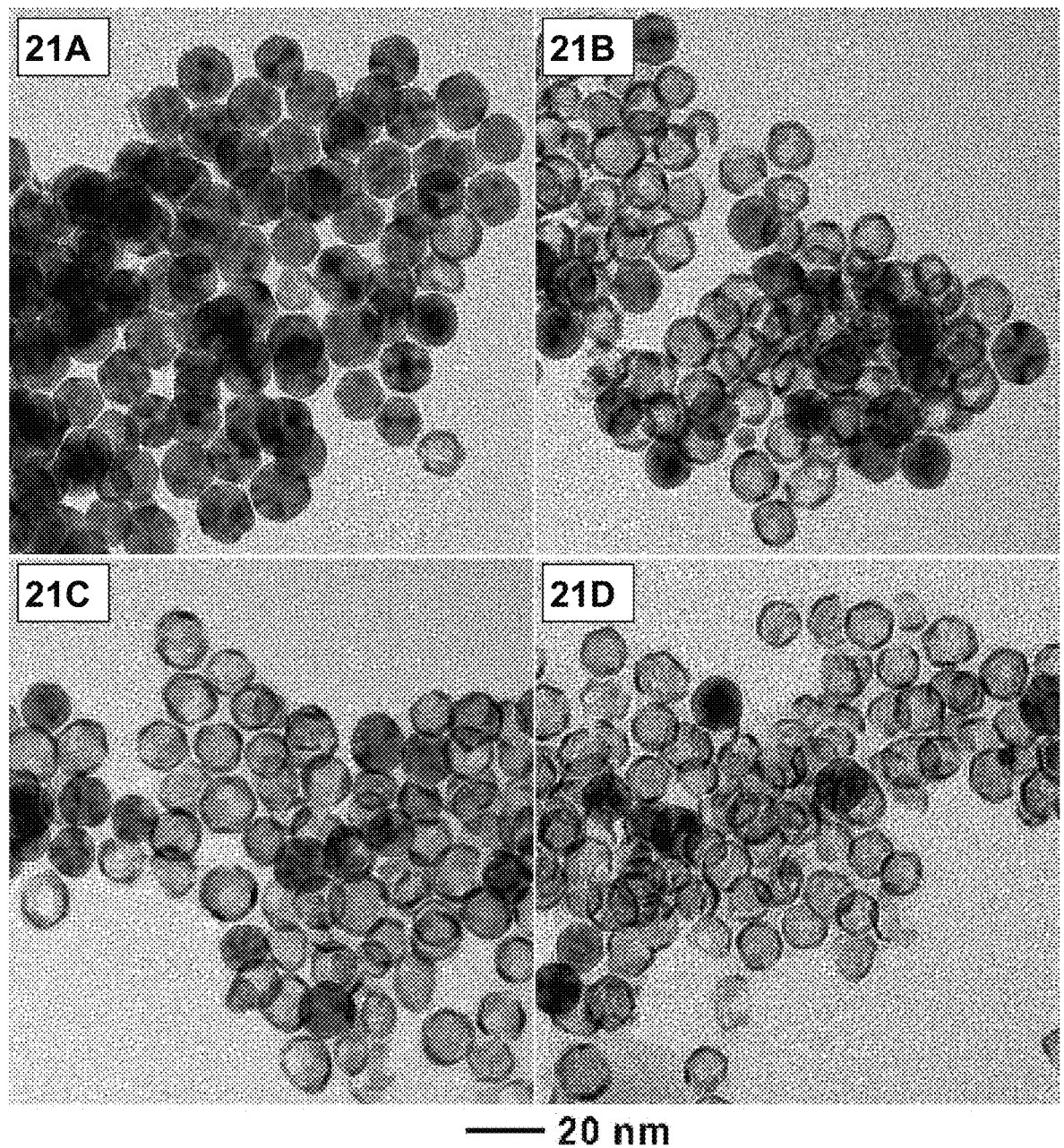
FIGS. 21A-21D show TEM images of the products obtained by etching the Pd@Pt$_{4.5L}$ icosahedra with the standard procedure for different periods of time.

Similar to the formation of Pt cubic/octahedral nanocages with a single-crystal structure, Pt—Pd intermixing and/or co-reduction of Pt and Pd could also occur during the deposition of Pt atoms onto a Pd icosahedral seed. The incorporation of some Pd atoms into the Pt shell was critical to the removal of the Pd core by wet etching. FIG. 20 shows a plausible etching mechanism involved in the formation of an icosahedra nanocage. In the early stage, vacancies would be formed on the surface when the Pd atoms in the outermost layer were attacked by the etchant. The vacancies could merge to generate atomic-wide channels, through which more Pd atoms could be etched away, resulting in the formation of larger channels for the continuous removal of Pd atoms from the core. During the etching process, some Pd atoms could diffuse into the Pt shell to generate a Pt—Pd alloy (FIG. 14F). The corrugated structure in the original Pt shell disappeared as a result of atom reconstruction. This can be attributed to the presence of holes on the surface, and the lateral confinement imposed by the twin boundaries would no longer exist. As a result, instead of forming a corrugated structure, every atomic layer of Pt in the shell would take the same arrangement. Interestingly, the etching process did not alter the multiply twinned structure and the twin boundaries in the shell were essentially retained (FIG. 14E).

We also followed the etching process by examining the samples obtained at different stages (FIGS. 21A-21D). When the Pd@Pt$_{4.5L}$ icosahedra were etched at 100° C. for 0.5 h, the Pd cores could only be etched from a small fraction of the core-shell icosahedra and the wt % of Pt in the sample was increased from 48% to 65%. After etching at 100° C. for 1 h, the Pd cores had been removed from most of the particles and the wt % of Pt was further increased to 75%. After etching for 2 h, essentially all the Pd cores were gone to generate nanocages with the wt % of Pt being increased to 80%. When the etching time was prolonged to 3 h, many of the nanocages were broken while the wt % of Pt was more or less similar to that of the product obtained by etching for 2 h. In this case, the Pt and Pd atoms inter-diffused to form an alloy stable against the etchant, while the atoms could be redistributed through migration to cause fragmentation to the nanocages.

The amount of etchant also played an important role in the formation of the icosahedral nanocages. In this etching system, the Pd cores were etched according to the following reaction (Xie, et al., *Angew. Chem., Int. Ed.* 2012, 51, 10266-10270):

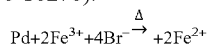
$$Pd + 2Fe^{3+} + 4Br^{-} \xrightarrow{\Delta} +2Fe^{2+}$$

Figures 15A, 15B, 15C, 15D:
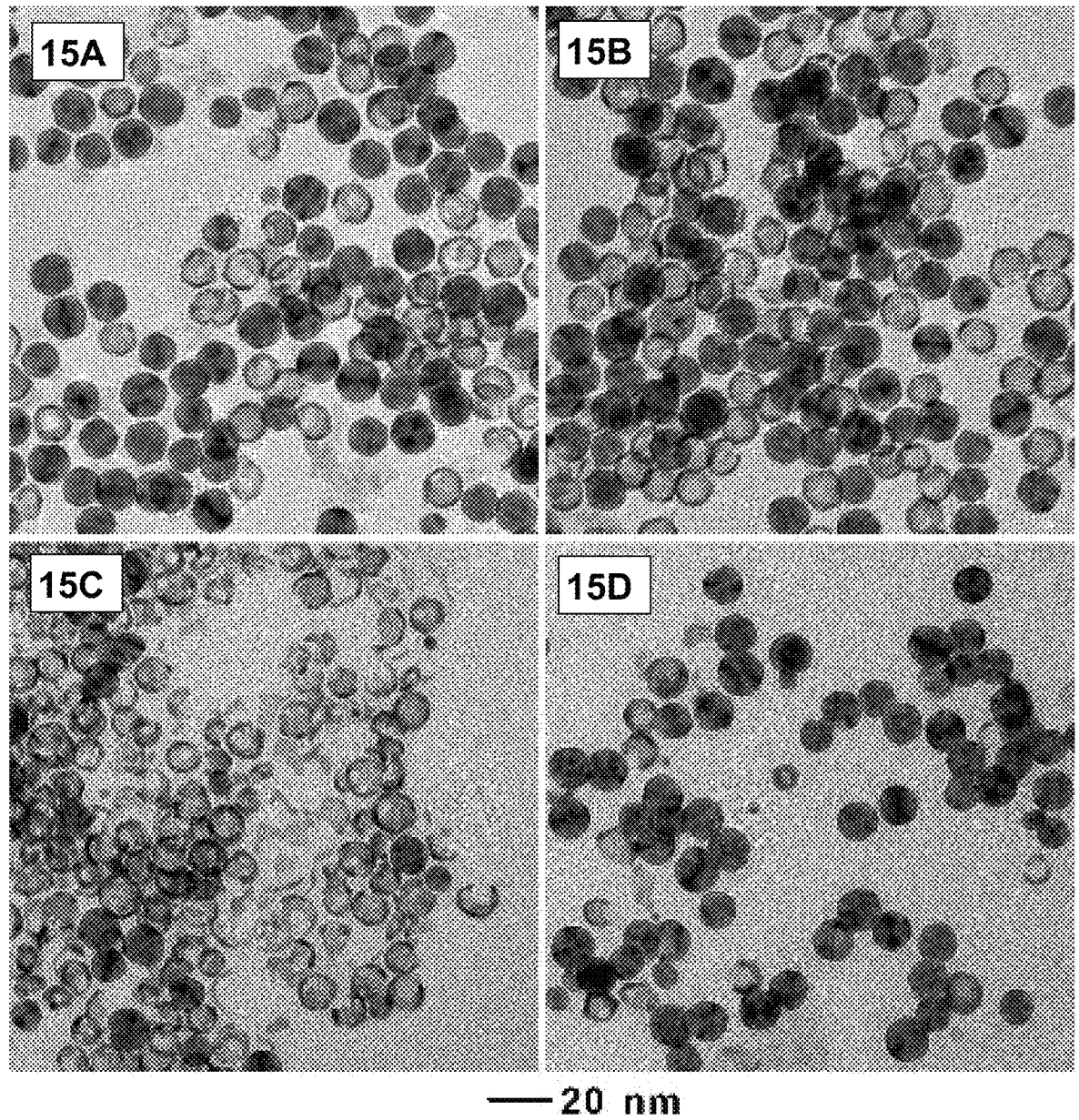
FIGS. 15A-15D show TEM images of products derived from the Pd@Pt$_{4.5L}$ icosahedra using the standard etching procedure, except for the use of (FIG. 15A) 5 mg of FeCl$_3$ and 30 µL of HCl.
Figures 22A, 22B:
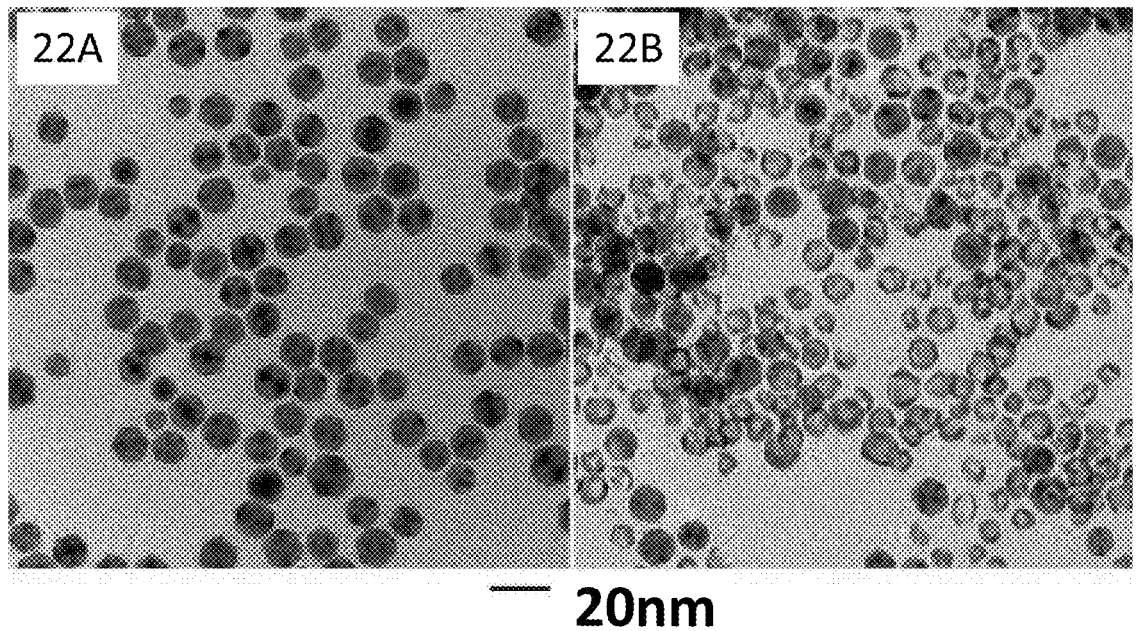
FIGS. 22A-22B show (FIG. 22A) TEM image of the Pd@Pt$_{2.7L}$ core-shell icosahedra.
Figures 23A, 23B:
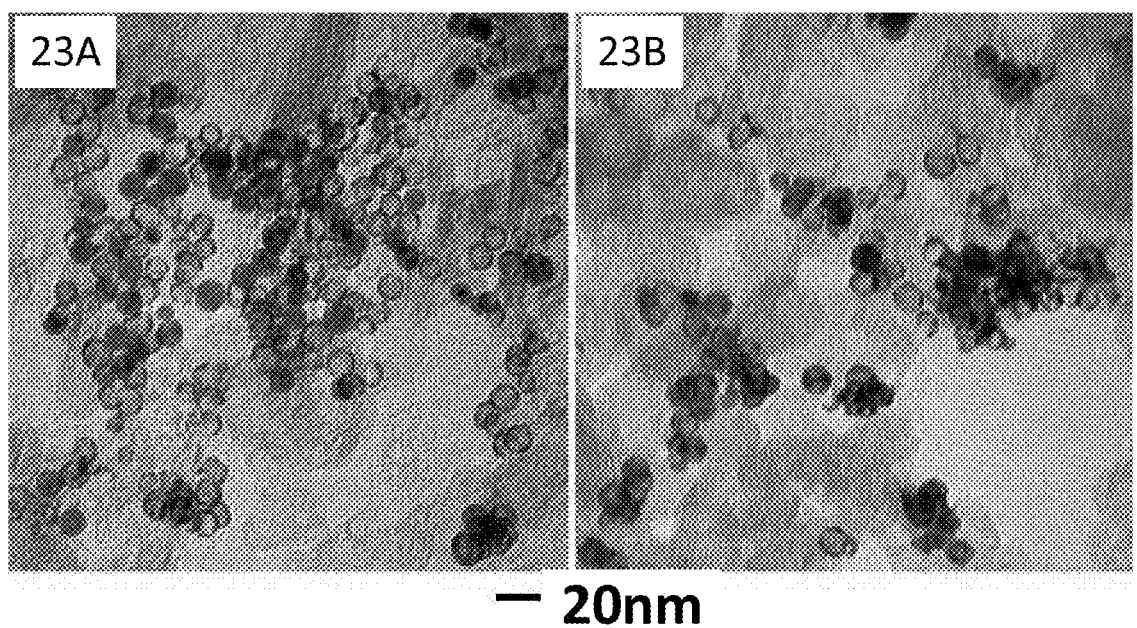
FIGS. 23A-23B show TEM images of the carbon-supported icosahedral nanocages (FIG. 23A) before and (FIG. 23B) after 5,000 cycles of the accelerated durability test.

We had to add HCl to prevent the hydrolysis of Fe$^{3+}$ and Fe$^{2+}$ ions. In a standard procedure, when the amounts of FeCl$_3$ and HCl were proportionally reduced, only a small portion of the Pd@Pt$_{4.5L}$ icosahedra can be converted into icosahedral nanocages (FIGS. 15A-15B). When the amounts of FeCl$_3$ and HCl were proportionally increased to 50 mg and 300 μL, respectively, most of the nanocages were fragmented into smaller pieces (FIG. 15C), due to a faster etching rate. The introduction of Br$^-$ ions is also critical to the etching process. As the standard reduction potential of PdBr$_4^{2-}$/Pd (0.49 V vs. the standard hydrogen electrode or SHE) is lower than that of PdCl$_4^{2-}$/Pd (0.59 V vs. SHE), the etching rate could be greatly accelerated by forming PdBr$_4^{2-}$ through the introduction KBr into the etching solution (Xie, et al., *Angew. Chem., Int. Ed.* 2012, 51, 10266-10270; Xiong, *Nano Lett.* 2005, 5, 1237-1242; Sau, et al., *Complex-shaped Metal Nanoparticles*; Wley-VCH: Weinhem, 2012). When we replaced the KBr in a standard procedure with an equal molar amount of KCl, a very small number of icosahedral nanocages were formed after etching at 100° C. for 2 h while most of the Pd@Pt$_{4.5L}$ icosahedra remained in a core-shell structure (FIG. 15D). As shown in our previous study, Pd@Pt$_{2.7L}$ icosahedra had the highest mass activity toward the oxygen reduction reaction (ORR) among Pd@Pt$_{nL}$ (n=0.7, 2, 2.7, 4.3) icosahedra (Wang, et al., *Nat. Commun.* 2015, 6, 7594). When we tried to etch the Pd@Pt$_{2.7L}$ icosahedra, we found that most of the icosahedral nanocages were broken because of the relatively weak mechanical strength associated with the ultrathin walls (FIGS. 22A-22B).

Figure 16A:
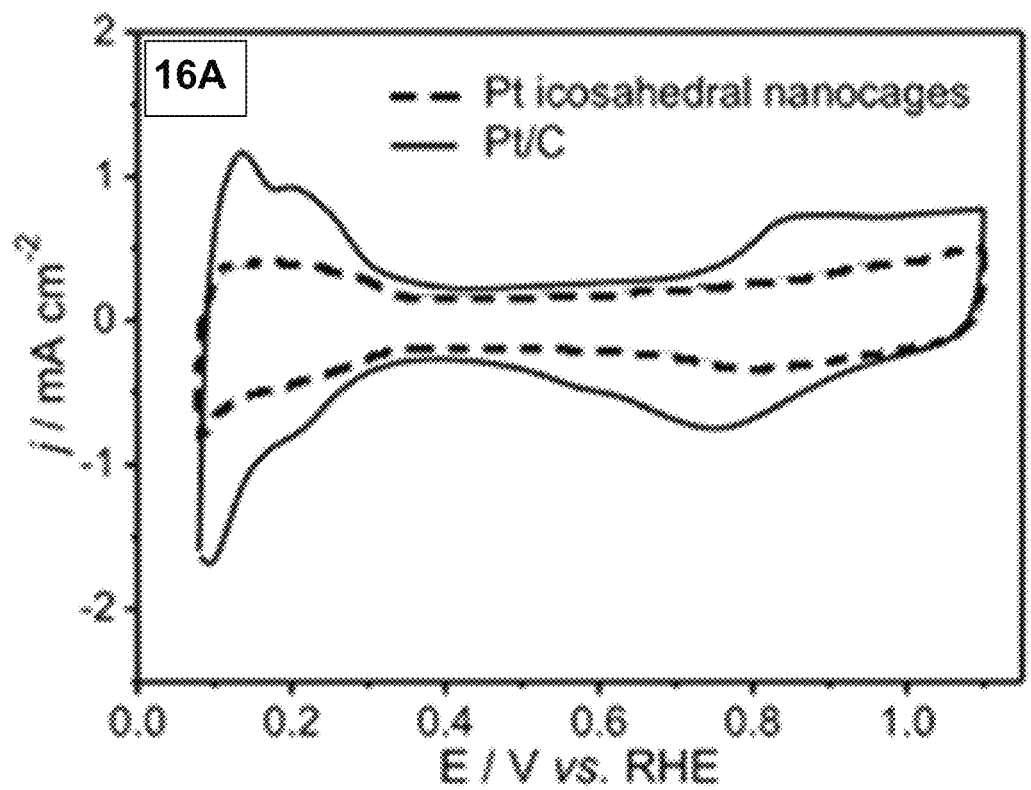
FIGS. 16A-16D show (FIG. 16A, FIG. 16B) CVs and positive-going ORR polarization curves recorded from the carbon-supported Pt icosahedral nanocages and a commercial Pt/C catalyst (Premetek Co.), respectively. The currents were normalized to the geometric area (0.196 cm2) of the rotating disk electrode.
Figure 16B:
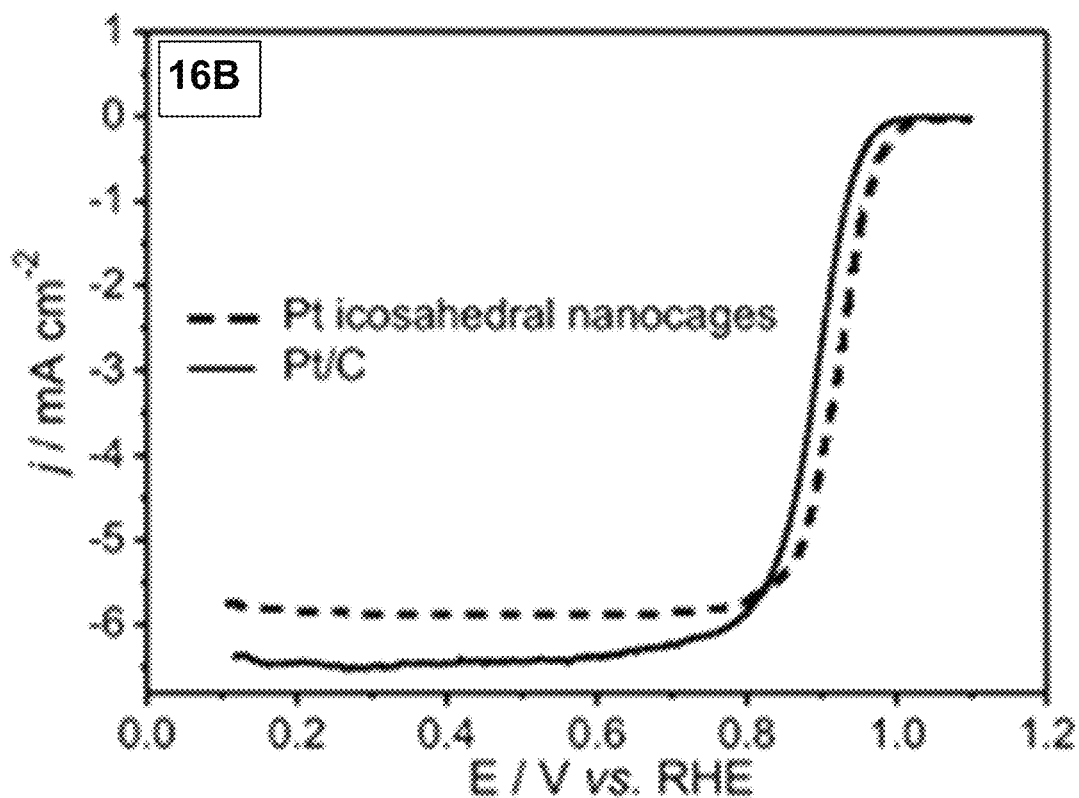
Figure 16C:
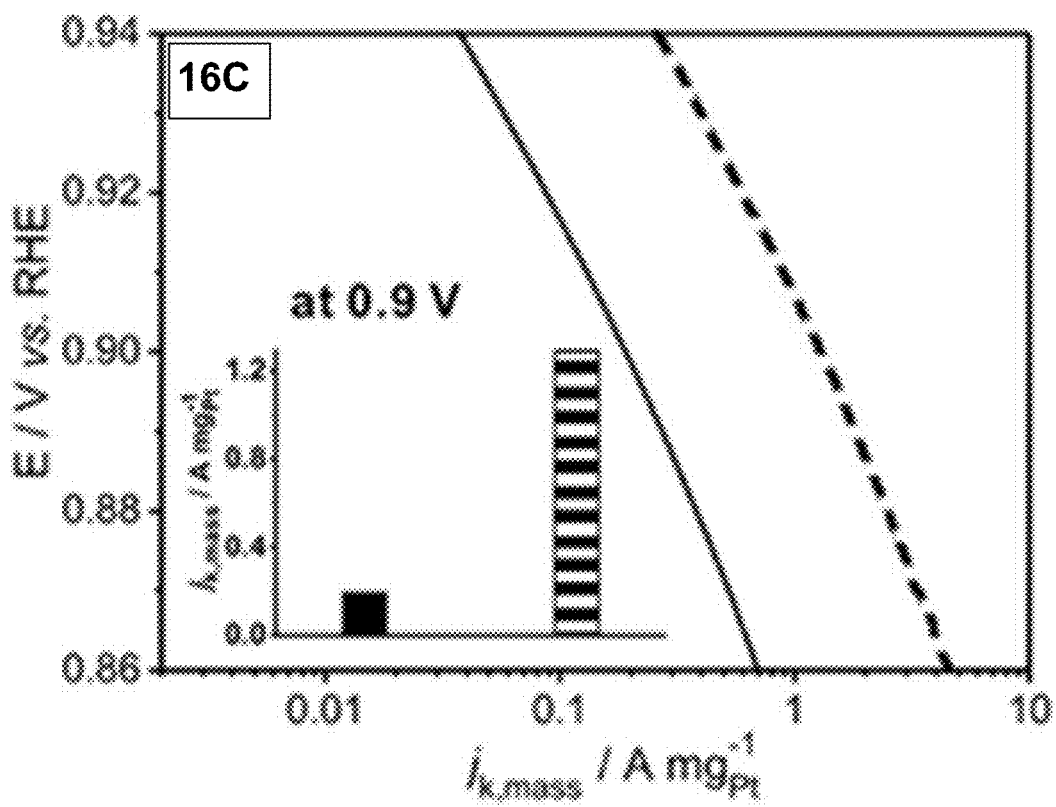
Figure 16D:
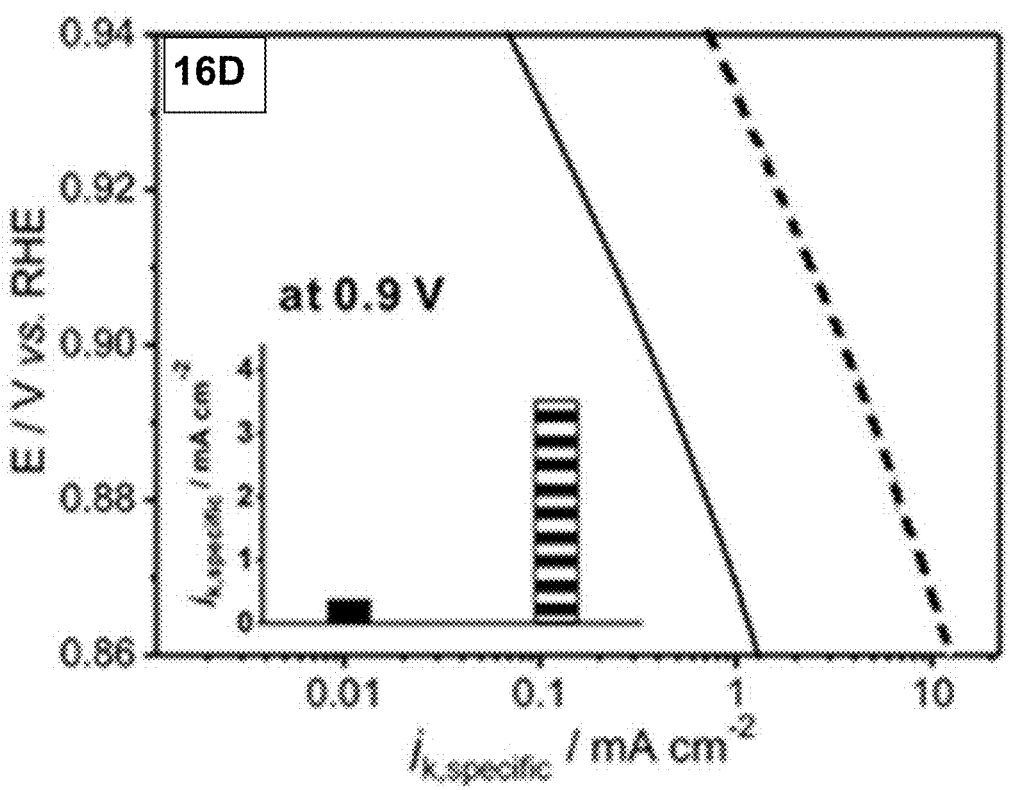

We benchmarked the ORR performance of the Pt-based icosahedral nanocages against a commercial Pt/C catalyst using the rotating disk electrode (RDE) method. FIG. 16A shows cyclic voltammograms (CVs) of the Pt icosahedral nanocages supported on carbon and the commercial Pt/C catalyst. We derived the electrochemical active surface areas (ECSAs) of the two catalysts from the charges associated with the desorption of hydrogen and then normalized the values against the amounts of Pt in the samples to obtain specific ECSAs. Although there was a substantial difference between their particle sizes (13.8±2.5 nm vs. 3.2 nm), the specific ECSA of the icosahedral nanocages was still on the same level as that of the Pt/C (36.5 m$^2$ g$^{-1}_{Pt}$ vs. 54.0 m$^2$ g$^{-1}_{Pt}$). Since there were holes in the walls of icosahedral nanocages, both atoms on the outer and internal surfaces would be able to participate in the electrocatalytic reaction. The positive-going ORR polarization curves of the catalysts are shown in FIG. 16B. To achieve a better understanding of mass and surface effects, the kinetic currents of a polarization curve were calculated by following Koutecky-Levich equation and then normalized against the Pt mass and ECSA to get the mass and specific activities (j$_{k,mass}$ and j$_{k,specific}$), respectively (FIGS. 16C-16D). Both the mass and specific activities of the catalyst based on Pt icosahedral nanocages were greatly enhanced relative to the Pt/C in the potential region of 0.86-0.94 V with a reference to the reversible hydrogen electrode (V$_{RHE}$). At 0.9 V$_{RHE}$, the mass activity of the icosahedral nanocages was 1.28 A mg$^{-1}_{Pt}$, almost seven times as high as that of the Pt/C (0.19 A mg$^{-1}_{Pt}$). The specific activity (3.50 mA cm$^{-2}$) of the Pt icosahedral nanocages at 0.9 V$_{RHE}$ showed a 10-fold enhancement relative to that of the Pt/C catalyst (0.35 mA cm$^{-2}$). It is also worth noting that the Pt icosahedral nanocages also had a greater specific activity relative to Pt octahedral nanocages (3.50 mA cm$^{-2}$ vs. 1.98 mA cm$^{-2}$), although their surfaces were both enclosed by {111} facets (Zhang, et al., *Science* 2015, 349, 412-416). Taken together, the significant enhancement in specific activity for the Pt icosahedral nanocages should be attributed to the presence of both {111} facets and twin boundaries on the surface. These two types of structural features have been identified to be favorable for ORR (Stamenkovic, et al, *Science* 2007, 315, 493-497; Wang, et al., *Nat. Commun.* 2015, 6, 7594; Sun, et al., *ACS Nano* 2015, 9, 7634-7640). The enhancement in mass activity could also benefit from a high dispersion of Pt atoms for the nanocages due to the involvement of an ultrathin wall thickness of only six atomic layers.

Figure 17A:
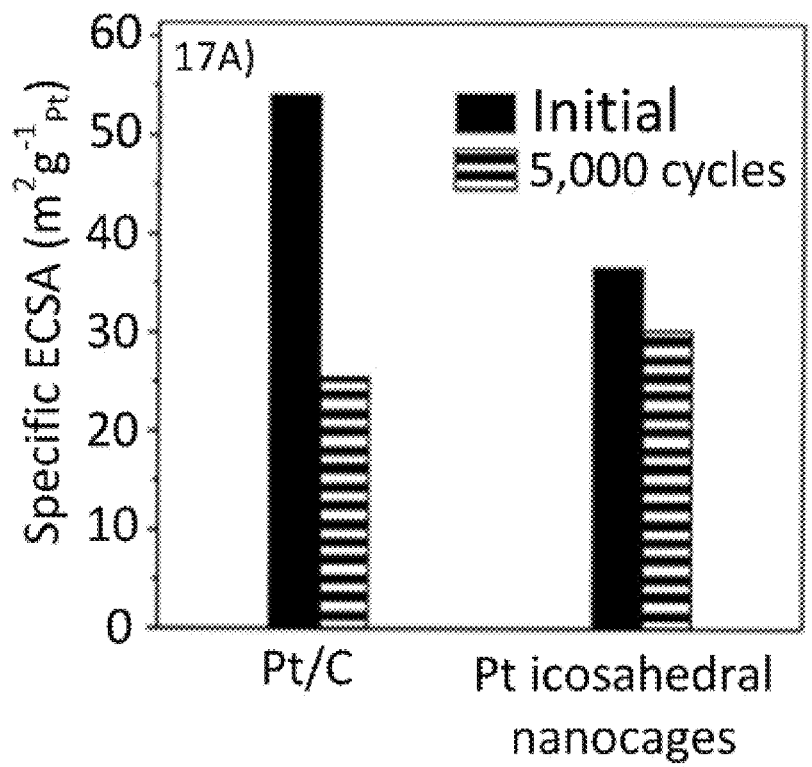
FIGS. 17A-17B show Comparison of the durability for the carbon-supported Pt icosahedral nanocages and the commercial Pt/C catalyst. The comparison is based on (FIG. 17A) the specific ECSAs and (FIG. 17B) the mass ORR activities at 0.9 VRHE for the catalysts before and after the accelerated ORR durability tests.
Figure 17B:
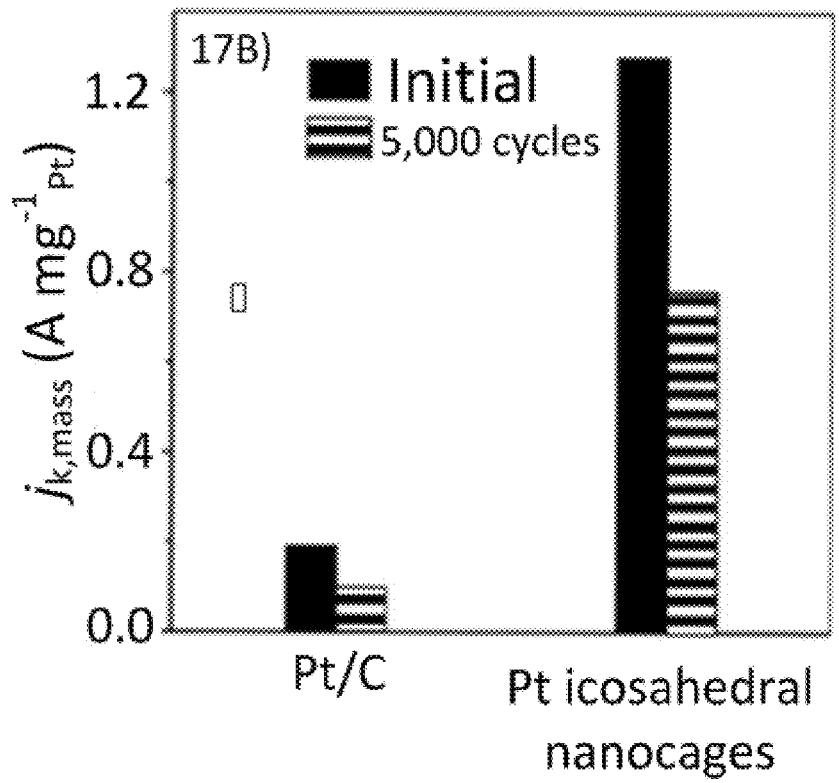
Figure 18A:
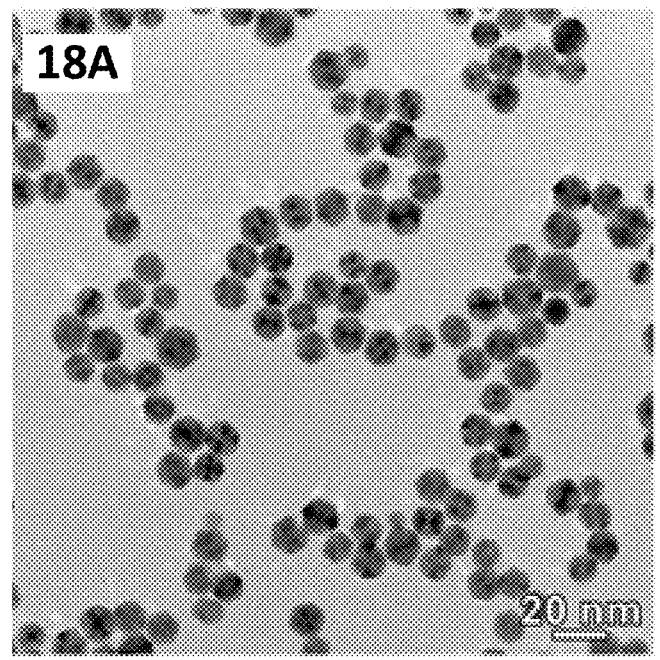
FIGS. 18A-18O show (FIG. 18A) TEM image and (FIG. 18B) size distribution of the Pd icosahedral seeds used for the deposition of Pt shells.
Figure 18B:
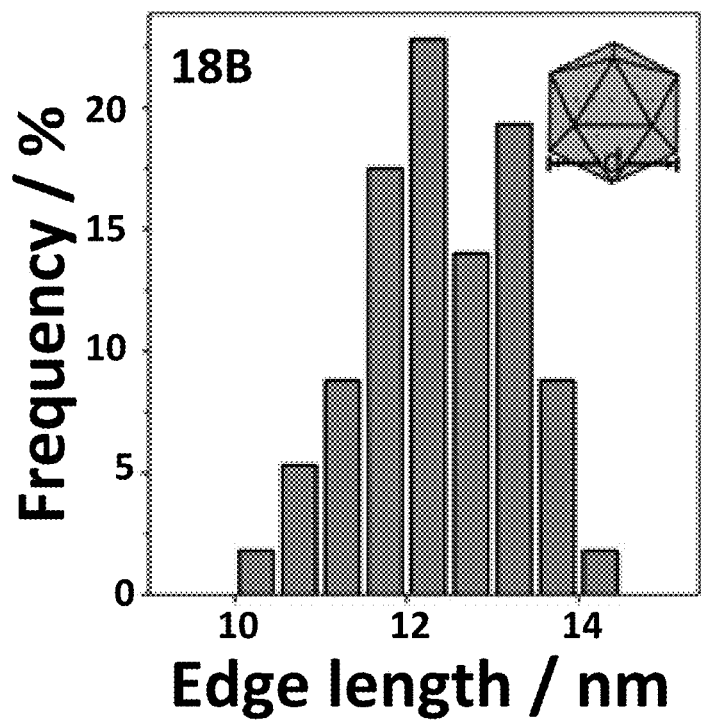
(FIG. 18C) TEM image and (FIG. 18D) size distribution of the Pd@Pt$_{4.5L}$ icosahedra. As shown by a schematic model in the inset, we defined the diameter of a Pd or Pd@Pt$_{nL}$ icosahedron as the distance between two opposite edges.
Figure 18C:
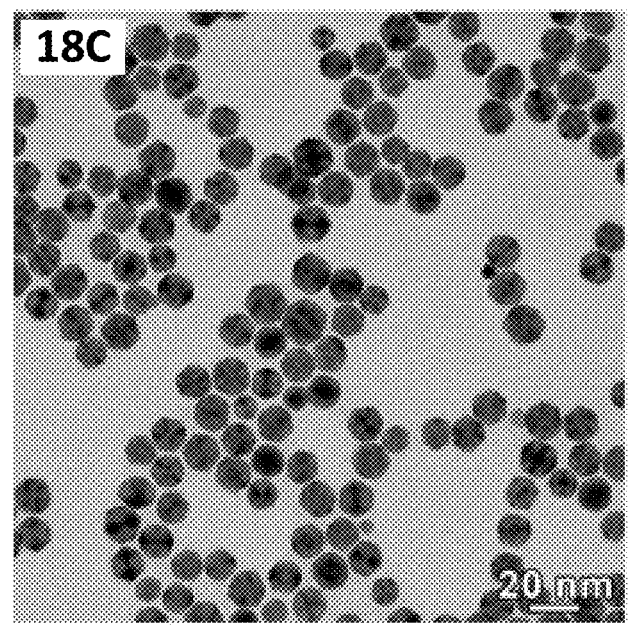
Figure 18D:
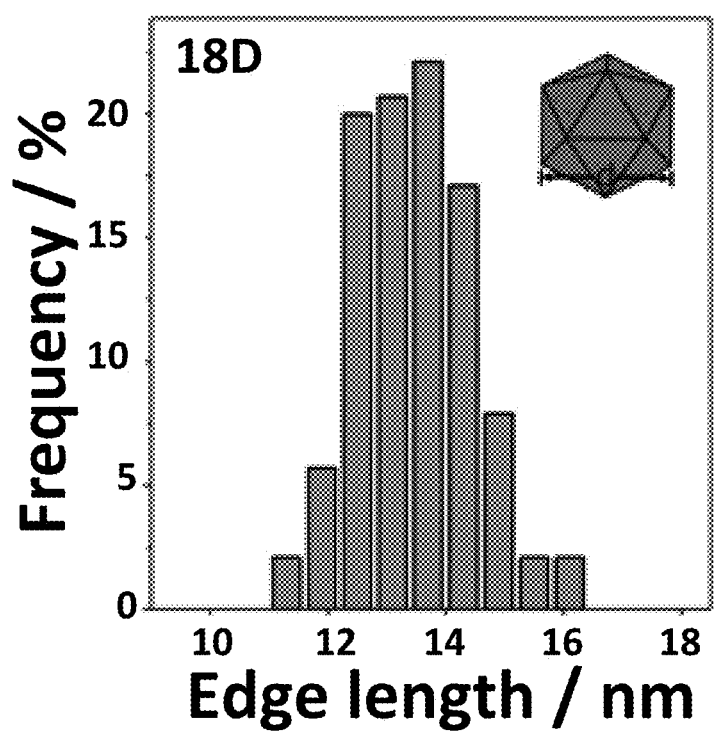

In addition to the great enhancement in both specific and mass activities, the Pt-based icosahedral nanocages also exhibited remarkable catalytic durability (FIGS. 17A-17B). After 5,000 cycles of accelerated durability tests at room temperature, the specific ECSA of the Pt-based icosahedral nanocages only dropped by 18%, whereas the specific ECSA of the commercial Pt/C catalyst decreased by 53%. Furthermore, the icosahedral nanocages still showed a mass activity of 0.76 A $mg^{-1}_{Pt}$ after 5,000 cycles of tests, which was about three times higher than that of the pristine Pt/C. As shown in Figure S6, most of the nanocages maintained their icosahedral morphology after 5,000 cycles of accelerated durability test. Meanwhile, some of the nanocages aggregated, leading to a decrease in the specific ECSA.

In conclusion, we have demonstrated the synthesis of a new class of ORR catalysts based on Pt-based icosahedral nanocages multiply twinned {111}-facet-enclosed with walls as thin as six atomic layers. During selectively etching Pd cores from $Pd@Pt_{4.5L}$ icosahedra with corrugated Pt shells, the atoms in every layer of the walls of Pt-based icosahedral nanocages reconstructed and adopted the same packing mode. When benchmarked against the commercial Pt/C catalyst, the mass and specific activities of Pt icosahedral nanocages exhibited 6.7-fold and 10-fold enhancements relative to commercial Pt/C, respectively, which can be ascribed to the exposed {111} facets, twin boundaries and the high dispersion of Pt atoms. After 5,000 cycles of an accelerated durability test, the mass activity of Pt icosahedral nanocages is about 4-fold enhancement as compared to that of commercial Pt/C before durability test. These results provide us an attractive strategy for designing future catalysts with enhanced activity by constructing a multiply twinned hollow structure at atomic scale.

Example 4: Pt-Based Nanocages and Nanoframes Synthesized by Templating Against Pd Nanoplates Template-directed protocol is an effective route to design the structure of hollow nanocrystals. Here we report the synthesis of Pt-based nanocages and nanoframes through etching treatment by using Pd@Pt core-shell nanoplates prepared in polyol-based and water-based systems as templates, respectively. The wall thickness of Pt—Pd nanocages is as thin as 5 atomic layers while the edge thickness of Pt nanoframes is 8 atomic layers. For polyol-based system, Pt atoms can be conformally deposited on Pd nanoplates to form Pd@Pt nanoplates due to the strong reducing agent, slow injection rate and high reaction temperature. For water-based system, the formation of Pd@Pt nanoplates with thicker Pt shells on side faces can be ascribed to the slow reducing agent, low reaction temperature, and twin planes on the side faces. Pt shells formed in water-based system may contain more Pd atoms than that formed in polyol-based system, which may result in the quick etching of Pd@Pt nanoplates from water-based system and thus the formation of Pt nanoframes.

Herein, we have synthesized Pd@Pt nanoplates using polyol-based and water-based systems. When we use these two types of Pd@Pt nanoplates as templates for etching, Pt-based nanocages with the wall thickness of 5 atomic layers and Pt nanoframes with 8-atomic-layers-thick edges are obtained. We have also discussed the plausible mechanisms for the formation of Pd@Pt nanoplates in two synthetic systems, and Pt-based nanocages and nanoframes.

Materials and Reagents

Ethylene glycol (EG, lot no. L05B13) was purchased from J. T. Baker. Sodium palladium(II) tetrachloride ($Na_2PdCl_4$, 99.998%), sodium platinum(IV) hexachloride hexahydrate ($Na_2PtCl_6 \cdot 6H_2O$, 98%), chloroplatinic(IV) acid hexahydrate ($H_2PtCl_6 \cdot 6H_2O$), poly(vinyl pyrrolidone) (PVP, M.W.≈55,000), L-ascorbic acid (AA, 99%), citric acid (CA, 99.5%), potassium bromide (KBr), ferric chloride ($FeCl_3$), and hydrochloric acid (HCl, 37%) were all obtained from Sigma-Aldrich. All aqueous solutions were prepared using deionized (DI) water with a resistivity of 18.2 MΩ·cm.

Synthesis of Pd Nanoplates

The Pd nanoplates were synthesized using a modified protocol as reported previously (Xiong, et al., *Langmuir* 2006, 22, 8563-8570). Typically, 105 mg of PVP was dissolved in 8.0 mL of DI water in a 20 mL vial and pre-heated at 90° C. in an oil bath under magnetic stirring for 20 min. Subsequently, 57.0 mg of $Na_2PdCl_4$ was dissolved in 3.0 mL of DI water and then injected into the preheating solution with a pipette. The mixture of reagents was capped, and maintained at 90° C. for 15 h. The product was collected by centrifugations, washed three times with DI water to remove excess PVP and inorganic ions, and then re-dispersed in 5.0 mL of EG or DI water. The concentration of Pd seed solution was determined by inductively coupled plasma mass spectrometry (ICP-MS).

Synthesis of Pd@Pt in the Polyol-Based System

In a standard procedure, 1.0 mL of the Pd nanoplates (1.76 mg/mL, EG solution), 54 mg of KBr, 264 mg of PVP, 100 mg of AA, and 9.0 mL of ethylene glycol were mixed in a 50-mL three-neck flask and preheated at 110° C. for 1 h. The reaction temperature was then quickly ramped to 200° C. within 10 min. The deposition of Pt atomic layers was initiated by injecting 24.0 mL volume of the $Na_2PtCl_6 \cdot 6H_2O$ solution in ethylene glycol (0.04 mg/mL) into the reaction solution at a relatively slow rate of 1.5 mL/h. After the injection of a specific amount of Pt precursor, the reaction solution was kept at 200° C. for another 1 h. The final product was collected by centrifugation, washed once with acetone and twice with ethanol, and re-dispersed in 1 mL DI water.

Synthesis of Pd@Pt in the Water-Based System

The Pd nanoplates were synthesized using a modified protocol as reported previously (Lim, et al., *Nano Lett.* 2008, 8, 2535-2540). Typically, 1.0 mL of the Pd nanoplates (1.76 mg/mL, aqueous solution), 35 mg of PVP, 40 mg of CA, and 3 mL DI water were mixed in a 20-mL vial and then heated at 80° C. for 10 min under magnetic stirring. Meanwhile, 6 mL of $H_2PtCl_6$ (4.9 mM) aqueous solution was quickly added into the preheated solution using a pipette. The reaction solution was kept at 80° C. for 5 h under magnetic stirring and then cooled to room temperature. The product was collected by centrifugation, washed three times with DI water, and redispersed in 1 mL DI water.

Synthesis of Pt-Based Nanocages and Nanoframes

Typically, 300 mg of KBr, 50 mg of PVP, 20 mg of $FeCl_3$, 0.12 mL of HCl and 5.88 mL of DI water were mixed in a vial. Then, the mixture was heated at 80° C. for 10 min in an oil bath under magnetic stirring. Subsequently, 0.2 mL of an aqueous dispersion of the as-prepared Pd@Pt nanoplates was injected into the preheating solution with a pipette. Pt-based nanocages can be obtained through etching Pd@Pt nanoplates in the polyol-based system for 60 min, while Pt-based nanoframes can be obtained through etching Pd@Pt nanoplates in the water-based system for 6 min. The products were collected by centrifugation, washed twice with ethanol and three times with water, and then dispersed in DI water.

Characterization

Transmission electron microscopy (TEM) images were taken using a Hitachi HT7700 microscope operated at 120 kV by drop casting the nanoparticle dispersions on carbon-coated Cu grids and drying under ambient conditions. High-resolution high angle annular dark-field scanning transmission electron microscopy (HAADF-STEM) images were carried out on a Cs-corrected FEI Titan 80/300 kV TEM/

STEM microscope and a Hitachi HD-2700A Cs-corrected STEM/SEM microscope. Energy-dispersive X-ray spectroscopy (EDX) analyses were performed in STEM mode using an aberration-corrected JEOL 2200FS electron microscope equipped with a Bruker-AXS SDD detector. The metal contents were measured using ICP-MS (NexION 300Q, Perkin Elmer).

Results and Discussion

Figures 24A, 24B, 24C, 24D:
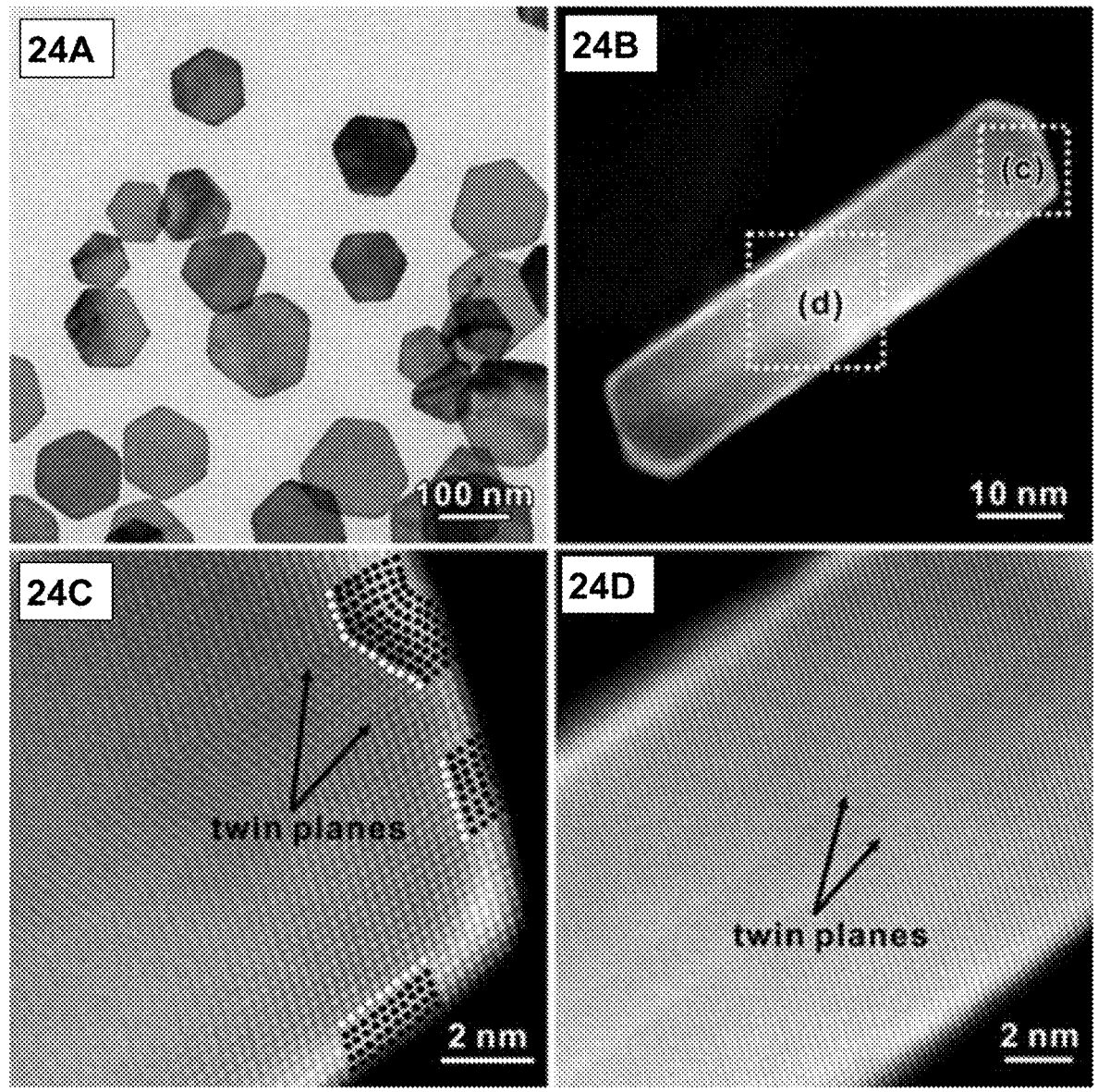
FIGS. 24A-24D show structural analyses of the Pd@Pt core-shell nanoplates obtained in polyol-based system.

Synthesis and Characterization of Pd@Pt Nanoplates Using Polyol-Based and Water-Based Systems As-prepared Pd nanoplates were confirmed via TEM. The sample mainly contained hexagonal nanoplates with the diameter in the range of 58-147 nm and the average thickness of the nanoplates was about 22 nm. Inspired by our recent success in the synthesis of Pd@Pt cubes, octahedra, icosahedra and concave decahedra through polyol-based system, Pd@Pt naoplates have been synthesized by using Pd nanoplates as seeds (Xie, et al., Nano Lett. 2014, 14, 3570-3576; Park, et al., ACS Nano 2015, 9, 2635-2647; Wang, et al., Nat. Commun. 2015, 6, 7594; Wang et al., J. Am. Chem. Soc. 2015, 137, 15036-15042). FIGS. 24A-24D show structural analyses of Pd@Pt nanoplates synthesized in polyol-based system. From the low-magnification TEM and HAADF-STEM images in FIGS. 24A-24B, the morphology of plates is well-retained after Pt deposition on Pd nanoplates. FIGS. 24C-24D show the atomic resolution HAADF-STEM images taken from one end and middle part of the same nanocrystal in FIG. 24B, respectively. The deposited Pt atoms followed the arrangement of Pd atoms of the seed and the twin structure of nanoplate was retained. For hexagonal nanoplates with face-centered cubic (fcc) structure, the top and bottom faces can be indexed as (111) facets, together with (111) and (100) side facets appearing alternatively (Xiong, et al., Langmuir 2006, 22, 8563-8570). From FIG. 24C, it is clear that the thickness of Pt shells is only 4 atomic layers along the (111) face. However, along the side face, the thickness of Pt shells on the two sides of twin planes was different, from 4 atomic layers to 7 atomic layers. The twin planes of the Pd plate caused all six sides to contain concave A-type faces with reentrant grooves and convex B-type faces. Compare to the sites of B-type face, it is more favorable for Pt atoms to be added on the sites of A-type face, as A-type face has more nearest atomic neighbors and thus higher stability energy. Therefore, as shown in FIG. 24C, the thickness of Pt atoms on A-type face is 7 atomic layers while the thickness of Pt atoms on B-type face is 4 atomic layers.

Figures 25A, 25B:
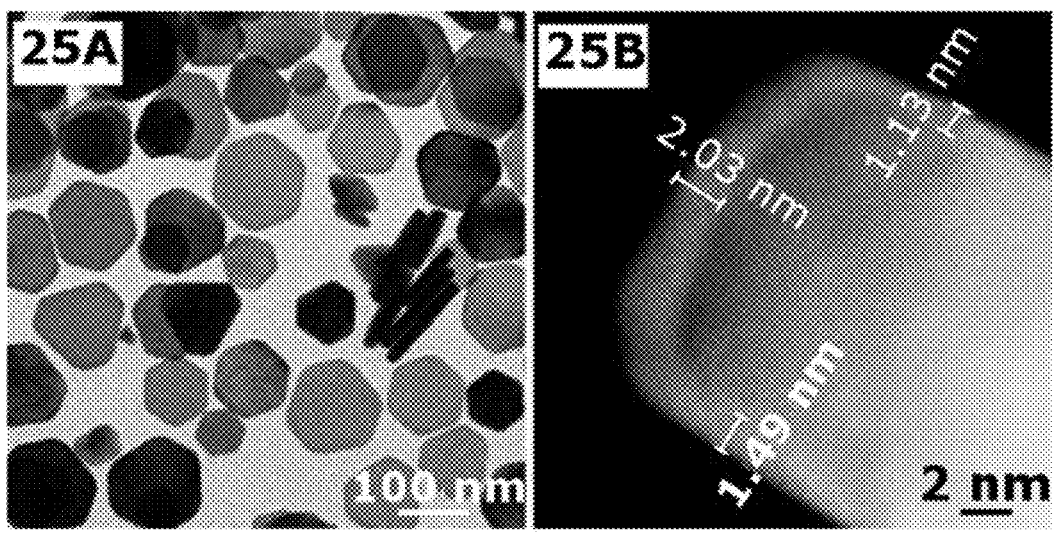
FIGS. 25A-25B show structural analyses of the Pd@Pt core-shell nanoplates obtained in water-based system.

Pd@Pt nanoplates can be also synthesized using the modified protocol in water-based system (FIGS. 25A-25B). The TEM image in FIG. 25A indicates that the product retains the morphology of nanoplates after Pt coating. HAADF-STEM image in FIG. 25B confirms the core-shell structure of nanoplate. The thickness of Pt shell on the Pd seed is not uniform. It is clear that Pt shell deposited on the side faces are thicker than that deposited on the top and bottom faces of Pd nanoplates.

Synthesis and Characterization of Pt-Based Nanocages and Nanoframes

Figures 26A, 26B, 26C, 26D, 26E, 26F:
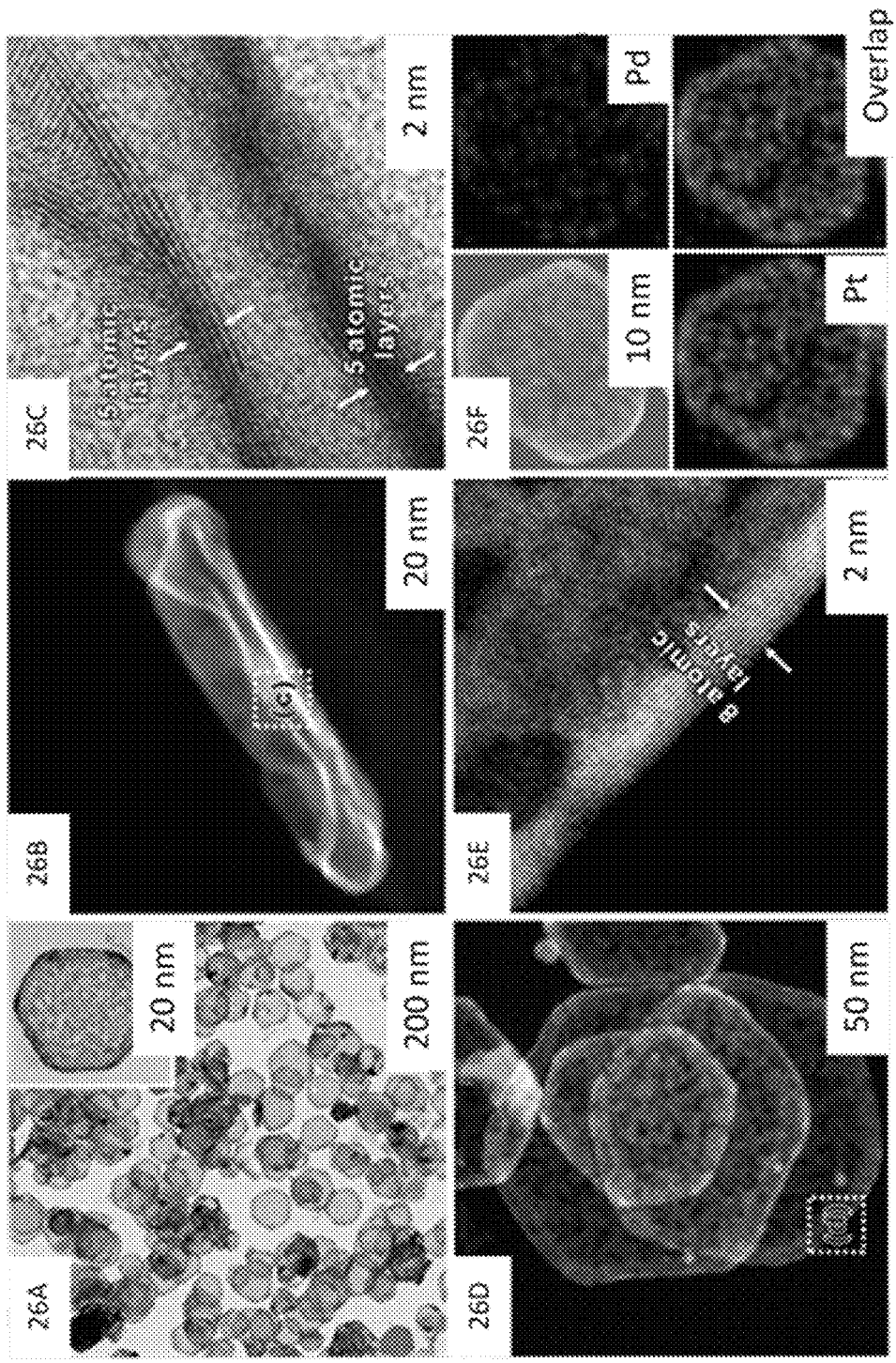
FIGS. 26A-26F show structural analyses of Pt-based nanocages derived from Pd@Pt nanoplates in polyol-based system.

Wet etching was conducted with the Pd@Pt nanoplates obtained from polyol-based and water-based systems using an acidic aqueous solution. The etching treatment was based on our previous reported protocol (Zhang, et al., Science 2015, 349, 412-416; Wang, et al., Nano Lett. 2016, 16, 1467-1471). Typically, Pd@Pt nanoplates were added in a solution consisting of $FeCl_3$, KBr, PVP, and HCl. Among the solution, $FeCl_3$ and KBr were wet etchants. HCl was added to prevent the hydrolysis of iron ions and PVP was used for better dispersion of nanocrystals. Then the etching was conducted at 80° C. for a period of time. After 1 h etching treatment, Pt-based nanocages can be obtained when using Pd@Pt nanoplates from polyol-based system as templates (FIGS. 26A-26F). TEM image in FIG. 26A indicates that the nanocages still retained the hexagonal shape during the etching process and there were some small holes on surfaces of nanocages. As shown in FIG. 26C, the wall thickness of nanocages along the top and bottom faces is about 5 atomic layers, while the side wall thickness of nanocages is about 8 atomic layers (FIG. 26E). The wall thickness of the nanocage is slightly thicker than that of Pt shell deposited on Pd nanoplate, which can be attributed to the interdifusion and alloying between Pt and Pd atoms, as well as the holes in the walls (Zhang, et al., Science 2015, 349, 412-416). EDX mapping (FIG. 26F) demonstrated that the nanocages were made of Pt—Pd alloy.

Figures 27A, 27B, 27C, 27D:
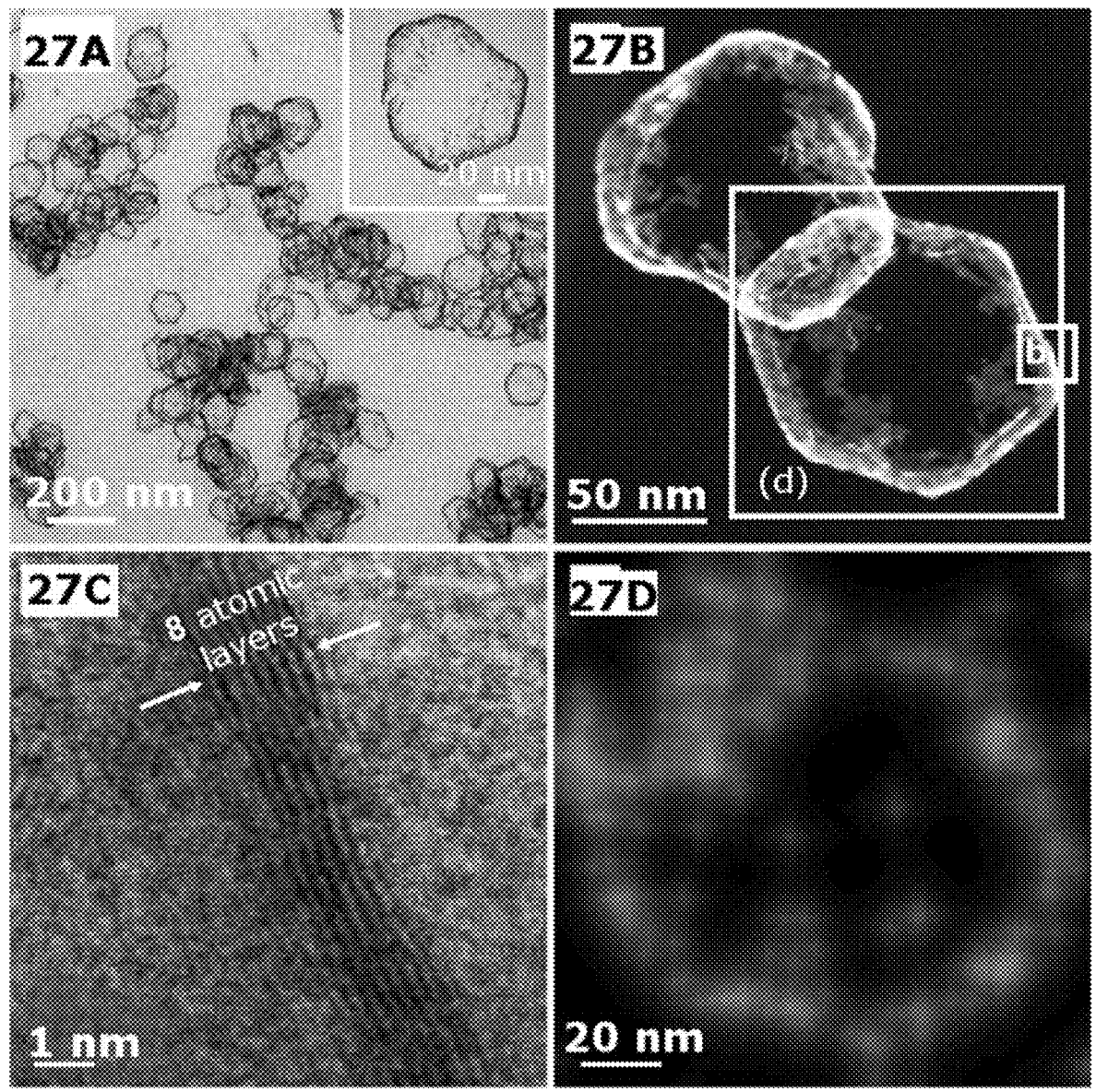
FIGS. 27A-27D show structural analyses of the Pt nanoframes derived from Pd@Pt nanoplates in water-based system.

When we used the same condition to etch Pd@Pt nanoplates from water-based system, nanoframes can be obtained after conducting the etching for only 6 min. TEM image in FIG. 27A indicates that both Pd cores and most of Pt atoms on the top and bottom faces of nanoplates were etched away. HAADF-STEM image in FIG. 27B further confirms the structure of nanoframes. Bright filed STEM image (FIG. 27C) of nanoframes demonstrates that the edge thickness of nanoframes is about 8 atomic layers. EDX-mapping showes that the nanoframes are only made of Pt (FIG. 27D).

Figure 28A:
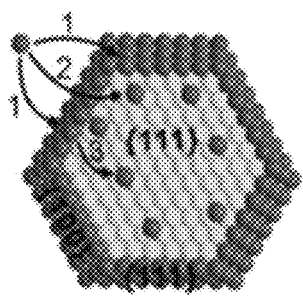
FIGS. 28A-28B show schematic illustration of the formation of Pd@Pt nanoplate, and Pt-based nanocage and nanoframe.
Figure 28B:
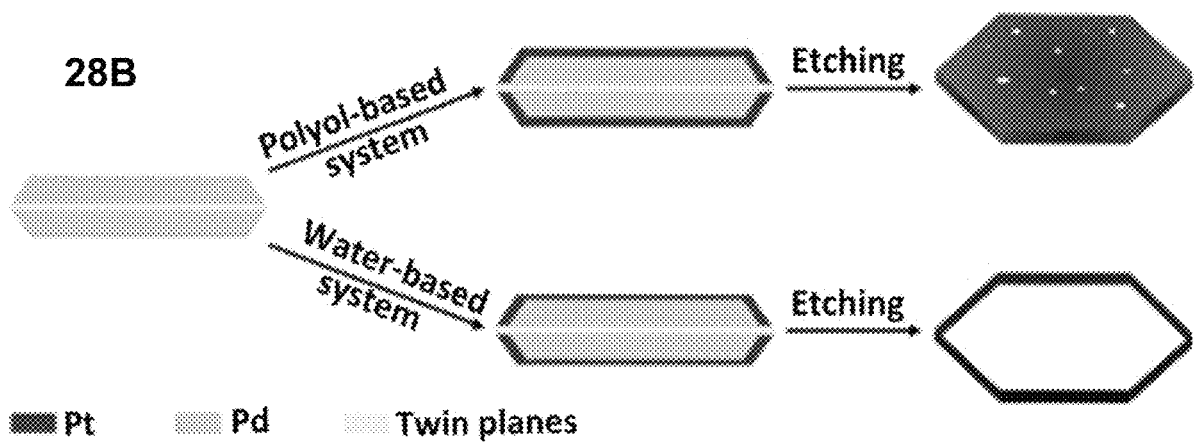

Mechanistic Analysis for the Formation of Pd@Pt Nanoplates, Pt-Based Nanocages and Nanoframes The different etching products derived from Pd@Pt nanoplates in polyol-based and water-based systems can be attributed to the different growth behaviors of Pt shells on the Pd plates in the two synthetic systems. FIG. 28A shows a plausible mechanism responsible for the formation of Pd@Pt nanoplate. There are three possible pathways for Pt atoms during Pt coating on Pd plate: (1) atomic deposition on the side faces, (2) atomic deposition on the top and bottom faces, and (3) surface diffusion. In polyol-based system, due to the strong reducing agent (AA) and high temperature (200° C.), the Pt(IV) precursor should be reduced immediately once its introduction to the reaction solution. Therefore, the deposition rate of Pt atoms is mainly determined by the injection rate of Pt precursor. Due to the existence of twin planes on the six sides of Pd plate, more Pt atoms tend to be deposited on the side faces. Then the deposited Pt atoms on the side faces can diffuse to the top and bottom faces of nanoplate in the reaction environment of 200° C. As the diameter of Pd nanoplates (57-147 nm) was larger than that of other Pd seeds (<20 nm) we reported, here we injected Pt precursor solution at a relatively slow rate (1.5 mL/h) to give Pt atoms enough time to diffuse across the top and bottom faces, resulting in conformal deposition of Pt shell on the Pd nanoplate (Xie, et al., Nano Lett. 2014, 14, 3570-3576; Park, et al., Nano 2015, 9, 2635-2647; Wang, et al., Nat. Commun. 2015, 6, 7594; Wang, et al., J. Am. Chem. Soc. 2015, 137, 15036-15042). In water-based system, Pt(IV) precursor was added to the reaction solution in one shot. The slow reduction rate associated with a weak reducing agent (CA) contributed to the epitaxial growth of Pt on Pd, instead of Pt self-nucleation. In this process, more Pt atoms were deposited on side faces due to the twin planes. However, owing to the low reaction temperature (80° C.), it is difficult for Pt atoms deposited on side faces to diffuse across the top and bottom faces, leading to thicker Pt shell on side faces relative to the top and bottom faces (FIG. 28B).

Density functional theory calculations suggest that the etching of Pd@Pt core-shell nanocrystals is initiated via a mechanism that involves the formation of surface vacancies (Yin, et al., *Science* 2004, 304, 711-714; Chen, et al., *Science* 2014, 343, 1339-1343; Lu, et al., *Nano Lett.* 2007, 7, 1764-1769; Xie, et al., *Angew Chem., Int. Ed.* 2012, 51, 10266-10270; Zhang, et al., *Science* 2015; 349, 412-416). Similar to the formation of cubic/octahedral/icosahedral nanocages derived from Pd@Pt cubes/octahedra/icosahedra, Pt—Pd intermixing and/or coreduction of Pt and Pd could also occur during Pt deposition on Pd nanoplates (Zhang, et al., *Science* 2015, 349, 412-416; Wang, et al., *Nano Lett.* 2016; 16, 1467-1471). For Pd@Pt nanoplates from polyol-based system, the etching process can involve (1) the formation of surface vacancies when etchants attack Pd atoms in the outermost layer, (2) the integration of vacancies to form atomic-wide channels for etching away more Pd atoms, (3) the formation of larger channels for the removal of Pd bulk, and (4) atom reconstruction and the alloying of Pt—Pd (Zhang, et al., *Science* 2015; 349, 412-416). Finally, Pt—Pd alloyed nanocages can be obtained. In contrast, for Pd@Pt nanoplates from water-based system, Pt shells may contain more Pd atoms due to the Pt—Pd intermixing and/or coreduction of Pt and Pd. When Pd@Pt nanoplates from water-based system were attacked by etchants, many vacancies and large channels could be generated and thus Pd cores were etched away quickly. As Pt shells on the side faces were thicker than that on top and bottom faces, Pt shells on the side faces could be retained while Pt shells on top and bottom faces were broken because of their weak mechanical strength, resulting in the formation of nanoframes. In this case, the etching process was so quick that prevented the alloying of Pt and Pd atoms.

Conclusions

Pt atoms can be conformally deposited on Pd nanoplates using two different protocols based on polyol and water, respectively. In polyol-based system, the conformal deposition of Pt shells as thin as 4-7 atomic layers can be attributed to the strong reducing power of agent and the slow injection rate of Pt(IV) precursor, as well as high reaction temperature. In contrast, Pd@Pt nanoplates can be obtained in water-based system due to the relatively weak reducing agent. More Pt atoms tend to stay on the side faces of Pd nanoplates because of twin planes and low reaction temperature, resulting in the thicker Pt shells on the side faces of Pd nanoplates than that on top and bottom faces. After etching treatment, Pt—Pd nanocages with walls as thin as 5 atomic layers and Pt nanoframes with edge thickness of 8 atomic layers can be prepared using Pd@Pt nanoplates from polyol-based and water-based systems as templates, respectively. Compared with Pt shells of Pd@Pt nanoplates from polyol-based system, Pt shells of Pd@Pt nanoplates from water-based system may contain more Pd atoms, leading to fast etching rate and the formation of Pt nanoframes. These results provide us a new strategy to control the structures of hollow nanocrystals at atomic scale by designing templates.

Example 5: Platinum-Based Nanocages with Subnanometer-Thick Walls and Well-Defined, Controllable Facets A cost-effective catalyst should have a high dispersion of the active atoms, together with a controllable surface structure for the optimization of activity, selectivity, or both. We fabricated nanocages by depositing a few atomic layers of platinum (Pt) as conformal shells on palladium (Pd) nanocrystals with well-defined facets and then etching away the Pd templates. Density functional theory calculations suggest that the etching is initiated via a mechanism that involves the formation of vacancies through the removal of Pd atoms incorporated into the outermost layer during the deposition of Pt. With the use of Pd nanoscale cubes and octahedra as templates, we obtained Pt cubic and octahedral nanocages enclosed by {100} and {111} facets, respectively, which exhibited distinctive catalytic activities toward oxygen reduction.

Here we demonstrate this concept by coating the surfaces of Pd nanoscale cubes and octahedra with four atomic layers of Pt, followed by selective removal of the Pd templates. Density functional theory (DFT) calculations suggest that the etching is initiated via a mechanism that involves the formation of surface vacancies by etching away Pd atoms incorporated into the Pt shells due to intermixing and/or co-reduction Yin, et al., *Science* 2004, 304, 711-714). We could obtain Pt nanocages with walls as thin as three atomic layers (0.7 nm thick), with their surfaces terminated in {100} or {111} facets. The nanocages show distinctive specific activities toward ORR depending on the exposed facet, while the activity and durability are both enhanced relative to a commercial Pt/C catalyst.

Materials and Methods

We first synthesized Pd cubes with an average edge length of 18.2 nm (Jin, et al., *Nano Res.* 2011, 4, 83-91). Four atomic layers of Pt were then deposited on the surface of each Pd cube as a conformal shell by introducing a Pt(IV) precursor at 200° C. (Xie, et al., *Nano Lett* 2014, 14, 3570-3576). The use of a slow injection rate and a relatively high temperature resulted in the formation of core-shell cubes with atomically flat surfaces (Xia, et al., *Proc. Natl. Acad. Sci. U.S.A.,* 2013, 110, 6669-6673). When subjected to etching, the Pd templates could be selectively removed to leave behind Pt cubic nanocages with ultrathin walls covered by {100} facets.

Figures 29A, 29B, 29C, 29D:
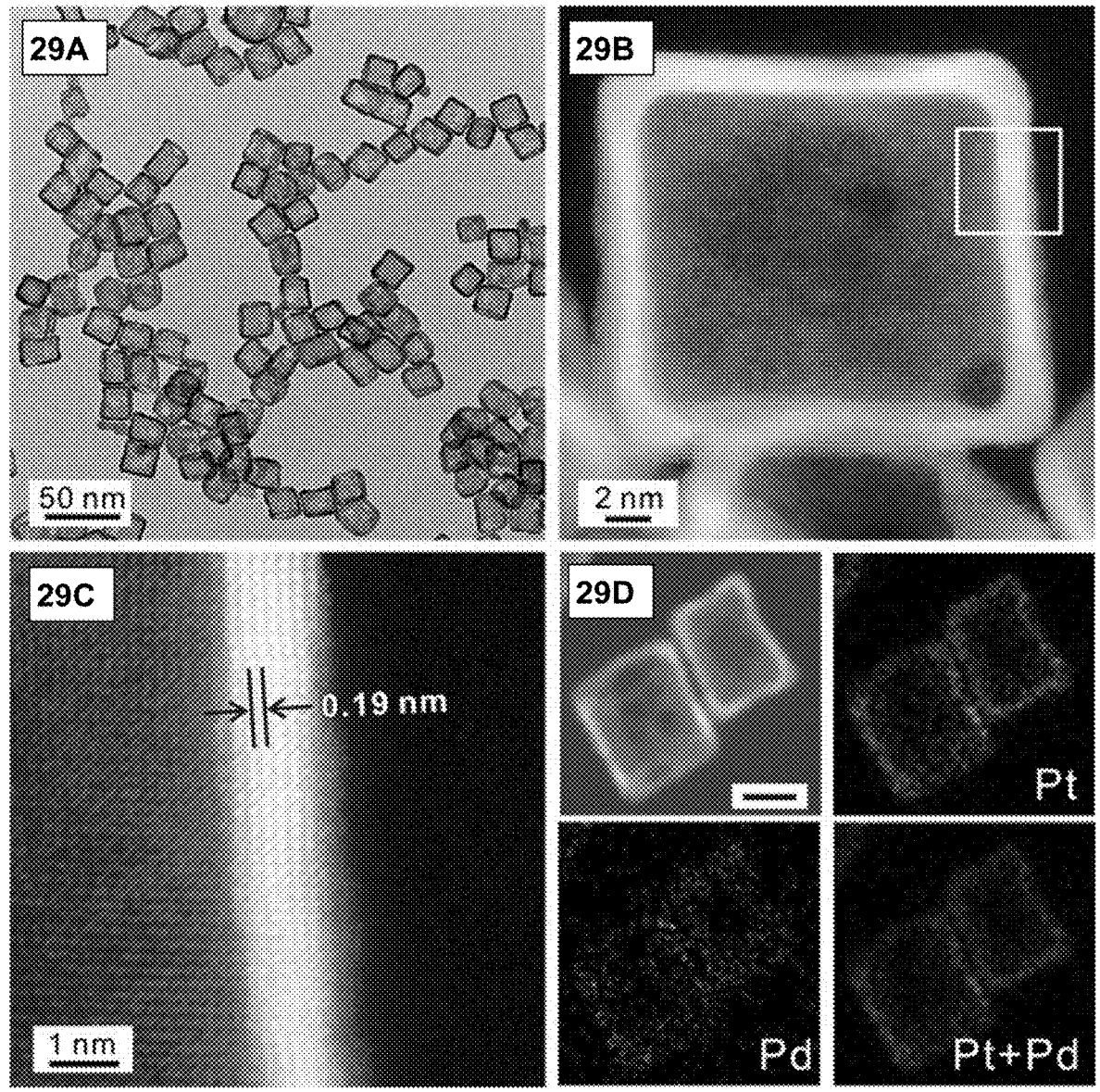
FIGS. 29A-29D show structural and compositional analyses of Pt cubic nanocages.

FIG. 29A shows a transmission electron microscopy (TEM) image of Pt cubic nanocages derived from Pd@Pt$_{4L}$ cubes using a standard procedure. The nanocages had an average edge length of 20.2 nm together with small holes on the surfaces. The high-angle annular dark-field scanning TEM (HAADF-STEM) image (FIG. 29B) taken from one of the nanocages revealed a periodic lattice extending across the entire surface, suggesting that the single-crystal structure of the Pd template was transferred to the Pt shell. The uniform contrast across the side face indicates that essentially all the Pd atoms in the core had been removed, except for those alloyed with Pt atoms in the walls. The atomic-resolution HAADF-STEM image (FIG. 29C) recorded from the region boxed in FIG. 29B indicates a wall thickness of about 1 nm, corresponding to six atomic layers along the [100] direction. The lattice spacing of 0.19 nm can be assigned to the (200) planes of face-centered cubic (fcc) Pt.

Although only four atomic layers of Pt were initially deposited on the surface of each Pd template, the wall thickness increased to six atomic layers because of the following factors: the inter-diffusion and alloying between Pt and Pd, and thus a small amount of Pd remaining in the walls; the inclusion of small holes in the side faces; and the migration of atoms from side faces to ridges, making the walls appear thicker under TEM. Elemental mapping based on energy-dispersive X-ray spectroscopy (EDS) confirmed that the nanocages were composed of a Pt—Pd alloy (FIG. 29D). Inductively-coupled plasma mass spectrometry (ICP-MS) analysis gave Pt mass percentages of 93.6% and 33.9% for the nanocages and core-shell cubes, respectively.

We hypothesize that the etching is initiated by oxidizing the Pd atoms in the outmost layer of the Pt shell to generate vacancies, followed by diffusion of Pd atoms from underlying layers to generate more vacancies (Yin, et al., *Science* 2004, 304, 711-714). This process is similar to the mechanism proposed by Strasser et al. for the electrochemical dealloying of Co—Pt core-shell nanoparticles (Heggen, et al., *J. Phys. Chem C* 2012, 116, 19703-19083), but in our case we were able to completely remove the Pd cores due to the involvement of ultrathin Pt shells and the persistence of pores in the shells. Previous work by Erlebacher et al. emphasized the role of mobile, low-coordinated metal atoms in a dealloying process, as movement and clustering of these species continually exposed less noble atoms for dissolution (Erlebacher, et al., *Nature* 2001, 410, 450-453). These observations may explain the restructuring of our atomic-width vacancies to larger pores, allowing more bulk-like dissolution of Pd from the core. In contrast, our system consists of ultrathin, smooth Pt surfaces with a relatively low Pd concentration. The amount of low-coordinated Pt should therefore be low, and surface restructuring is limited to areas near the atom-wide channels formed in the initial stage. We performed DFT calculations to evaluate the diffusion barrier of a Pd atom though the Pt shell using a fully-relaxed Pt(100) membrane of four atomic layers as a model system. We examined a number of processes (e.g., one-to-one atom exchange, as well as three-body and four-body rotations), and concluded that i) diffusion of Pd and Pt atoms through Pt, at 100° C., must be vacancy-mediated, and ii) the lowest diffusion barrier is for Pd through Pt (0.88 eV). Previous experimental studies of Pd—Pt inter-diffusion also found that Pd had a higher diffusion rate in Pt than in Pd (Baheti, et al., *J. Mater. Sci. Mater. Electron.* 2013, 24, 2833-2838.

Because diffusion must occur at vacancies in our model, we also considered the mechanism by which the vacancies arise. We believe that Pt—Pd intermixing occurs during the deposition of Pt (FIG. 30A), rather than after the formation of perfect Pt overlayers. The deposition was conducted at a relatively high temperature to give Pt atoms an opportunity to spread across the Pd surface and thus grow in a layer-by-layer fashion (Xia, et al., *Proc. Natl. Acad. Sci. U.S.A* 2013, 110, 6669-6673). Using DFT, we obtained an energy barrier of 0.99 eV for the diffusion of Pt adatoms across a Pd(100) surface (a "hopping" mechanism). However, a Pt adatom can instead substitute into the Pd surface, pushing the Pd atom to a nearby hollow surface site with a barrier of just 0.74 eV (a "substitution" mechanism); this process is exothermic by 0.38 eV. As a consequence of these two mechanisms, some Pd atoms will be incorporated into the Pt shell as each Pt overlayer is formed. The activation energy barrier for Pt substitution increases as the Pt coverage increases, so not all the Pd atoms will be substituted by Pt atoms when each additional layer of Pt is deposited. Alternatively, Pd atoms can be incorporated into the Pt shell through a co-reduction mechanism. Since the synthesis was conducted in air at 200° C., a trace amount of Pd atoms on the templates could be oxidized and released into the reaction solution as Pd(II) ions prior to the introduction of Pt(IV) precursor. Subsequently, the Pd(II) and Pt(IV) ions would be co-reduced and deposited onto the templates to generate Pt shells doped with Pd atoms. Prior to the introduction of Pt(IV) precursor, however, the concentration of Pd(II) ions in the reaction solution was too low to be detected by ICP-MS.

Figures 30A, 30B, 30C, 30D, 30E, 30F:
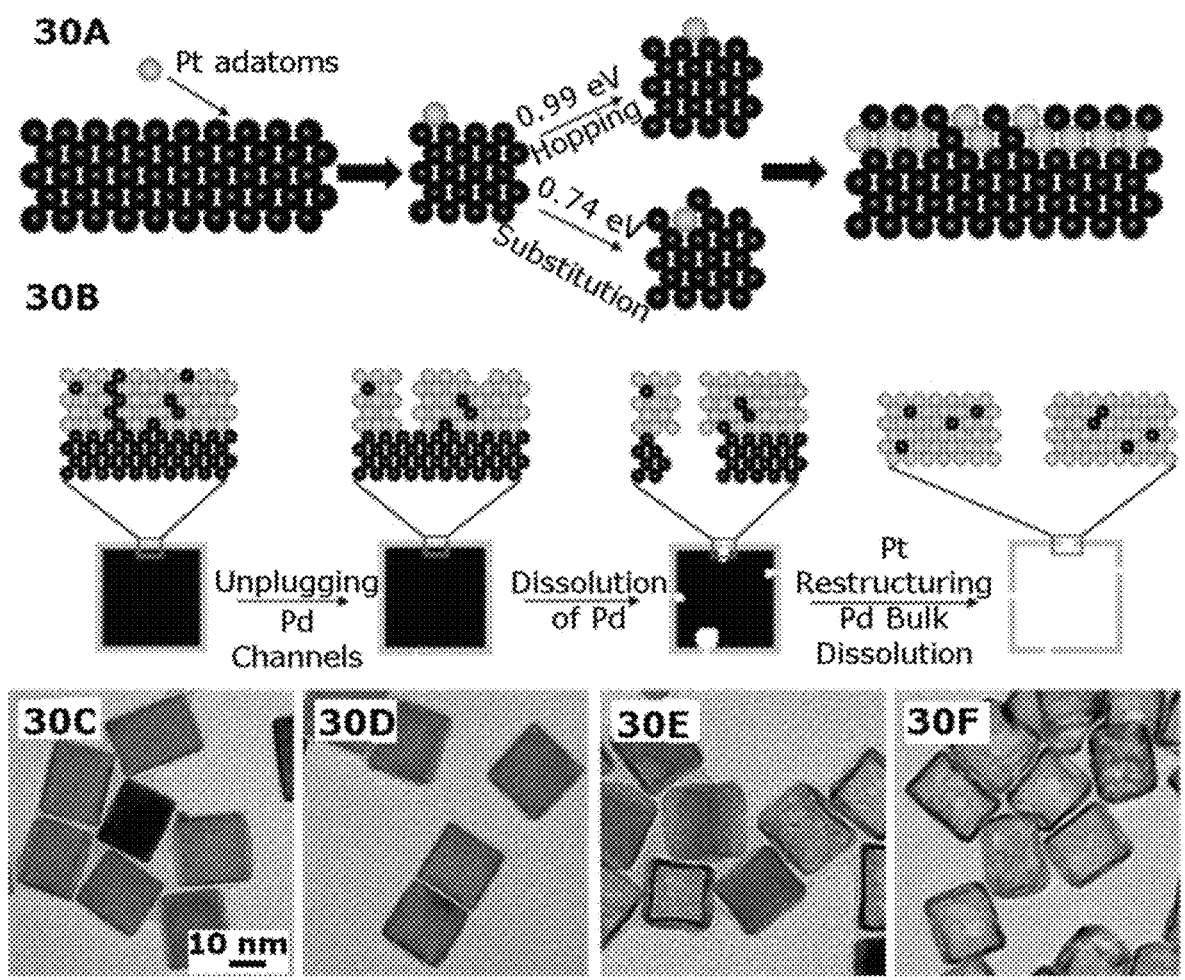
FIGS. 30A-30F show mechanistic details involved in the deposition and etching processes, and TEM images of the products obtained after etching for different periods of time.

FIG. 30B illustrates a plausible mechanism involved in the formation of a Pt cubic nanocage from a Pd@Pt$_{nL}$ cube. During Pt deposition, some Pd atoms are incorporated into the Pt overlayers through intermixing and/or co-reduction. Upon contact with the etchant, the Pd atoms in the outermost layer are oxidized to generate surface vacancies. The underlying Pd atoms then diffuse to these vacancies and are continuously etched away, leaving behind atom-wide channels. In the early stage of etching, the diffusion of Pd through these channels leads to a Kirkendall effect since Pd diffuses outward faster than Pt diffuses inward, creating a void in the Pd template. Over time, the channels will grow in size (and also reconstruct) to allow direct corrosion of Pd from the core. FIG. 30C-30D shows TEM images of the initial Pd@Pt$_{4L}$ cubes and the same batch of sample after etching with a standard procedure for 10 min, respectively. There were essentially no changes to the shape, morphology, or structure of the core-shell cubes. According to ICP-MS analysis, the Pd mass percentage of this sample was 63.5%, which only dropped slightly from the initial value of 65.1%. The data suggest that the initial etching only involved "unplugging" of the existing Pd atoms on the outermost layer of the Pt shell. In a control experiment, we noticed that the Pd etching could be initiated at a much faster rate and at a lower temperature by co-titrating Pd(II) and Pt(IV) precursors at a molar ratio of 1:99 during the deposition of Pt Our results also indicate that the etching rate could be manipulated by varying the molar ratio of Pd(II) to Pt(IV) precursors.

Once initiated, the surface layers begin to undergo reconstruction facilitated by the high etching temperature, enlarging the channels to 1-3 nm wide for direct corrosion of Pd. As shown in FIG. 30E, most of the Pd@Pt$_{4L}$ cubes had evolved into hollow structures after etching for 30 min. At the same time, the Pd mass percentage quickly dropped to 21.9%. Further etching led to Pt cubic nanocages characterized by a completely hollow interior and porous walls. FIG. 30F shows a TEM image of the product obtained after etching for 3 h, and the Pd mass percentage had dropped to 6.4%. At this point, the removal of Pd was essentially completed because the Pd mass percentage did not show any change when the etching time was prolonged to 4 h. We noted that Pt nanocages derived from Pd@Pt$_{2-3L}$ cubes tended to collapse when the standard procedure was used for etching, but could be largely preserved under milder etching conditions.

Figures 31A, 31B, 31C, 31D:
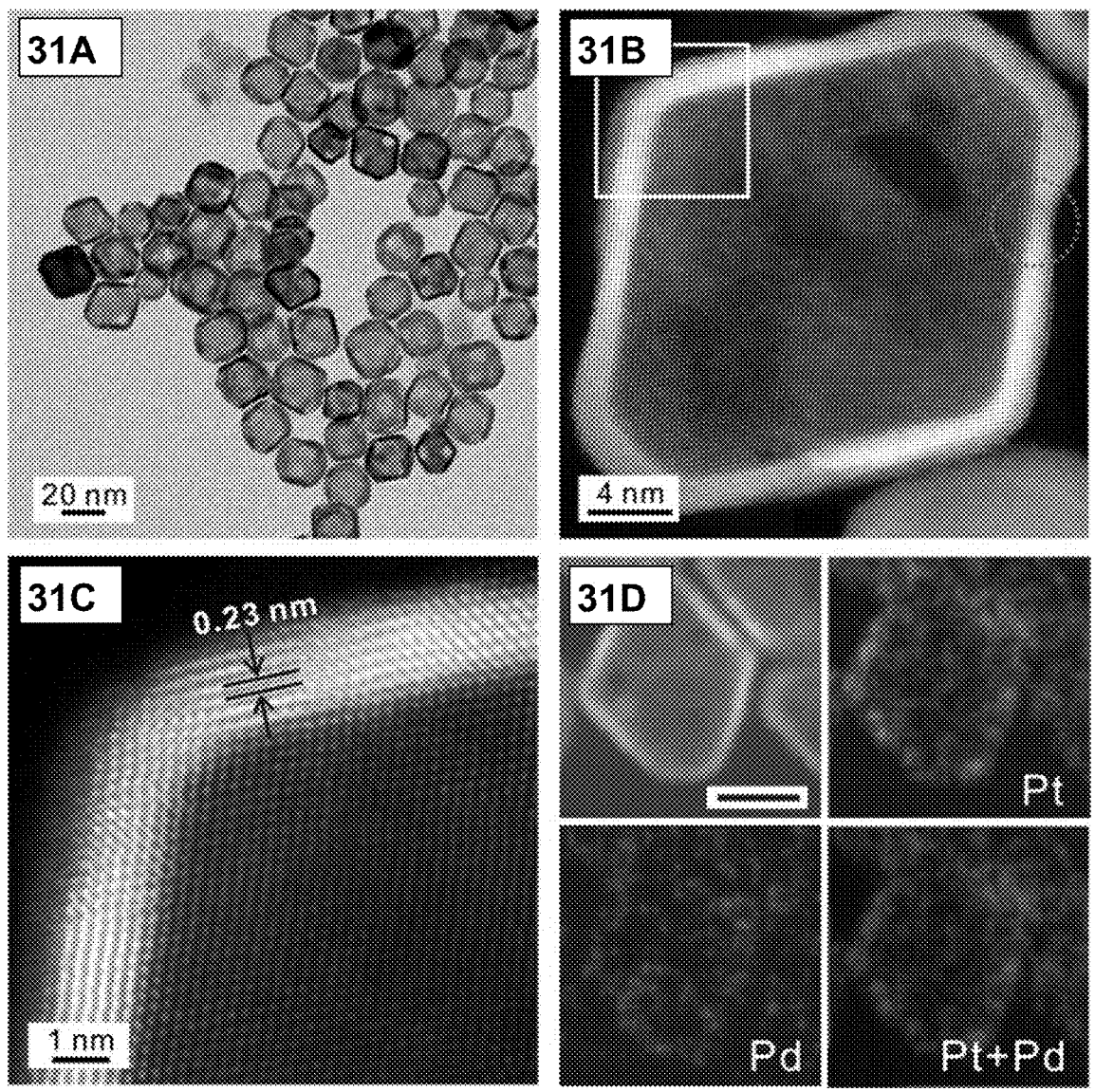
FIGS. 31A-31D show structural and compositional analyses of Pt octahedral nanocages.

The arrangement of atoms on the surface can affect both catalytic activity and selectivity; for example, Pt(111) is more active toward ORR than Pt(100) (Markovic, et al, *Surf. Sci. Rep.* 2002 45, 117-229). Thus, we extended Pt deposition and Pd etching procedures to the preparation of Pt octahedral nanocages enclosed by {111} facets (FIG. 31A). We prepared Pd@Pt$_{4.5L}$ octahedra from Pd octahedra of 19.4 nm in edge length (Jin, et al., *Nano Res.* 2011, 4, 83-91; Erlebacher, et al., *Nature* 2001, 410, 450-453) and then etched away the Pd templates using a standard procedure. The HAADF-STEM image in FIG. 31B shows a lattice spacing of 0.23 nm that can be assigned to the {111} planes of fcc Pt. The atomic-resolution HAADF-STEM image in FIG. 31C indicates the presence of seven atomic layers of Pt in the shell. The inclusion of Pd in the walls was confirmed by EDS (FIG. 31D). According to ICP-MS analysis, the Pd mass percentage of the octahedral nanocages was only 9.1%, indicating the completion of template removal. By switching to Pd@Pt$_{2-3L}$ octahedra, we were able to obtain Pt octahedral nanocages with a wall thickness of only three atomic layers (or 0.7 nm along the [111] direction) using a standard procedure.

We used ORR as a model reaction to demonstrate the ability to engineer the catalytic activity of such Pt nanocages by manipulating the type of facet exposed on the surface. We benchmarked their catalytic performance against a commercial Pt/C. We used cyclic voltammetry (CV) to measure the electrochemically active surface area (ECSA) of each catalyst. The specific ECSAs of cubic and octahedral nanocages were measured as 46.8 and 38.2 $m^2 g^{-1}{}_{Pt}$, respectively, which are comparable to the value of 44.2 $m^2 g^{-1}{}_{Pt}$ reported for $Pt_3Ni$ nanoframes (Chen, et al., *Science* 2014, 343, 1339-1343). Although the surfaces of the nanocages are covered by small holes (about 20% of the total surface area), their ECSAs were still similar to those of the corresponding Pd@$Pt_{nL}$ NCs, 39.7 and 38.0 $m^2 g^{-1}{}_{Pt}$, respectively, for the cubic and octahedral systems, because of the contribution from the inner surface (Xie, et al., *Nano Lett* 2014, 14, 3570-3576; Park, et al., *ACS Nano,* 2015; 9, 2635-2647). The specific ECSAs of the nanocages were also on par with that of the Pt/C catalyst (56.8 $m^2 g^{-1}{}_{Pt}$) even though their sizes differ more than sevenfold (20 vs. 2.8 nm).

Figure 32A:
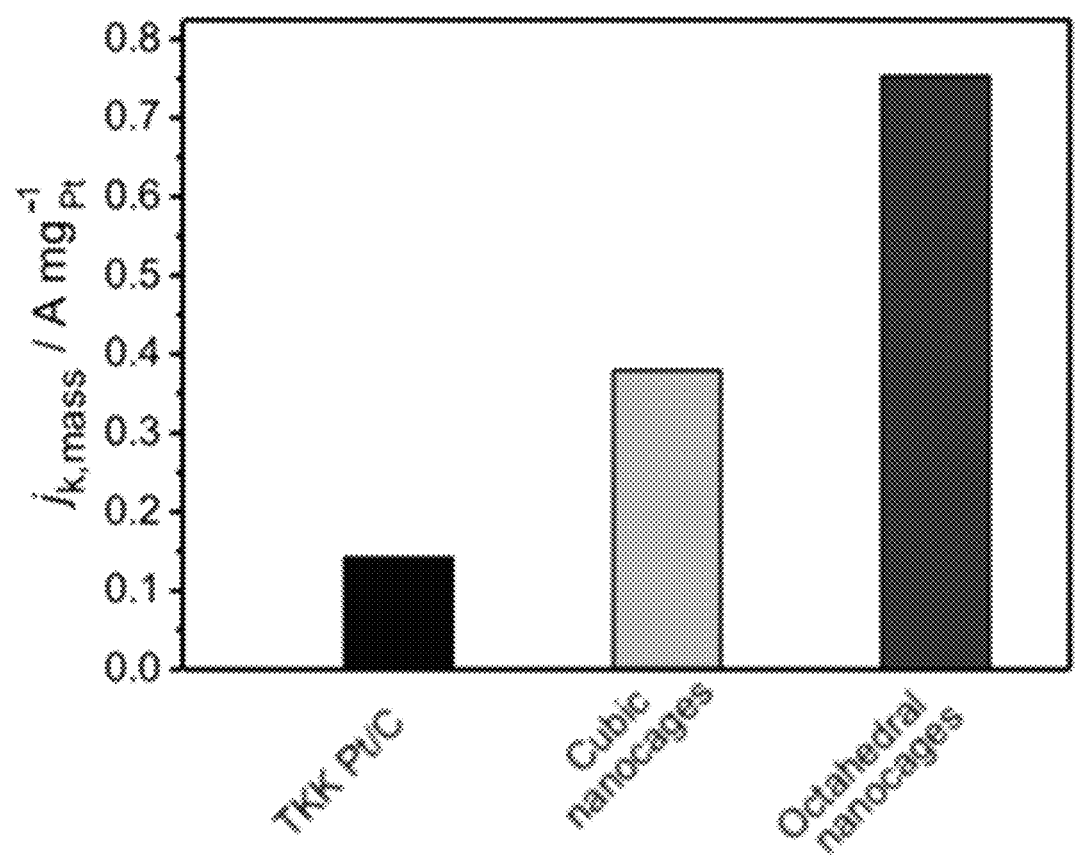
FIGS. 32A-32D show Electrocatalytic properties of Pt nanocages relative to a commercial Pt/C catalyst.
Figure 32B:
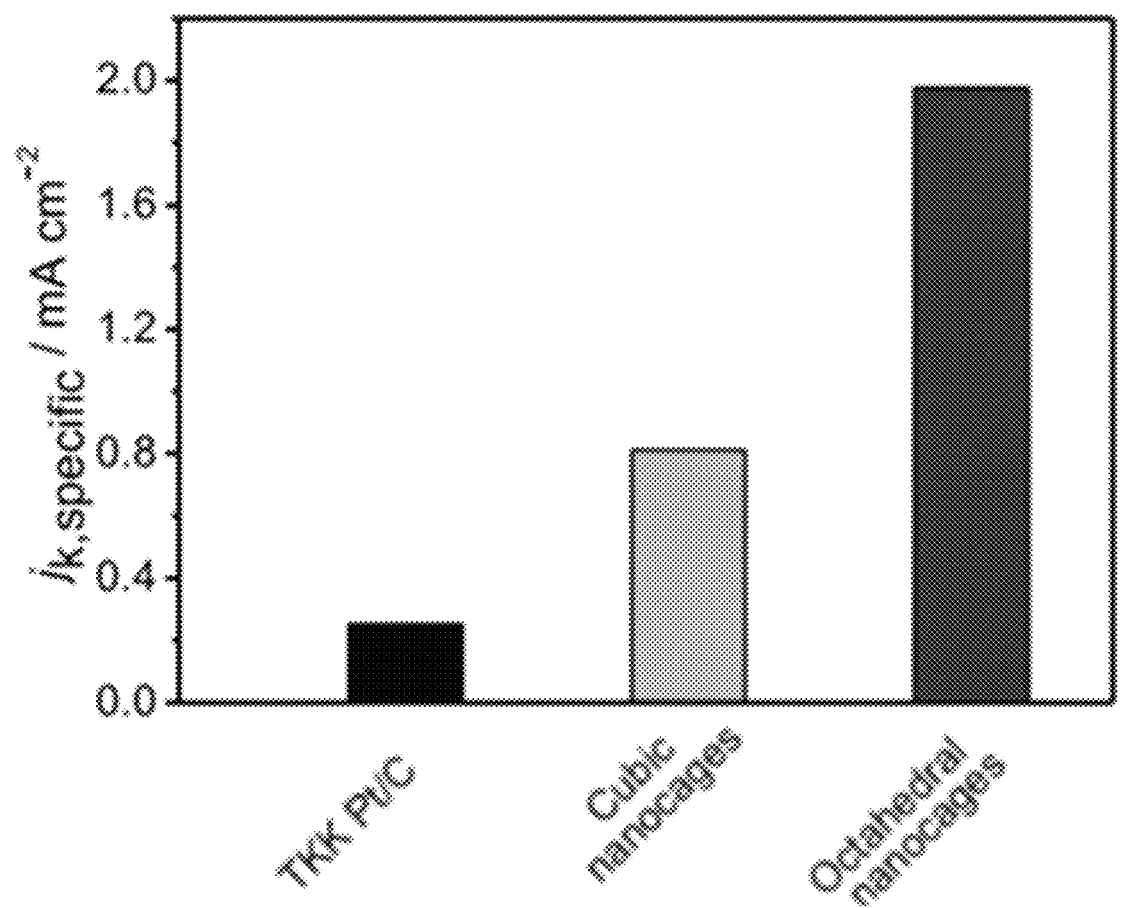

We then evaluated the electrocatalytic performance of the different catalysts toward ORR. As displayed in FIG. 32A, the octahedral nanocages had mass activity of 0.75 A $mg^{-1}{}_{Pt}$ at 0.9 V vs. reversible hydrogen electrode (RHE), which was five times greater than the Pt/C reference (0.14 A $mg^{-1}{}_{Pt}$). The results demonstrate that the transformation from Pd@$Pt_{nL}$ NCs into Pt nanocages could greatly improve the catalytic performance toward ORR in terms of Pt mass and materials cost. This catalytic system, however, needs to be optimized before it can compete with the more active (but, more complex) system based upon Pt—Ni alloys (Chen, et al., *Science* 2014, 343, 1339-1343; Zhang, et al., *Nano Lett.* 2010, 10, 638-644; Wu, *Nano Lett.* 2011, 11, 798-802; Choi, et al., *Nano Lett.* 2013, 13, 3420-3425; Cui, et al., *Nat. Mater.* 2013, 12, 765-771; Gan, et al., *Science* 2014, 346, 1502-1506; Han, et al., *Energy Environ. Sci* 2015, 8, 258-266. As shown in FIG. 32B, the octahedral nanocages exhibited the highest specific activity, with a value of 1.98 mA $cm^{-2}$ at 0.9 $V_{RHE}$, which was almost eight times greater than that of the Pt/C (0.25 mA $cm^{-2}$). The almost two-fold difference in specific activity between the octahedral and cubic nanocages clearly demonstrates the feasibility to control the catalytic activity of such nanocages through facet engineering. We used DFT to analyze the ORR specific activities of the nanocages by calculating the energetics of OH removal, which has been shown to be the rate-determining step on similar surfaces (Xie, et al., *Nano Lett.* 2014, 14, 3570-3576; Park, et al., *ACS Nano* 2015; 9, 2635-2647). Relative to their core-shell precursors, the nanocage models showed substantially enhanced activity, which is attributed to the shortening of Pt—Pt interatomic distances.

Figure 32C:
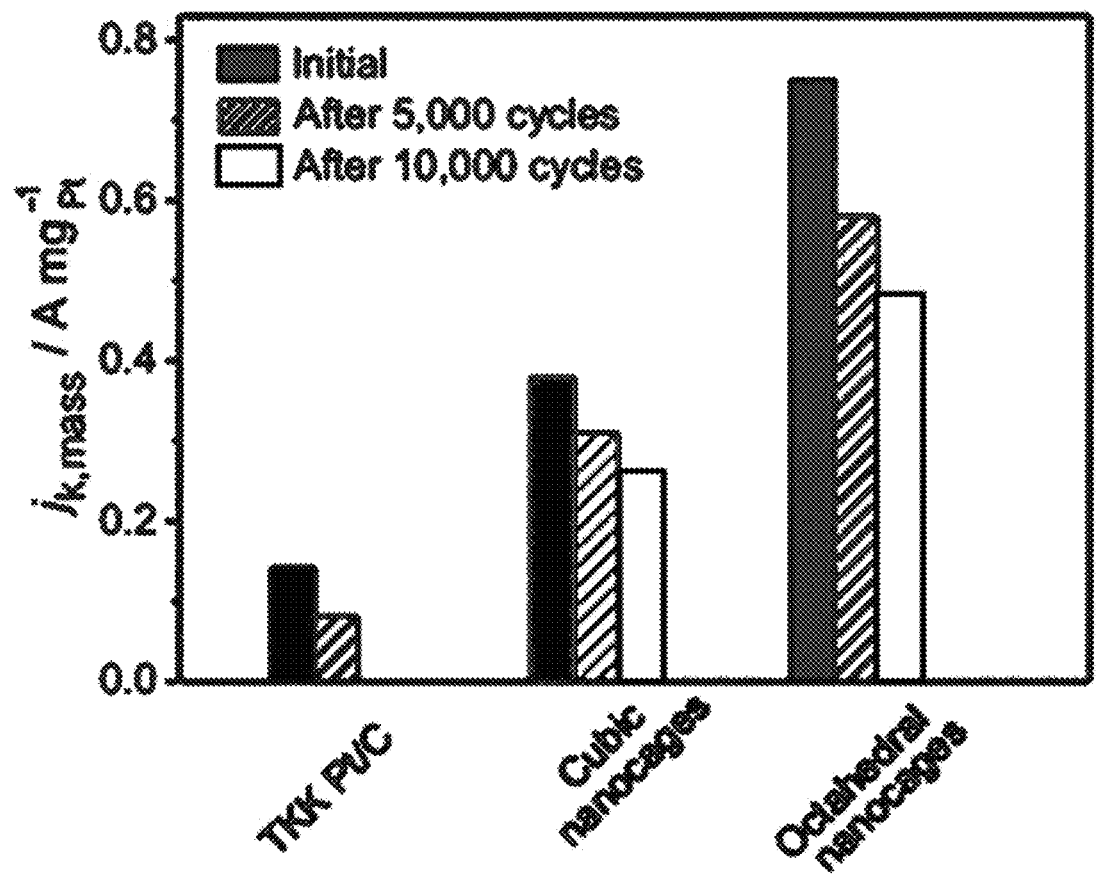
Figure 32D:
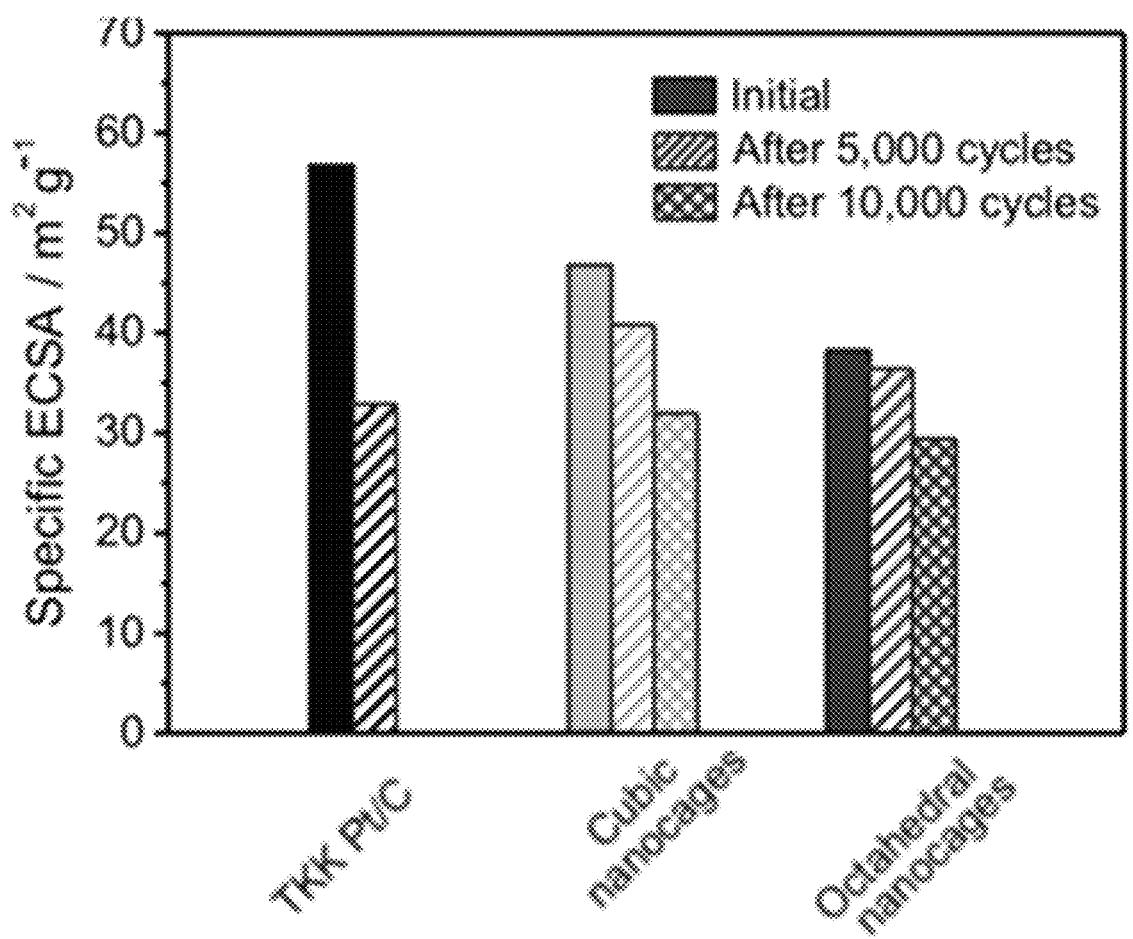

We evaluated the long-term stability of the catalysts through an accelerated durability test (FIG. 32C-32D). The Pt octahedral nanocages showed the best performance, with the ORR mass activity only reduced by 36% after 10,000 cycles, still showing 3.4-fold enhancement relative to the pristine Pt/C. The ECSAs of the cubic and octahedral nanocages only dropped by 13 and 6% after 5,000 cycles, and by 32 and 23% after 10,000 cycles, respectively. During the durability test, the holes in the walls of the nanocages were slightly enlarged. These results demonstrate that the excellent durability associated with the core-shell catalysts was not affected by the selective removal of Pd cores.

Example 6: Gold-Based Cubic Nanoboxes with Well-Defined Openings at the Corners and Ultrathin Walls Less than 2 nm Thick We report a facile synthesis of Au-based cubic nanoboxes as small as 20 nm for the outer edge length, together with well-defined openings at the corners and walls fewer than ten atomic layers (or <2 nm) in thickness. The success relies on the selective formation of $Ag_2O$ at the corners of Ag nanocubes, followed by the conformal deposition of Au on the side faces in a layer-by-layer fashion. When six atomic layers of Au are formed on the side faces to generate Ag@Au core-shell nanocubes, we can selectively remove the $Ag_2O$ patches at the corner sites using ascorbic acid, making it possible to further remove the Ag core by $H_2O_2$ etching without breaking the ultrathin Au shell. The resultant Au nanobox exhibits a strong plasmon resonance in the near-infrared region, consistent with computational simulations.

Here we demonstrate that $Ag_2O$ patches can be specifically generated at the corner sites of Ag nanocubes when the synthesis is conducted in the presence of NaOH at pH=11.2. Remarkably, we can selectively dissolve the $Ag_2O$ patches using a weak acid, lifting off any Au overlayers deposited on the $Ag_2O$ patches and thus exposing the Ag core at the corner sites without affecting the ultrathin Au layers on the side faces. When subjected to Ag etching with an aqueous $H_2O_2$ solution, the Ag core can be completely removed to transform the Ag@Au nanocube into a nanobox with well-defined openings at the corners. Due to the inter-diffusion between Au and Ag in physical contact, the final nanoboxes are comprised of a Au—Ag alloy, whose exact composition is controlled by the etchant used for removing Ag form the cores. This new approach works well for Ag nanocubes of 38 nm and 18 nm in edge length and the wall thickness of the nanoboxes can be readily controlled at 2 nm. These ultrathin nanoboxes with controllable openings at the corners exhibit strong optical absorption in the range of 835 to 1135 nm, making them well-suited for biomedical applications.

Chemicals and Materials.

Silver trifluoroacetate ($CF_3COOAg$, 98%), gold(III) chloride trihydrate ($HAuCl_4.3H_2O$, 99.9+%), poly(vinylpyrrolidone) (PVP) with an average molecular weight of 29,000 (PVP-29) or 55,000 (PVP-55), ethylene glycol (EG, J.T. Baker), sodium hydrosulfide hydrate (NaHS.$xH_2O$), aqueous hydrochloric acid (HCl, 37%), L-ascorbic acid (HAsc, 99%), sodium hydroxide (NaOH, 98+%), iron(III) nitrate nonahydrate ($Fe(NO_3)_3.9H_2O$, 99.95%) and hydrogen peroxide ($H_2O_2$, 30 wt. % in $H_2O$) were all purchased from Sigma-Aldrich and used as received. All aqueous solutions were prepared using deionized (DI) water with a resistivity of 18.2 MΩ·cm at 25° C.

Synthesis of Aq Nanocubes.

We used $CF_3COOAg$ as a precursor and EG as a solvent, as well as reductant, for the synthesis of Ag nanocubes. Firstly, we introduced 5 mL of EG into a 100-mL round bottom flask (ACE Glass) and heated it to 150° C. under magnetic stirring in an oil bath. Next, 0.06 mL of NaHS (3 mM in EG) was quickly injected. After 2 min, 0.5 mL of HCl (3 mM in EG) and 1.25 mL of PVP-55 (20 mg/mL in EG) were sequentially added. After another 2 min, 0.4 mL of $CF_3COOAg$ (282 mM in EG) was introduced. During the entire process, the flask was capped with a glass stopper except for the addition of reagents. Once the major LSPR peak of the Ag nanocubes had reached 436 nm, the reaction would be quenched in an ice-water bath to obtain the Ag nanocubes with an edge length of 38 nm. For the synthesis of Ag nanocubes with an edge length of 18 nm, we followed the protocol recently reported by Xia and co-workers (*J. Am. Chem. Soc.* 2016, 138, 3161-3167). After centrifuging and washing with acetone and DI water three times, the Ag nanocubes were re-dispersed in DI water for future use.

Synthesis of Ag@Au$_{3L}$ and Ag@Au$_{6L}$ Core-Shell Nanocubes.

In a typical synthesis, 2 mL of aqueous PVP-29 (29 mg/mL) solution was placed in a 23-mL glass vial, followed by the introduction of 0.5 mL of aqueous HAsc (100 mM), 0.5 mL of aqueous NaOH (200 mM), and 20 µL of the suspension of 38-nm Ag nanocubes ($4.2 \times 10^{10}$ particles per mL) under magnetic stirring. Next, 0.4 mL or 0.8 mL of aqueous HAuCl$_4$ (0.1 mM) was titrated into the reaction mixture at a rate of 0.02 mL/min using a syringe pump. After the titration had been completed, the reaction solution was continuously magnetically stirred at room temperature for 20 min. The resultant products were collected by centrifugation at 6000 rpm for 15 min, washed with DI water three times, and stored in 2.5 mL of DI water for further use.

Synthesis of Au-Based Nanoboxes.

100 µL of the as-prepared Ag©Au$_{nL}$ nanocubes ($4.2 \times 10^{11}$ particles per mL) was mixed with 0.8 mL of PVP-29k (1 mM) and 0.2 mL of HAsc (100 mM) at room temperature. After 20 min, the particles were collected by centrifugation at 6000 rpm for 20 min, followed by re-dispersion in DI water. Next, the particles were mixed with 1 mL of 3% aqueous H$_2$O$_2$ and etched for 3 h. The resultant Au nanoboxes were washed twice with DI water and re-dispersed in 0.5 mL of DI water.

Synthesis of Au-based Nanoboxes with further Deploying.

100 µL of the as-prepared Ag©Au$_{nL}$ nanocubes ($4.2 \times 10^{11}$ particles per mL) was mixed with 0.8 mL of PVP-29k (1 mM) and 0.2 mL of HAsc (100 mM) at room temperature. After 20 min, the particles were collected by centrifugation at 6000 rpm for 20 min, followed by re-dispersion in 100 µL DI water. The particles were then mixed with 1 mL of 3% aqueous H$_2$O$_2$ and etched for 3 h, the resultant nanoboxes were washed twice with DI water and re-dispersed in 1 mL of DI water. Next, 4 µL of aqueous Fe(NO$_3$)$_3$ (50 mM) was added and vortexed for a few seconds before the mixture was allowed to sit still for one hour. The products were collected by centrifugation at 12000 rpm for 20 min, followed by washing twice with DI water and then re-dispersion in 0.5 mL of DI water.

Instrumentation and Characterization.

The UV-vis-NIR spectra were collected using a LAMDA 750 (PerkinElmer, Waltham, Mass.). The quantification of Ag content was performed using an inductively coupled plasma mass spectrometer (ICP-MS, NexION 300Q, PerkinElmer, Waltham, Mass.). Transmission electron microscopy (TEM) images were taken on a Hitachi HT7700 microscope (Hitachi, Tokyo, Japan) operated at 120 kV. A conventional centrifuge (Eppendorf 5430) was used for the collection and washing of all samples. EDX analysis was performed using an Oxford Inca x-sight spectrometer with a 1 mm2 Si (Li) detector. EDX spectra were obtained under STEM mode using an accelerating voltage of 200 kV and a probe size of 1 nm. EDX mapping was conducted with 25×25 or 50×50 point scans at 1500 ms dwell time. High-angle annular dark-field scanning TEM (HAADF-STEM) images were acquired with a JEOL 2200FS STEM/TEM microscope equipped with a CEOS GmbH probe corrector.

Discrete Dipole Approximation (DDA) Calculation.

Figure 35A:
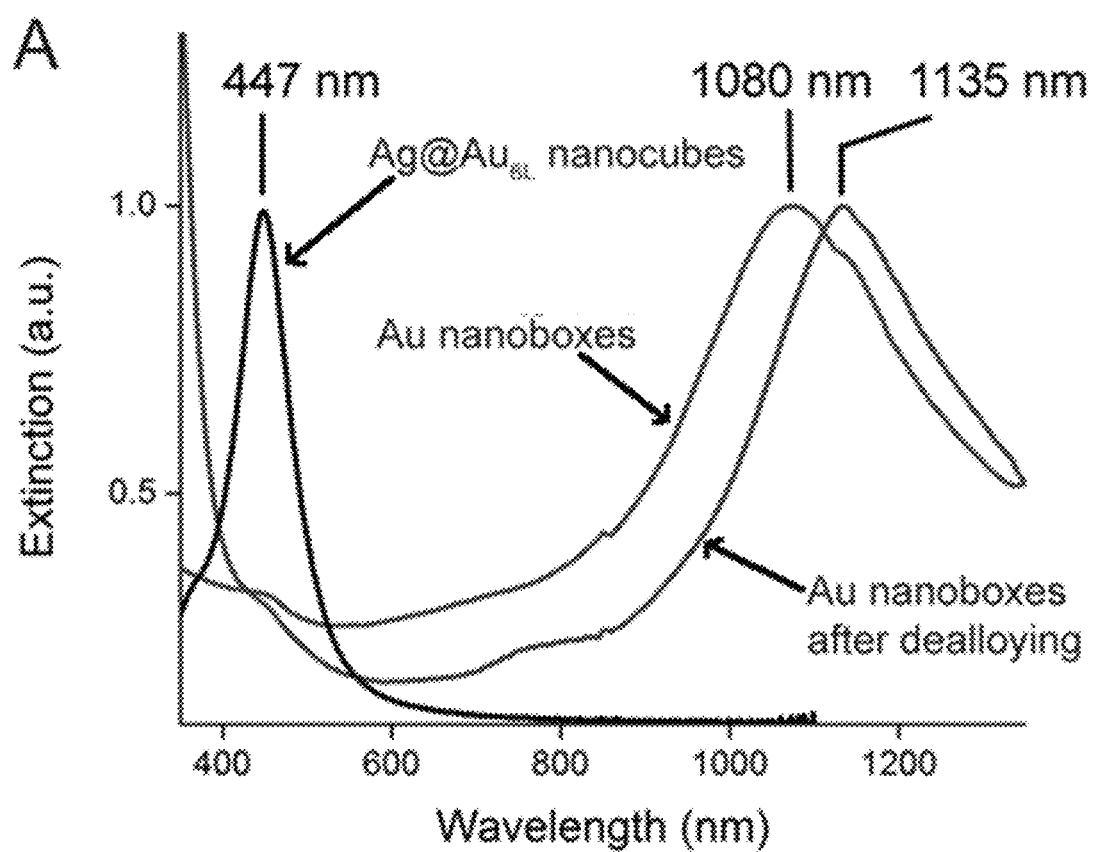
FIGS. 35A-35B show (FIG. 35A) UV-vis-NIR spectra taken from an aqueous suspension of the Ag©Au$_{6L}$ nanocubes with an average edge length of 40 nm, and Au nanoboxes before and after dealloying with Fe(NO$_3$)$_3$.
Figure 35B:
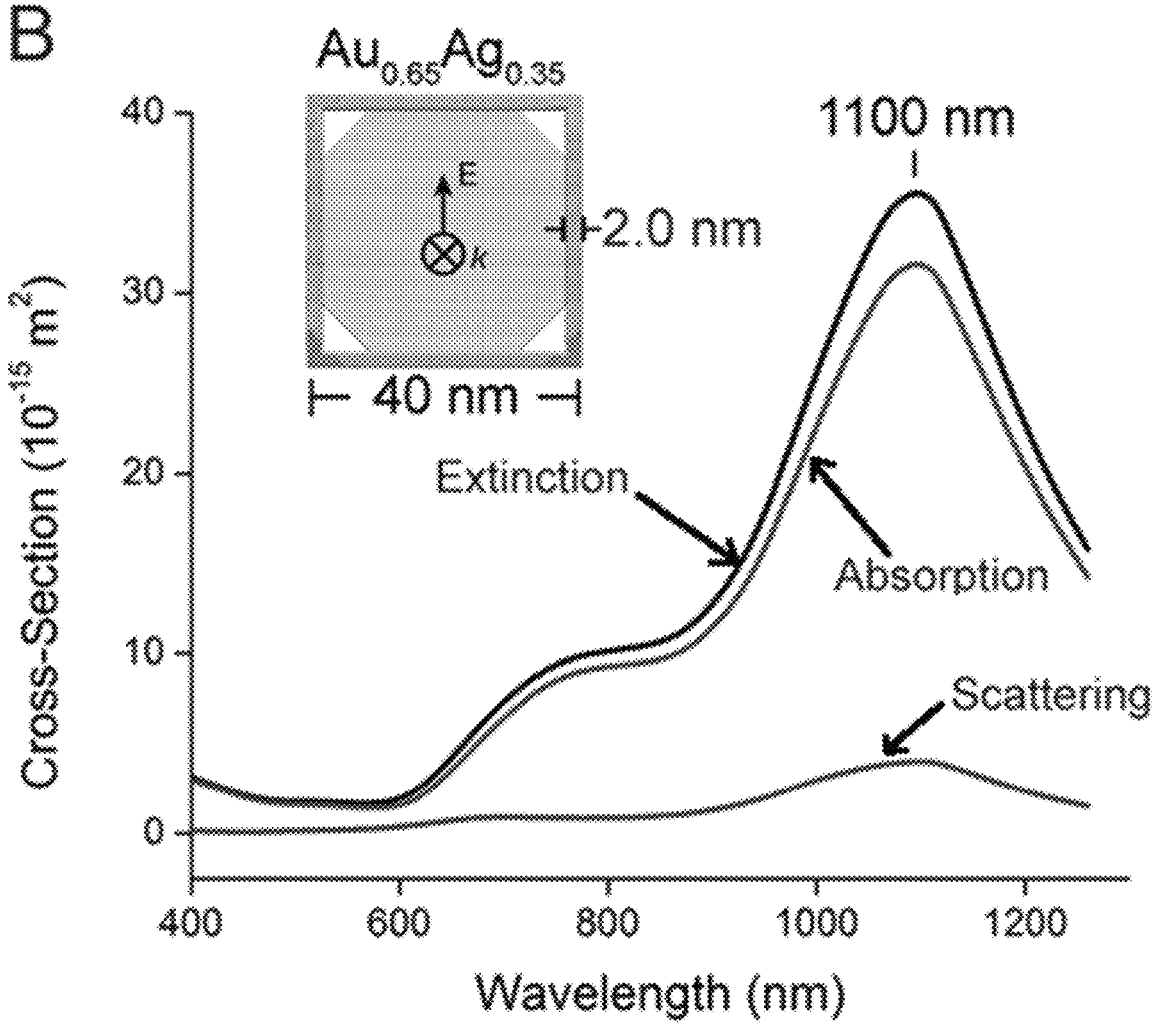
Figure 36A:
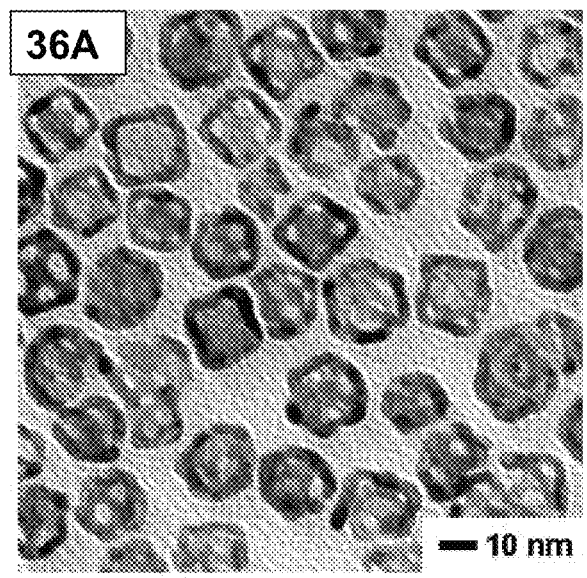
FIGS. 36A-36C show (FIG. 36A) TEM image of the nanoboxes with an outer edge length of 20 nm.
Figure 36B:
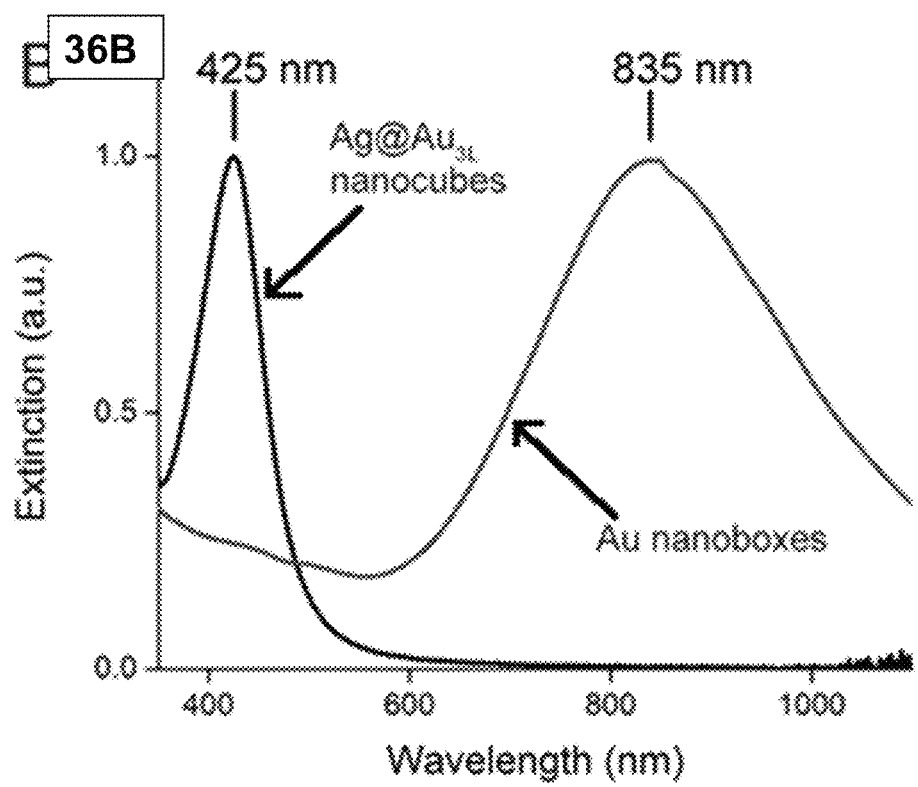
Figure 36C:
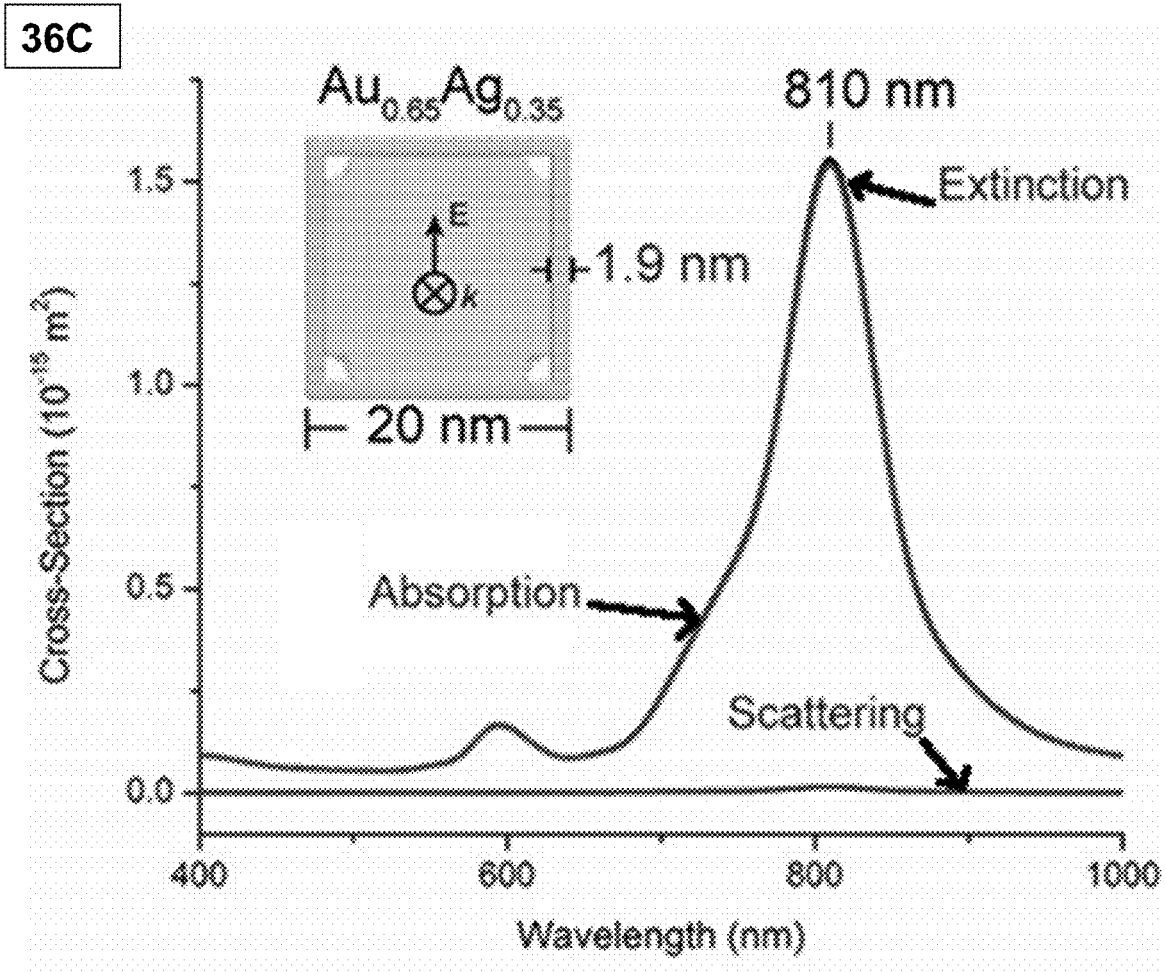

A model of the structure was generated by i) creating a cube, ii) subtracting a smaller cube from the interior to create a box, and then iii) truncating each corner with a (111) plane, which resulted in the formation of eight triangular pores. In terms of the smaller structure (the 20-nm nanobox), truncation did not lead to pore sizes commensurate with what was observed by electron microscopy characterization. Therefore, a sphere of 1.5 nm in radius was subtracted from each one of the corners. Once the shape was generated and inspected with Visual Molecular Dynamics (VMD) 1.9.2, it was then uploaded as a shape-file into the ddscat 7.2.0 software. In all cases, the propagation (k-vector) and electric field (E-field) of the incident photon were perpendicular and parallel to the (100)-facet of the cube, respectively (as indicated in FIG. 35B and FIG. 36C). Furthermore, in all simulations, between $10^4$ and $10^5$ dipoles were used to ensure accurate results. The dielectric constant for the Au—Ag alloy was taken from ref. 15. Since all spectra were measured when the nanoboxes were suspended in water, the dielectric constants of the medium and void spaces were taken to be $\varepsilon_m = n^2 = 1.78$.

Results and Discussion

Figure 33:
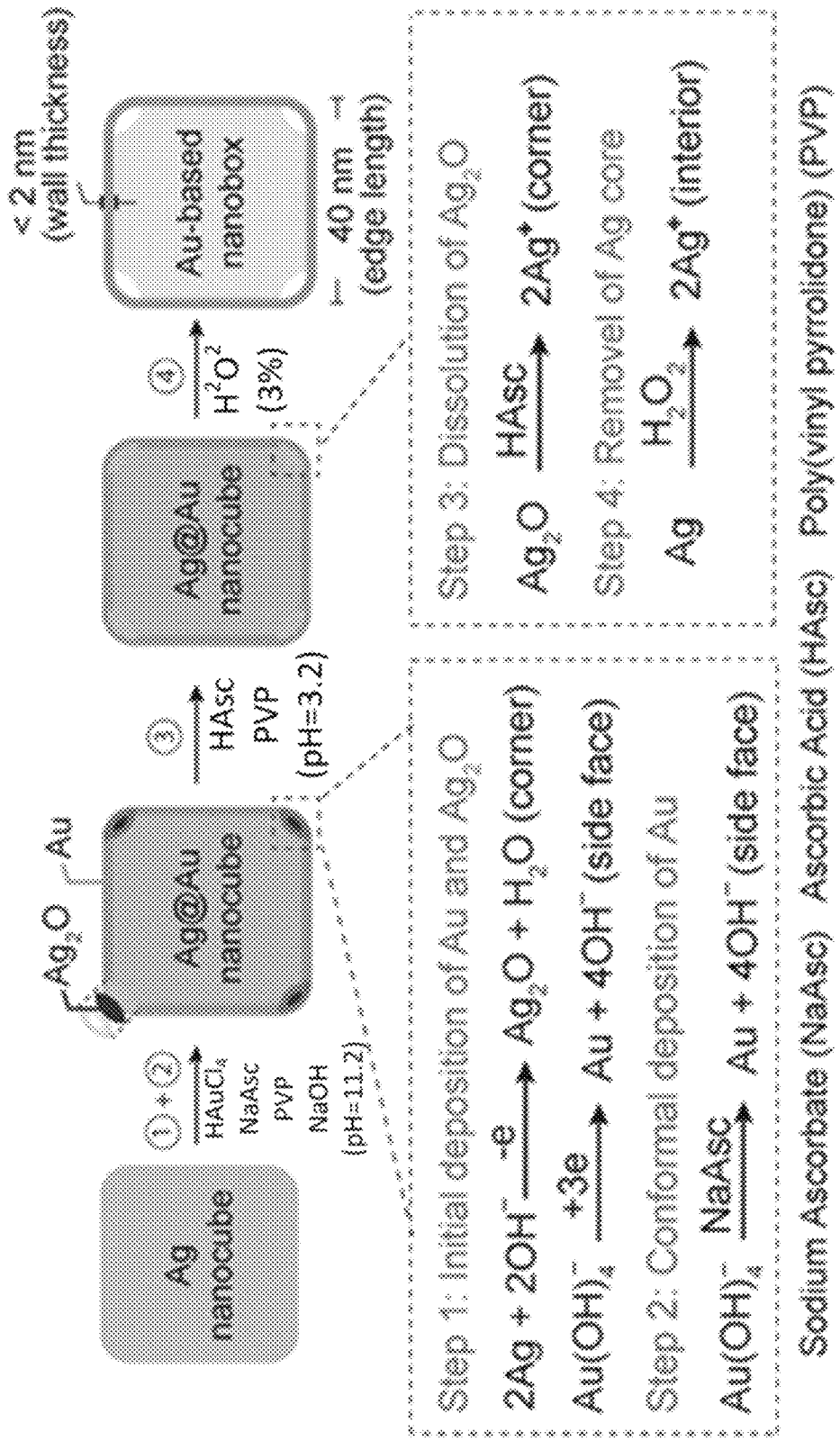
FIG. 33 shows schematic illustration (projected along [100] direction) of the four steps involved in the transformation of a Ag nanocube into a Au-based nanobox.

FIG. 33 illustrates the four major steps involved in the fabrication of Au-based nanoboxes. The synthesis relies on the use of Ag nanocubes with slight truncation at corners as templates for the conformal deposition of ultrathin Au shells. In a typical process, the Ag nanocubes are dispersed in an aqueous solution containing NaOH, ascorbic acid (HAsc, which should react with NaOH to form NaAsc), and poly(vinylpyrrolidone) (PVP), followed by the titration of aqueous HAuCl$_4$ using a syringe pump under ambient condition. In the first step, we believe that a small number of Au atoms are formed and deposited onto the side faces at the expense of Ag atoms dissolved from the corners. Because of the presence of NaOH in the reaction solution (pH=11.2), the resultant Ag$^+$ ions are supposed to react with OH$^-$ for the generation of Ag$_2$O at the corners, preventing the underlying Ag from further reacting with Au$^{3+}$ (Hickling, et al., Discuss. Faraday Soc. 1947, 1, 277). In the second step, the reduction of Au$^{3+}$ by NaAsc would become a dominant pathway for the generation of Au atoms, followed by their conformal deposition onto the side faces of nanocubes in a layer-by-layer fashion. Some of the deposited Au atoms can migrate to corners through surface diffusion. As such, the Ag nanocubes are transformed into Ag@Au$_{nL}$ core-shell nanocubes with multiple Au atomic layers on side faces, together with some Au deposited on the Ag$_2$O regions at the corners.

In the third step, we dissolve the Ag$_2$O at the corners with an acid, lifting-off the Au deposited on the Ag$_2$O regions (Johnston, et al., J. Am. Chem. Soc. 1933, 55, 2311). Specifically, we collect the Ag@Au nanocubes by centrifugation and then re-dispersed them in an aqueous acidic solution containing HAsc and PVP (pH=3.2). We confirm that HAsc could dissolve Ag$_2$O without compromising the integrity of the Au layers on the side faces. Finally, we use aqueous 3% H$_2$O$_2$ to etch away the Ag cores, leading to the production of Au-based nanoboxes with hollow interiors, ultrathin walls, and well-defined openings at the corners. We speculate that Ag could be included in the Au walls due to the inter-diffusion between the two elements for the formation of an alloy. We can use a stronger dealloying agent based on Fe(NO$_3$)$_3$ to remove additional Ag in order to generate nanoboxes with a higher Au content. By varying the edge length of the Ag nanocubes and the thickness of Au layers deposited on the Ag templates, we can independently control the physical dimension and wall thickness of the Au-based nanoboxes.

Figure 37:
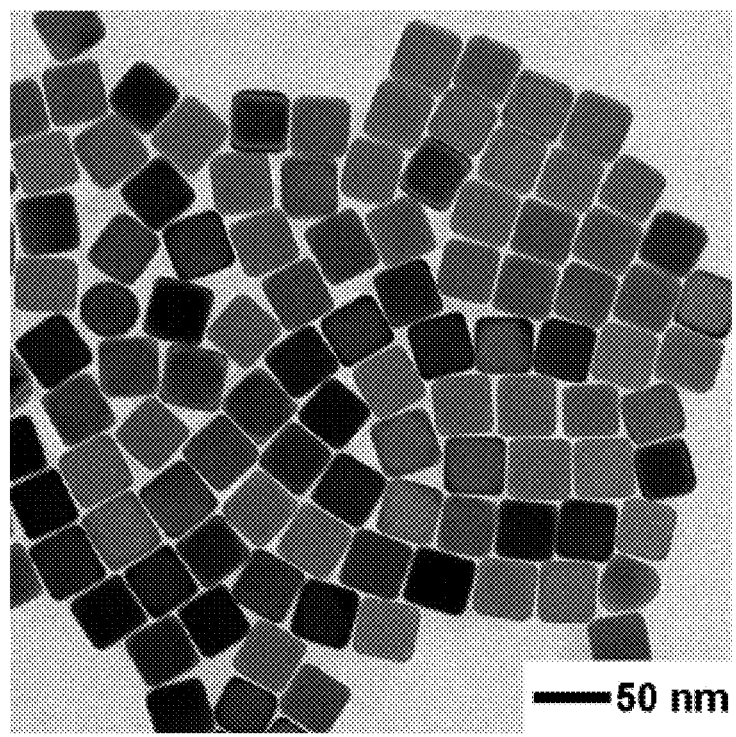
FIG. 37 shows a TEM image of Ag nanocubes with an edge length of 38 nm.

In the first set of experiments, we used Ag nanocubes with an average edge length of 38 nm with slight truncation at the corners (FIG. 37) as templates to generate Ag@Au$_{6L}$ nanocubes and then Au-based nanoboxes with an outer edge length of 40 nn (see experimental section for details). FIG.

Figures 34A, 34B, 34C, 34D, 34E, 34F:
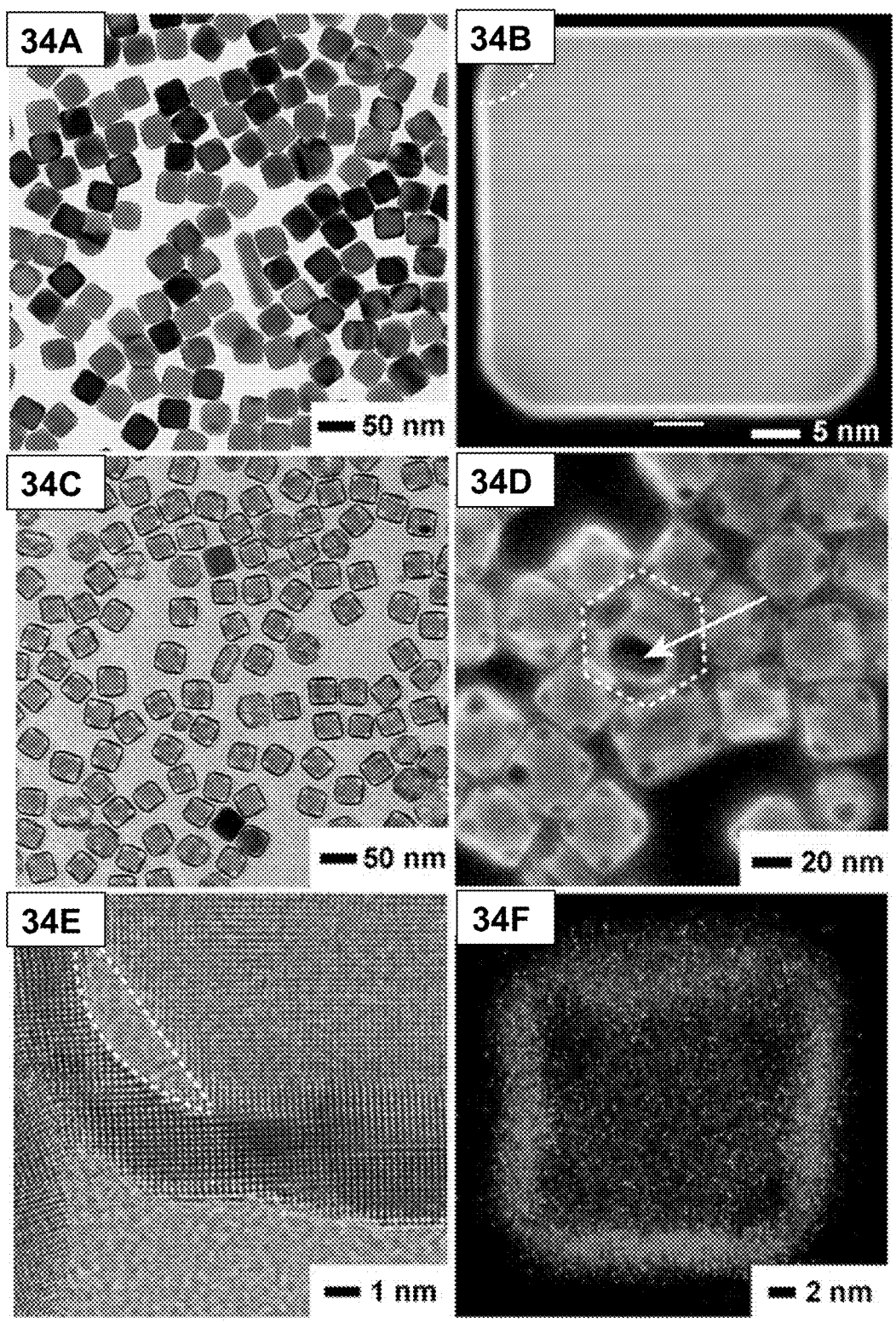
FIGS. 34A-34F show (FIG. 34A) TEM image of Ag©Au$_{6L}$ nanocubes.
Figure 38:
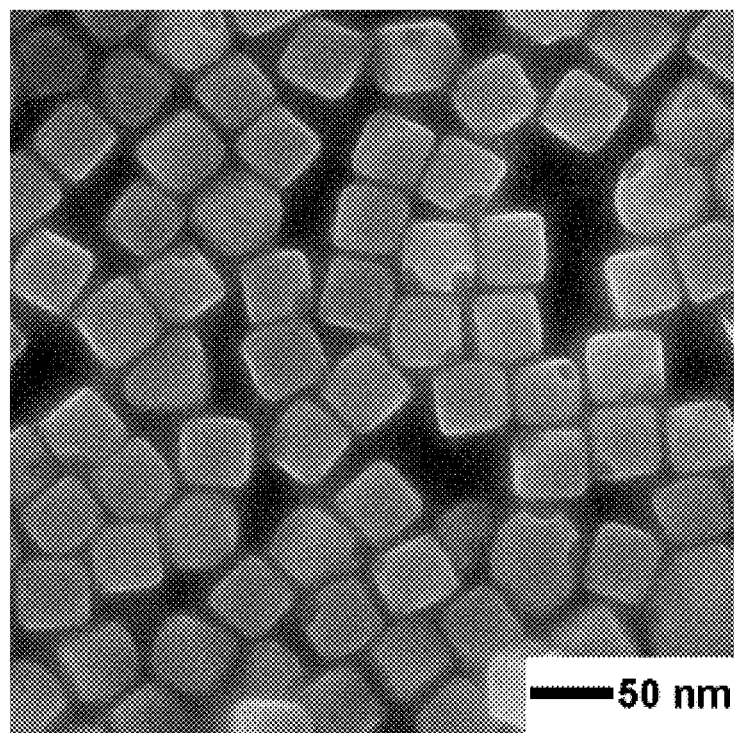
FIG. 38 shows a SEM image of Ag@Au$_{6L}$ nanocubes obtained by titrating 0.8 mL od 0.1 mM HAuCl$_4$ into an aqueous mixture containing 38-nm Ag nanocubes, NaAsc, PVP, and NaOH.
Figure 39:
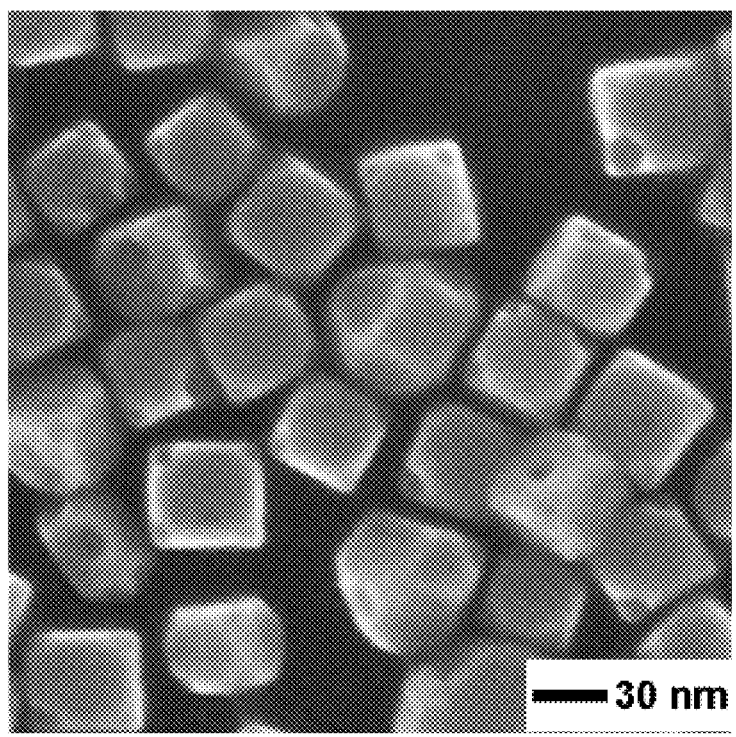
FIG. 39 shows a SEM image of a sample obtained through a reaction between Ag nanocubes and 0.1 mL of 0.1 mM HAuCl$_4$ at a pH of 11.2 in the absence of NaAsc.

34A shows a TEM image of the Ag@Au$_{6L}$ nanocubes with the introduction of 0.8 mL of aqueous HAuCl$_4$ (0.1 mM) to generate six atomic layers of Au on the side faces. We also characterized the sample using SEM. As shown in FIG. 38, some of the nanocubes show small holes at the corner sites, but not the side faces. To confirm the formation of a conformal shell of Au on the Ag core, we used aberration-corrected high-angle annular dark-field scanning TEM (HAADF-STEM) to characterize the core-shell nanocubes (FIG. 34B). The contrast between the shell and the core clearly verifies the conformal deposition of Au on the entire surface of the Ag nanocube, with a somewhat thinner projection along the edges. The dark contrast at the corners suggests a higher degree of truncation at the corners than the edges due to the formation of Ag$_2$O at the corner sites. We also conducted a control experiment by titrating the Ag nanocubes with HAuCl$_4$ in the presence of PVP and NaOH (at pH=11.2) in the absence of HAsc. FIG. 39 shows an SEM image of the sample obtained with the reaction between Ag nanocubes and 0.1 mL of HAuCl$_4$ (0.1 mM), confirming the formation of holes at the corners due to the involvement of galvanic replacement reaction. Collectively, these results support the argument that the initial deposition of Au occurred on the side faces at the expense of Ag atoms oxidized and dissolved away from the corners through the involvement of galvanic replacement.

After treating the as-prepared Ag©Au$_6$ nanocubes with an aqueous solution containing HAsc and PVP, we removed the Ag cores using 3% aqueous H$_2$O$_2$. FIG. 34C shows a typical TEM image of the resultant nanoboxes with an average outer edge length of 40 nm, together with a well-preserved cubic shape and well-defined pores at the corners. From the TEM image, we noticed that a few of the solid core-shell nanocubes still remained in the final product. Likely, the corners of these nanocubes were covered by relatively thicker Au overlayers, preventing HAsc from dissolving Ag$_2$O and then H$_2$O$_2$ from attacking and dissolving the Ag core. FIG. 34D shows an SEM image collected from the same sample, confirming the formation of well-defined pores at the corners. As shown by the particle marked by an arrow, the interior was indeed hollow due to the removal of the Ag core. FIG. 34E shows an atomic-resolution aberration-corrected high-angle annular bright-field scanning TEM (HAABF-STEM) image recorded from the corner region of a nanobox. It reveals a highly ordered arrangement of the atoms and gives a wall thickness of about 2 nm, corresponding to ten atomic layers along the [100] direction. As indicated by the white, dashed lines, the STEM image also clearly resolved an opening at the corner. Although six atomic layers of Au were originally deposited on the side faces, the wall thickness of the nanobox was increased to ten atomic layers. This result suggests the involvement of inter-diffusion and alloying of Au and Ag and thus the retention of Ag in the walls in the form of an alloy. Elemental mapping by energy-dispersive x-ray spectroscopy (EDS) confirms the presence of Ag in the nanoboxes, with a Au to Ag atomic ratio of 1.2:1 (FIG. 34F). The inductively coupled plasma mass spectrometry (ICP-MS) analysis gives a Au to Ag atomic ratio of 1:1 for a bulk quantity of the sample. We suspect that ICP-MS result tends to underestimate the relative Au content because any solid Ag©Au$_{6L}$ nanocube remaining in the final sample would increase the Ag content.

Figure 40:
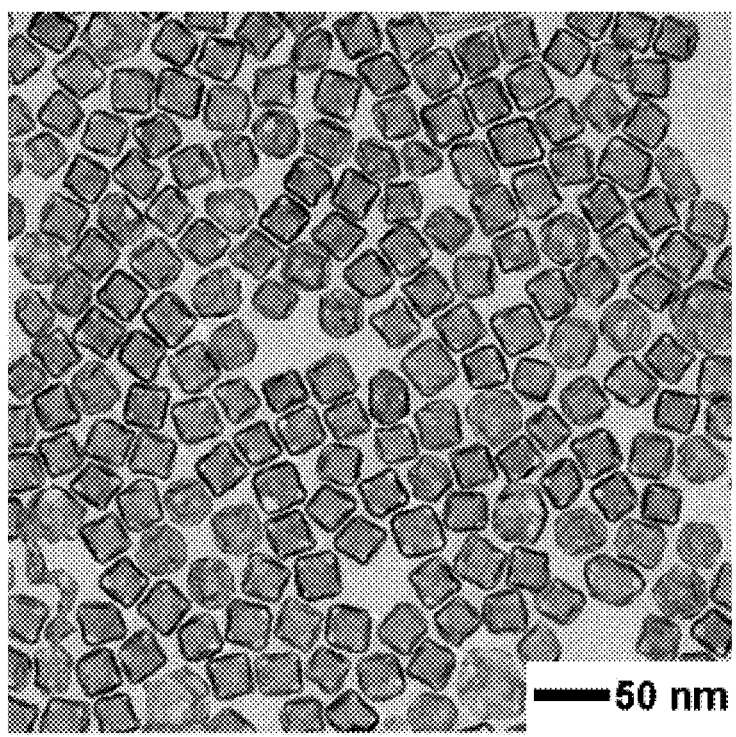
FIG. 40 shows a TEM image of Au-based nanoboxes obtained by titrating 0.4 mL of 0.1 mM HAuCl$_4$ into an aqueous mixture containing 38-nm Ag nanocubes, NaAsc, PVP, and NaOH, followed by the removal of Ag cores with 3% H$_2$O$_2$.

We also fabricated Ag©Au$_{3L}$ nanocubes from Ag nanocubes with an average edge length of 38 nm, followed by the removal of Ag cores. FIG. 40 shows a TEM image of the resultant nanoboxes. When the Au atomic layers on the side faces were reduced from six to three, the wall thickness of the nanoboxes would decrease, ultimately reduce their overall rigidity. On the other hand, we would anticipate that the amount of Au deposited on the corners would be reduced as the total amount of Au$^{3+}$ precursor added into the reaction system was decreased, leading to the formation of Ag©Au$_{3L}$ nanocubes with non-uniform Au coverage at the corners and thus the formation of openings with a less uniform distribution in pore size.

Figure 41:
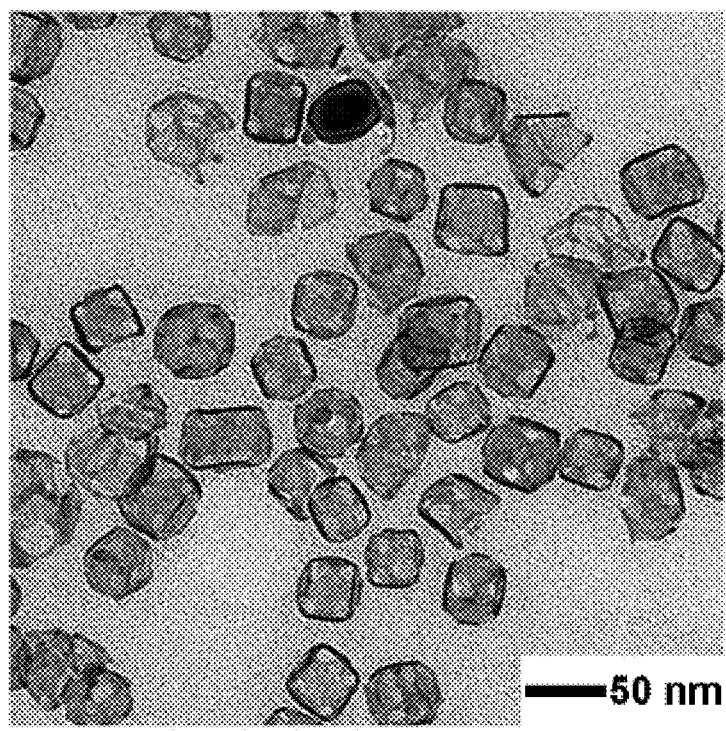
FIG. 41 shows a TEM image of Au-based nanoboxes obtained by titrating 0.8 mL of 0.1 mM HAuCl$_4$ into an aqueous mixture containing 38-nm Ag nanocubes, NaAsc, PVP, and NaOH, followed by the removal of Ag cores with 3% H$_2$O$_2$ first and then dealloying with Fe(NO$_3$)$_3$.

We used UV-vis-NIR spectroscopy to characterize the optical properties of the as-prepared nanoboxes. When Ag©Au$_{6L}$ nanocubes were transformed into nanoboxes, the LSPR peak was red-shifted from 447 to 1080 nm (FIG. 35A). When Fe(NO$_3$)$_3$, was used to remove more Ag from the walls of the nanoboxes (FIG. 41), the LSPR peak was further red-shifted to 1135 nm. To better understand the optical properties of the nanoboxes, we used discrete dipole approximation (DDA) to calculate their absorption and scattering cross-sections (Yang, et al., *J. Am. Chem. Soc.* 2014, 136, 8153; Zhang, et al., *ACS Nano* 2016, 10, 2607). In the simulation, we assumed that a nanobox is surrounded by and completely filled with water. Also, we defined the geometry of a nanobox with an outer edge length of 40 nm, a wall thickness of 2 nm, and triangular pores (10 nm in edge length) at all corners, together with a Au—Ag alloy composition of 65% Au and 35% Ag because of its available dielectric constant (Pena-Rodriguez, et al., *Opt. Mater. Express* 2014, 4, 2, 403). FIG. 35B shows the calculated absorption, scattering, and extinction spectra. The peak was located at 1100 nm, in agreement with the experimental data (at 1080 nm). The calculated extinction, absorption, and scattering cross-sections at resonance were $35.5 \times 10^{-15}$, $31.6 \times 10^{-15}$, and $3.9 \times 10^{-15}$ m$^2$, respectively. The absorption cross section is about five times greater than those reported for Au—Ag nanocages with an edge length of 36 nm but prepared by galvanic replacement reaction (Chen, et al., *Adv. Mater.* 2005, 17, 2255).

Figure 42:
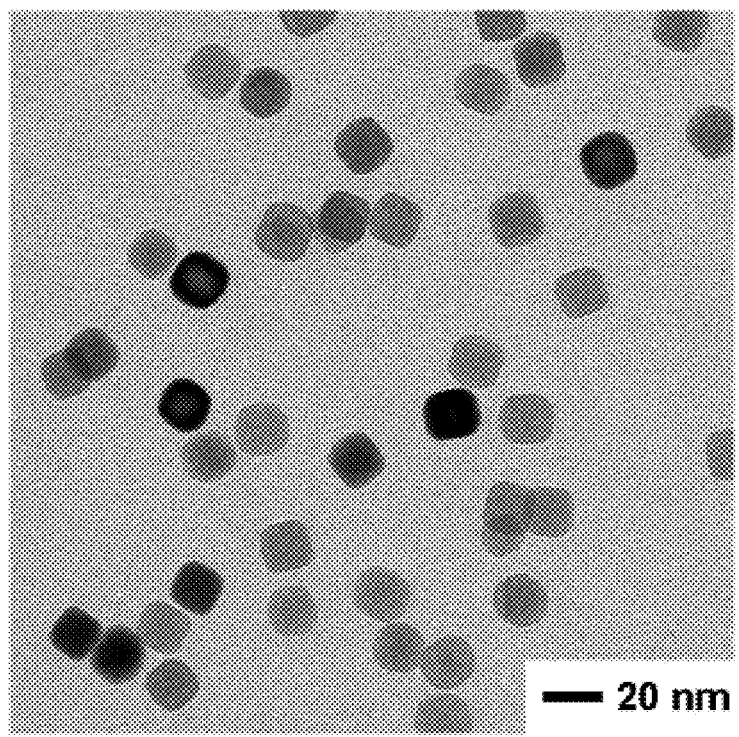
FIG. 42 shows a TEM image of Ag nanocubes with an edge length of 18 nm.

We have also extended the procedure to Ag nanocubes with an average edge length of 18 nm (FIG. 42) for their transformation into nanoboxes. Specifically, we adjusted the initial concentration of these nanocubes in the reaction solution with a goal to keep the total surface area the same as that of the nanocubes with an edge length of 38 nm. As a result, with the titration of 0.8 mL of aqueous HAuCl$_4$ (0.1 mM), Au atoms derived from the reduction by NaAsc could also be deposited on the nanocubes for the generation of Ag©Au$_{6L}$ nanocubes with an edge length of 20 nm. FIG. 36A shows TEM image of the nanoboxes upon removal of the Ag cores, indicating a well-preserved cubic shape and holes at the corners. Because the small Ag nanocubes had an increased degree of truncation at the corners, the 20-nm nanoboxes were not as uniform as the 40-nm nanoboxes. As the core-shell nanocubes were transformed into nanoboxes, the LSPR peak was red-shifted from 425 nm to 835 nm (FIG. 36B). Again, we calculated the optical cross-sections of a nanobox with an outer edge length of 20 nm and a wall thickness of 1.9 nm, together with the assumption that the pore size is 3 nm at all corners (FIG. 36C). The resonance peak is located at 810 nm, in agreement with the experimental data. The results indicate that absorption is in dominance, with its cross-section of $1.6 \times 10^{-15}$ m$^2$ at the resonance peak, which is five orders in magnitude much larger than that of a traditional organic dye (e.g., indocyanine green, $2.0 \times 10^{-20}$ m$^2$ at 800 nm).[17] Collectively, our DDA results suggest that the extinction peak position is sensitive to the edge length and the thickness of the nanobox. It is also worth pointing out that the edge length could be varied to tune the ratio of absorption to scattering. For example, the absorption completely dominates for the 20-nm nanobox while scattering would emerge with a contribution of 10% as the edge length of the nanobox was increased to 40 nm.

In summary, we have demonstrated a facile route to the fabrication of Au-based nanoboxes with a wall thickness less than 2 nm and well-defined openings at corners. When $Au^{3+}$ is titrated into a suspension of Ag nanocubes with slight corner truncation in the presence of NaOH and NaAsc, a small amount of Ag will be dissolved from the corners because of its galvanic replacement with $Au^{3+}$. Owing to the presence of NaOH, $Ag_2O$ is formed at the corners, impeding further dissolution of Ag from the nanocubes. Meanwhile, the resultant Au atoms are deposited onto the side faces, followed by the conformal deposition of more Au formed through the redox reaction with NaAsc. Some of the deposited Au atoms can also migrate from side faces to corners, generating Au overlayers thinner than those on the side faces. The $Ag_2O$ at the corners can be removed using HAsc, making it feasible to completely etch away the Ag core without breaking the ultrathin Au shell. Owing to the ultrathin wall thickness, Au nanoboxes as small as 20 nm in edge length can still be fabricated with strong absorption in the near-infrared region for immediate applications as contrast agents for optical imaging and as capsules for controlled release.

Example 7: Seed-Mediated Synthesis of Ru Nanocages with Fcc Structure

Nanocages are one type of hollow structures which have attracted varieties of research interests because of their high utilization efficiency of noble metals and enhanced properties. Among various noble metals, Ru nanocages have never been achieved. In this study, we report for the first time the synthesis of uniform Pd@Ru core-shell nanocubes based on seed-mediated growth and their conversion to Ru nanocages through chemical etching. The key to the success of the synthesis is to ensure the layer-by-layer growth of Ru on the surface of Pd nanocubes, which can be realized by controlling the injection rate of Ru precursor solution and reaction temperature. Adding enough PVP is also necessary to inhibit agglomeration and obtain conformal core-shell nanocrystals Through selectively removing the Pd cores by chemical etching, the Pd@Ru core-shell nanocubes can be easily transformed into Ru nanocages, with an average thickness of –1.1 nm. Most importantly, the resultant Ru nanocages adopted face-centered cubic (fcc) crystal structure rather than hcp structure of bulk Ru. With increased amount of Ru precursor, the crystal structure of Ru nanocages changed from fcc to hcp. The synthesis in our work can be also applied to Pd seeds with different sizes. Pd nanocubes with smaller size is more beneficial to form smooth Ru shells as the travel distance of Ru adatoms is short.

Herein, we reported an effective approach to the synthesis of Ru nanocages based on seed-mediated growth and chemical etching. Pd cubic seeds with 10 nm size were used as templets and then were etched away. The resultant Ru nanocages were in good cubic shape, with thickness of –1.1 nm. To achieve this, we carefully adjusted the injection rate and reaction temperature which determined atom deposition rate and surface diffusion rate separately. More interestingly, in bulk Ru, it adopts hcp structure (Brink, et al., *J. Phys. Chem. C* 2008, 112, 12122-12126). While in our work, the resultant Ru nanocages show an fcc crystal structure. The transition of Ru nanocrystals from fcc to hcp structure can be achieved simply by increasing the amount of precursor. Ru nanocages prepared by using Pd seed with different sizes were also investigated. We report an effective approach to synthesize Ru nanocages with an fcc structure.

Chemicals and Materials.

Ethylene glycol (EG, 99%) was obtained from J. T. Baker. Sodium tetrachloropalladate(II) ($Na_2PdCl_4$, 99.99%), Ruthenium(III) chloride hydrate ($RuCl_3 \cdot xH_2O$, 99.99%), poly(vinylpyrrolidone) (PVP, MW≈55000), L-ascorbic acid (AA, 99%), potassium bromide (KBr, 99%), potassium chloride (KCl, 99%), hydrochloric acid (HCl, 37%), and iron(III) chloride ($FeCl_3$, 97%) were all obtained from Sigma-Aldrich and used as received. All aqueous solutions were prepared using deionized (DI) water with a resistivity of 18.2 MW cm.

Synthesis of 6 nm, 10 nm and 18 nm Pd Nanocubes.

Pd nanocubes (6, 10 and 18 nm in edge length) were synthesized using protocols reported by our group (Jin, et al., *Nano Res.* 2011, 4, 83-91). For the synthesis of 10 nm Pd, PVP (105 mg), AA (60 mg), and KBr (300 mg) were dissolved in DI water (8.0 mL), and then placed in a vial and pre-heated at 80° C. in an oil bath under magnetic stirring for 10 min. Subsequently, 3 mL of aqueous $Na_2PdCl_4$ solution (19 mg $mL^{-1}$) was injected into the preheating solution in one shot. The reaction solution was maintained at 80° C. under magnetic stirring for 3 h. The product was collected by centrifugations, washed three times with DI water to remove excess PVP and inorganic ions, and then re-dispersed in 6 mL EG. For the syntheses of 6 nm and 18 nm nanocubes, the procedure was the same as aforementioned procedure except that KBr (300 mg) was replaced by KBr (5 mg) and KCl (185 mg), and KBr (600 mg) respectively.

Synthesis of Pd@Ru Core-shell Nanocubes.

In a standard synthesis of Pd@Ru core-shell nanocrystals, 50 mg AA, 100 mg PVP were dissolved in 8 mL EG. The resulting solution was preheated at 200° C. under magnetic stirring for 10 min in a three-necked flask. Then, 1 mL of 2 mg $mL^{-1}$ 10 nm Pd cubes was added into the flask and kept for 1 hour. Also, 2 mg $RuCl_3 \cdot xH_2O$ and 250 mg PVP were dissolved in 20 mL EG and injected to the flask at a rate of 1 mL $h^{-1}$ using a syringe pump. The reaction was allowed to continue for an additional 10 min to complete. The resultant product was collected by centrifugation, washed once with acetone and twice with water, and then re-dispersed in 8 mL DI water. The procedure for the syntheses of 6 and 18 nm Pd@Ru nanocubes was similar to that of 10 nm Pd@Ru nanocubes. 2 mg 6 nm and 18 nm Pd nanocubes were used as seeds respectively and 3.64 mg and 1.04 mg $RuCl_3 \cdot xH_2O$ was injected correspondingly. The number of grown Ru layers was the same for these three kinds of Pd seeds. All other procedure was the same as aforementioned.

Formation of Ru Nanocages.

Chemical etching was conducted in an acidic aqueous solution to generate Ru nanocages. Typically, KBr (300 mg), PVP (50 mg), $FeCl_3$ (50 mg), HCl (0.3 mL, 37%), DI water (5.7 mL), and 1 mL as-prepared Pd@Ru core-shell nanocrystals were mixed together in an 18-mL vial. The mixture was transferred into an oil bath heated at 100° C. under magnetic stirring for 3 h. After that, the product was collected by centrifugation, washed three times with ethanol, and then re-dispersed in DI water for further characterization.

Morphological, Structural, and Elemental Analysis.

Transmission electron microscopy (TEM) was conducted with an HT7700 microscope operated at 120 kV. HAADF-STEM and EDX scanning analyses were performed using an ARM 200F microscope (JEOL) with STEM aberration corrector operated at 200 kV. Inductively coupled plasma mass spectrometry (ICP-MS, NexION 300Q, PerkinElmer) was used for a quantitative analysis of metal content in the samples.

Results and Discussion

Figure 43:
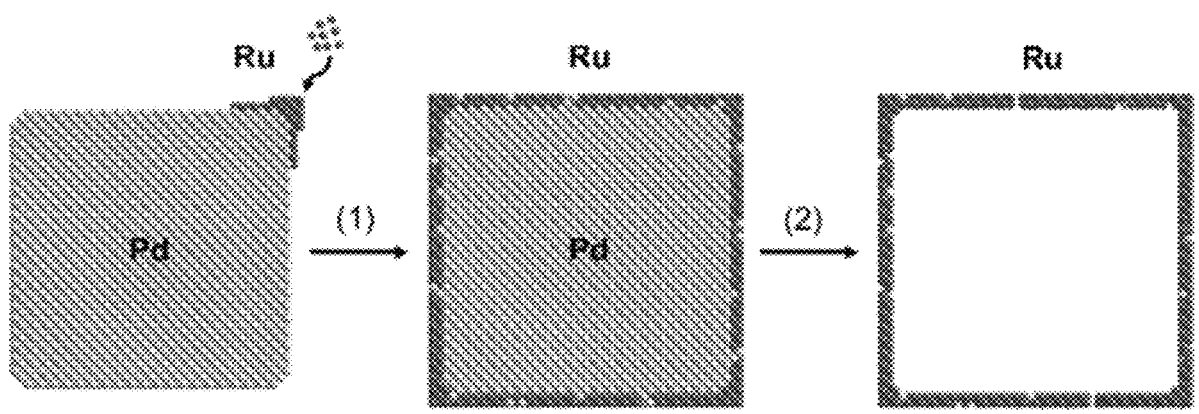
FIG. 43 shows schematic illustration of two steps involved in the synthesis of Ru nanocages: (1) selective deposition of Ru on the corners and diffusion to side faces and edges of Pd cubes, yielding Pd@Ru core-shell nanocubes, and (2) formation of Ru cubic nanocages by etching away the Pd cores.
Figures 44A, 44B, 44C, 44D:
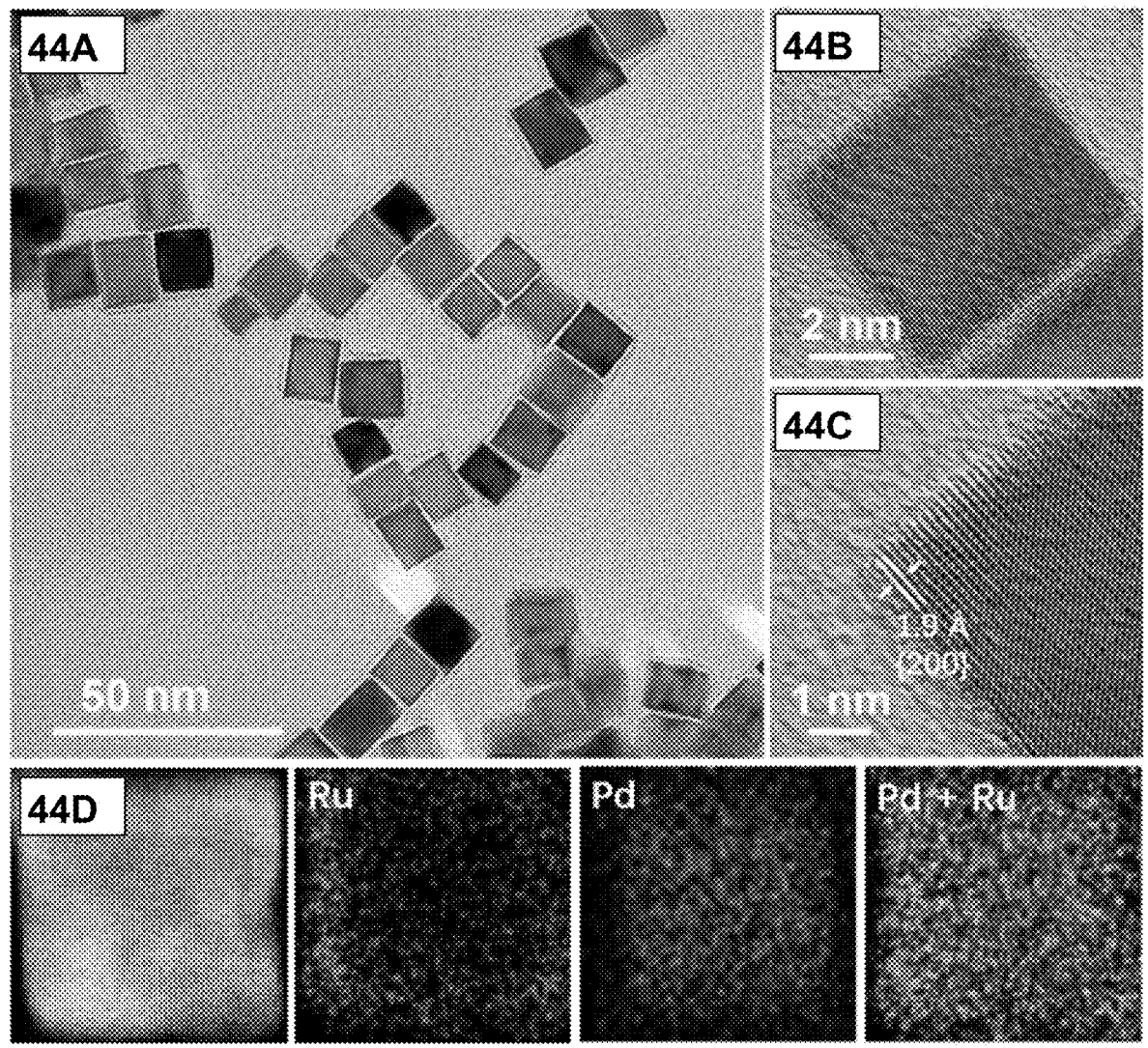
FIGS. 44A-44D show (FIG. 44A) typical TEM image of Pd@Ru core-shell cubes.
Figures 45A, 45B, 45C, 45D:
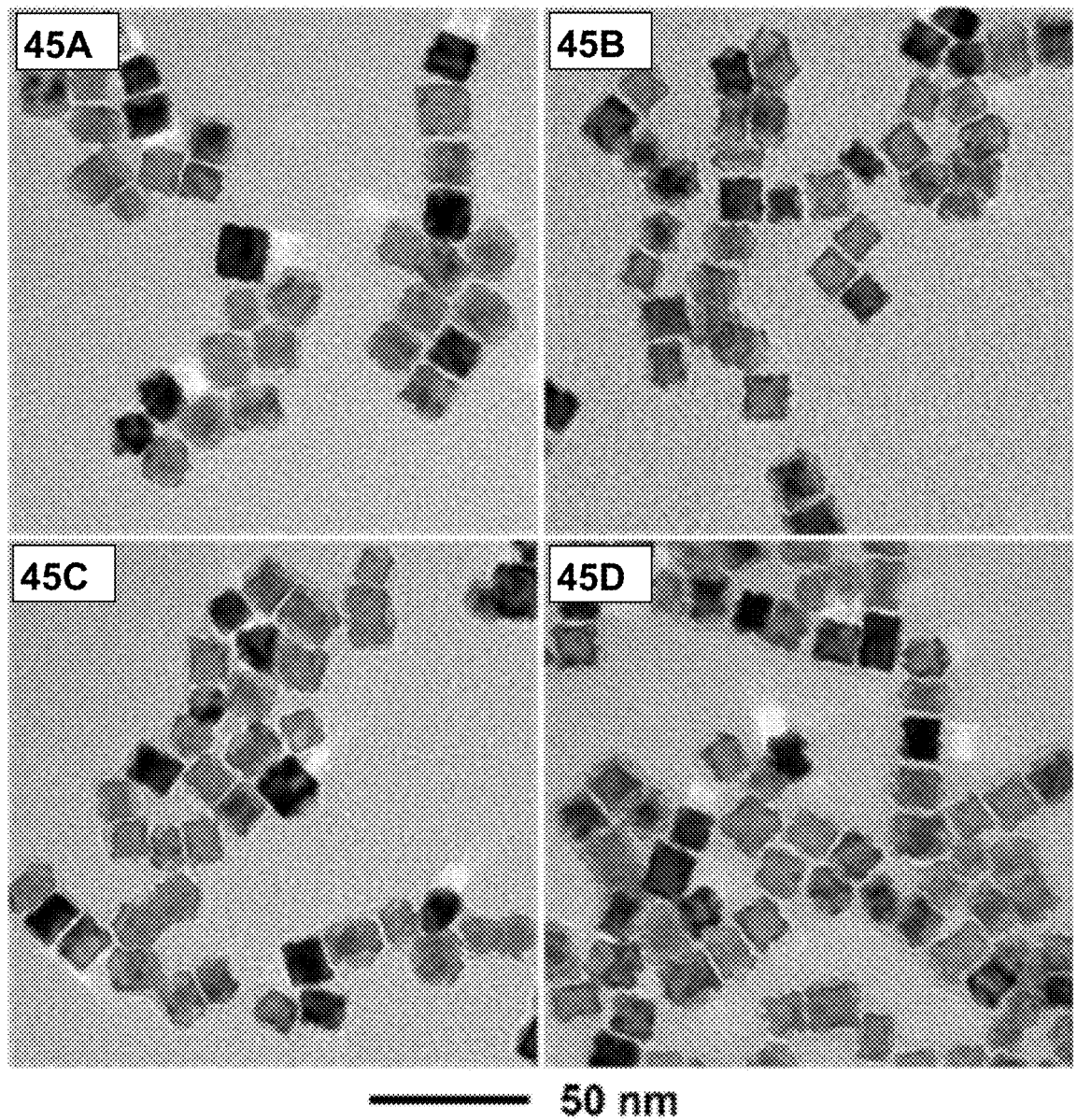
FIGS. 45A-45D show typical TEM images of Pd@Ru nanocubes prepared by the standard procedure except with different injection rates.
Figures 50A, 50B, 50C:
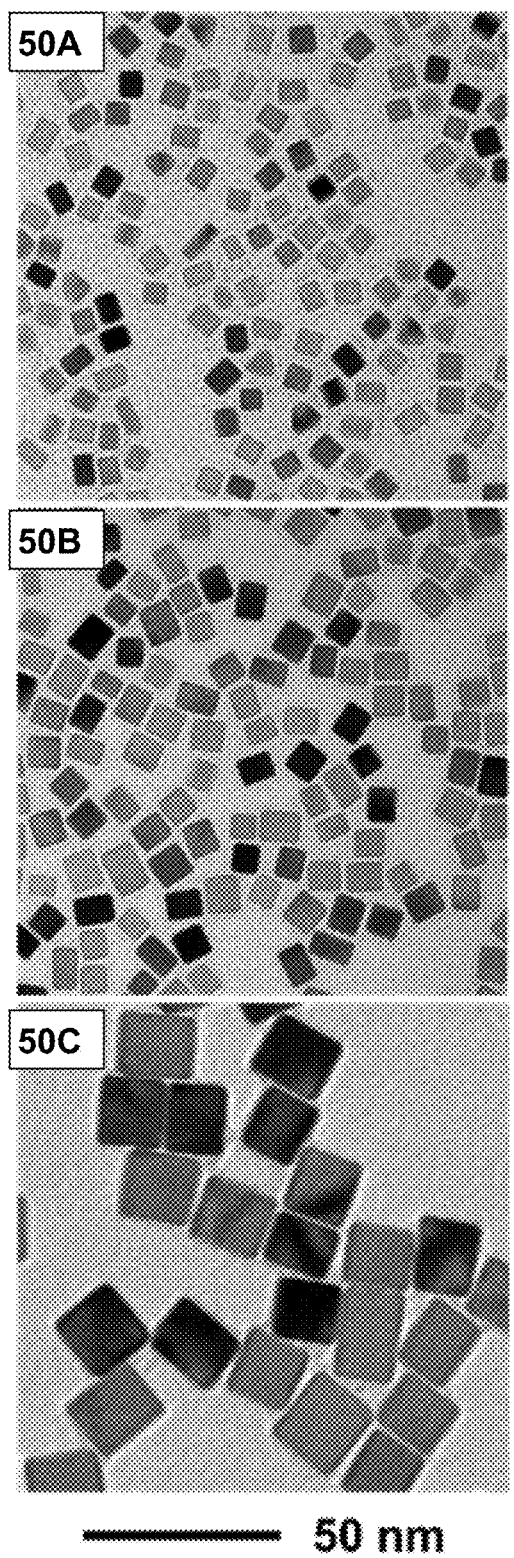
FIGS. 50A-50C show TEM images of Pd seeds with different sizes.

There are two main steps involved in the synthesis of Pd@Ru core-shell nanocubes, shown in FIG. 43. In the first step, because of the lower surface energy of {111} facets compared to {100} facet, the reduced Ru atoms selectively deposit on the corners of Pd cubic seeds (Zhang, et al., Acc. Chem. Res. 2013, 46, 1783-1794). Then the Ru adatoms sufficiently diffuse to the side facets, resulting in Pd@Ru core-shell nanocubes. In the second step, through selectively etching Pd cores away by an oxidative etchant which reacts little with Ru, Ru nanocages can be obtained. In this work, Pd nanocubes with different sizes were used to conduct the syntheses (FIGS. 50A-50C). All the nanocubes were uniform in both size and shape, with slightly truncated corners. In the syntheses, we chose high reaction temperature (200° C.) and lower injection rate (1 mL h$^{-1}$) for two reasons: (i) high reaction temperature enhances surface diffusion of Ru adatoms and (ii) low injection rate suppresses deposition rate of Ru adatoms. Both are considered to ensure sufficient diffusion of Ru adatoms from corners to edges and the whole side facets, which is critical in the formation of core-shell structure. Generally, there are three kinds of growth modes, island growth mode (Vollmer-Weber mode), layer-plus-island growth mode (Stranski-Krastanov mode) and layer-by-layer growth mode (Frank-van der Merve mode). For selecting preferred growth mode as well as controlling the shapes and morphologies of bimetallic nanocrystals through seed-mediated growth approach, manipulating the ratio between the atom deposition rate and surface diffusion rate is decisive (Xia, et al., Proc. Natl. Acad. Sci. U.S.A. 2013, 110, 6669-6673). In the case of synthesizing Pd@Ru core-shell structure, we varied the parameters to ensure that, compared to the deposition rate, the surface diffusion rate is sufficient to form core-shell nanocrystals. FIGS. 44A-44D show typical transmission electron microscopy (TEM), high-resolution transmission electron microscopy (HRTEM), and energy dispersive X-ray (EDX) mapping images of Pd@Ru core-shell nanocubes using 10 nm Pd nanocubes. The TEM image in FIG. 44A indicates that all the Pd@Ru core-shell nanocubes are good in cubic shape, with average size ~12 nm. The HAADF-STEM images (FIG. 44B-44C) taken from individual Pd@Ru core-shell nanocube clearly show that Ru was epitaxially grown on Pd cubic seeds. The surfaces of Pd seeds are conformal and smooth, indicating that the Ru adatom diffusion is sufficient. The lattice fringe spacing of grown Ru atoms was 1.9 Å marked on the corner region of the cube can be indexed to the {200} plane of fcc Ru. The cube shows a continuous lattice from Pd core to Ru shell which implies that the grown Ru shell should have the same crystal structure as Pd core. As is known, in bulk Ru, its crystal structure is hcp structure. However, as the atomic masses of Pd and Ru are similar and the lattice mismatch between Pd and fcc Ru is only 1.8% (3.89 versus 3.82 Å), it's possible for Ru adatoms to follow the arrangement of Pd atoms through epitaxial growth. This would be discussed with more details following. The core-shell structure of the as-synthesized Pd@Ru nanocubes was also confirmed by EDX mapping images (FIG. 44D). From the elemental mapping, the Pd core and the Ru shell can be easily distinguished by the contrast of different colors. For the EDX mapping of Ru shell, one can see the Ru adatoms distribute in not only edges and corners, but also side facets, proving the core-shell structure of the resultant Pd@Ru nanocubes.

Figures 51A, 51B:
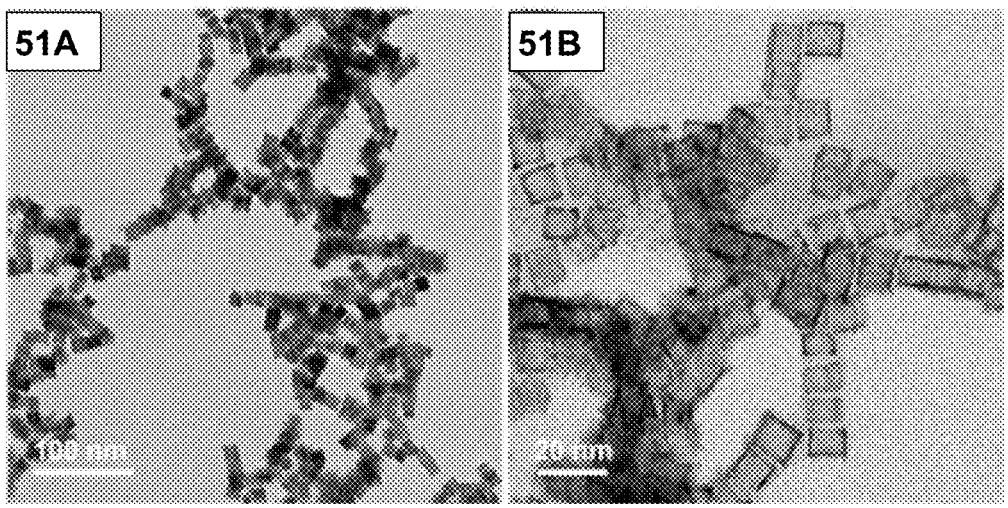
FIGS. 51A-51B show typical transmission electron microscopy (TEM) images of (FIG. 51A) Pd@Ru nanocrystals prepared using the standard procedure without adding PVP in the Ru precursor solution, (FIG. 51B) Ru nanocages after chemical etching.

To achieve a better understanding over the preparation of Pd@Ru core-shell nanocubes, control experiments were performed. We first investigated the role of PVP in the synthesis of Pd@Ru core-shell nanocrystals. PVP has been widely used in chemical syntheses of colloidal nanocrystals (Xiong, et al., J. Am. Chem. Soc. 2005, 127, 17118-17127; Sun, et al., Science 2000, 287, 1989-1992; Chen, et al., Angew. Chem. Int. Ed. 2005, 117, 2645-2648). Its major role has been mainly assigned as a stabilizer. Even though it has been reported that the terminal hydroxyl group in PVP can work as a mild reducing agent, it can be ignored in our syntheses considering the strong reducing power of AA (Yin, et al., Nature 2005, 437, 664-670). FIG. 51A-51B shows the TEM image of resultant Pd@Ru nanocrystals without adding PVP in the precursor solution. In contrast to Pd@Ru nanocrystals shown in FIG. 44A, agglomeration appeared in the sample. There were plenty of small nanoparticles attached to the surface of Pd@Ru nanocrystals, which verifies the importance of PVP in synthesizing core-shell nanocrystals. When Ru salt precursor was introduced to the flask, it was soon reduced and generated plenty of Ru atoms. PVP can protect these Ru atoms from agglomeration and thus inhibit self-nucleation (Wiley, et al., Nano Lett. 2004, 4, 1733-1739; Pastoriza-Santos, et al., Nano Lett. 2002, 2, 903-905). Therefore, it is necessary to add enough PVP when synthesizing core-shell nanocrystals.

In addition, controlling deposition rate and surface diffusion rate is also critical in obtaining core-shell nanocrystals. FIG. 45A-45D shows TEM images of Pd@Ru nanocubes prepared using the standard procedure except with different injection rates. As the injection rate was increased from 1 mL h$^{-1}$ to 2, 5, 10 and 20 mL h$^{-1}$, the morphology of nanocrystals changed obviously. It can be seen that the grown Ru layers on the side facets were rough, with small islands on them, showing an island growth mode. Besides, there were more Ru adatoms on the corners of resultant nanocrystals which indicated insufficient atom diffusion. The growth pathway of Ru adatoms was determined by the ratio between the atom deposition rate and surface diffusion rate ($V_{deposition}/V_{diffusion}$) (Xia, et al., Proc. Natl. Acad. Sci. U.S.A. 2013, 110, 6669-6673). When using cubic seeds as templets, if $V_{deposition} > V_{diffusion}$, the growth pathway is dominated by atom deposition while surface diffusion can be ignored. In this case, it results in the formation of octapods, concave or frame. Specifically, when $V_{deposition}$ is much larger than $V_{diffusion}$, it follows island growth mode. If $V_{deposition} < V_{diffusion}$, the growth pathway is determined by surface diffusion and the <100> and <110> directions have the most adatoms, forming cuboctahedron. When $V_{deposition}$ is equal or quite close to $V_{diffusion}$, the adatoms diffuse to the side facets soon after depositing on the corners or edges, resulting in the formation of core-shell nanocrystals. In this case, it follows the layer-by-layer growth mode. In our work, as the injection rate was increased, the consequently increased deposition rate of Ru adatoms was higher than surface diffusion rate, leading to island growth. Simply by adjusting the injection rate of Ru precursor, we can control the deposition rate of Ru adatoms, thus realize the overgrowth of ultrathin, conformal overlayers of Ru on the surface of Pd nanocubes.

Figures 46A, 46B, 46C, 46D:
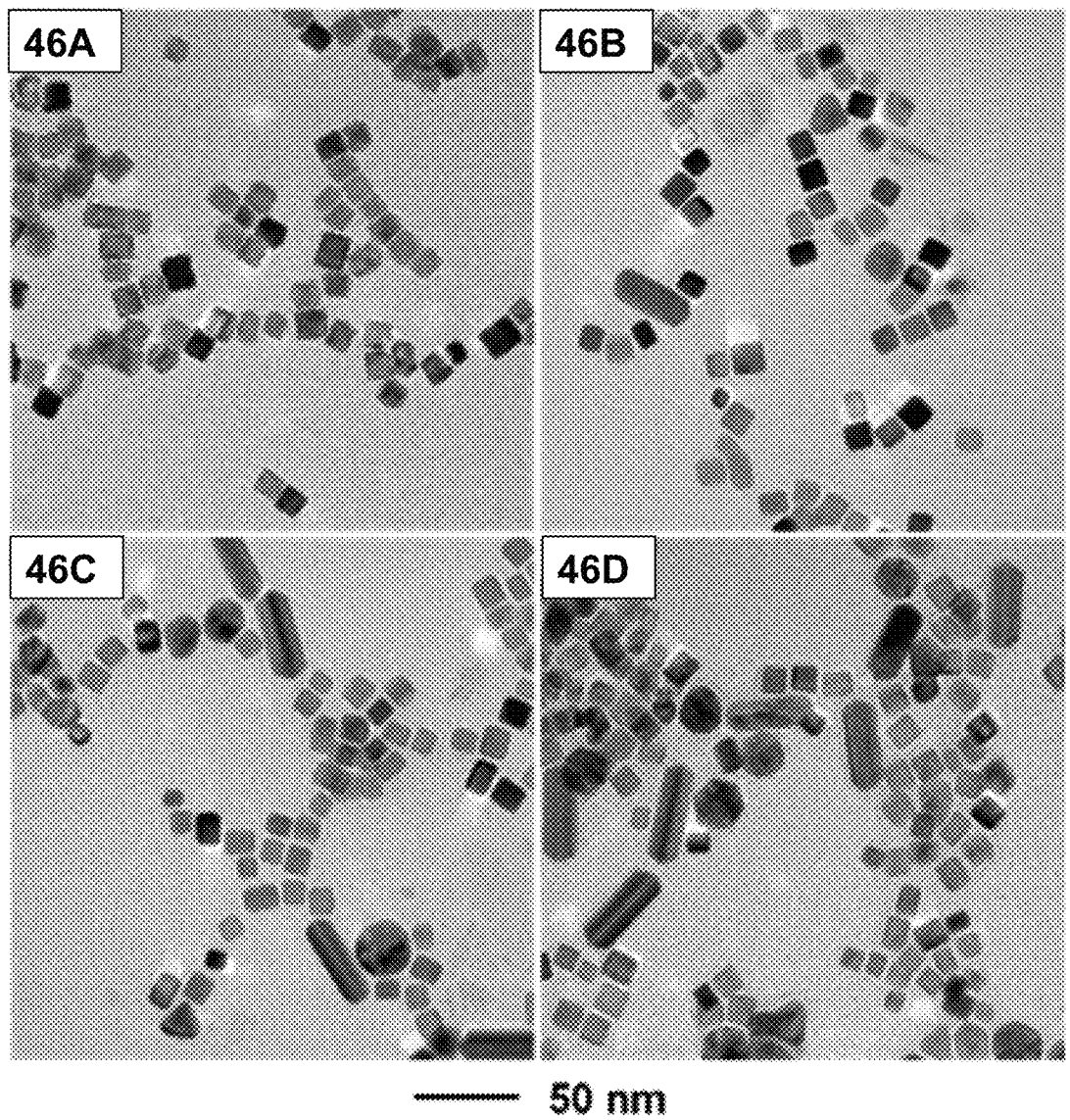
FIGS. 46A-46D show typical TEM images of Pd@Ru core-shell nanocubes prepared by the standard procedure except at different reaction temperature.

Another factor that influences the formation of Pd@Ru core-shell nanocubes is reaction temperature. Because surface diffusion is a thermally promoted process, it can be enhanced or suppressed by increasing or decreasing the reaction temperature respectively.[49] The diffusion coefficient (D) which measures the rate of spreading of an adatom across a surface can be expressed as an Arrhenius-like equation (Xia, et al., *Proc. Natl. Acad. Sci. U.S.A.* 2013, 110, 6669-6673):

$$D=D_0 \exp(-E_{diff}/RT)$$

where Do is the diffusion preexponential factor, $E_{diff}$ is the potential energy barrier to diffuse, R is the ideal gas constant, and T is the absolute temperature (in Kelvin). Theoretically, temperature change can not only affect the surface diffusion rate, but also influence the reducing power of the system which accounts for the fluctuation of deposition rate. However, considering the strong reducing power of AA and long enough time for the reaction to proceed, we expected that the effect of temperature change on deposition rate was not so significant. In order to confirm it, ICP-MS was used to analyze the elemental composition of samples prepared at various temperature (Table 5). As the reaction temperature was decreased from 200° C. to 175° C., 150° C., 120° C. and 100° C., the mass percentage of Ru in the Pd@Ru nanocrystals decreased from 31.4% to 29.1%, 27.8%, 26.7% and 26.0% respectively. It is relatively consistent with what we expected. FIG. 46A-46D shows TEM images of Pd@Ru core-shell nanocubes prepared by the standard procedure except at various temperature. In FIG. 46A, almost all the nanocrystals still keep a cubic shape, but their corners and edges are not sharp and the side facets are not smooth either. As the reaction temperature was decreased from 175° C. to 150° C., some nanorods and irregular nanocrystals appeared (FIG. 46B). It can be explained by asymmetric growth induced by the difference between deposition rate and diffusion rate of Ru adatoms (Peng, et al., *J. Am. Chem. Soc.* 2015, 137, 6643-6652). When using dropwise approach, after injecting few drops, if the instantaneous number of the precursor ions only fluctuates in a particular range, it can be addressed as "steady state", which has a lower limit and upper limit. In seed-mediated growth process, there exists a correlation between the growth modes (symmetric or asymmetric growth) and the lower limit of precursor ions in the steady state. When injecting the precursor solution into the flask, if the lower limit of the steady state is below a critical value, the reduced atoms of first few drops of precursor solution will only deposit on a limited number of available sites on the seeds. Afterward, if the atom deposition is faster than surface diffusion, subsequently reduced atoms will tend to deposit on these initially activated sites as they can't access other sites through diffusion. It will induce asymmetric growth. In our work, when the temperature was decreased to 150° C., the surface diffusion of Ru adatoms were suppressed while the deposition rate was kept at a relatively stable range, thus led to asymmetric growth (FIG. 46B). In this case, some nanobars and irregular nanocrystals appeared. We further decreased the reaction temperature to 125° C. and to 100° C., the portion of nanorods and irregular nanocrystals increased obviously which supported the aforementioned mechanism well (FIG. 46C-46D) The asymmetric growth mode can be easily switched to symmetric growth mode by enhancing surface diffusion simply by increasing the reaction temperature.

TABLE 5

Comparison of elemental composition of Pd@Ru nanocubes and nanocages, determined by ICP-MS.

| Reaction Temperature | Percentage of Pd (wt %) | Percentage of Ru (wt %) |
|---|---|---|
| 175° C. | 70.9 | 29.1 |
| 150° C. | 72.2 | 27.8 |

TABLE 5-continued

Comparison of elemental composition of Pd@Ru nanocubes and nanocages, determined by ICP-MS.

| Reaction Temperature | Percentage of Pd (wt %) | Percentage of Ru (wt %) |
|---|---|---|
| 125° C. | 73.3 | 26.7 |
| 100° C. | 74.0 | 26.0 |

After obtaining Pd@Ru core-shell nanocubes, we extended chemical etching approach to selectively remove Pd cores away by an oxidative etchant which reacts little with Ru. As is known, chemical stabilities of Pd and Ru are quite different (Romanenko, et al., *Appl. Catal. A* 2002, 227, 117-123). Specifically, Pd is much more vulnerable to chemical oxidation while Ru is highly resistant to oxidative corrosion. On the basis of this difference, chemical etching was conducted in an aqueous solution at 100° C. by using an etchant based on the $Fe^{3+}/Br^-$ pair (Xie, et al., *Angew. Chem. Int. Ed.* 2012, 51, 10266-10270). Consequently, the Pd cubic cores can be completely etched away based on the following reaction:

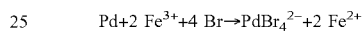

$$Pd+2\ Fe^{3+}+4\ Br^- \rightarrow PdBr_4^{2-}+2\ Fe^{2+}$$

Figures 47A, 47B, 47C, 47D:
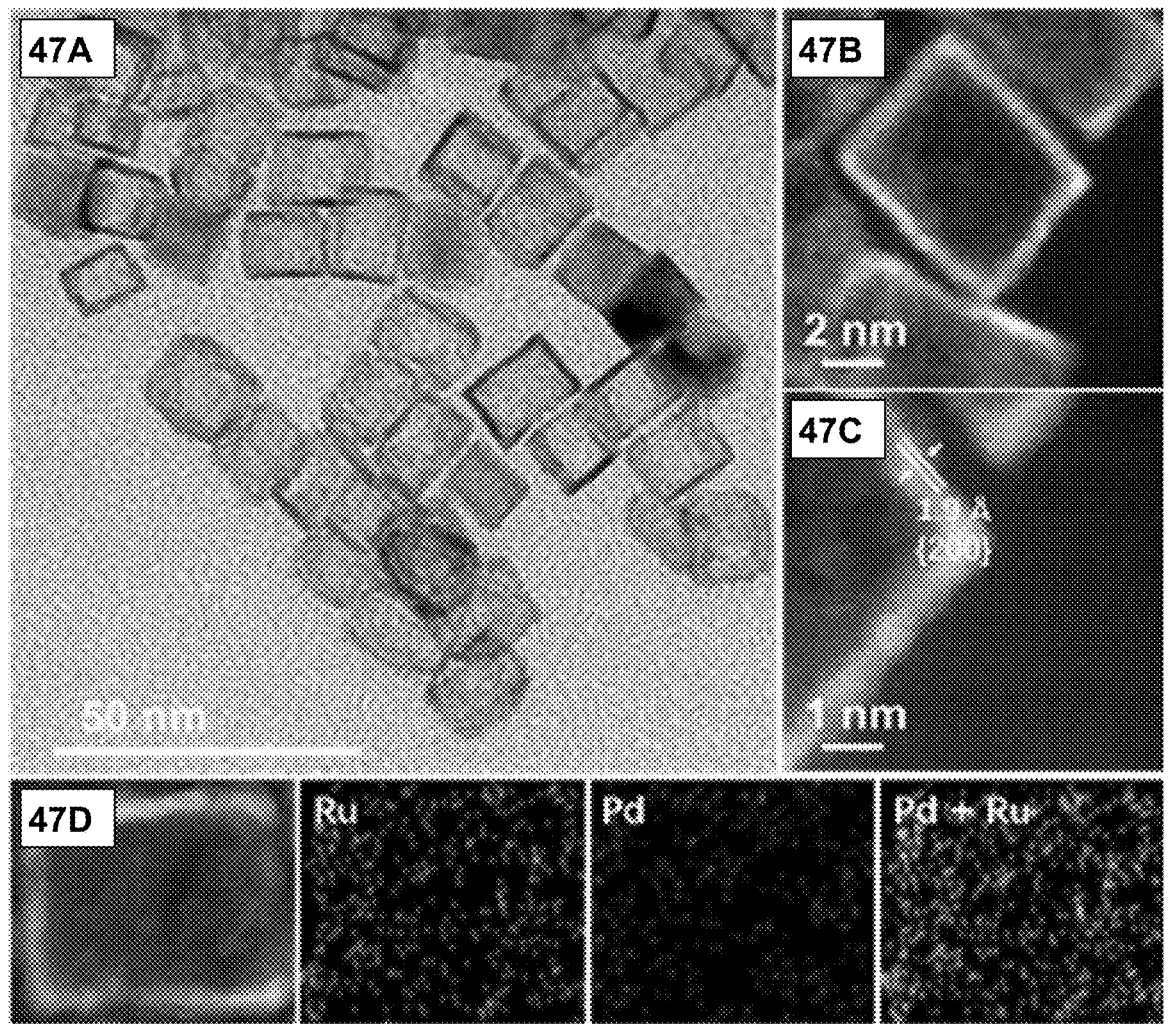
FIGS. 47A-47D show (FIG. 47A) Typical TEM image of Ru nanocagess.

FIG. 47A shows a typical TEM image of resultant Ru nancaoges. The resultant Ru nancaoges all maintained a cubic shape, indicating good stability towards the etching process (FIG. 47B). Besides, Ru adatoms were uniformly distributed on the side facets as well as the corners and edges, showing the nanocage structure. HAADF-STEM image in FIG. 47C shows a lattice spacing of 1.9 Å which can be assigned to the {200} planes of fcc Ru, consistent with that shown in FIG. 44C. It means the Ru shells kept their structure well during the etching process. The thickness of Ru nanocages is a few atomic layer thick, ~1.1 nm, verifying the ultrathin feature of Ru shells. In order to analyze the elemental composition of nanocages, EDX mapping was conducted. Compared to FIG. 44D, the amount of Pd cores decreased obviously after etching while the Ru shell was still intact (FIG. 47D). This verifies that the main composition in the nanocages is Ru. ICP-MS was also conducted to quantitatively analyze the elemental composition before and after etching process. Table 4 shows the comparison of elemental composition of the resultant core-shell nanocubes and nanocages. The percentage of Pd and Ru in Pd@Ru nanocubes was 68.6 wt % and 31.4 wt % separately. After applying etching process, the percentage of Pd decreased to 8.8 wt % while the percentage of Ru increased to 91.2 wt %, indicating the Pd cores can be sufficiently etched way by chemical etching. All these data demonstrate that the elemental composition of resultant nanocages was dominated by Ru.

TABLE 4

Comparison of elemental composition of Pd@Ru nanocubes and nanocages, determined by ICP-MS.

| | Percentage of Pd (wt %) | Percentage of Ru (wt %) |
|---|---|---|
| Before etching | 68.6 | 31.4 |
| After etching | 8.8 | 91.2 |

Figure 48:
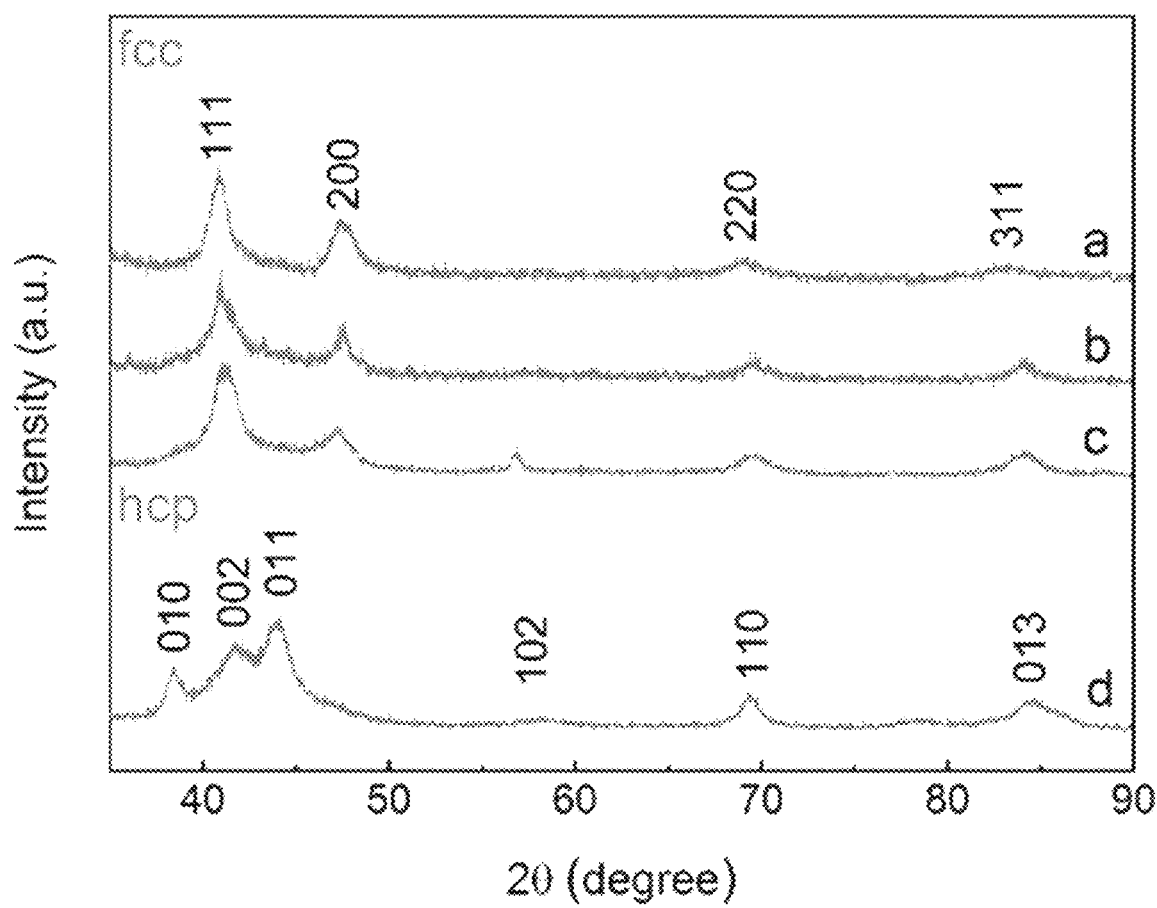
FIG. 48 shows XRD patterns of (a) Ru nanocages prepared by the standard procedure, and with different amount of Ru precursor while keeping the overall volume 20 mL. (b) 4 mg, (c) 10 mg, (d) 20 mg.
Figures 52A, 52B, 52C, 52D:
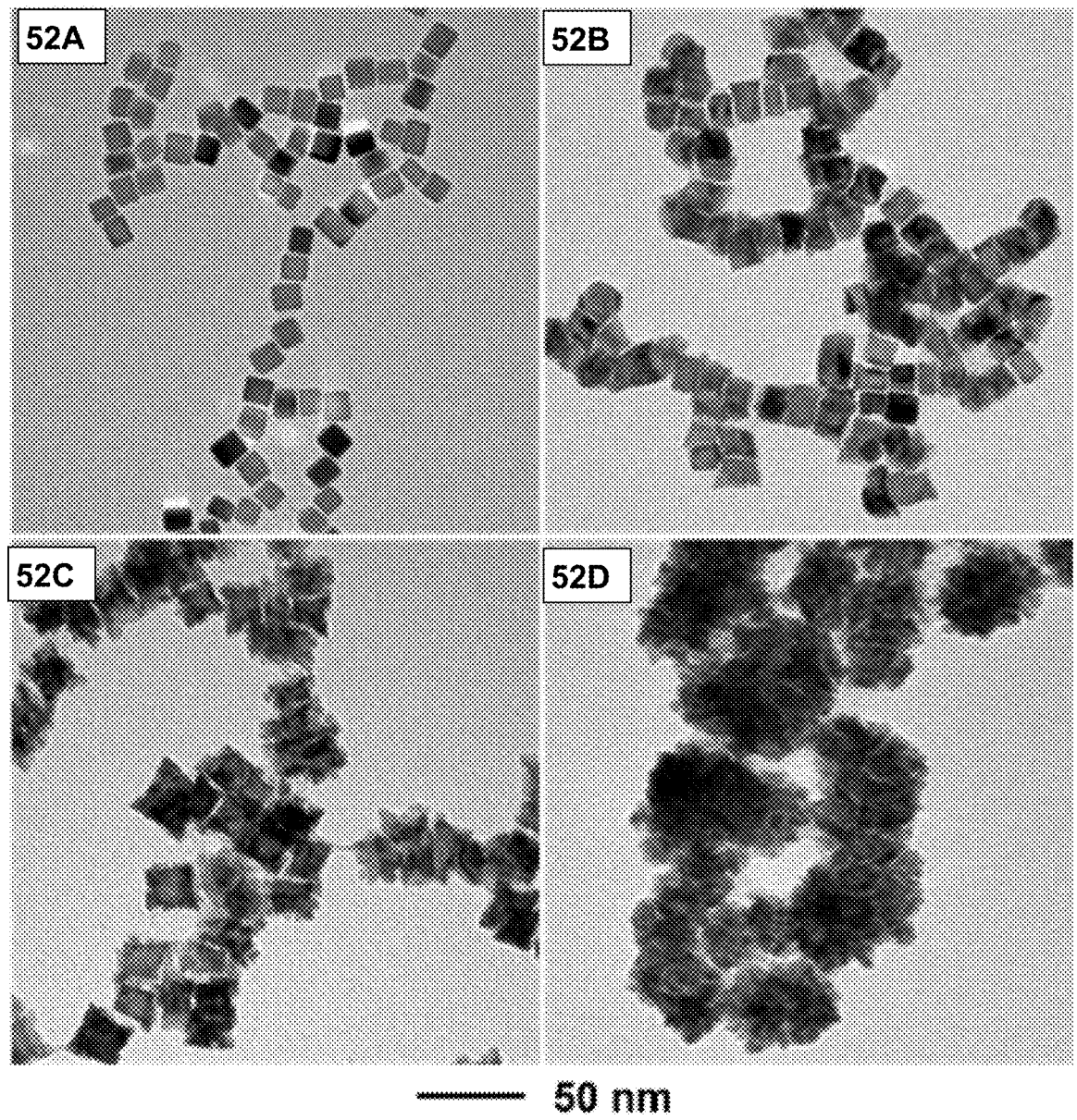
FIGS. 52A-52D show typical transmission electron microscopy (TEM) images of Pd@Ru nanocrystals prepared by the standard procedure except with different amount of Ru precursor while keeping the overall volume 20 mL.

As is known, Ru is a 4d transition metal and adopts an hcp structure at all temperature in the bulk. Although fcc Ru has been reported, the mechanism involved in the formation of fcc structure is still ambiguous (Kusada, et al., *J. Am. Chem. Soc.* 2013, 135, 5493-5496). In our work, seed-mediated growth seems to be an effective approach to synthesize Ru nanocrystals with fcc structure. As mentioned in FIG. 44C, for the Pd@Ru core-shell nanocubes, the continuous lattice from the Pd core to the Ru shell and the lattice spacing of Ru all verify the fcc structure of Ru shell. In order to confirm it, we conducted X-ray diffraction (XRD) to analyze the crystal structure of Ru nanocages. FIG. 48A shows the XRD pattern of Ru nanocages. The XRD pattern of Ru nanocages displayed the [111], [200], [220] and [311] reflexions characteristic of fcc crystal structure, confirming that the Ru nanocages are fcc structure. It can be attributed to the epitaxial overgrowth of Ru on fcc Pd seeds. As the atomic masses of Pd and Ru are similar and the lattice mismatch between Pd and fcc Ru is only 1.8%, the arrangement of Ru adatoms can be influenced by the interaction between Ru adatoms and Pd atoms and follows that of Pd atoms for the first few Ru layers. Thus, the arrangement of Ru adatoms will follow that of Pd atoms and subsequently, the resultant Ru shells will adopt fcc structure which is the same as that of Pd. It verifies that seed-mediate growth on fcc Pd cubic seeds is a suitable way to obtain Ru nanocages with fcc structure. In addition to the Ru nanocages prepared by standard procedure, we also applied etching process to the Pd@Ru nanocrystals prepared by varying the amount of Ru precursor (FIGS. 52A-52D). When we decreased the amount of Ru precursor to 1 mg, the resultant nanocrystals kept a good cubic shape, with sharp corners and smooth surface (FIG. 52A). Obviously, it followed a layer-by-layer growth mode. However, as the amount of Ru precursor was increased to 4 mg and then to 10 mg, the shape of resultant nanocrystals changed notably (FIGS. 52B-52C). The surface of the obtained nanocrystals became rougher with increasing number of islands on the Pd surfaces, indicating layer-plus-island growth. After etching process, we conducted XRD to analyze their crystal structure (FIG. 48). When the injected amount of Ru precursor was increased to 4 mg and 10 mg, the Ru nanocrystals still show fcc structure. Compared to FIG. 48, there is slight peak shift in FIG. 48. Especially, in FIG. 48, there is a small peak near 58° which can be assigned to the crystal face of hcp Ru. It implies that there should be some small Ru nanoparticles with hcp structure in that case. Interestingly, when the amount of Ru precursor was increased to 20 mg, its crystal structure changed from fcc to hcp, showing that the resultant Ru nanocrystals were dominated hcp Ru. All four XRD patterns verify the transition of Ru crystal structure from fcc to hcp as the injected amount of Ru precursor increases. The transition of Ru crystal structure over the amount of precursor can be explained by following proposed mechanisms. When the injected amount of Ru precursor is low, the deposition rate of Ru atoms can be comparable to the diffusion rate and Ru adatoms would follow the layer-by-layer growth mode. For the first few layers of Ru adatoms, due to the similar properties of Pd and Ru as well as the interaction between them, the arrangement of Ru adatoms follow that of Pd atoms, leading to an fcc structure. While when the injected amount of Ru precursor is much higher, the growth pathway is dominated by deposition rate which follows island growth mode. Especially, if it's too high, self-nucleation of Ru atoms can occur. The reduced Ru atoms would grow on the nuclei and form Ru nanoparticles. These nanoparticles should adopt hcp structure in our reaction system (Kusada, et al., *J. Am. Chem. Soc.* 2013, 135, 5493-5496). Then the driving force of decreasing surface energy would result in the agglomeration of these nanoparticles or adherence to the small Ru "islands" on the Pd surface (FIGS. 52C-52D). Thus, the crystal structure of Ru is dominated by hcp Ru nanoparticles, showing an overall hcp structure. The aforementioned transition of Ru crystal structure demonstrates that we can select the crystal structure of Ru nanocrystals simply by varying the amount of Ru precursor through seed-mediated growth.

Figures 49A, 49B, 49C, 49D:
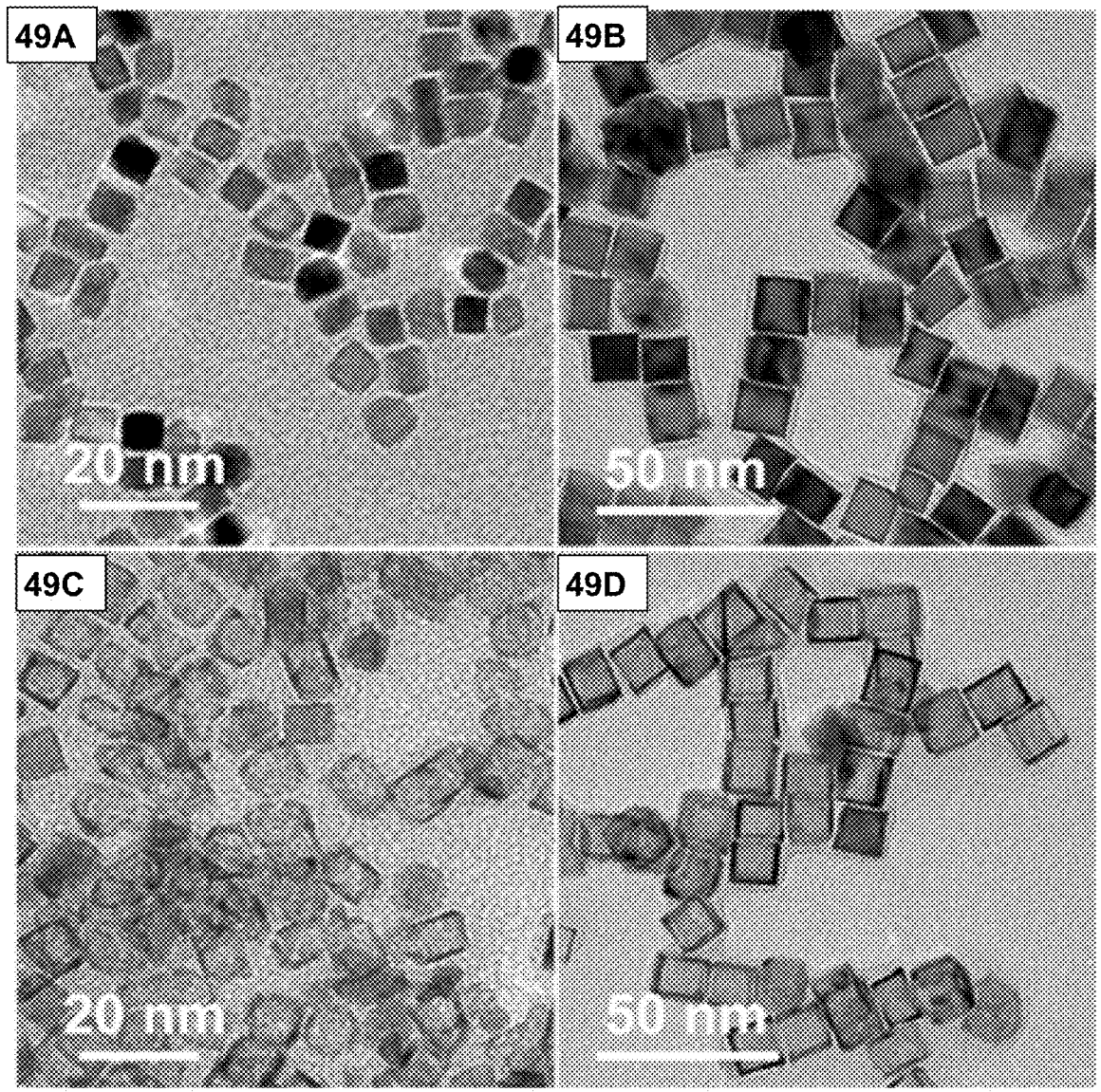
FIGS. 49A-49D show TEM images of Ru cubic nanocubes growing on (FIG. 49A) 6 nm cubes, (FIG. 49B) 18 nm cubes and (FIG. 49C) 6 nm Ru nanocages, (FIG. 49D) 18 nm Ru nanocages by selectively etching away the Pd cores.

We also extent our synthesis to Pd nanocubes with different sizes. Theoretically, small Pd seeds are more suitable for Ru adatoms to diffuse across the whole side facets, while Pd seeds with larger size would impose a longer travel distance for the Ru atatoms (Xia, et al., *J. Am. Chem. Soc.* 2014, 136, 10878-10881). In order to confirm it, 6 nm and 18 nm Pd seeds were used to prepare the Ru nanocages. (FIGS. 49A-49B show the resultant Pd@Ru nanocubes prepared by using Pd seeds with different sizes, which are uniform in size and shape. After chemical etching, both of the resultant Ru nanocrystals are nanocages (FIGS. 49C-49D). However, compared to 6 nm Ru nanocages, there are more Ru adatoms on the corners and edges on the 18 nm Ru nanocages, showing the insufficient diffusion of Ru adatoms on larger Pd seeds. It is consistent with what we expected. Overall, Pd seeds with smaller size are suitable for synthesizing Ru nanocages.

Conclusions

We have demonstrated the synthesis of Pd@Ru core-shell nanocubes through seed-mediated growth. For the polyol-based system, adding enough PVP, the slow injection rate of Ru precursor, the enhanced surface diffusion by relatively high reaction temperature, and proper amount of Ru precursor played a critical role in enabling the layer-by-layer overgrowth. Higher injection rate resulted in island growth mode while lower reaction temperature induced asymmetric growth. Epitaxial growth on Pd nanocubes by manipulating the deposition rate and surface diffusion led to the formation of Pd@Ru core-shell nanocubes with well-controlled shape. We then applied chemical etching approach to selectively remove Pd cores and obtained Ru nanocages with uniform shape and size. Significantly, lattice fringe of grown Ru atoms and continuous lattice of Pd@Ru nanocubes indicated the fcc structure of grown Ru shell. The XRD data also supported the fcc structure of Ru nanocages which was different from hcp structure of bulk Ru. Varying the amount of Ru precursor can not only influence the growth mode, but also select the crystal structure of grown Ru nanocrystals. The crystal structure of Ru shell can be switched from fcc to hcp by simply increasing the amount of Ru precursor. Besides, our synthesis can be extended to Pd seeds with different sizes. Compared to larger Pd seeds, Pd cubes with smaller size are more suitable to synthesize Ru nanocages.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. A polyhedral nanocage comprising
   a hollow interior,
   a plurality of facets encapsulating the hollow interior,
   wherein each facet is made of a plurality of metal atoms,
   wherein each facet comprises at least 80% of a single type of metal atom, and
   wherein each facet has a thickness of about 0.5 to 5 nm, wherein the polyhedral nanocage is produced by a process that involves
producing a polyhedral Pd metal seed,
depositing Ru, Rh, Ir, or Pt metal atoms on the surface of the Pd metal seed so as to at least substantially cover the surface, and
etching away the Pd metal seed to produce the polyhedral nanocage.

2. The polyhedral nanocage of claim 1, wherein the nanocage is an icosahedral nanocage having an average diameter of about 5 nm to 15 nm,
wherein about 70% to 100% of the metal atoms are Pt atoms packed in a face-centered cubic structure, and
wherein each of the facets is a {111} facet having a thickness of about 2 to 5 atomic layers.

3. The polyhedral nanocage of claim 1, wherein the nanocage is an octahedral nanocage having an average edge length of about 6 nm to 24 nm,
wherein about 80% to 100% of the metal atoms are Pt atoms packed in a face-centered cubic structure, and
wherein each of the facets is a {111} facet having a thickness of about 0.5 nm to 2.0 nm.

4. The polyhedral nanocage of claim 1, wherein the nanocage is a hexagonal prism nanocage having two hexagonal {111} facets having a diameter of about 50 nm to 150 nm,
wherein the nanocage has a height of about 20 nm to 30 nm, and
wherein the facets have a thickness of about 5 to 10 atomic layers.

5. The polyhedral nanocage of claim 1, wherein the nanocage is a cubic nanocage having an average edge length of about 5 nm to 25 nm,
wherein about 80% to 100% of the metal atoms are Pt atoms having a face-centered cubic packing structure, and
wherein each of the facets is a {100} facet having a thickness of about 2 to 6 atomic layers.

6. The polyhedral nanocage of claim 1, wherein the nanocage is a decahedral nanocage having an average edge length of about 18 nm to 25 nm,
wherein about 80% to 100% of the metal atoms are Pt atoms packed in a face-centered cubic structure, and
wherein each of the facets is a {111} facet having a thickness of about 2 to 5 atomic layers.

7. The polyhedral nanocage of claim 1, wherein the nanocage is a cubic nanocage having an average edge length of about 7.5 nm,
wherein about 85% to 95% of the metal atoms are Rh atoms packed in a face-centered cubic structure, and
wherein each of the facets is a {100} facet having a thickness of about 0.5 nm to 2.5 nm.

8. The polyhedral nanocage of claim 1, wherein the nanocage is an octahedral nanocage having an average edge length of about 18 nm to 27 nm,
wherein about 85% to 95% of the metal atoms are Rh atoms packed in a face-centered cubic structure, and
wherein each of the facets is a {111} facet having a thickness of about 0.5 nm to 2.5 nm.

9. The polyhedral nanocage of claim 1, wherein the nanocage is a cubic nanocage having an average edge length of about 6 nm to 18 nm,
wherein about 85% to 95% of the metal atoms are Ir atoms packed in a face-centered cubic structure, and
wherein each of the facets is a {100} facet having a thickness of about 0.5 nm to 2.5 nm.

10. The polyhedral nanocage of claim 1, wherein the nanocage is an octahedral nanocage having an average edge length of about 6 nm,
wherein about 85% to 95% of the metal atoms are Ir atoms packed in a face-centered cubic structure, and
wherein each of the facets is a {111} facet having a thickness of about 0.5 nm to 2.5 nm.

11. The polyhedral nanocage of claim 1, wherein each of the facets has a thickness of about 2 to 6 atomic layers.

12. The polyhedral nanocage of claim 1, wherein each of the facets has a thickness of from 0.5 to 1.5 nm.

13. The polyhedral nanocage of claim 1, further comprising a plurality of twin boundaries, wherein each facet is joined to an adjacent facet through a twin boundary.

14. The polyhedral nanocage of claim 1, wherein the polyhedral nanocage is selected from the group consisting of a cubic nanocage, a tetrahedral nanocage, an octahedral nanocage, a rhombic dodecahedral nanocage, a decahedral nanocage, an icosahedral nanocage, a triangular prism nanocage, a hexagonal prism nanocage, a cuboctahedral nanocage, and rod-shaped nanocage, a bar-shaped nanocage, and a wire-shaped (or tube-like) nanocage.

15. The polyhedral nanocage of claim 1, wherein the nanocage has the largest dimension of about 6 nm to 30 nm.

16. The polyhedral nanocage of claim 1, wherein one or more of the facets is selected from the group consisting of a {100} facet, a {110} facet, and a {111} facet.

* * * * *